US012772138B2

(12) United States Patent
Ishii

(10) Patent No.: US 12,772,138 B2
(45) Date of Patent: Oct. 20, 2026

(54) APPLICABILITY OF SYSTEM INFORMATION PROVIDED BY A CONDITIONAL RECONFIGURATION

(71) Applicant: SHARP KABUSHIKI KAISHA, Sakai City (JP)

(72) Inventor: Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 350 days.

(21) Appl. No.: 18/566,776

(22) PCT Filed: Jun. 6, 2022

(86) PCT No.: PCT/JP2022/022769
§ 371 (c)(1),
(2) Date: Dec. 4, 2023

(87) PCT Pub. No.: WO2022/259999
PCT Pub. Date: Dec. 15, 2022

(65) Prior Publication Data

US 2024/0381213 A1 Nov. 14, 2024

Related U.S. Application Data

(60) Provisional application No. 63/197,985, filed on Jun. 7, 2021.

(51) Int. Cl.
*H04W 36/36* (2009.01)
*H04W 36/00* (2009.01)
*H04W 36/30* (2009.01)

(52) U.S. Cl.
CPC ..... *H04W 36/362* (2023.05); *H04W 36/0061* (2013.01); *H04W 36/305* (2018.08)

(58) Field of Classification Search
CPC ........... H04W 36/362; H04W 36/0061; H04W 36/305; H04W 36/0079; H04W 36/0077
See application file for complete search history.

(56) References Cited

U.S. PATENT DOCUMENTS 12,439,303 B2 * 10/2025 Wu .................. H04W 36/0079
12,471,180 B2 * 11/2025 Rugeland ........ H04W 36/00837
(Continued)

OTHER PUBLICATIONS

3GPP TS 38.423 V16.5.0 (Apr. 2021) 3rd Generation Partnership Project; Technical Specification Group Radio Access Network; NG-RAN; Xn application protocol (XnAP) (Release 16).
(Continued)

*Primary Examiner* — Kenneth T Lam
(74) *Attorney, Agent, or Firm* — ScienBiziP, P.C.

(57) ABSTRACT

A wireless terminal which comprises receiver circuitry and processor circuitry. The processor circuitry is configured to establish a connection to an access node serving a first cell. The receiver circuitry is configured to receive, from the first cell, a reconfiguration message comprising a conditional reconfiguration for a second cell. The conditional reconfiguration comprises: a triggering condition, configuration parameters, and a first version of system information. The processor circuitry is further configured, upon the triggering condition being fulfilled, to: execute the conditional reconfiguration by applying the configuration parameters for the second cell; and, determine whether or not the first version of the system information is applied for the second cell, based on whether or not a second version of the system information is received from the second cell after receiving the conditional reconfiguration and before executing the conditional reconfiguration.

13 Claims, 61 Drawing Sheets

(56) References Cited

U.S. PATENT DOCUMENTS

| | | | | |
|---|---|---|---|---|
| 2019/0045379 A1* | 2/2019 | Ishii | ...................... | H04W 24/02 |
| 2021/0377825 A1* | 12/2021 | Deenoo | ............. | H04W 36/0077 |
| 2022/0361071 A1* | 11/2022 | Awada | .............. | H04W 36/0005 |
| 2023/0115685 A1* | 4/2023 | Hwang | .................... | H04W 8/26 709/245 |
| 2023/0388891 A1* | 11/2023 | Wu | ................. | H04W 36/00692 |

OTHER PUBLICATIONS

3GPP TS 38.331 V15.5.1 (Apr. 2019) 3rd Generation Partnership Project; Technical Specification Group Radio Access Network; NR; Radio Resource Control (RRC) protocol specification (Release 15).
3GPP TS 38.213 V16.5.0 (Mar. 2021) 3rd Generation Partnership Project; Technical Specification Group Radio Access Network; NR; Physical layer procedures for control (Release 16).
3GPP TS 37.340 V16.5.0 (Mar. 2021) 3rd Generation Partnership Project; Technical Specification Group Radio Access Network; Evolved Universal Terrestrial Radio Access (E-UTRA) and NR; Multi-connectivity; Stage 2 (Release 16).
3GPP TS 33.501 V17.1.0 (Mar. 2021) 3rd Generation Partnership Project; Technical Specification Group Services and System Aspects; Security architecture and procedures for 5G system (Release 17).
Samsung (Offline rapporteur), "Offline discussion 208: Finalization of T312 for Fast handover failure recovery", R2-2003848, 3GPP TSG-RAN WG2 Meeting #109Bis-e, Elbonia, Online, Apr. 20-30, 2020.
Nokia et al., "Report from [AT109bis-e][207][MOB] Open CHO issues", R2-2003847, 3GPP TSG-RAN WG2 Meeting #109bis-e, Elbonia, Online, Apr. 20-30, 2020.
Sharp, "UE configuration release in RRC reestablishment", R2-2003609, 3GPP TSG-RAN WG2#109bis e-meeting, Electronic, Apr. 20-Apr. 30, 2020.
Huawei et al., "6.9.3.3 UE capabilities for conditional handover and fast handover failure recovery", R2-2003579, 3GPP TSG-RAN WG2 #109bis-e, Electronic, Apr. 20-Apr. 30, 2020.
Huawei et al., "6.9.3.2 Open issues and corrections for fast handover failure recovery", R2-2003578, 3GPP TSG-RAN WG2 #109bis-e, Electronic, Apr. 20-Apr. 30, 2020.
Huawei et al., "Discussion on leftovers for CHO", R2-2003577, 3GPP TSG-RAN WG2 #109bis-e, Electronic, Apr. 20-Apr. 30, 2020.
ZTE Corporation et al., "Further consideration on conventional HO overriding a CHO command", R2-2003422, 3GPP TSG RAN WG2 Meeting #109bis-e, Electronic, Apr. 20-30, 2020.
Samsung, "Clarification on source reconfiguration during CHO", R2-2003333, 3GPP TSG-WG2 Meeting #109-e-bis, e-Meeting, Apr. 20-Apr. 30, 2020.
China Telecom, "Further details of CHO configuration and execution", R2-2003260, 3GPP TSG-RAN WG2 Meeting #109bis-e, Online, Apr. 20-Apr. 30, 2020.
Nokia et al., "MCG recovery versus recovery via CHO-Rel-16 impact", R2-2003106, 3GPP TSG-RAN WG2 Meeting #109bis-e, Elbonia, Apr. 20-30, 2020.
Nokia et al., "E-mail discussion report [Post109e#12][MOB] Resolving open issues for CHO", R2-2003105, 3GPP TSG-RAN WG2 Meeting #109bis, Elbonia, Online, Apr. 20-30, 2020.
Ericsson, "UE capabilities for CHO", R2-2003037, 3GPP TSG-RAN WG2 #109bis-e, Electronic meeting, Apr. 20-30, 2020.
Ericsson, "Failure handling interaction (CHO, fast MCG recovery and timer T312)", Tdoc R2-2003036, 3GPP TSG-RAN WG2 #109bis-e, Electronic meeting, Apr. 20-30, 2020.
Ericsson, "CHO and MR-DC operation", Tdoc R2-2003035, 3GPP TSG-RAN WG2 #109e, Electronic meeting, Apr. 20-30, 2020.
Panasonic, "Corrections to conditional reconfiguration evaluation", R2-2002996, 3GPP TSG-RAN WG2 Meeting #109bis, Online, Apr. 20-Apr. 30, 2020.
OPPO, "Discussion of some remaining issues for CHO", R2-2002951, 3GPP TSG-RAN WG2 Meeting #109bis-e, Electronic, Apr. 20-Apr. 30, 2020.
LG Electronics Inc., "Consideration on CHO Capability", R2-2002902, 3GPP TSG-RAN WG2 Meeting #109bis-e, Online, Apr. 20-24, 2020.
LG Electronics Inc., "Failure Handling of both CHO and MR-DC", R2-2002901, 3GPP TSG-RAN WG2 Meeting #109bis-e, Online, Apr. 20-24, 2020.
LG Electronics Inc., "T304 Running Issue When CHO Execution", R2-2002900, Revision of R2-2001535, 3GPP TSG-RAN WG2 Meeting #109bis-e, Online, Apr. 20-24, 2020.
Futurewei, "On measurement and evaluation during CHO execution", R2-2002748, 3GPP TSG-RAN WG2 Meeting #109e-bis, E-Conference, Apr. 20-30, 2020.
Quectel, "Discussions on VarRLF-Report Setting", R2-2002599, 3GPP TSG RAN WG2#109bis-e, Electronic meeting, Apr. 20-Apr. 30, 2020.
3GPP TS 38.300 V16.5.0 (Mar. 2021) 3rd Generation Partnership Project; Technical Specification Group Radio Access Network; NR; NR and NG-RAN Overall Description; Stage 2 (Release 16).

* cited by examiner

APPLICABILITY OF SYSTEM INFORMATION PROVIDED BY A CONDITIONAL RECONFIGURATION

TECHNICAL FIELD

The technology relates to wireless communications, and particularly to conditional handovers in a radio access network.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e., LTE base stations). An Xn interface exists between gNB-gNB, between (gNB)-(ng-eNB) and between (ng-cNB)-(ng-eNB). The Xn is the network interface between NG-RAN nodes. Xn-U stands for Xn User Plane interface and Xn-C stands for Xn Control Plane interface. An NG interface exists between 5GC and the base stations (i.e., gNB & ng-cNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In typical cellular mobile communication systems, handover (HO) procedures are adopted to manage the mobility of a wireless terminal (e.g., User Equipment, UE). In general, there are two types of handovers: (1) make after break and (2) make before break. In make after break HO, a connection between a wireless terminal and a current (source) base station is temporarily disconnected before establishing a new connection between the wireless terminal and a target base station. In contrast, in make before break HO the new connection is prepared before breaking the connection with the current base station.

3GPP has completed the basic feature for new radio (NR) systems in Release 15 specification. 3GPP Release 15 describes only basic handover, i.e., make after break. The basic make after break handover described in 3GPP Release 15 is mainly based on LTE handover mechanism in which the network controls UE mobility based on UE measurement reporting. In the basic make after break handover described in 3GPP Release 15, similar to LTE, a source gNB triggers handover by sending a HO request to target gNB. After receiving an acknowledgement, ACK, from the target gNB, the source gNB initiates handover by sending a HO command to the UE, the HO command including the target cell configuration. The UE then performs an initial access to the target cell in order to establish a connection with the with target cell.

In 3GPP Release 16, standardization of several HO improvements is ongoing. Conditional handover (CHO) is one of such 3GPP Release 16 improvement aimed for in-creasing reliability and robustness of handovers. In CHO, the gNB of the source cell provides CHO configuration parameters including candidate target cells (also referred as target candidate cells) and triggering conditions to the UE in RRC_CONNECTED state. After receipt of the CHO configuration parameters, the UE may perform measurements of radio signals from the source cell as well as the candidate target cells, and may autonomously initiate a handover to one of the candidate cells whose triggering conditions are met.

What is needed, therefore, are apparatus, methods, and procedures to efficiently and effectively implement and/or handle conditional handover configurations.

SUMMARY OF INVENTION

In one example, a wireless terminal comprising: processor circuitry configured to establish a connection to an access node serving a first cell; receiver circuitry configured to receive, from the first cell, a reconfiguration message comprising a conditional reconfiguration for a second cell, the conditional reconfiguration comprising: a triggering condition, configuration parameters, and a first version of system information; the processor circuitry further configured, upon the triggering condition being fulfilled, to: execute the conditional reconfiguration by applying the configuration parameters for the second cell; and, determine whether or not the first version of the system information is applied for the second cell, based on whether or not a second version of the system information is received from the second cell after receiving the conditional reconfiguration and before executing the conditional reconfiguration.

In one example, an access node serving a first cell, the access node comprising: processor circuitry configured to establish a connection, via a first cell, to a wireless terminal; transmitter circuitry configured to transmit, to the wireless terminal, a reconfiguration message comprising a conditional reconfiguration for a second cell, the conditional reconfiguration comprising: a triggering condition, configuration parameters, and a first version of system information, wherein the reconfiguration message is configured whereby, upon the triggering condition being fulfilled: the conditional re-configuration is executed by the wireless terminal applying the configuration parameters for the second cell, and; whether or not the first version of the system information is applied for the second cell is determined by the wireless terminal, based on whether or not a second version of the system information is received from the second cell after the conditional reconfiguration is received and before the conditional reconfiguration is executed.

In one example, a method for a wireless terminal comprising: establishing a connection to an access node serving a first cell; receiving, from the first cell, a reconfiguration message comprising a conditional reconfiguration for a second cell, the conditional reconfiguration comprising: a triggering condition, configuration parameters, and a first version of system information; upon the triggering condition being fulfilled: executing the conditional reconfiguration by applying the configuration parameters for the second cell, and; determining whether or not the first version of the system information is applied for the second cell, based on whether or not a second version of the system information is received from the second cell after receiving the conditional reconfiguration and before executing the conditional reconfiguration.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DESCRIPTION OF EMBODIMENTS

Figure 1:
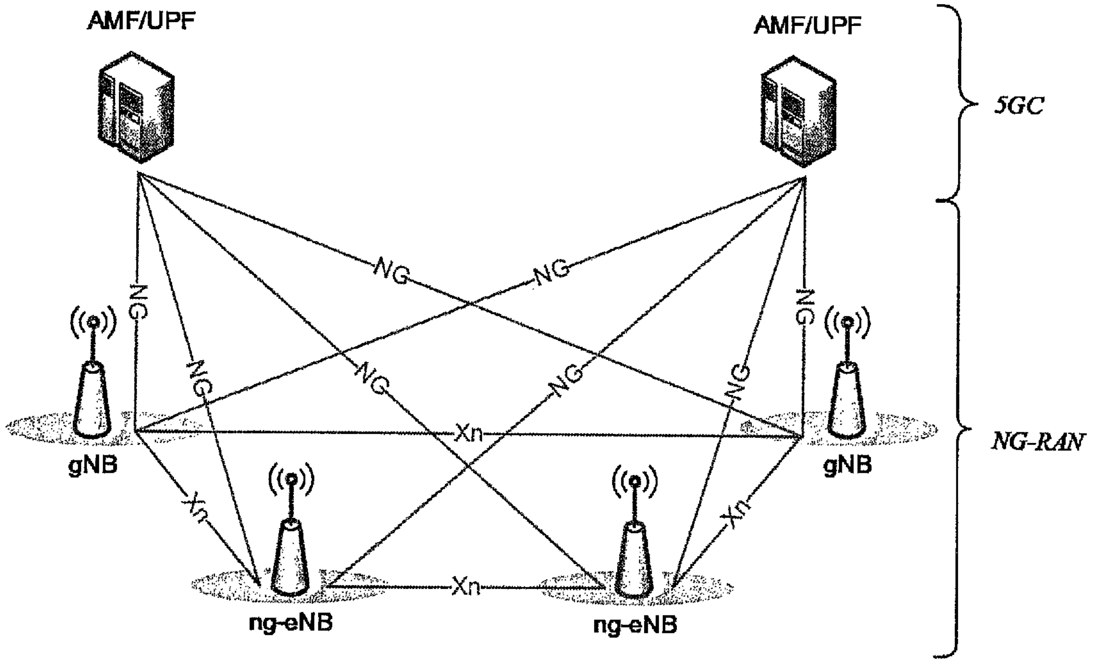
PRIOR ART Fig. 1
FIG. 1 is a diagrammatic view of overall architecture for a 5G New Radio system.

In one of its example aspects the technology disclosed herein concerns a wireless terminal which comprises receiver circuitry and processor circuitry. The processor circuitry is configured to establish a connection to an access node serving a first cell. The receiver circuitry is configured to receive, from the first cell, a reconfiguration message comprising a conditional reconfiguration for a second cell. In an example example embodiment and mode the conditional reconfiguration comprises: a triggering condition, configuration parameters, and a first version of system information. The processor circuitry is further configured, upon the triggering condition being fulfilled, to: execute the conditional reconfiguration by applying the configuration parameters for the second cell; and, determine whether or not the first version of the system information is applied for the second cell, based on whether or not a second version of the system information is received from the second cell after receiving the conditional reconfiguration and before executing the conditional reconfiguration. Methods of operating such wireless terminals are also disclosed.

In another of its example aspects the technology disclosed herein concerns an access node which serves a cell. The access node comprises processor circuitry and transmitter circuitry. The processor circuitry is configured to establish a connection, via a first cell, to a wireless terminal. The transmitter circuitry is configured to transmit, to the wireless terminal, a reconfiguration message comprising a conditional reconfiguration for a second cell. The conditional reconfiguration comprises: a triggering condition, configuration parameters, and a first version of system information. The reconfiguration message is configured whereby, upon the triggering condition being fulfilled: the conditional reconfiguration is executed by the wireless terminal applying the configuration parameters for the second cell, and; whether or not the first version of the system information is applied for the second cell is determined by the wireless terminal, based on whether or not a second version of the system information is received from the second cell after the conditional reconfiguration is received and before the conditional reconfiguration is executed. Methods of operating such access nodes are also disclosed.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. A frame, which may have both downlink portion(s) and uplink portion(s), is communicated between the base station and the wireless terminal. Each frame may comprise plural subframes, and a subframe may be divided into slots. The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural sub-carriers and plural symbols (e.g., plural resource elements (RE)) and is called a resource block (RB). A resource block may comprise, for example, 84 resource elements, i.e., 12 subcarriers and 7 symbols, in case of normal cyclic prefix.

Figure 2:
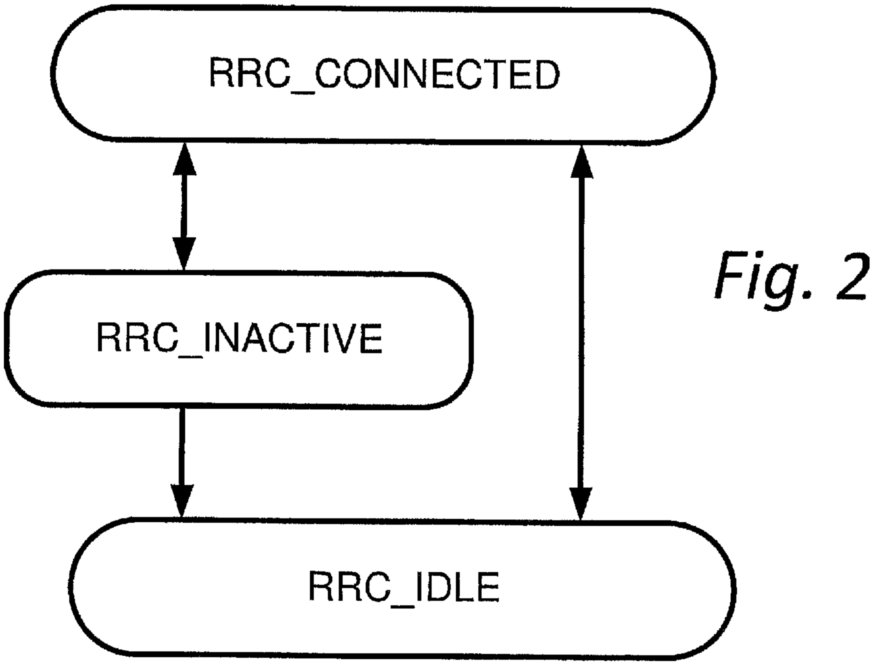
FIG. 2 is a diagrammatic view showing transition states of a Radio Resource Control RRC state machine.

As described herein, both an access node and a wireless terminal may manage respective Radio Resource Control (RRC) state machines. The RRC state machines transition between several RRC states including RRC_IDLE, RRC_INACTIVE and RRC_CONNECTED. FIG. 2 depicts the state transition diagram of the RRC states. From the vantage point of a wireless terminal e.g., user equipment (UE), the RRC states may be briefly characterized as follows:

- RRC_IDLE:
  - A UE specific DRX (discontinuous reception) may be configured by upper layers;
  - UE controlled mobility based on network configuration;
  - The UE:
    - Monitors a Paging channel;
    - Performs neighboring cell measurements and cell (re-)selection;
    - Acquires system information.
- RRC_INACTIVE:
  - A UE specific DRX may be configured by upper layers or by RRC layer;
  - UE controlled mobility based on network configuration;
  - The UE stores the Access Stratum (AS) context;
  - The UE:
    - Monitors a Paging channel;
    - Performs neighboring cell measurements and cell (re-)selection;
    - Performs RAN-based notification area updates when moving outside the RAN-based notification area;
    - Acquires system information.
- RRC_CONNECTED:
  - The UE stores the AS context.
  - Transfer of unicast data to/from UE.
  - At lower layers, the UE may be configured with a UE specific DRX;
  - Network controlled mobility, i.e. handover within NR and to/from E-UTRAN;
  - The UE:
    - Monitors a Paging channel;
    - Monitors control channels associated with the shared data channel to determine if data is scheduled for it;
    - Provides channel quality and feedback information;
    - Performs neighboring cell measurements and measurement reporting;
    - Acquires system information.

Figure 3:
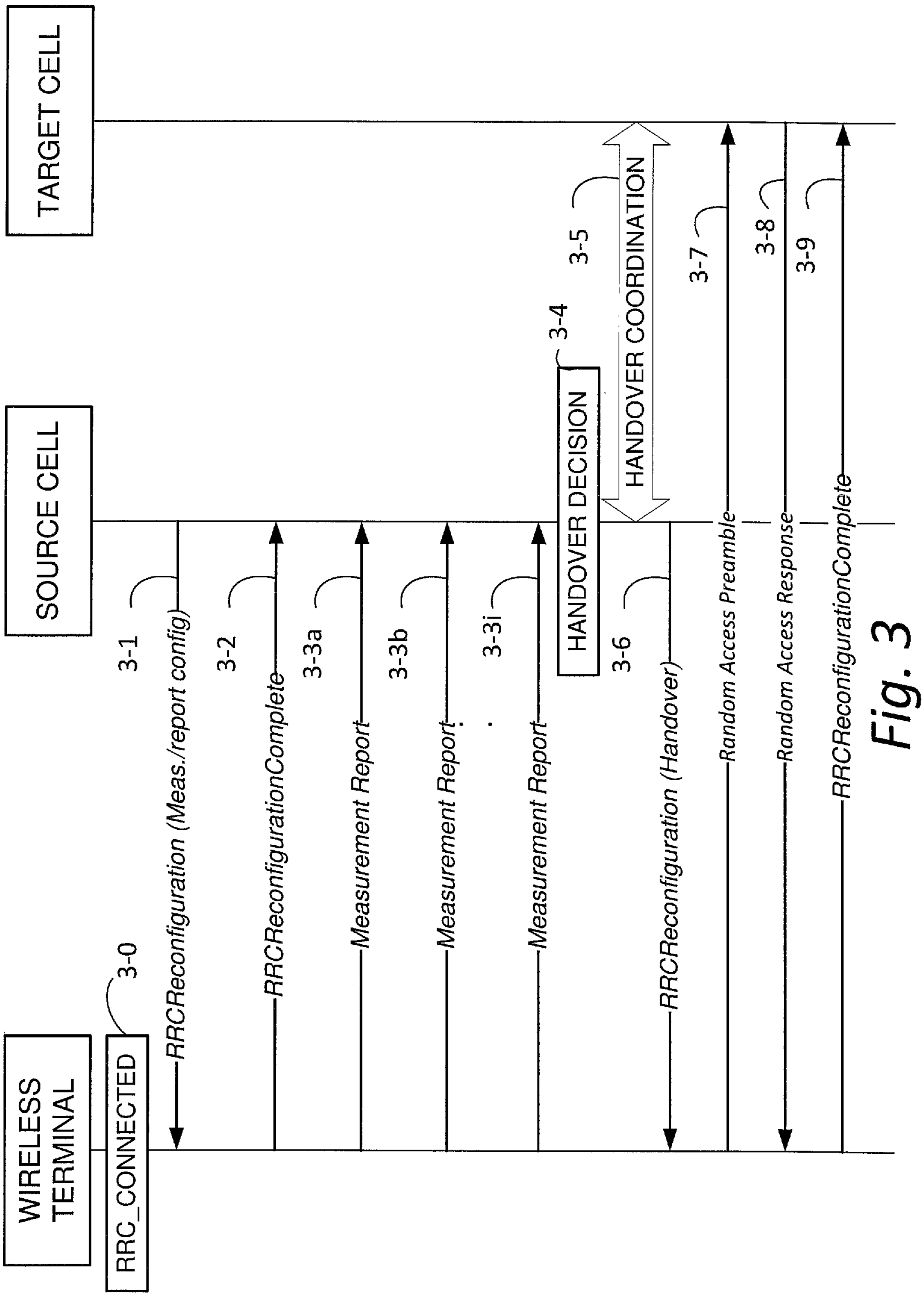
FIG. 3 is a diagrammatic view of showing signaling and messages of a procedure/scenario of a basic handover in an example cellular communications system.

FIG. 3 shows a procedure/scenario of a basic handover in a cellular communication system. During RRC_CONNECTED state, depicted by act 3-0, as act 3-1 the wireless terminal, e.g., UE, may receive RRCReconfiguration message from the gNB of the current serving cell (source cell). The RRCReconfiguration message of act 3-1 may comprise configuration parameters (a) for radio signal measurements and (b) reporting of measurement results (measurement configuration). The RRCReconfiguration message of act 3-1 may be acknowledged with an RRCReconfigurationComplete message, as shown by act 3-2. Thereafter, the UE may start measurements and, as shown by act 3-3*a*, act 3-3*b*, and act 3-3*i*, may transmit the results of the measurements to the gNB of the source cell based on the configuration parameters which were received in the RRCReconfiguration message of act 3-1. The configuration parameters may include radio resources (frequencies, sub-carrier spacing, etc.) for measurements and conditions to trigger reporting. Upon receiving one of the measurement reports of acts 3-3*x*, as act 3-4 the gNB of the source cell may determine whether or not to handover the UE to another cell. For example, when the measurement report indicates that signal quality from a neighbor cell (Target cell in FIG. 3) is better than the one from the source cell, the gNB of the source cell may initiate a handover to the target cell. As shown by act 3-5, the gNB may then conduct a coordination procedure to the gNB of the target cell. After the coordination depicted by act 3-5 is completed, as shown by act 3-6 the gNB may send to the UE a RRCReconfiguration message. The RRCReconfiguration message of act 3-6 may include a command to handover to the target cell. Upon receiving RRCReconfiguration message of act 3-6 with the handover command, the UE may start an initial access to the target cell by sending Random Access Preamble as shown by act 3-7. In response to it sending of the Random Access Preamble as shown by act 3-7, the UE should receive a Random Access Response message as shown by act 3-8. The handover procedure is then completed by the UE sending a RRCReconfigurationComplete message to the gNB of the target cell, as shown by act 3-9.

Figure 4:
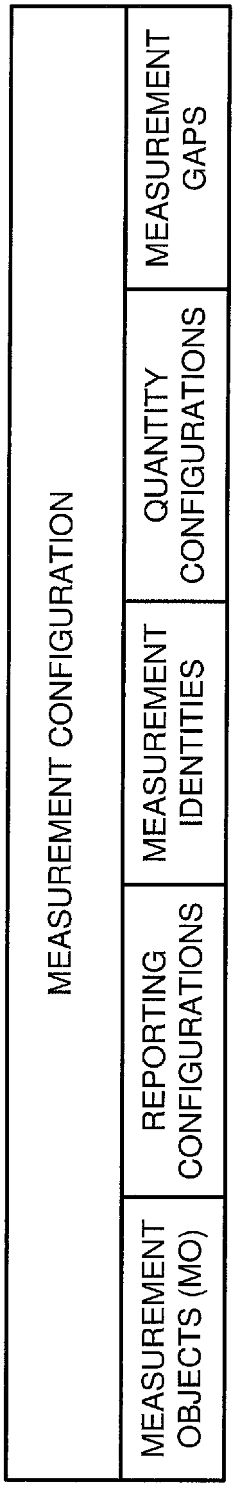
FIG. 4 is a diagrammatic view showing example parameters of a measurement configuration which may be provided by a source node of a radio access network.

In one configuration, the measurement configuration, which may be realized by the parameters of the RRCReconfiguration message of act 3-1, may comprise the parameters which are illustrated in FIG. 4 as "measurement objects", "reporting configurations", "measurement identities", "quantity configurations", and "measurement gaps", each of which are described below.

1. Measurement objects: A list of objects on which the UE shall perform the measurements.

For intra-frequency and inter-frequency measurements a measurement object (MO) indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration may comprise the following:

Reporting criterion: The criterion that triggers the UE to send a measurement report. This can either be periodical or a single event description.

Reference Signal (RS) type: The RS that the UE uses for beam and cell measurement results (synchronization signal SS/Physical Broadcast Channel PBCH block or Channel State Information-Reference Signal CSI-RS).

Reporting format: The quantities per cell and per beam that the UE includes in the measurement report, e.g. received signal received power, RSRP and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED state may maintain a measurement object list, a reporting configuration list, and a measurement identities list. The measurement object list may possibly include New Radio, NR, measurement object(s) and inter-RAT objects. Similarly, the reporting configuration list may include NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures may distinguish the three types of cells: the serving cell(s), the listed cell(s), and the detected cell(s). The listed cells are cells listed within the measurement object(s). The detected cells are cells that are not listed within the measurement object(s) but are detected by the UE on the synchronization signal block, SSB, frequency(ies) and subcarrier spacing(s) indicated by the measurement object(s).

For measurement object(s), the UE measures and reports on the serving cell(s), listed cells and/or detected cells. For inter-RAT measurements object(s) of E-UTRA, the UE measures and reports on listed cells and detected cells.

Listing 1 shows an example implementation of the measurement configuration, per 3GPP TS 38.331 v15.5.1.

Listing 1

```
MeasConfig ::=                              SEQUENCE {
   measObjectToRemoveList                               MeasObjectToRemoveList
OPTIONAL,    -- Need N
   measObjectToAddModList                               MeasObjectToAddModList
OPTIONAL,    -- Need N
   reportConfigToRemoveList
ReportConfigToRemoveList
OPTIONAL,    -- Need N
   reportConfigToAddModList
ReportConfigToAddModList
OPTIONAL,    -- Need N
   measIdToRemoveList                                 MeasIdToRemoveList
OPTIONAL,    -- Need N
   measIdToAddModList                                 MeasIdToAddModList
OPTIONAL,    -- Need N
   s-MeasureConfig                                  CHOICE {
      ssb-RSRP                                             RSRP-Range,
      csi-RSRP                                             RSRP-Range
   }
```

-continued

Listing 1

```
OPTIONAL,   -- Need M
   quantityConfig                                         QuantityConfig
OPTIONAL,   -- Need M
   measGapConfig                                          MeasGapConfig
OPTIONAL,   -- Need M
   measGapSharingConfig                                   MeasGapSharingConfig
OPTIONAL,   -- Need M
   ...
}
MeasObjectToRemoveList ::=              SEQUENCE (SIZE
(1..maxNrofObjectId)) OF MeasObjectId
MeasIdToRemoveList ::=                                 SEQUENCE (SIZE
(1..maxNrofMeasId)) OF MeasId
ReportConfigToRemoveList ::=            SEQUENCE (SIZE
(1..maxReportConfigId)) OF ReportConfigId
MeasIdToAddModList ::=   SEQUENCE (SIZE (1..maxNrofMeasId)) OF
MeasIdToAddMod
MeasIdToAddMod ::=                           SEQUENCE {
   measId                                       MeasId,
   measObjectId                                   MeasObjectId,
   reportConfigId                                   ReportConfigId
}
MeasObjectNR ::=                            SEQUENCE {
   ssbFrequency                                   ARFCN-ValueNR
OPTIONAL,   -- Cond SSBorAssociatedSSB
   ssbSubcarrierSpacing                              SubcarrierSpacing
OPTIONAL,   -- Cond SSBorAssociatedSSB
   smtc1                                        SSB-MTC
OPTIONAL,   -- Cond SSBorAssociatedSSB
   smtc2                                        SSB-MTC2
OPTIONAL,   -- Cond IntraFreqConnected
   refFreqCSI-RS                                  ARFCN-ValueNR
OPTIONAL,   -- Cond CSI-RS
   referenceSignalConfig                             ReferenceSignalConfig,
   absThreshSS-BlocksConsolidation                      ThresholdNR
OPTIONAL,   -- Need R
   absThreshCSI-RS-Consolidation                        ThresholdNR
OPTIONAL,   -- Need R
   nrofSS-BlocksToAverage                             INTEGER
(2..maxNrofSS-BlocksToAverage)                                   OPTIONAL,   --
Need R
   nrofCSI-RS-ResourcesToAverage                        INTEGER
(2..maxNrofCSI-RS-ResourcesToAverage)
OPTIONAL,   -- Need R
   quantityConfigIndex                               INTEGER
(1..maxNrofQuantityConfig),
   offsetMO                                     Q-OffsetRangeList,
   cellsToRemoveList                                 PCI-List
OPTIONAL,   -- Need N
   cellsToAddModList                                 CellsToAddModList
OPTIONAL,   -- Need N
   blackCellsToRemoveList                              PCI-Range IndexList
OPTIONAL,   -- Need N
   blackCellsToAddModList SEQUENCE (SIZE
(1..maxNrofPCI-Ranges)) OF PCI-RangeElement
OPTIONAL,   -- Need N
   whiteCellsToRemoveList                              PCI-RangeIndexList
OPTIONAL, -- Need N
   whiteCellsToAddModList                              SEQUENCE (SIZE
(1..maxNrofPCI-Ranges)) OF PCI-RangeElement
OPTIONAL,   -- Need N
   ... ,
   [[
   freqBandIndicatorNR-v1530                            FreqBandIndicatorNR
OPTIONAL,   -- Need R
   measCycleSCell-v1530                              ENUMERATED {sf160, sf256,
sf320, sf512, sf640, sf1024, sf1280}
OPTIONAL   -- Need R
   ]]
}
CellsToAddModList ::=                         SEQUENCE (SIZE
(1..maxNrofCellMeas)) OF CellsToAddMod
CellsToAddMod ::=                           SEQUENCE {
   physCellId                                     PhysCellId,
   cellIndividualOffset                               Q-OffsetRangeList
}
ReportConfigToAddModList ::=                       SEQUENCE (SIZE
```

-continued

Listing 1

```
(1..maxReportConfigId)) OF ReportConfigToAddMod
ReportConfigToAddMod ::=                SEQUENCE {
  reportConfigId                          ReportConfigId,
  reportConfig                            CHOICE {
    reportConfigNR                          ReportConfigNR,
    ...,
    reportConfigInterRAT                    ReportConfigInterRAT
  }
}
ReportConfigNR ::=                      SEQUENCE {
  reportType                                CHOICE {
    periodical
PeriodicalReportConfig,
    eventTriggered
EventTriggerConfig,
    ...,
    reportCGI                                 ReportCGI
  }
}
ReportCGI ::=                           SEQUENCE {
  cellForWhichToReportCGI                 PhysCellId,
    ...
}
EventTriggerConfig::=                   SEQUENCE {
  eventId                                   CHOICE {
    eventA1                                   SEQUENCE {
      a1-Threshold
MeasTriggerQuantity,
      reportOnLeave                             BOOLEAN,
      hysteresis                                Hysteresis,
      timeToTrigger
TimeToTrigger
    },
    eventA2                                   SEQUENCE {
      a2-Threshold
MeasTriggerQuantity,
      reportOnLeave                             BOOLEAN,
      hysteresis                                Hysteresis,
      timeToTrigger
TimeToTrigger
    },
    eventA3                                   SEQUENCE {
      a3-Offset
MeasTriggerQuantityOffset,
      reportOnLeave                             BOOLEAN,
      hysteresis                                Hysteresis,
      timeToTrigger
TimeToTrigger,
      useWhiteCellList                          BOOLEAN
    },
    eventA4                                   SEQUENCE {
      a4-Threshold
MeasTriggerQuantity,
      reportOnLeave                             BOOLEAN,
      hysteresis                                Hysteresis,
      timeToTrigger
TimeToTrigger,
      useWhiteCellList                          BOOLEAN
    },
    eventA5                                   SEQUENCE {
      a5-Threshold1
MeasTriggerQuantity,
      a5-Threshold2
MeasTriggerQuantity,
      reportOnLeave                             BOOLEAN,
      hysteresis                                Hysteresis,
      timeToTrigger
TimeToTrigger,
      useWhiteCellList                          BOOLEAN
    },
    eventA6                                   SEQUENCE {
      a6-Offset
MeasTriggerQuantityOffset,
      reportOnLeave                             BOOLEAN,
      hysteresis                                Hysteresis,
      timeToTrigger
TimeToTrigger,
```

-continued

Listing 1

```
      useWhiteCellList                                    BOOLEAN
    },
    ...
  },
  rsType                                          NR-RS-Type,
  reportInterval                                     ReportInterval,
  reportAmount                                      ENUMERATED {r1, r2,
r4, r8, r16, r32, r64, infinity},
  reportQuantityCell
MeasReportQuantity,
  maxReportCells                                     INTEGER
(1..maxCellReport),
  reportQuantityRS-Indexes
MeasReportQuantity
OPTIONAL,   -- Need R
  maxNrofRS-IndexesToReport                           INTEGER
(1..maxNrofIndexesToReport)                OPTIONAL,   -- Need R
  includeBeamMeasurements                             BOOLEAN,
  reportAddNeighMeas                                ENUMERATED {setup}
OPTIONAL,   -- Need R
  ...
}
PeriodicalReportConfig ::=   SEQUENCE {
  rsType                                          NR-RS-Type,
  reportInterval                                     ReportInterval,
  reportAmount                                      ENUMERATED {r1, r2,
r4, r8, r16, r32, r64, infinity},
  reportQuantityCell
MeasReportQuantity,
  maxReportCells                                     INTEGER
(1..maxCellReport),
  reportQuantityRS-Indexes
MeasReportQuantity
OPTIONAL,   -- Need R
  maxNrofRS-IndexesToReport                             INTEGER
(1..maxNrofIndexesToReport)            OPTIONAL,   -- Need R
  includeBeamMeasurements                              BOOLEAN,
  useWhiteCellList                                   BOOLEAN,
  ...
}
NR-RS-Type ::=                                   ENUMERATED {ssb,
csi-rs}
MeasTriggerQuantity ::=                            CHOICE {
  rsrp                                            RSRP-Range,
  rsrq                                            RSRQ-Range,
  sinr                                            SINR-Range
}
MeasTriggerQuantityOffset ::=                        CHOICE {
  rsrp                                             INTEGER (−30..30),
  rsrq                                             INTEGER (−30..30),
  sinr                                             INTEGER (−30..30)
}
MeasReportQuantity ::=               SEQUENCE {
  rsrp                                            BOOLEAN,
  rsrq                                            BOOLEAN,
  sinr                                            BOOLEAN
}
MeasIdToAddModList ::=   SEQUENCE (SIZE (1..maxNrofMeasId)) OF
MeasIdToAddMod
MeasIdToAddMod ::=                       SEQUENCE {
  measId                                    MeasId,
  measObjectId                                 MeasObjectId,
  reportConfigId                                  ReportConfigId
}
```

Listing 2 shows an example procedure of measurement report triggering.

Listing 2

```
Event A1:         Serving becomes better than absolute
threshold;
Event A2:         Serving becomes worse than absolute threshold;
Event A3:         Neighbour becomes amount of offset better than
PCell/PSCell;
Event A4:         Neighbour becomes better than absolute
threshold;
Event A5:         PCell/PSCell becomes worse than absolute
threshold1 AND Neighbour/SCell becomes better than another
absolute threshold2;
Event A6:         Neighbour becomes amount of offset better than
SCell.
1>          for each measId included in the measIdList within
VarMeasConfig:
  2>          if the corresponding reportConfig includes a
  reportType set to eventTriggered or periodical:
    3>          if the corresponding measObject concerns NR:
      4>          if the eventA1 or eventA2 is configured in the
      corresponding reportConfig:
        5>          consider only the serving cell to be
        applicable;
    4>          if the eventA3 or eventA5 is configured in the
      corresponding reportConfig:
      5>          if a serving cell is associated with a
        measObjectNR and neighbours are associated with
        another measObjectNR, consider any serving cell
        associated with the other measObjectNR to be a
        neighbouring cell as well;
    4>          for measurement events other than eventA1 or
      eventA2:
      5>          if useWhiteCellList is set to true:
        6>          consider any neighbouring cell detected based
          on parameters in the associated measObjectNR to be
          applicable when the concerned cell is included in
          the whiteCellsToAddModList defined within the
          VarMeasConfig for this measId;
      5>          else:
        6>          consider any neighbouring cell detected based
          on parameters in the associated measObjectNR to be
          applicable when the concerned cell is not included
          in the blackCellsToAddModList defined within the
          VarMeasConfig for this measId;
  3>          else if the corresponding measObject concerns
E-UTRA:
    4>          consider any neighbouring cell detected on the
      associated frequency to be applicable when the
      concerned cell is not included in the
      blackCellsToAddModListEUTRAN defined within the
      VarMeasConfig for this measId;
2>          else if the corresponding reportConfig includes a
  reportType set to reportCGI:
  3>          consider the cell detected on the associated
    measObject which has a physical cell identity matching
    the value of the cellForWhichToReportCGI included in the
    corresponding reportConfig within the VarMeasConfig to
    be applicable;
2>          if the reportType is set to eventTriggered and if the
  entry condition applicable for this event, i.e. the event
  corresponding with the eventId of the corresponding
  reportConfig within VarMeasConfig, is fulfilled for one or
  more applicable cells for all measurements after layer 3
  filtering taken during timeToTrigger defined for this event
  within the VarMeasConfig, while the VarMeasReportList does
  not include a measurement reporting entry for this measId
  (a first cell triggers the event):
  3>          include a measurement reporting entry within the
    VarMeasReportList for this measId;
  3>          set the numberOfReportsSent defined within the
    VarMeasReportList for this measId to 0;
  3>          include the concerned cell(s) in the
    cellsTriggeredList defined within the VarMeasReportList
    for this measId;
  3>          initiate the measurement reporting procedure;
2>          else if the reportType is set to eventTriggered and
  if the entry condition applicable for this event, i.e. the
```

-continued

Listing 2

```
  event corresponding with the eventId of the corresponding
  reportConfig within VarMeasConfig, is fulfilled for one or
  more applicable cells not included in the
  cellsTriggeredList for all measurements after layer 3
  filtering taken during timeToTrigger defined for this event
  within the VarMeasConfig (a subsequent cell triggers the
  event):
  3>          set the numberOfReportsSent defined within the
    VarMeasReportList for this measId to 0;
  3>          include the concerned cell(s) in the
    cellsTriggeredList defined within the VarMeasReportList
    for this measId;
  3>          initiate the measurement reporting procedure;
2>          else if the reportType is set to eventTriggered and
  if the leaving condition applicable for this event is
  fulfilled for one or more of the cells included in the
  cellsTriggeredList defined within the VarMeasReportList
  for this measId for all measurements after layer 3 filtering
  taken during timeToTrigger defined within the
  VarMeasConfig for this event:
  3>          remove the concerned cell(s) in the
    cellsTriggeredList defined within the VarMeasReportList
    for this measId;
  3>          if reportOnLeave is set to true for the corresponding
    reporting configuration:
    4>          initiate the measurement reporting procedure;
  3>          if the cellsTriggeredList defined within the
    VarMeasReportList for this measId is empty:
    4>          remove the measurement reporting entry within the
      VarMeasReportList for this measId;
    4>          stop the periodical reporting timer for this measId,
      if running;
2>          if reportType is set to periodical and if a (first)
  measurement result is available:
  3>          include a measurement reporting entry within the
    VarMeasReportList for this measId;
  3>          set the numberOfReportsSent defined within the
    VarMeasReportList for this measId to 0;
  3>          if the reportAmount exceeds 1:
    4>          initiate the measurement reporting procedure, as
      specified in 5.5.5, immediately after the quantity to
      be reported becomes available for the NR SpCell;
  3>          else (i.e. the reportAmount is equal to 1):
    4>          initiate the measurement reporting procedure,
      immediately after the quantity to be reported becomes
      available for the NR SpCell and for the strongest cell
      among the applicable cells;
2>          upon expiry of the periodical reporting timer for this
  measId:
  3>          initiate the measurement reporting procedure.
2>          if reportType is set to reportCGI:
  3>          if the VE acquired the SIB1 or
    SystemInformationBlockType1 for the requested cell; or
  3>          if the UE detects that the requested NR cell is not
    transmitting SIB1 (see TS 38.213 [13], clause 13):
    4>          stop timer T321;
    4>          include a measurement reporting entry within the
      VarMeasReportList for this measId;
    4>          set the numberOfReportsSent defined within the
      VarMeasReportList for this measId to 0;
    4>          initiate the measurement reporting procedure;
2>          upon the expiry of T321 for this measId:
  3>          include a measurement reporting entry within the
    VarMeasReportList for this measId;
  3>          set the numberOfReportsSent defined within the
    VarMeasReportList for this measId to 0;
  3>          initiate the measurement reporting procedure.
```

Figure 5:
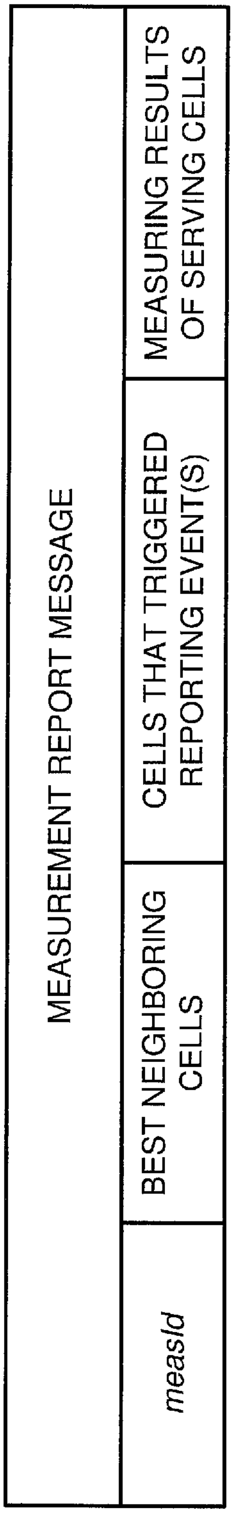
FIG. 5 is a diagrammatic view showing example information elements of an example MeasurementReport message.

In the measurement reporting procedure described above, the UE may transmit the MeasurementReport message to the gNB of the serving cell (source cell). The MeasurementReport message may comprise measId that triggered the measurement reporting, measurement result(s) of serving cell(s), best neighboring cells, and/or cells that triggered reporting event(s), as illustrated by way of example in FIG. 5. It should be noted that for event-driven (eventTriggered)

reporting, there are two conditions: entry condition and leaving condition. The entry condition is met when a specific event occurs, whereas the leaving condition is met when the condition of the specific event no longer exists. In addition, a parameter for hysteresis may be involved in determining the entry/leaving conditions to avoid ping-pong effects. For example, for Event A1, the entry condition is met when the signal strength of the serving cell is better than a1-threshold+hysteresis, whereas the leaving condition is met when the signal strength is lower than a1-threshod-hysteresis. When the entry condition is met, the UE may generate and send MeasurementReport. On the other hand, when the leaving condition is met, whether or not to send MeasurementReport may depend on the parameter reportOnLeave associated with a concerned event.

Listing 3 shows an example implementation of a MeasurementReport.

Listing 3

```
MeasurementReport ::=   SEQUENCE {
  criticalExtensions   CHOICE {
    measurementReport   MeasurementReport-IEs,
    criticalExtensionsFuture   SEQUENCE { }
  }
}
MeasurementReport-IEs ::=   SEQUENCE {
  measResults   MeasResults,
  lateNonCriticalExtension   OCTET STRING
OPTIONAL,
  nonCriticalExtension   SEQUENCE{ } OPTIONAL
}
MeasResults ::=   SEQUENCE {
  measId   MeasId,
  measResultServingMOList   MeasResultServMOList,
  measResultNeighCells   CHOICE {
    measResultListNR   MeasResultListNR,
    ...,
    measResultListEUTRA   MeasResultListEUTRA
  }   OPTIONAL,
  ...
}
MeasResultServMOList ::= SEQUENCE (SIZE
(1..maxNrofServingCells)) OF MeasResultServMO
MeasResultServMO ::=   SEQUENCE {
  servCellId   ServCellIndex,
  measResultServingCell   MeasResultNR,
  measResultBestNeighCell   MeasResultNR
OPTIONAL,
  ...
}
MeasResultListNR ::= SEQUENCE (SIZE (1..maxCellReport)) OF
MeasResultNR
MeasResultNR ::=   SEQUENCE {
  physCellId   PhysCellId
OPTIONAL,
  measResult   SEQUENCE {
    cellResults   SEQUENCE{
      resultsSSB-Cell   MeasQuantityResults
OPTIONAL,
      resultsCSI-RS-Cell   MeasQuantityResults
OPTIONAL
    },
    rsIndexResults   SEQUENCE {
      resultsSSB-Indexes   ResultsPerSSB-IndexList
OPTIONAL,
      resultsCSI-RS-Indexes   ResultsPerCSI-RS-IndexList
OPTIONAL
    }   OPTIONAL
  },
  ...,
  [[
  cgi-Info   CGI-Info
```

-continued

Listing 3

```
    OPTIONAL
      ]]
    }
    ...
```

Five basic example embodiments and modes of conditional handover configurations and techniques according to the technology disclosed herein are described below in general, non-limiting fashion.

1: Conditional Handover Configurations and Reporting

Figure 6:
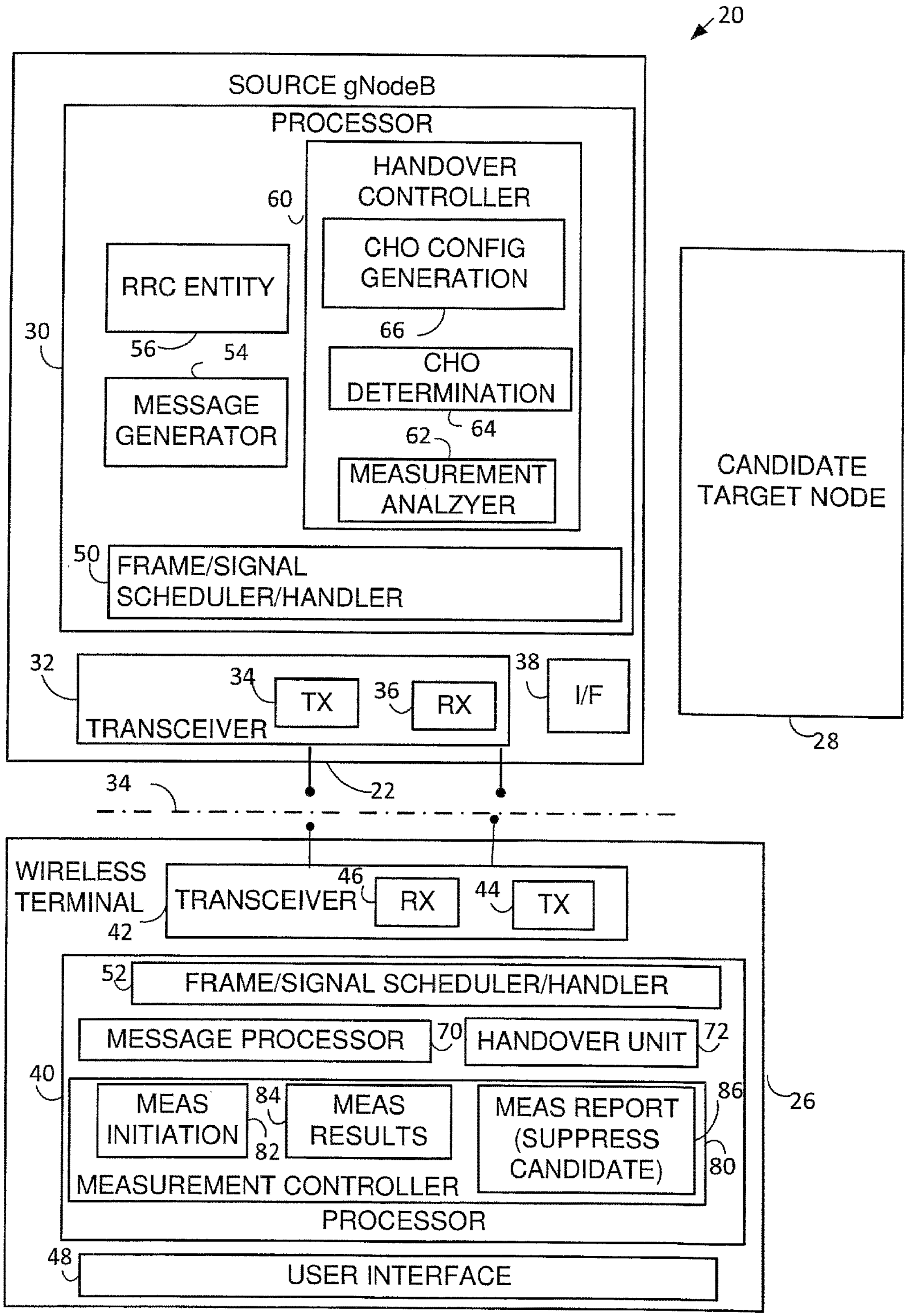
FIG. 6 is a schematic view of an example communications system comprising a source gNodeB which provides a wireless terminal with conditional handover configuration information which the wireless terminal may use for controlling generation and/or content of measurement reports.

FIG. 6 shows an example communications system 20 wherein a source radio access node 22 communicates over air or radio interface 24 (e.g., Uu interface) with wireless terminal 26. The source radio access node may also communication with a target radio access node 28 over an appropriate interface, such as either the radio interface 24 in the case of a backhaul configuration or X, interface in the manner shown in FIG. 1.

As mentioned above, the radio access node 22 may be any suitable node for communicating with the wireless terminal 26, such as a base station node, gNodeB ("gNB") or eNodeB ("eNB"), for example. For sake of simplicity, the source radio access node 22 may herein briefly be referred to as the source node 22, or source gNodeB 22, or source gNB 22. Similarly, the target radio access node 28 may herein briefly be referred to as the target node 28, or target gNodeB 28, or target gNB 28.

The source gNodeB 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively. In addition, source gNodeB 22 may comprise inter-node interface circuitry 38 for communicating with target gNodeB 28. Although not shown as such, it should be understood that the target gNodeB 28 may similarly have its own node processor 30, node transceiver circuitry 32, and inter-node interface circuitry 38.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The respective transmitter circuits 36 and 46 may comprise, e.g., amplifier(s), modulation circuitry and other conventional transmission equipment. The respective receiver circuits 34 and 44 may comprise, e.g., amplifiers, demodulation circuitry, and other conventional receiver equipment.

In general operation, source gNodeB 22 and wireless terminal 26 communicate with each other across radio interface 24 using predefined configurations of information. By way of non-limiting example, the source gNodeB 22 and wireless terminal 26 may communicate over radio interface 24 using "frames" of information that may be configured to include various channels. For example, a frame, which may have both downlink portion(s) and uplink portion(s), may comprise plural subframes, with each subframe in turn being divided into slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between source gNodeB 22 and wireless terminal 26 over radio interface 24, the node processor 30 and terminal processor 40 of FIG. 6 are shown as comprising respective information handlers. For an example implementation in which the information is communicated via frames, the information handler for source gNodeB 22 is shown as node frame/signal scheduler/handler 50, while the information handler for wireless terminal 26 is shown as terminal frame/signal handler 52.

The node processor 30 of source gNodeB 22 also includes message generator 54, RRC state machine 56, and handover controller 60. The RRC state machine 56 may operate in a manner understood from FIG. 2, and may interact with message generator 54 for the generation of RRC messages such as RRCReconfiguration messages, for example. The handover controller 60 may comprise measurement analyzer 62, conditional handover (CHO) determination unit 64, and conditional handover configuration information generator 66.

The terminal processor 40 of wireless terminal 26 also includes message processor 70, handover unit 72, and measurement controller 80. The measurement controller 80 in turn further comprises measurement initiation unit 82; measurement results unit 84; and measurement report control unit 86.

Figure 7:
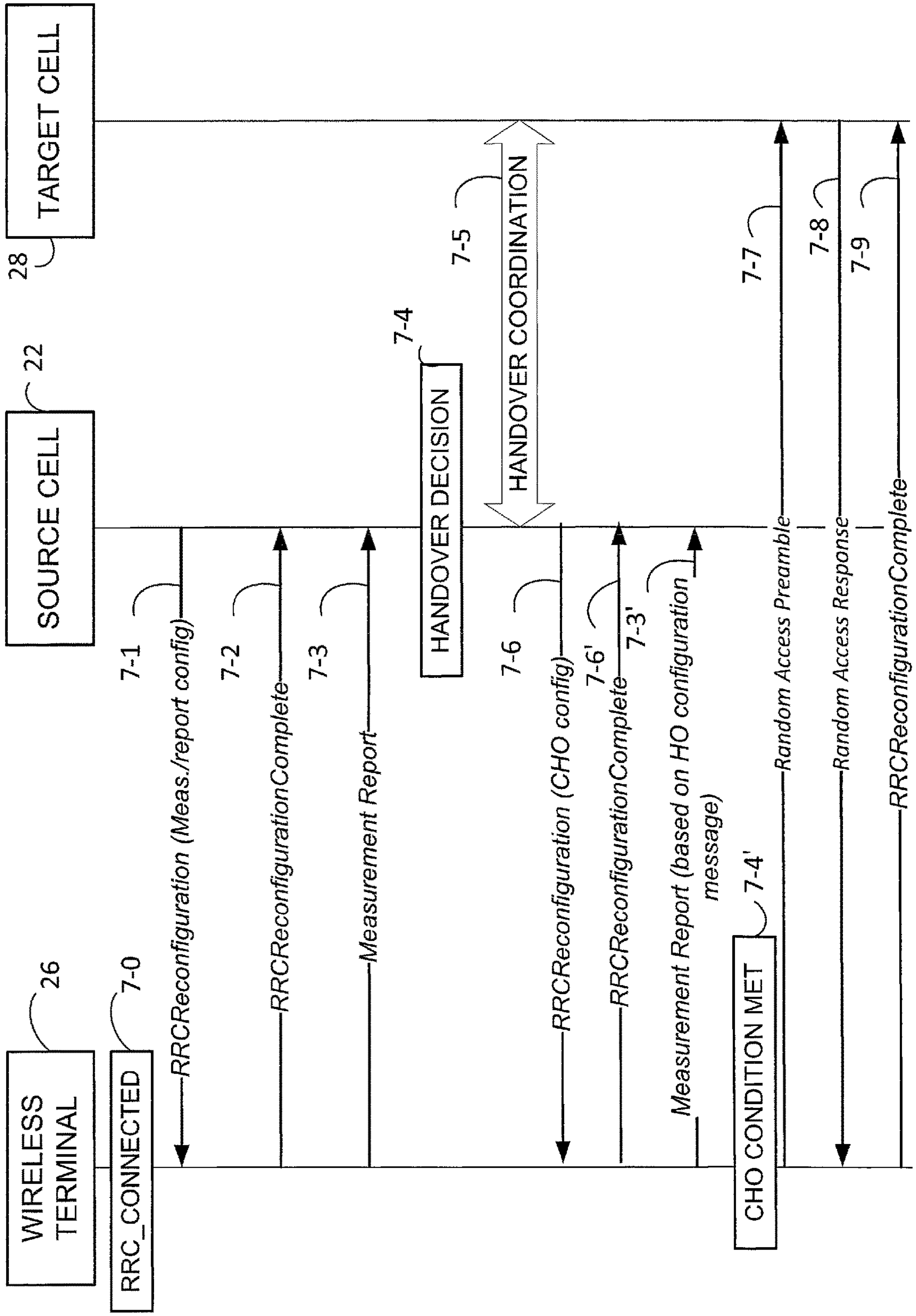
FIG. 7 is a diagrammatic view showing signaling and messages involved in measurement report in a conditional handover situation for the example cellular communications system of FIG. 6.

FIG. 7 illustrates an example scenario in which the communications system of FIG. 6 may execute a conditional handover. Some acts of FIG. 7 which are similar to those of FIG. 3 have similar suffixed act numbers, for example, act 7-0, like act 2-0 shows that the UE is in RRC_CONNECTED state. Similarly, act 7-1, like act 3-1, shows that the wireless terminal 26 may be configured by the gNB 22 of the serving cell (source cell) with the measurement configuration. The measurement configuration of act 7-1 may be similar to the measurement configuration of Listing 1. Based on the measurement configuration received in act 7-1, the wireless terminal 26 may send measurement reports 7-3. The timing of the measurements made by wireless terminal 26 may be governed by measurement initiation unit 82, the measurement results analysed by measurement results unit 84, and the measurement reports may be generated by 86. The measurement reports may be similar to the example implementation shown in Listing 3. Example logic for triggering the decision of act 7-4, e.g., a procedure for measurement report triggering, may be understood with reference to Listing 1.

FIG. 7 further shows that, in this particular scenario, as act 7-4 the gNB 22 makes a decision to send the conditional handover (CHO) configuration to the wireless terminal 26. The decision of act 7-4, which may be made by conditional handover (CHO) determination unit 64, is triggered by the measurement result(s) of the target cell, i.e., a measurement report 7-3, as assessed by measurement analyzer 62. Act 7-5 shows a handover coordination procedure which is performed after the decision of act 7-4. The handover coordination procedure of act 7-5 is performed to prepare both source gNodeB 22 and target gNodeB 28 for the possibility of the handover. The communications involved in the handover coordination procedure of act 7-5 may be transmitted over the inter-node interface 34.

In one example implementation, after the handover decision of act 7-4 and the handover coordination procedure of act 7-5, as shown by act 7-6 a message may be sent to wireless terminal 26 to carry the conditional handover CHO configuration information. The conditional handover configuration information for the message of act 7-6 may be generated by conditional handover configuration information generator 66. In one example implementation the message of act 7-6 may be an RRCReconfiguration message. In another example implementation (not illustrated), another suitable message (e.g., RRCCHOConfiguration) may be used to send the conditional handover configuration information. Upon successful receipt of the message of act 7-6, i.e., the message that includes and sends the conditional handover configuration information to wireless terminal 26, a response or acknowledgement message is returned to source gNodeB 22 as shown by act 7-6'.

In an example implementation, the message used for act 7-6, e.g., the message that includes the CHO configuration information, may comprise the following parameters:

Identification(s) of candidate target cell(s)
Event(s) to trigger execution of CHO
RACH configuration(s) of the candidate target cell(s)
UL/DL configuration(s) of the candidate target cell(s)
New UE identity(ies) (e.g. RNTI) to be used for the candidate target cell(s).

Figure 8:
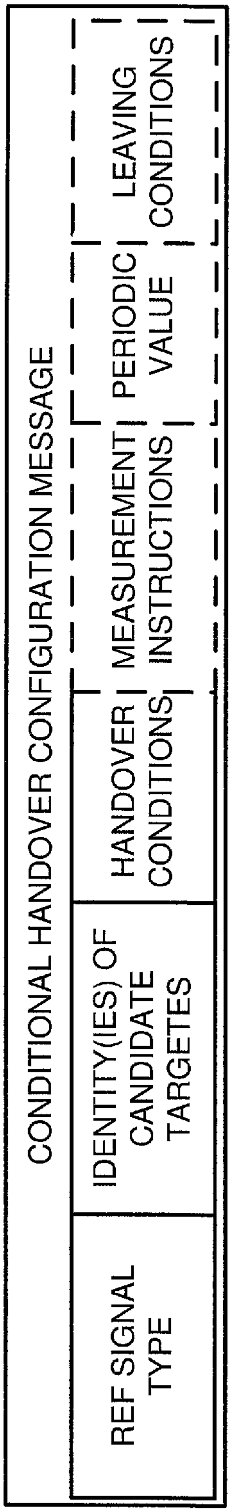
FIG. 8 is a diagrammatic view showing example generic contents of an example conditional handover configuration message for the example embodiment of FIG. 6.

FIG. 8 generically shows various general information elements or types of information that may be included in the conditional handover configuration message of act 7-6, including but not limited to: reference signal type (e.g. SSB or CSI-RS); identifier(s) of candidate target nodes; handover conditions; measurement instructions; periodic values for periodic reporting, and leaving conditions. The last three aforementioned information elements may be optional and may be discussed in conjunction with other example embodiments and modes.

Listing 4 shows an information element CHOConfig, which is an example implementation of an information element (IE) to be included in the message of act 7-6 which is used for the CHO configuration. In this example implementation, the condition(s) to trigger measurement report (EventTriggerConfigCHO) may be configured separately from the conditions included in measConfig (EventTriggerConfig).

Listing 4

```
CHOConfig ::=  SEQUENCE {
  CHOConfigToRemoveList  CHOConfigToRemoveList
OPTIONAL,  -- Need N
  CHOConfigToAddModList  CHOConfigToAddModList
OPTIONAL,  -- Need N
  }
OPTIONAL,  -- Need M
CHOConfigToRemoveList ::= SEQUENCE (SIZE
```

-continued

Listing 4

```
(1..maxNrofCHOConfigId)) OF CHOConfigId
ReportConfigToAddModList ::= SEQUENCE (SIZE
(1..maxCHOConfigId)) OF CHOConfigToAddMod
CHOConfigToAddMod ::=  SEQUENCE {
  choConfigId   CHOConfigId,
  reportConfig   CHOICE {
    choConfigNR   CHOConfigNR,
    ...,
    choConfigInterRAT   choConfigInterRAT
  }
}
CHOConfigNR ::=  SEQUENCE {
  CHOConditionList   SEQUENCE (SIZE
(1..maxCHOConditionList)) OF CHOCondition
}
CHOCondition   SEQUENCE {
   candidateCellIDList   SEQUENCE (SIZE
(1..maxCandidateCellIDList)) OF PhysCellId eventTriggered
EventTriggerConfigCHO,
    ...,
    reportCGI   ReportCGI
  }
  spCellConfigCommon   ServingCellConfigCommon
OPTIONAL,   -- Need M
  newUE-Identity   RNTI-Value,
  validity   ENUMERATED {ms50, ms100, ms150, ms200,
ms500, ms1000, ms2000, ms10000},
  rach-ConfigDedicated   CHOICE {
    uplink   RACH-ConfigDedicated,
    supplementaryUplink   RACH-ConfigDedicated
  }
OPTIONAL,   -- Need N
}
EventTriggerConfigCHO::=  SEQUENCE {
  eventId   CHOICE {
    eventA1   SEQUENCE {
      a1-Threshold   MeasTriggerQuantity,
    },
    eventA2   SEQUENCE {
      a2-Threshold   MeasTriggerQuantity,
    },
    eventA3   SEQUENCE {
      a3-Offset   MeasTriggerQuantityOffset,
    },
    eventA4   SEQUENCE {
      a4-Threshold   MeasTriggerQuantity,
    },
    eventA5   SEQUENCE {
      a5-Threshold1   MeasTriggerQuantity,
      a5-Threshold2   MeasTriggerQuantity,
    },
    eventA6   SEQUENCE {
a6-Offset   MeasTriggerQuantityOffset,
    },
    ...
  },
     rsType   NR-RS-Type
...}
```

After receiving the CHO configuration in the message of act 7-6 of FIG. 7, the wireless terminal 26 could, as in previous practice, continue the measurement procedure based on the measurement configuration received earlier, e.g., the measurement configuration received in act 7-1 before the handover decision of act 7-4. The earlier measurement configuration, e.g., the pre-conditional measurement configuration information, may include a measurement object that includes the measurement parameters covering the candidate target cell(s). Additionally, the measurement object of the pre-conditional measurement configuration information may also include the candidate target cell(s) in the whitelisted cells. In such a case, the measurement object could trigger a measurement report based on the associated (linked) report configuration. However, the serving cell, e.g., source gNodeB 22, has already negotiated with each of the candidate target cell(s), and the wireless terminal 26 is allowed to autonomously execute a handover to one of the candidate target cell(s) as long as the CHO configuration remains valid. Therefore, once the CHO configuration is provided in the message of act 7-5, it may be wasteful to send a measurement report with regard to any of the candidate target cell(s).

In view of the foregoing, as one of its features and advantages, the wireless terminal 26 of FIG. 6 may suppress measurement reports with regard to a candidate target cell included in the CHO configuration, when the measurement result of the signal from the candidate target cell satisfies the reporting condition specified in the corresponding reporting configuration. In other words, the wireless terminal 26 may transmit a measurement report when the measurement results available in the UE include the result(s) from cell(s) other than the one(s) configured as candidate target cell(s). Accordingly, the measurement report control unit 86 of wireless terminal 26 is labeled as a measurement report control unit 86 which may suppress the reporting of measurements for candidate target gNodeBs.

To reflect the foregoing, FIG. 7 shows as act 7-3' the wireless terminal 26 sending a measurement report which is based on the conditional handover configuration. For example, assume that one measurement object is linked to an event-triggered reporting configuration. If the measurement with regard to this measurement object results in finding a cell that meets the triggering condition in the reporting configuration, the wireless terminal 26 of FIG. 6 may send a measurement report if the identification of the found cell (e.g. physical cell ID) is for none of the candidate target cell(s) in the CHO configuration. Otherwise the UE may determine not to send the measurement report. If measurement results for cells other than the candidate target cell(s) are available, the wireless terminal 26 may be allowed to include in the measurement report the results from the candidate target cell(s) along with the results from the cells other than the candidate target cells.

Act 7-4' shows that the wireless terminal 26 may make a determination that the conditional handover conditions of the conditional handover configuration information are satisfied, and that a handover to a candidate target gNodeB 28 should occur. The determination of act 7-4' may be made by handover unit 72 of wireless terminal 26. Thereafter, the wireless terminal 26 may seek access to target gNodeB 28 by engaging in a random access procedure, as shown by act 7-7 and act 7-8. Act 7-7 comprises wireless terminal 26 sending a Random Access Preamble to target gNodeB 28. Upon successful receipt and recognition by target gNodeB 28 of the Random Access Preamble of act 7-7, the wireless terminal 26 should receive a Random Access Response message as shown by act 7-8. The handover procedure is then completed by the wireless terminal 26 sending an RRCReconfigurationComplete message to the target gNodeB 28, as shown by act 7-9.

Figure 9:
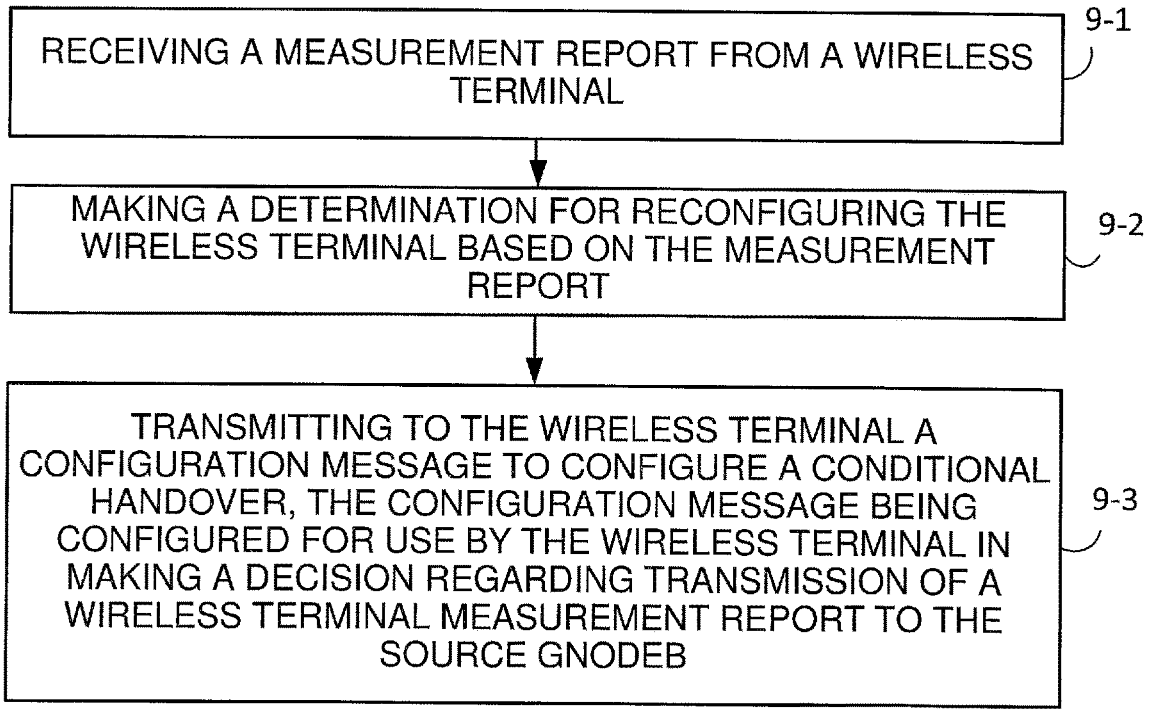
FIG. 9 is a flowchart showing example, basic, representative steps or acts performed by a source node of the system of FIG. 6.

The source gNodeB 22 of FIG. 6 thus provides wireless terminal 26 with conditional handover configuration information which the wireless terminal 26 may use for controlling generation and/or content of measurement reports. Example, representative, basic acts performed by source gNodeB 22 of FIG. 6 are shown in FIG. 9. Act 9-1 comprises receiving a measurement report from a wireless terminal. The measurement report of act 9-1 may be a report message such as message 7-3 of FIG. 7. Act 9-2 comprises making a determination for reconfiguring the wireless terminal based on the measurement report. The determination of act 9-2 may be made by conditional handover (CHO) determination unit 64 of source gNodeB 22, and may further be reflected by act 7-4 of FIG. 7. Act 9-3 comprises transmitting to the wireless terminal a configuration message to configure a conditional handover, the configuration message being configured for use by the wireless terminal in making a decision regarding transmission of a wireless terminal measurement report to the source gNodeB 22.

Figure 10:
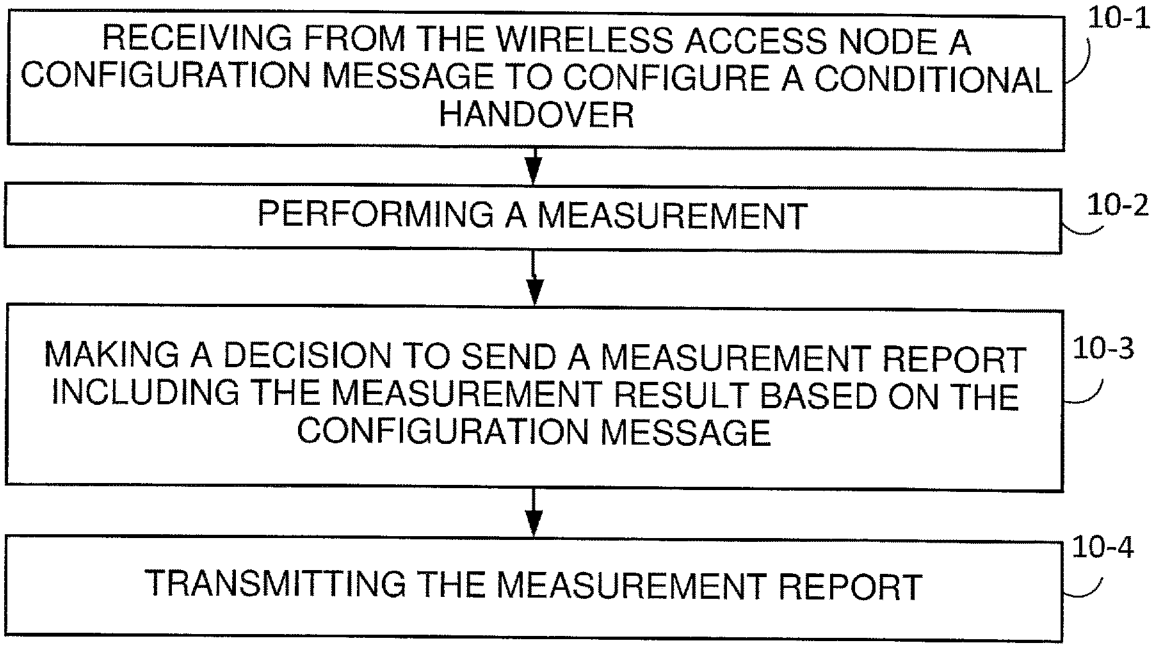
FIG. 10 is a flowchart showing example, basic, representative steps or acts performed by a wireless terminal of the system of FIG. 6.

Example, representative, basic acts performed by wireless terminal 26 of FIG. 6 are shown in FIG. 10. Act 10-1 comprises receiving from the wireless access node a configuration message to configure a conditional handover. The conditional handover configuration message of act 10-1 may be the message of act 7-5 as described above. Act 10-2 comprises the wireless terminal 26 performing a measurement. The measurement may be initiated by measurement initiation unit 82 of wireless terminal 26. Act 10-3 comprises the wireless terminal 26 making a decision, based on the configuration message of act 10-2, to send a measurement report including the measurement result. Act 10-4 comprises transmitting the measurement report to source gNodeB 22.

Listing 5 is an example procedure of measurement report triggering, based on Listing 2 with revisions for supporting the embodiment and mode of FIG. 6 and FIG. 7 marked as bold text.

Listing 5

```
1>  for each measId included in the measIdList within
VarMeasConfig:
2>  if the corresponding reportConfig includes a
  reportType set to eventTriggered or periodical:
  3>  if the corresponding measObject concerns NR:
    4>  if the eventA1 or eventA2 is configured in the
      corresponding reportConfig:
      5>  consider only the serving cell to be
        applicable;
    4>  if the eventA3 or eventA5 is configured in the
      corresponding reportConfig:
      5>  if a serving cell is associated with a
        measObjectNR and neighbours are associated with
        another measObjectNR, consider any serving cell
        associated with the other measObjectNR to be a
        neighbouring cell as well;
    4>  for measurement events other than eventA1 or
      eventA2:
      5>  if useWhiteCellList is set to true:
        6>  consider any neighbouring cell detected based
          on parameters in the associated measObjectNR to be
          applicable when the concerned cell is included in
          the whiteCellsToAddModList defined within the
          VarMeasConfig for this measId;
      5>  else:
        6>  consider any neighbouring cell detected based
          on parameters in the associated measObjectNR to be
          applicable when the concerned cell is not included
          in the blackCellsToAddModList defined within the
          VarMeasConfig for this measId;
  3>  else if the corresponding measObject concerns
    E-UTRA:
    4>  consider any neighbouring cell detected on the
      associated frequency to be applicable when the
      concerned cell is not included in the
      blackCellsToAddModListEUTRAN defined within the
      VarMeasConfig for this measId;
2>  else if the corresponding reportConfig includes a
  reportType set to reportCGI:
  3>  consider the cell detected on the associated
    measObject which has a physical cell identity matching
    the value of the cellForWhichToReportCGI included in the
    corresponding reportConfig within the VarMeasConfig to
    be applicable;
2>  if the reportType is set to eventTriggered and if the
  entry condition applicable for this event, i.e. the event
  corresponding with the eventId of the corresponding
  reportConfig within VarMeasConfig, is fulfilled for one or
  more applicable cells for all measurements after layer 3
  filtering taken during timeToTrigger defined for this event
  within the VarMeasConfig, while the VarMeasReportList does
  not include a measurement reporting entry for this measId
  (a first cell triggers the event):
  3>  include a measurement reporting entry within the
    VarMeasReportList for this measId;
3>  set the numberOfReportsSent defined within the
    VarMeasReportList for this measId to 0;
  3>  include the concerned cell(s) in the
    cellsTriggeredList defined within the VarMeasReportList
    for this measId;
```

-continued

Listing 5

```
    3> if cellsTriggeredList includes cells other than the
       candidate target cell(s) configured by CHOConfig;
       4> initiate the measurement reporting procedure;
2> else if the reportType is set to eventTriggered and
    if the entry condition applicable for this event, i.e. the
    event corresponding with the eventId of the corresponding
    reportConfig within VarMeasConfig, is fulfilled for one or
    more applicable cells not included in the
    cellsTriggeredList for all measurements after layer 3
    filtering taken during timeToTrigger defined for this event
    within the VarMeasConfig (a subsequent cell triggers the
    event):
    3> set the numberOfReportsSent defined within the
       VarMeasReportList for this measId to 0;
    3> include the concerned cell(s) in the
       cellsTriggeredList defined within the VarMeasReportList
       for this measId;
3> if cellsTriggeredList includes cells other than the
       candidate target cell(s) configured by CHOConfig;
       4> initiate the measurement reporting procedure;
2> else if the reportType is set to eventTriggered and
    if the leaving condition applicable for this event is
    fulfilled for one or more of the cells included in the
    cellsTriggeredList defined within the VarMeasReportList
    for this measId for all measurements after layer 3 filtering
    taken during timeToTrigger defined within the
    VarMeasConfig for this event:
    3> remove the concerned cell(s) in the
       cellsTriggeredList defined within the VarMeasReportList
       for this measId;
    3> if reportOnLeave is set to true for the corresponding
       reporting configuration:
       4> initiate the measurement reporting procedure;
    3> if the cellsTriggeredList defined within the
       VarMeasReportList for this measId is empty:
       4> remove the measurement reporting entry within the
          VarMeasReportList for this measId;
       4> stop the periodical reporting timer for this measId,
          if running;
2> if reportType is set to periodical and if a (first)
    measurement result is available:
    3> include a measurement reporting entry within the
       VarMeasReportList for this measId;
    3> set the numberOfReportsSent defined within the
       VarMeasReportList for this measId to 0;
    3> if the reportAmount exceeds 1:
       4> initiate the measurement reporting procedure, as
          specified in 5.5.5, immediately after the quantity to
          be reported becomes available for the NR SpCell;
    3> else (i.e. the reportAmount is equal to 1):
       4> initiate the measurement reporting procedure,
          immediately after the quantity to be reported becomes
          available for the NR SpCell and for the strongest cell
          among the applicable cells;
2> upon expiry of the periodical reporting timer for this
    measId:
    3> initiate the measurement reporting procedure.
2> if reportType is set to reportCGI:
    3> if the UE acquired the SIB1 or
       SystemInformationBlockType1 for the requested cell; or
    3> if the UE detects that the requested NR cell is not
       transmitting SIB1 (see TS 38.213 [13], clause 13):
       4> stop timer T321;
       4> include a measurement reporting entry within the
          VarMeasReportList for this measId;
       4> set the numberOfReportsSent defined within the
          VarMeasReportList for this measId to 0;
       4> initiate the measurement reporting procedure;
2> upon the expiry of T321 for this measId:
    3> include a measurement reporting entry within the
       VarMeasReportList for this measId;
    3> set the numberOfReportsSent defined within the
       VarMeasReportList for this measId to 0;
    3> initiate the measurement reporting procedure.
```

2: Measurement Reporting after Conditional Handover Configuration

Figure 11:
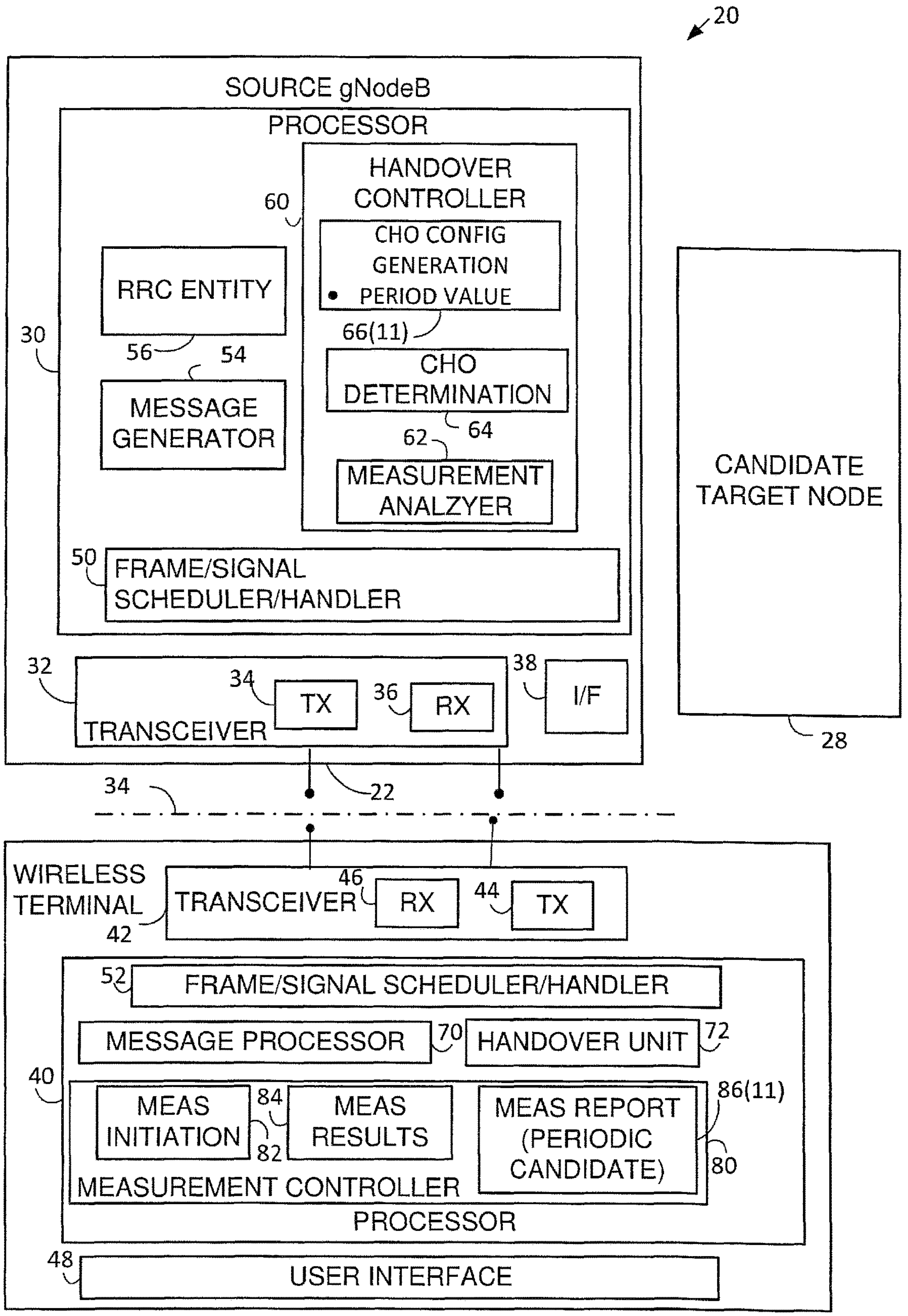
FIG. 11 is a schematic view of an example communications system comprising a source gNodeB which provides a wireless terminal with conditional handover configuration information which permits the wireless terminal to periodically report measurement results for a candidate target gNodeB(s).

In the example embodiment and mode of FIG. 11, the wireless terminal 26 may be permitted to periodically transmit a measurement report for the configured candidate target cell(s). One reason for permitting the wireless terminal 26 to transmit a measurement report on a periodic basis is that the source cell, the serving cell of source gNodeB 22, may use this measurement report to determine whether or not to release the CHO configuration. Since each of the candidate target cell(s), such as target gNodeB 28, reserves radio resources for a potential CHO, the radio access network may not desire to maintain the reserved resources forever. Therefore, the radio access network may force the wireless terminal 26 to continue reporting the measurement results of the candidate target cells.

The source gNodeB 22, wireless terminal 26, and node processor 30 of the communications system 20 of FIG. 11 are similar to those of FIG. 6, with like units and functionalities having like reference numbers. As shown in FIG. 11, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(11). A difference between the example embodiment of FIG. 6 and the example embodiment and mode of FIG. 11 is that the conditional handover configuration information generator 66(11) includes in the conditional handover configuration information a conditional handover instruction which, rather than suppressing the reporting of measurements for candidate target gNodeBs, instead permits periodic reporting of the measurements for candidate target gNodeBs. The instruction of the conditional handover configuration information that permits the periodic reporting of the measurement results for the candidate target gNodeBs may be included in the "measurements instruction" information element, shown as the fourth information element of the conditional handover configuration message of FIG. 8, for example. Moreover, a value of the periodicity for the permitted reporting of the measurement results for the candidate target gNodeBs may be included in the "periodic value" information element, shown as the fifth information element of the conditional handover configuration message of FIG. 8, for example.

As in the FIG. 6 example embodiment and mode, the wireless terminal 26 of the example embodiment and mode of FIG. 11 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80, with the measurement controller 80 in turn comprising measurement initiation unit 82, measurement results unit 84, and measurement report control unit 86. Since, in the example embodiment and mode of FIG. 11, the wireless terminal 26 is permitted to periodically transmit the measurement results for a candidate target gNodeB, the measurement report control unit 86 of FIG. 11 is labeled for periodic candidate reporting.

Figure 12:
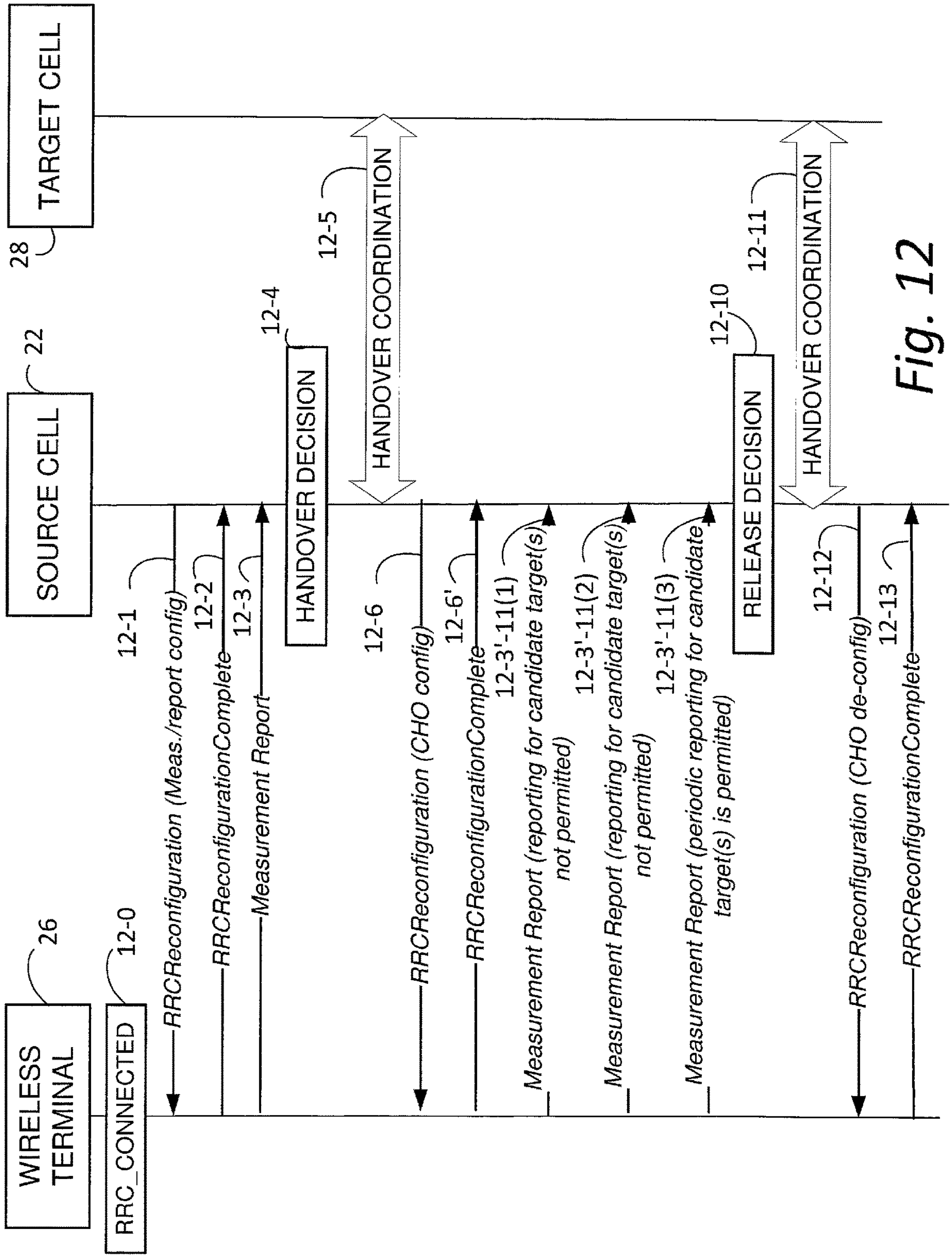
FIG. 12 is a diagrammatic view showing signaling and messages involved in measurement report in a conditional handover situation for the example cellular communications system of FIG. 11.

FIG. 12 illustrates an example scenario of the example embodiment and mode of FIG. 11, wherein after receiving the CHO configuration the wireless terminal 26 may periodically transmit the measurement report including the measurement results of some or all of the candidate target cell(s). The acts of FIG. 12 which are similar to those of FIG. 7 have similar suffixes, e.g., act 12-0 of FIG. 12 is similar to act 7-0 of FIG. 7, act 12-1 of FIG. 12 is similar to act 7-1 of FIG. 7, and so forth. A difference in the example embodiment and mode of FIG. 11 and FIG. 12 is that, after the conditional handover coordination of act 12-5, periodic reporting of measurement results for the candidate target gNodeB(s) is permitted. For example, FIG. 12 shows that the reporting of measurement results for the candidate target gNodeB(s) does not occur in the first two measurement reporting messages 12-3'-11(1) and 12-3'-11(2), but does occur in the third measurement reporting message 12-3'-11(3).

In the example situation shown in FIG. 12, it may occur as a result of the third measurement reporting message 12-3'-11(3) that as act 12-10 the network, e.g., source gNodeB 22, determines that the conditional handover configuration, which resulted from the conditional handover decision of act 12-4, should be released. Such determination may be made by conditional handover (CHO) determination unit 64, for example. After the conditional handover release decision of act 12-10, as act 12-11 the source gNodeB 22 may engage in a handover release operation with target gNodeB 28, as reflected by act 12-11. In other words, as act 12-10 the source cell 22 may decide to release the CHO configuration, and in accordance with such decision may as act 12-11 negotiate with the candidate target cell(s), such as target gNodeB 28, to release the reserved resources. Thereafter as act 12-12 the source gNodeB 22 may send a conditional handover de-configuration message to the wireless terminal 26. Upon successful receipt of the conditional handover de-configuration message, as act 12-13 the wireless terminal 26 replies to source gNodeB 22 with a RRCReconfigurationComplete message.

Figure 13:
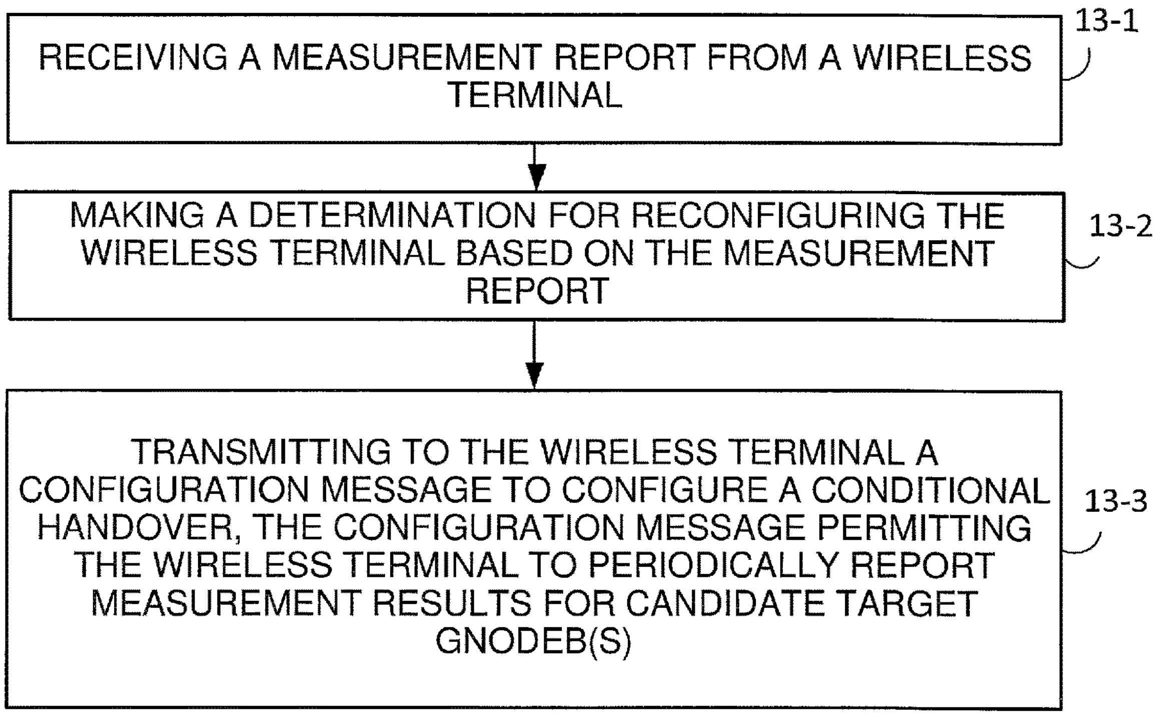
FIG. 13 is a flowchart showing example, basic, representative steps or acts performed by a source node of the system of FIG. 11.

The source gNodeB 22 of FIG. 11 thus permits the wireless terminal 26 to periodically report measurement results for the candidate target gNodeB(s). Example, representative, basic acts performed by source gNodeB 22 of FIG. 11 are shown in FIG. 13. Act 13-1 comprises receiving a measurement report from a wireless terminal. Act 13-2 comprises making a determination for reconfiguring the wireless terminal based on the measurement report. The determination of act 13-2 may be made by conditional handover (CHO) determination unit 64 of source gNodeB 22, and may further be reflected by act 12-4 of FIG. 12. Act 13-3 comprises transmitting to the wireless terminal a configuration message to configure a conditional handover, the configuration message being configured to permit periodic reporting of measurement results for a candidate target gNodeB(s).

Figure 14:
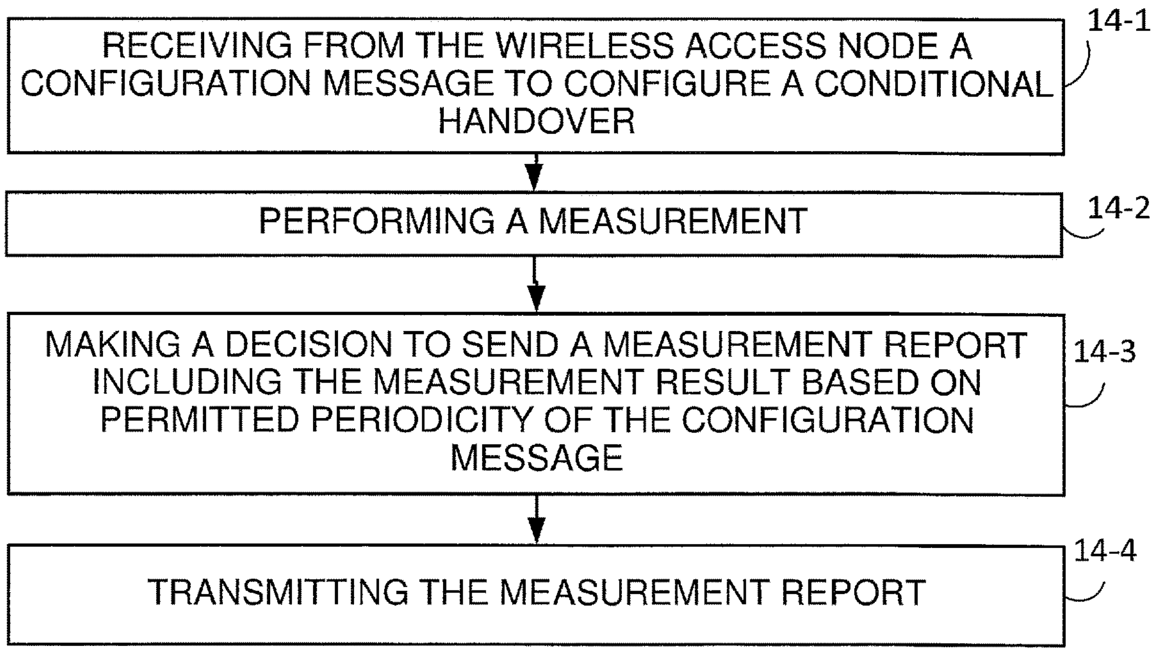
FIG. 14 is a flowchart showing example, basic, representative steps or acts performed by a wireless terminal of the system of FIG. 11.

Example, representative, basic acts performed by wireless terminal 26 of FIG. 11 are shown in FIG. 14. Act 14-1 comprises receiving from the wireless access node a configuration message to configure a conditional handover. The conditional handover configuration message of act 14-1 may be the message of act 12-6 as described above. Act 14-2 comprises the wireless terminal 26 performing a measurement. The measurement may be initiated by measurement initiation unit 82 of wireless terminal 26. Act 14-3 comprises the wireless terminal 26 making a decision, based on the configuration message of act 14-2 and permitted periodicity, to send a measurement report including the measurement result. Act 14-4 comprises transmitting the measurement report to source gNodeB 22.

In one example implementation, the CHO configuration may indicate if the wireless terminal 26 is required to transmit the measurement report for some or all of the candidate target cell(s), and the periodicity of the reporting. Listing 6 shows an example format of the CHO configuration based on Listing 4, where an optional field reportPeriodicity, configured separately from the reporting configuration, indicates the periodicity of the reporting of the concerned target cell(s). The presence of this optional field may indicate that the UE is forced to periodically transmit the measurement report, whereas the absence of this field may indicate that the UE should suppress the measurement report as disclosed in the first example embodiment and mode. The reportPeriodicity field may correspond to the period value information element shown in FIG. 8.

Listing 6

```
CHOConfig ::=   SEQUENCE {
      CHOConfigToRemoveList   CHOConfigToRemoveList
OPTIONAL,   -- Need N
      CHOConfigToAddModList   CHOConfigToAddModList
OPTIONAL,   -- Need N
      }
OPTIONAL,   -- Need M
CHOConfigToRemoveList ::= SEQUENCE (SIZE
(1..maxNrofCHOConfigId)) OF CHOConfigId
ReportConfigToAddModList ::= SEQUENCE (SIZE
(1..maxCHOConfigId)) OF CHOConfigToAddMod
CHOConfigToAddMod ::=   SEQUENCE {
      choConfigId   CHOConfigId,
      reportConfig   CHOICE {
         choConfigNR   CHOConfigNR,
         ...,
         choConfigInterRAT   choConfigInterRAT
      }
}
CHOConfigNR ::=   SEQUENCE {
      CHOConditionList   SEQUENCE (SIZE
(1..maxCHOConditionList)) OF CHOCondition
}
CHOCondition   SEQUENCE {
   candidateCellIDList   SEQUENCE (SIZE
(1..maxCandidateCellIDList)) OF PhysCellId eventTriggered
EventTriggerConfigCHO,
         ...,
         reportCGI   ReportCGI
      }
```

-continued

Listing 6

```
      spCellConfigCommon   ServingCellConfigCommon
OPTIONAL,   -- Need M
      newUE-Identity   RNTI-Value,
   reportPeriodicity   ENUMERATED {ms50, ms100,
ms150, ms200, ms500, ms1000, ms2000, ms10000}
OPTIONAL,
      validity   ENUMERATED {ms50, ms100, ms150,
ms200, ms500, ms1000, ms2000, ms10000} ,
      rach-ConfigDedicated   CHOICE {
         uplink   RACH-ConfigDedicated,
         supplementaryUplink   RACH-ConfigDedicated
      }
OPTIONAL,   -- Need N
}
EventTriggerConfigCHO::=   SEQUENCE {
      eventId   CHOICE
         eventA1   SEQUENCE {
            a1-Threshold   MeasTriggerQuantity,
         },
         eventA2   SEQUENCE {
            a2-Threshold   MeasTriggerQuantity,
         },
         eventA3   SEQUENCE {
            a3-Offset
MeasTriggerQuantityOffset,
         },
         eventA4   SEQUENCE {
            a4-Threshold
MeasTriggerQuantity,
         },
         eventA5   SEQUENCE {
            a5-Threshold1
MeasTriggerQuantity,
            a5-Threshold2
MeasTriggerQuantity,
         },
         eventA6   SEQUENCE {
            a6-Offset
MeasTriggerQuantityOffset,
         },
         ...
      },
...
```

Listing 7 is an example procedure of measurement report triggering, based on Listing 2 with revisions for supporting the present embodiment marked as bold text.

Listing 7

```
1>      for each measId included in the measIdList within
  VarMeasConfig:
  2>      if the corresponding reportConfig includes a
    reportType set to eventTriggered or periodical:
    3> if the corresponding measObject concerns NR:
      4>      if the eventA1 or eventA2 is configured in the
        corresponding reportConfig:
        5>      consider only the serving cell to be
          applicable;
      4>      if the eventA3 or eventA5 is configured in the
        corresponding reportConfig:
        5>      if a serving cell is associated with a
          measObjectNR and neighbours are associated with
          another measObjectNR, consider any serving cell
          associated with the other measObjectNR to be a
          neighbouring cell as well;
      4>      for measurement events other than eventA1 or
        eventA2:
        5>      if useWhiteCellList is set to true:
          6>      consider any neighbouring cell detected based
            on parameters in the associated measObjectNR to be
            applicable when the concerned cell is included in
            the whiteCellsToAddModList defined within the
            VarMeasConfig for this measId;
```

-continued

Listing 7

5> else:
6> consider any neighbouring cell detected based on parameters in the associated measObjectNR to be applicable when the concerned cell is not included in the blackCellsToAddModList defined within the VarMeasConfig for this measId;
3> else if the corresponding measObject concerns E-UTRA:
4> consider any neighbouring cell detected on the associated frequency to be applicable when the concerned cell is not included in the blackCellsToAddModListEUTRAN defined within the VarMeasConfig for this measId;
2> else if the corresponding reportConfig includes a reportType set to reportCGI:
3> consider the cell detected on the associated measObject which has a physical cell identity matching the value of the cellForWhichToReportCGI included in the corresponding reportConfig within the VarMeasConfig to be applicable;
2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
3> include a measurement reporting entry within the VarMeasReportList for this measId;
3> set the numberOfReportsSent defined within the VarMeasReportList for this measId to 0;
3> include the concerned cell(s) in the cellsTriggeredList defined within the VarMeasReportList for this measId;
3> initiate the measurement reporting procedure;
2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
3> set the numberOfReportsSent defined within the VarMeasReportList for this measId to 0;
3> include the concerned cell(s) in the cellsTriggeredList defined within the VarMeasReportList for this measId;
4> initiate the measurement reporting procedure;
2> else if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
3> remove the concerned cell(s) in the cellsTriggeredList defined within the VarMeasReportList for this measId;
3> if reportOnLeave is set to true for the corresponding reporting configuration:
4> initiate the measurement reporting procedure;
3> if the cellsTriggeredList defined within the VarMeasReportList for this measId is empty:
4> remove the measurement reporting entry within the VarMeasReportList for this measId;
4> stop the periodical reporting timer for this measId, if running;
2> if reportType is set to periodical and if a (first) measurement result is available, or:
2> if a measurement result is available for one of the candidate target cell(s) configured by CHOConfig, and reportPeriodicity is included in CHOConfig:
3> include a measurement reporting entry within the VarMeasReportList for this measId;
3> set the numberOfReportsSent defined within the VarMeasReportList for this measId to 0;
3> if the reportAmount exceeds 1:
4> initiate the measurement reporting procedure, as specified in 5.5.5, immediately after the quantity to be reported becomes available for the NR SpCell;

-continued

Listing 7

3> else (i.e. the reportAmount is equal to 1):
4> initiate the measurement reporting procedure, immediately after the quantity to be reported becomes available for the NR SpCell and for the strongest cell among the applicable cells;
2> upon expiry of the periodical reporting timer for this measId, or:
2> upon expiry of reportPeriodicity included in CHOConfig:
3> initiate the measurement reporting procedure.
2> if reportType is set to reportCGI:
3> if the UE acquired the SIB1 or SystemInformationBlockType1 for the requested cell; or
3> if the UE detects that the requested NR cell is not transmitting SIB1 (see TS 38.213 [13], clause 13):
4> stop timer T321;
4> include a measurement reporting entry within the VarMeasReportList for this measId;
4> set the numberOfReportsSent defined within the VarMeasReportList for this measId to 0;
4> initiate the measurement reporting procedure;
2> upon the expiry of T321 for this measId:
3> include a measurement reporting entry within the VarMeasReportList for this measId;
3> set the numberOfReportsSent defined within the VarMeasReportList for this measId to 0;
3> initiate the measurement reporting procedure.

In another example implementation, the indication in the CHO configuration indicating if the wireless terminal 26 is required to transmit the measurement report for some or all of the candidate target cell(s) may be a Boolean type field (or a present/absence type field), associated with no designated periodicity. In this case, after receiving the CHO configuration, the wireless terminal may send a measurement report (even for candidate target cell(s)) in accordance with the reporting configuration in the pre-conditional measurement configuration if the Boolean type field is set to true (or false) (or the presence/absence type field is present (or absent)), otherwise, the wireless terminal may suppress measurement reports with regard to the candidate target cell(s) in accordance with the previous embodiment.

3: Leaving Condition for Conditional Handover Configuration

Figure 15:
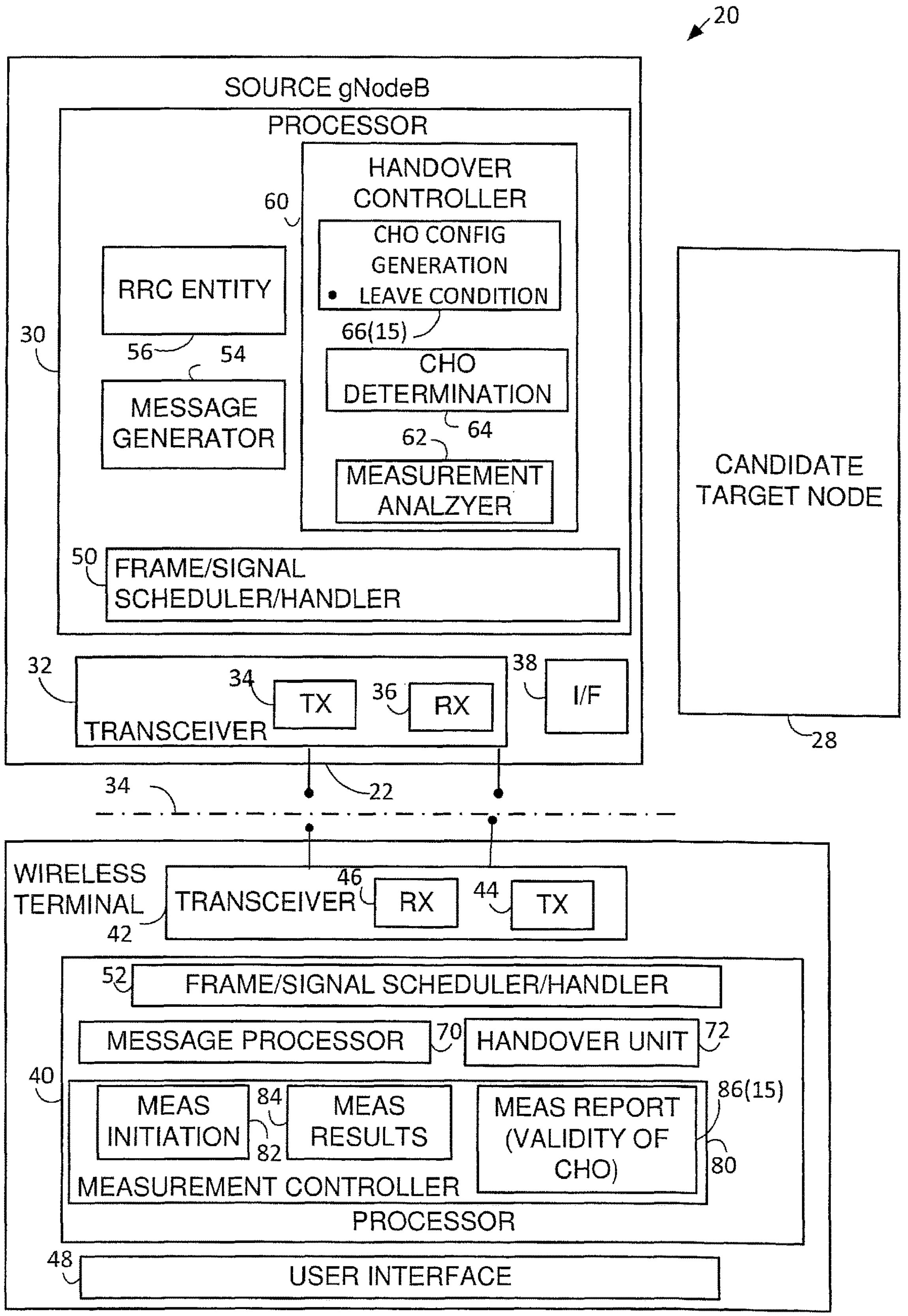
FIG. 15 is a schematic view of an example communications system comprising a source gNodeB which provides a wireless terminal with conditional handover configuration information which notifies the wireless terminal of conditions for leaving the conditional handover.

In the example embodiment and mode of FIG. 15, the source gNodeB 22 may provide the wireless terminal 26 with validity information, or conversely invalidity information, that informs the wireless terminal 26 of the validity or currency of the conditional handover configuration information that the wireless terminal 26 receives from the source gNodeB 22 One reason for providing the wireless terminal 26 with such (in)validity information is to preclude continued pendency of aged conditional handover configuration information, and/or to force the wireless terminal 26 to report measurement results for a candidate target gNodeB upon occurrence of one or more leave condition(s).

The source gNodeB 22, wireless terminal 26, and node processor 30 of the communications system 20 of FIG. 15 are similar to those of FIG. 6 and FIG. 11, with like units and functionalities having like reference numbers. As shown in FIG. 15, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(15). A difference between the previous example embodiments and the example embodiment and mode of FIG. 15 is that the conditional handover configuration information generator 66(15) includes, in the conditional handover configuration information, (in) validity information, also known as "leave condition(s)", which may be used by wireless terminal 26 to assess how long the conditional handover condition is to be in effect or when the conditional handover condition is to be exited. By way of non-limiting example, the leaving conditions may be provided in the last illustrated information element, "leaving conditions", of the conditional handover configuration message of FIG. 8.

As in the preceding example embodiments and modes, the wireless terminal 26 of the example embodiment and mode of FIG. 15 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80, with the measurement controller 80 in turn comprising measurement initiation unit 82, measurement results unit 84, and measurement report control unit 86. In the example embodiment and mode of FIG. 15, the wireless terminal 26 is provided with information which specifies the (in) validity of or leaving conditions for the conditional handover. Accordingly, the measurement report control unit 86(15) of FIG. 15 functions to determine, using the (in) validity information and/or leaving conditions, whether the measurement results for the candidate target gNodeB(s) are to be reported.

The example embodiment of FIG. 15 discloses validity of CHO configurations that wireless terminal 26 has previously received and associated reporting. In one example implementation, the validity of a CHO configuration may be valid until the wireless terminal 26 actually executes a handover. In another example implementation, the validity may terminate upon the source cell explicitly de-configuring the CHO configuration by sending a message to the UE (as in the example embodiment and mode of FIG. 11). In yet another example implementation, the validity may be managed by at least one timer. In this timer implementation, the wireless terminal 26 may release the CHO configuration at the expiry of the timer, while the radio network (the source/candidate target cells) may release the reserved radio resources at the expiry.

In the FIG. 15 example embodiment, de-configuring CHO configurations may be based on one or more leaving conditions. The leaving conditions may specify events upon which the UE leaves from the CHO configuration.

Figure 16:
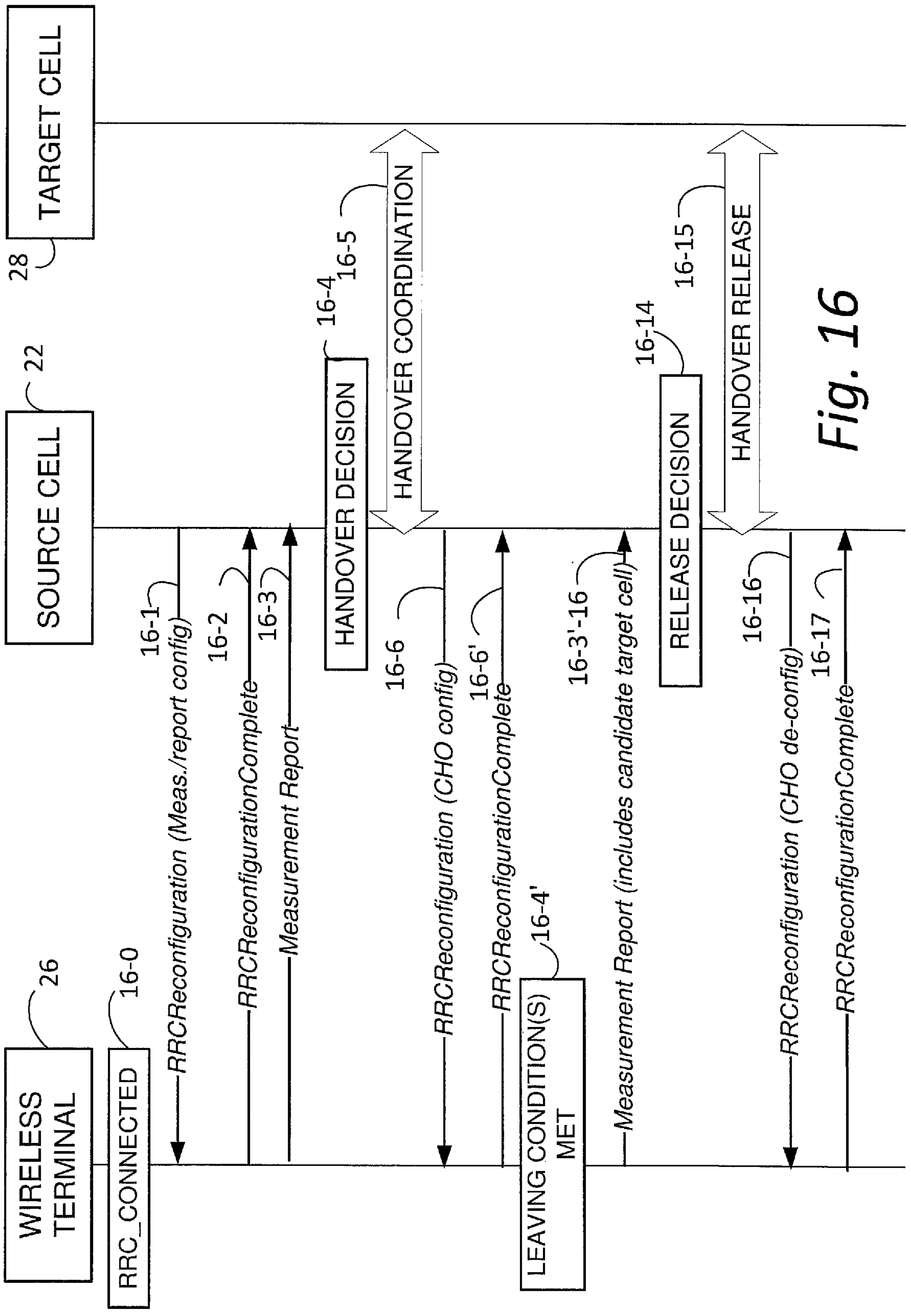
FIG. 16 is a diagrammatic view showing signaling and messages involved in measurement report in a conditional handover situation for the example cellular communications system of FIG. 15.

FIG. 16 illustrates an example scenario which may be performed by the system 20 of FIG. 15. In one example implementation shown in FIG. 16, the UE wireless terminal 26 may use EventTriggeringConfig configured with MeasConfig. Accordingly, the UE may continue the measuring procedure based on the information element measIds in MeasConfig. For each measId, if the UE detects that one of the candidate target cell meets the leaving condition/event (e.g. measurement result <threshold-hysteresis) specified in the corresponding reportConfig, the wireless terminal 26 may send a measurement report including the measurement result of the candidate target cell, based on a flag reportOnLeave associated with the condition/event. The source cell may release the handover coordination with the candidate target cell and may further send a message for CHO de-configuration. This scenario is illustrated in FIG. 16.

The acts of FIG. 16 which are similar to those of FIG. 7 and FIG. 12, have similar suffixes, e.g., act 16-0 of FIG. 16 is similar to act 7-0 of FIG. 7, act 16-1 of FIG. 16 is similar to act 7-1 of FIG. 7, and so forth. A difference in the example embodiment and mode of FIG. 16 relative to previous example embodiments and modes is that, after the conditional handover coordination of act 16-5, the wireless terminal 26 continues to check if the invalidity or leave conditions specified in the conditional handover configuration information of message 16-5 is satisfied. If the invalidity or leave conditions specified in the conditional handover configuration information of message 16-5 are not satisfied, then the measurement report control unit 86 of wireless terminal 26 continues to suppress the measurement reporting of the measurement results of the candidate target eNode(s), in a manner similar to that of the example embodiment of FIG. 6 and FIG. 7. In other words, measurement reports such as those of act 7-3' of FIG. 6, which suppress the reporting of measurement results for the candidate target eNode(s), may be transmitted. However, in the example scenario of FIG. 16, as act 16-4' the wireless terminal 26 detects that the invalidity or leaving conditions specified in the conditional handover configuration information are met. Upon making the determination of act 16-4 that the invalidity or leaving conditions specified in the conditional handover configuration information are met by current conditions and/or events, thereafter the wireless terminal 26 sends measurement reports which include the candidate target cell, as reflected by act 16-3'-16. Based on the receipt of the un-suppressed measurement report of act 16-3'-16 or other information, as act 16-14 the source gNodeB 22 makes a decision to release the conditional handover. Accordingly, a conditional handover release procedure is performed between source gNodeB 22 and the target gNodeB 28, as shown by act 16-15. Thereafter as act 16-16 the source gNodeB 22 may send a conditional handover de-configuration message to the wireless terminal 26. Upon successful receipt of the conditional handover de-configuration message, as act 16-17 the wireless terminal 26 replies to source gNodeB 22 with a RRCReconfigurationComplete message.

Figure 17:
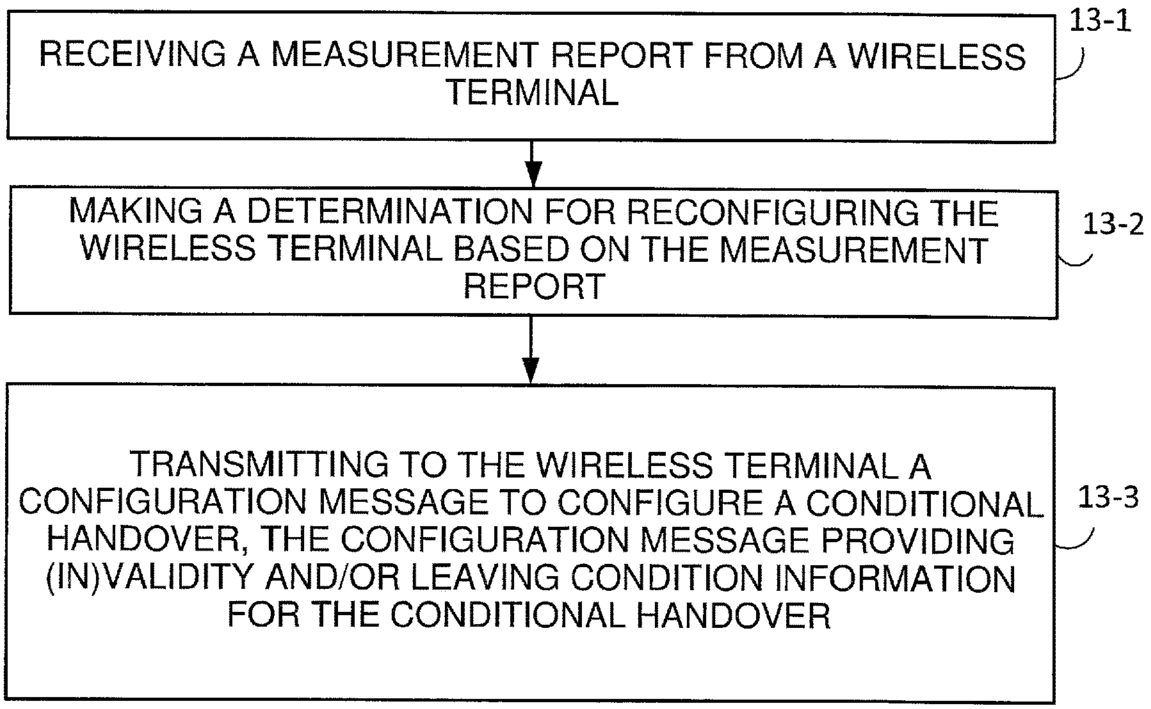
FIG. 17 is a flowchart showing example, basic, representative steps or acts performed by a source node of the system of FIG. 15.

The source gNodeB 22 of FIG. 15 thus provides the wireless terminal 26 with certain (in) validity information or leaving condition information to apprise the wireless terminal 26 how long reports of measurement results for the candidate target gNodeB(s) should be suppressed, if the report suppression is configured as described in the previous embodiment. Example, representative, basic acts performed by source gNodeB 22 of FIG. 15 are shown in FIG. 17. Act 17-1 comprises receiving a measurement report from a wireless terminal. Act 17-2 comprises making a determination for reconfiguring the wireless terminal based on the measurement report. The determination of act 17-2 may be made by conditional handover (CHO) determination unit 64 of source gNodeB 22, and may further be reflected by act 16-4 of FIG. 16. Act 17-3 comprises transmitting to the wireless terminal a configuration message to configure a conditional handover, the configuration message being configured to provide (in) validity or leaving condition information for a conditional handover.

Figure 18:
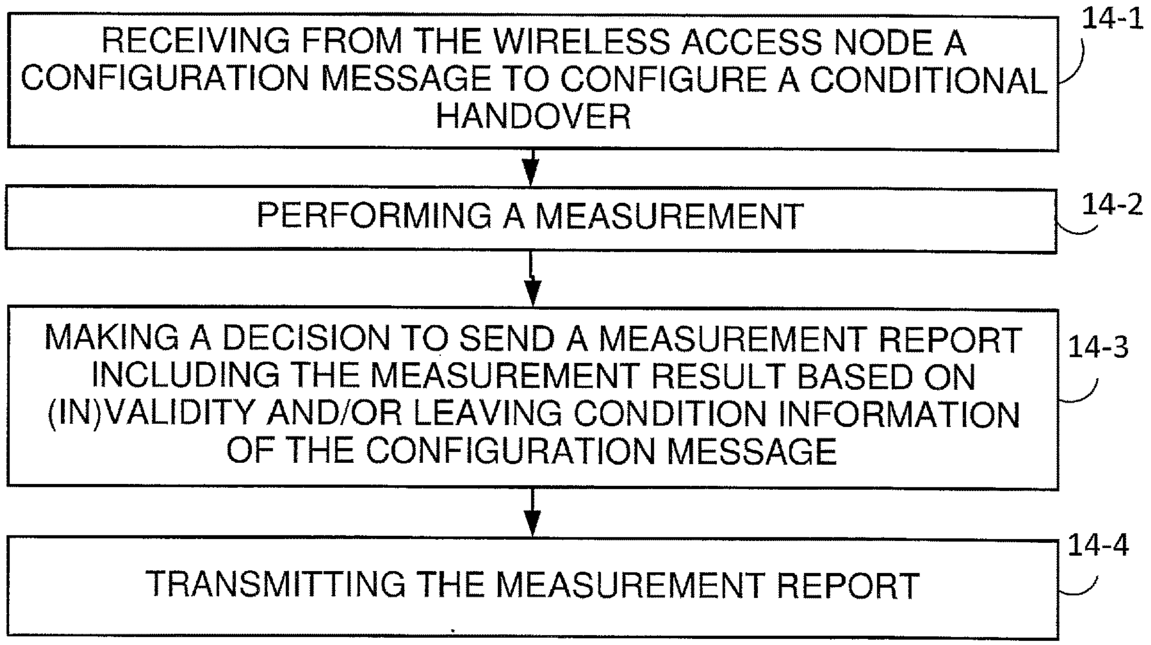
FIG. 18 is a flowchart showing example, basic, representative steps or acts performed by a wireless terminal of the system of FIG. 15.

Example, representative, basic acts performed by wireless terminal 26 of FIG. 15 are shown in FIG. 18. Act 18-1 comprises receiving from the wireless access node a configuration message to configure a conditional handover. The conditional handover configuration message of act 18-1 may be the message of act 16-6 as described above. Act 18-2 comprises the wireless terminal 26 performing a measurement. The measurement may be initiated by measurement initiation unit 82 of wireless terminal 26. Act 18-3 comprises the wireless terminal 26 making a decision, based on the configuration message of act 14-2 and the (in) validity and/or leaving condition information, whether to send a measurement report including the measurement result for a candidate target gNodeB(s). Act 18-4 comprises transmitting the measurement report to source gNodeB 22.

In another example implementation, the CHO configuration may include one or more leaving condition(s), separately from the condition(s) configured in MeasConfig. For example, the CHO configuration may include leaving offset(s) for each condition/event as shown in Listing 8. The wireless terminal 26 may consider that the leaving condition is met when the measurement result of the concerned candidate target cell goes below ax_Threshold-ax_LeavingOffset, where ax is one of A1, A2, A3, A4, A5 and A6 or any other events (not specified). Similar to the previous implementation, each condition may be associated with reportOnLeave, instructing the UE whether to transmit a measurement report when the leaving condition is met.

Listing 8

```
CHOConfig ::=  SEQUENCE {
     CHOConfigToRemoveList   CHOConfigToRemoveList
OPTIONAL,   -- Need N
     CHOConfigToAddModList   CHOConfigToAddModList
OPTIONAL,   -- Need N
     }
OPTIONAL,   -- Need M
CHOConfigToRemoveList ::=   SEQUENCE (SIZE
(1..maxNrofCHOConfigId)) OF CHOConfigId
ReportConfigToAddModList ::=   SEQUENCE (SIZE
(1..maxCHOConfigId)) OF CHOConfigToAddMod
CHOConfigToAddMod ::=   SEQUENCE {
     choConfigId   CHOConfigId,
     reportConfig   CHOICE {
          choConfigNR   CHOConfigNR,
          ...,
```

-continued

Listing 8

```
            choConfigInterRAT    choConfigInterRAT
        }
}
CHOConfigNR ::=   SEQUENCE {
        CHOConditionList   SEQUENCE (SIZE
(1..maxCHOConditionList)) OF CHOCondition
}
CHOCondition   SEQUENCE {
    candidateCellIDList   SEQUENCE (SIZE
(1..maxCandidateCellIDList))   OF PhysCellId eventTriggered
EventTriggerConfigCHO,
            ...,
            reportCGI   ReportCGI
        }
        spCellConfigCommon    ServingCellConfigCommon
OPTIONAL,   -- Need M
        newUE-Identity    RNTI-Value,
    reportPeriodicity    ENUMERATED {ms50, ms100,
ms150, ms200, ms500, ms1000, ms2000, ms10000} OPTIONAL,
        validity   ENUMERATED {ms50,
ms100, ms150, ms200, ms500, ms1000, ms2000, ms10000},
        rach-ConfigDedicated    CHOICE {
    uplink   RACH-ConfigDedicated,
            supplementaryUplink    RACH-ConfigDedicated
        }
OPTIONAL,   -- Need N
}
EventTriggerConfigCHO::=   SEQUENCE {
        eventId   CHOICE {
            eventA1   SEQUENCE {
                a1-Threshold   MeasTriggerQuantity,
                a1-LeavingOffset   MeasTriggerQuantityOffset
OPTIONAL,
            reportOnLeave    BOOLEAN    OPTIONAL,
            },
            eventA2   SEQUENCE {
                a2-Threshold   MeasTriggerQuantity,
                a2-LeavingOffset   MeasTriggerQuantityOffset
    OPTIONAL,
            reportOnLeave    BOOLEAN
OPTIONAL,
            },
            eventA3   SEQUENCE {
                a3-Offset   MeasTriggerQuantityOffset,
                a3-LeavingOffset   MeasTriggerQuantityOffset
    OPTIONAL,
            reportOnLeave    BOOLEAN
            OPTIONAL,
        },
            eventA4   SEQUENCE {
              a4-Threshold   MeasTriggerQuantity,
              a4-LeavingOffset   MeasTriggerQuantityOffset
    OPTIONAL,
                reportOnLeave    BOOLEAN    OPTIONAL,
            },
            eventA5   SEQUENCE {
             a5-Threshold1   MeasTriggerQuantity,
             a5-Threshold2   MeasTriggerQuantity,
             a5-LeavingOffset1   MeasTriggerQuantityOffset
    OPTIONAL,
             a5-LeavingOffset2   MeasTriggerQuantityOffset
    OPTIONAL,
             reportOnLeave    BOOLEAN    OPTIONAL,
          },
            eventA6   SEQUENCE {
                a6-Offset   MeasTriggerQuantityOffset,
                a6-LeavingOffset   MeasTriggerQuantityOffset
    OPTIONAL,
            reportOnLeave    BOOLEAN    OPTIONAL,
          },
            ...
        },
...
```

4: Security Configurations for Conditional Handover Configurations

Typical wireless systems may be required to protect user/signalling data from security attacks by applying encryptions and integrity protections. For this purpose, security contexts may be established among terminals and network entities. In general, a security context is a secure relationship between two or more entities using one or more keys. In the LTE/5G systems, the UE establishes an Access Stratum (AS) security context with eNB(s) and/or gNB(s). The AS security context may be setup in conjunction with a Non-Access Stratum (NAS) security context (established with Mobility Management Entity (MME) for LTE, or Access and Mobility management Function (AMF) for 5G). The security contexts may comprise one or more security keys derived from some shared secrets stored in the UE and a network entity. The AS security context may be firstly established immediately after an RRC connection establishment (i.e. Initial AS security context), while the NAS security context may be firstly established during a registration process.

Figure 19:
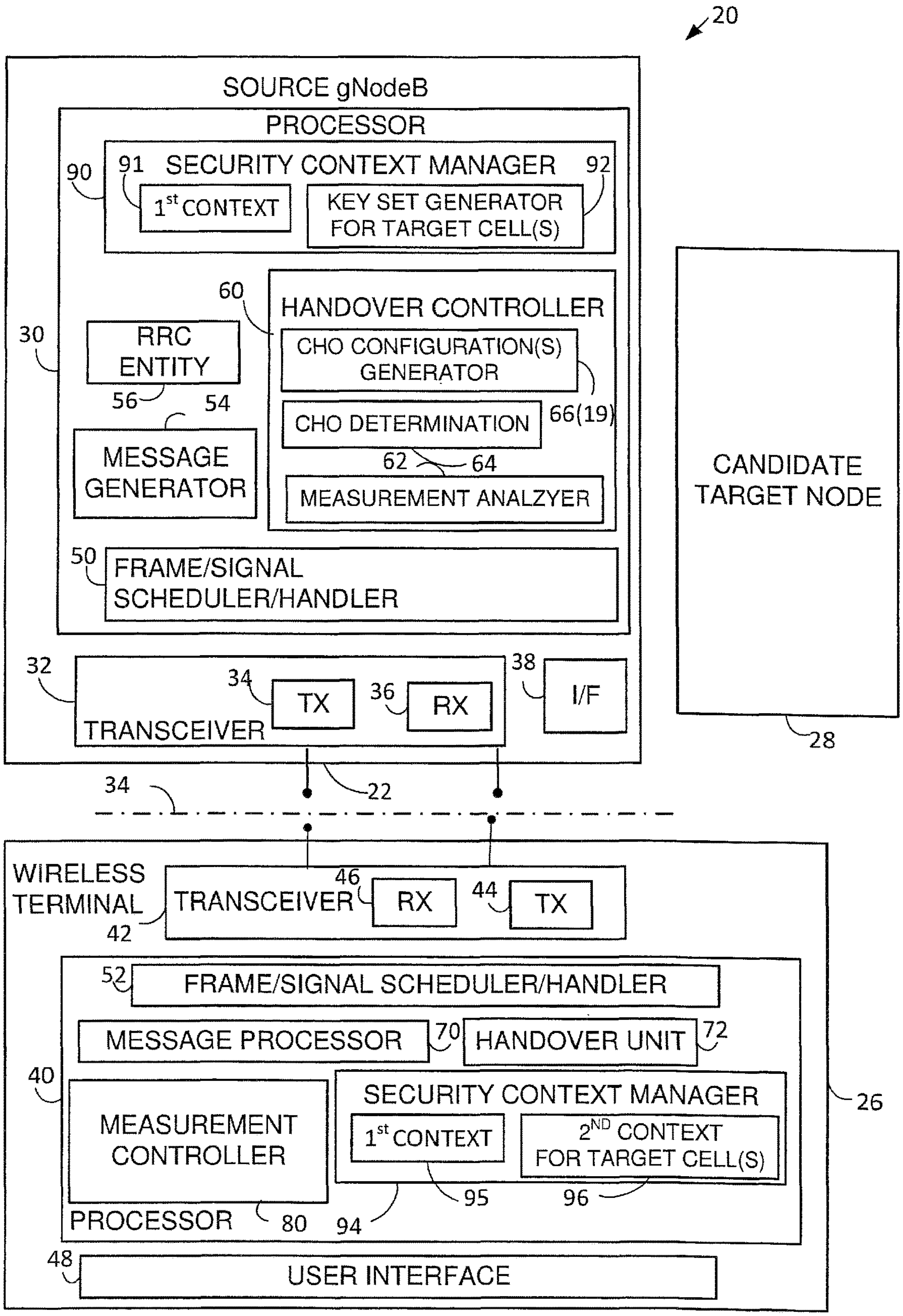
FIG. 19 is a schematic view of an example communications system comprising a source gNodeB which provides a wireless terminal with conditional handover configuration information including security configuration(s).

FIG. 19 shows an example communications system 20 wherein security contexts may be employed in conjunction with handovers. FIG. 19 shows system 20 as comprising source gNodeB 22, wireless terminal 26, and candidate target node 28. The source gNodeB 22, wireless terminal 26, and node processor 30 of the communications system 20 of FIG. 19 are similar to those of FIG. 6, FIG. 11, and FIG. 15, with like units and functionalities having like reference numbers. As shown in FIG. 19, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(19). A difference between the previous example embodiments and the example embodiment and mode of FIG. 19 is that node processor 30 further comprises source node security context manager 90. The security context manager 90 in turn comprises first security context generator 91 and key set generator 92 for target cell(s).

As in the preceding example embodiments and modes, the wireless terminal 26 of the example embodiment and mode of FIG. 19 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 19, it should be understood that, in like manner with FIG. 15, measurement controller 80 may in turn comprises a measurement initiation unit, a measurement results unit, and a measurement report control unit. In addition, the terminal processor 40 of FIG. 19 is shown as comprising terminal security context manager 94. The terminal security context manager 94 comprises terminal first context generator 95 and terminal second context generator 96 for target cell(s).

The example embodiment and mode of FIG. 19 takes into consideration various aspects of context generation and handling in conjunction with handovers. For example, the example embodiment and mode of FIG. 19 takes into consideration that, in some conditions, such as upon a handover, the security context may be altered/updated. A handover, either conditional or non-conditional, may be categorized into one of the following types:

- Inter-gNB handover: the target cell is controlled by a gNB different from the gNB that controls the currently serving cell.
- Intra-gNB handover: the target cell is controlled by the same gNB that controls the currently serving cell.
- Intra-cell handover: some configuration parameter changes while the UE stays in the currently serving cell. This may be considered as a handover without mobility.

A non-conditional handover herein refers to a conventional (regular) handover, wherein the UE immediately attempts to access to a target cell once directed to do so. On the other hand, a conditional handover is a handover configured prospectively, e.g., for which the wireless terminal is configured for a potential handover in advance of an actual handover trigger or event, as explained in the previous embodiments.

While the UE stays in RRC_CONNECTED (or possibly in RRC_INACTIVE), the AS security context may have to be updated due to the UE's mobility or some other reasons. The AS security context update may be triggered by the Radio Access Network (RAN). When triggered, the UE and the currently serving gNB (source gNB) may generate a fresh set of security keys. If the UE performs a handover to a target cell, the fresh set of security keys may be shared by the target gNB controlling the target cell. Herein a set of parameters or information used for generating the security keys used for a non-conditional handover may be referred as a first security configuration. In some example configurations, the first security configuration may be provided to the UE by a handover command upon directing a handover or anytime the security keys need to be updated.

In a non-conditional handover, the currently serving gNB may send a handover command to the UE. In one configuration, RRCReconfiguration may be used to trigger the non-conditional handover. Listing 9 shows an example format of RRCReconfiguration used for the non-conditional handover.

Listing 9

```
RRCReconfiguration ::=   SEQUENCE {
    rrc-TransactionIdentifier   RRC-TransactionIdentifier,
    criticalExtensions   CHOICE {
      rrcReconfiguration   RRCReconfiguration-IEs,
      criticalExtensionsFuture   SEQUENCE { }
    }
}
RRCReconfiguration-IEs ::=   SEQUENCE {
    radioBearerConfig   RadioBearerConfig
OPTIONAL, -- Need M
    secondaryCellGroup   OCTET STRING (CONTAINING
CellGroupConfig) OPTIONAL, -- Need M
    measConfig   MeasConfig
OPTIONAL, -- Need M
    lateNonCriticalExtension   OCTET STRING
OPTIONAL,
    nonCriticalExtension   RRCReconfiguration-v1530-IEs
OPTIONAL
}
RRCReconfiguration-v1530-IEs ::=   SEQUENCE {
    masterCellGroup   OCTET STRING (CONTAINING
CellGroupConfig)   OPTIONAL, -- Need M
    fullConfig   ENUMERATED {true}
OPTIONAL, -- Cond FullConfig
    dedicatedNAS-MessageList   SEQUENCE (SIZE(1..maxDRB)) OF
DedicatedNAS-Message   OPTIONAL, -- Cond nonHO
    masterKeyUpdate   MasterKeyUpdate
OPTIONAL, -- Cond MasterKeyChange
    dedicatedSIB1-Delivery   OCTET STRING (CONTAINING SIB1)
OPTIONAL, -- Need N
  dedicatedSystemInformationDelivery OCTET STRING (CONTAINING
SystemInformation)
OPTIONAL, -- Need N
    otherConfig   OtherConfig
OPTIONAL, -- Need M
    nonCriticalExtension   RRCReconfiguration-v1540-IEs
OPTIONAL
}
RRCReconfiguration-v1540-IEs ::=   SEQUENCE {
    otherConfig-v1540   OtherConfig-v1540   OPTIONAL, --
Need M
    nonCriticalExtension   SEQUENCE { }   OPTIONAL
}
MasterKeyUpdate ::=   SEQUENCE {
    keySetChangeIndicator   BOOLEAN,
    nextHopChainingCount   NextHopChainingCount,
    nas-Container   OCTET STRING
OPTIONAL,   -- Cond securityNASC
    ...
}
CellGroupConfig ::=   SEQUENCE {
    cellGroupId   CellGroupId,
```

-continued

Listing 9

```
        rlc-BearerToAddModList    SEQUENCE (SIZE(1..maxLC-ID)) OF
RLC-BearerConfig    OPTIONAL,    -- Need N
        rlc-BearerToReleaseList    SEQUENCE (SIZE(1..maxLC-ID)) OF
LogicalChannelIdentity
OPTIONAL,    -- Need N
        mac-CellGroupConfig    MAC-CellGroupConfig
OPTIONAL,    -- Need M
        physicalCellGroupConfig    PhysicalCellGroupConfig
OPTIONAL,    -- Need M
        spCellConfig    SpCellConfig
OPTIONAL,    -- Need M
        sCellToAddModList    SEQUENCE (SIZE (1..maxNrofSCells)) OF
SCellConfig OPTIONAL,    -- Need N
        sCellToReleaseList    SEQUENCE (SIZE (1..maxNrofSCells)) OF
SCellIndex
OPTIONAL,    -- Need N
        ...,
        [[
        reportUplinkTxDirectCurrent-v1530    ENUMERATED {true}
OPTIONAL    -- Cond BWP-Reconfig
        ]]
}
-- Serving cell specific MAC and PHY parameters for a SpCell:
SpCellConfig ::=    SEQUENCE {
        servCellIndex    ServCellIndex
OPTIONAL,    -- Cond SCG
        reconfigurationWithSync    ReconfigurationWithSync
OPTIONAL,    -- Cond ReconfWithSync
        rlf-TimersAndConstants    SetupRelease { RLF-TimersAndConstants }
OPTIONAL,    -- Need M
        rlmInSyncOutOfSyncThreshold    ENUMERATED {n1}
OPTIONAL,    -- Need S
        spCellConfigDedicated    ServingCellConfig
OPTIONAL,    -- Need M
        ...
}
ReconfigurationWithSync ::=    SEQUENCE {
        spCellConfigCommon    ServingCellConfigCommon
OPTIONAL,    -- Need M
        newUE-Identity    RNTI-Value,
        t304    ENUMERATED {ms50, ms100, ms150, ms200, ms500,
ms1000, ms2000, ms10000},
        rach-ConfigDedicated    CHOICE {
            uplink    RACH-ConfigDedicated,
        supplementaryUplink    RACH-ConfigDedicated
        }
  OPTIONAL,    -- Need N
        ...,
        [[
        smtc    SSB-MTC
OPTIONAL    -- Need S
        ]]
}
RadioBearerConfig ::=    SEQUENCE {
        srb-ToAddModList    SRB-ToAddModList
OPTIONAL,    -- Cond HO-Conn
        srb3-ToRelease    ENUMERATED{true}
OPTIONAL,    -- Need N
        drb-ToAddModList    DRB-ToAddModList
OPTIONAL,    -- Cond HO-toNR
        drb-ToReleaseList    DRB-ToReleaseList
OPTIONAL,    -- Need N
        securityConfig    SecurityConfig
OPTIONAL,    -- Need M
        ...
}
SecurityConfig ::=    SEQUENCE {
        securityAlgorithmConfig    SecurityAlgorithmConfig
OPTIONAL,    -- Cond RBTermChange
        keyToUse    ENUMERATED{master, secondary}
OPTIONAL,    -- Cond RBTermChange
        ...
}
```

When receiving RRCReconfiguration as shown by way of example in Listing 9 above, the UE may perform the a procedure as specified in 3GPP TS 38.331 and shown, at least in part, in Listing 10.

LISTING 10

1> :
  2> if the nas-Container is included in the received masterKeyUpdate:
    3> forward the nas-Container to the upper layers;
  2> if the keySetChangeIndicator is set to true:
    3> derive or update the $K_{gNB}$ key based on the $K_{AMF}$ key, as specified in TS 33.501 [11];
  2> else:
    3> derive or update the $K_{gNB}$ key based on the current $K_{gNB}$ key or the NH, using the nextHopChainingCount value indicated in the received masterKeyUpdate, as specified in TS 33.501 [11];
  2> store the nextHopChainingCount value;
  2> derive the keys associated with the $K_{gNB}$ key as follows:
    3> if the securityAlgorithmConfig is included in SecurityConfig:
      4> derive the $K_{RRCenc}$ and $K_{UPenc}$ keys associated with the cipheringAlgorithm indicated in the securityAlgorithmConfig, as specified in TS 33.501 [11];
      4> derive the $K_{RRCint}$ and $K_{UPint}$ keys associated with the integrityProtAlgorithm indicated in the securityAlgorithmConfig, as specified in TS 33.501 [11];
    3> else:
      4> derive the $K_{RRCenc}$ and $K_{UPenc}$ keys associated with the current cipheringAlgorithm, as specified in TS 33.501 [11];
      4> derive the $K_{RRCint}$ and $K_{UPint}$ keys associated with the current integrityProtAlgorithm, as specified in TS 33.501 [11].

In one configuration, the MasterKeyUpdate information element (IE) (and possibly combined with security AlgorithmConfig IE) shown by way of example in Listing 10 may be considered to be one example implementation of the first security configuration. In addition, the Reconfiguration WithSync IE may comprise RACH configurations, indicating that this handover involves mobility (cell change and/or gNB change).

Figure 20:
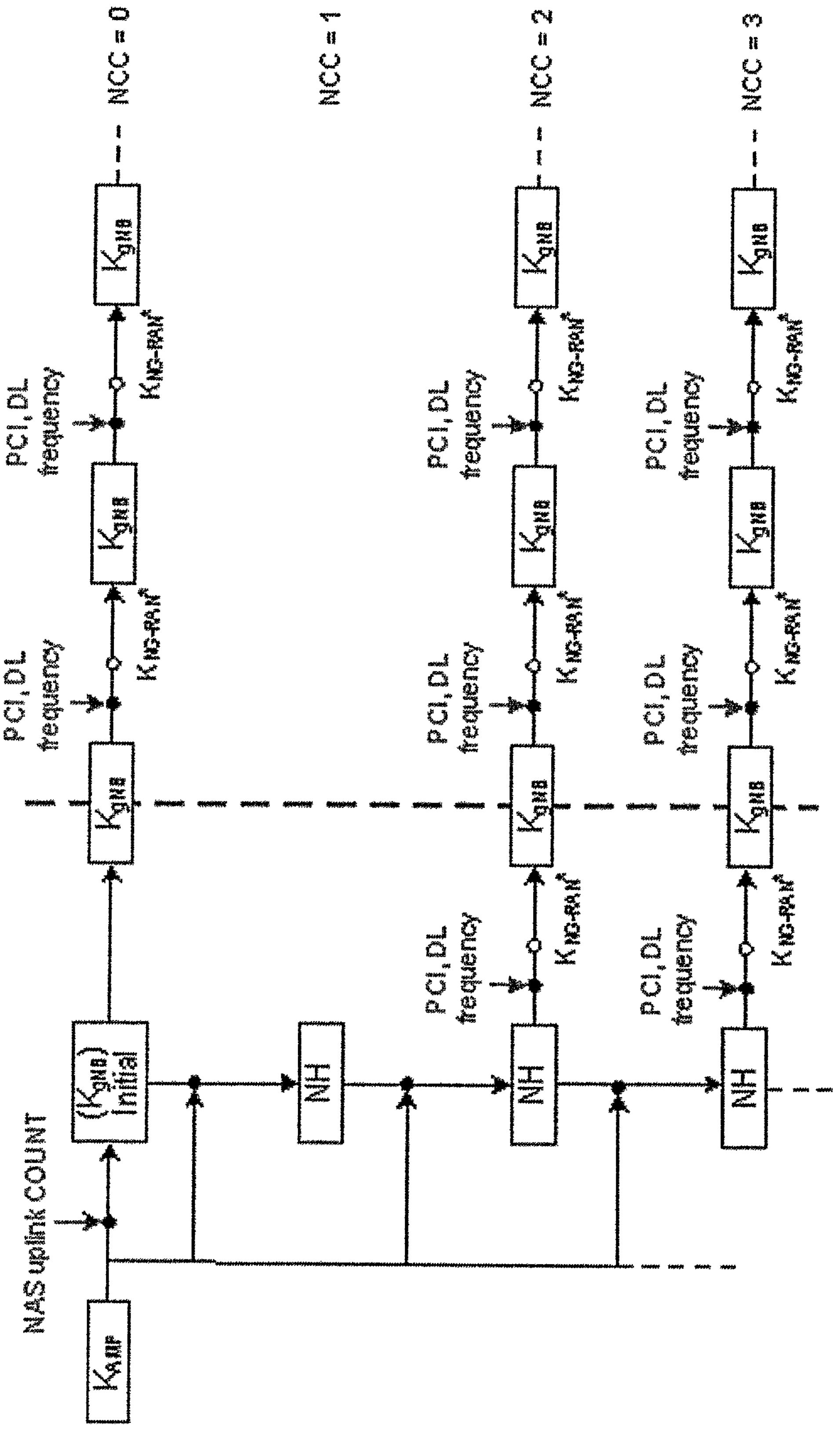
FIG. 20 is a diagrammatic view showing example, basic, representative acts performed by a wireless terminal to derive a master key, $K_{gNB}$, used for the AS security context.

If indicated by the handover command (e.g., by the presence of the first security configuration), the UE may be requested to update the security context. For an intra-gNB or an inter-gNB handover, the updated security context may be used for the target cell upon/after the handover procedure execution. For example, the UE may derive $K_{gNB}$, a master key used for the AS security context, using parameters including $K_{AMF}$, one of the keys used for NAS security context, nextHopChainingCount (NCC), received in RRCReconfiguration, as shown in FIG. 20, per 3GPP TS 33.501, which is incorporated herein by reference. The derived $K_{gNB}$ may be used to further generate subsequent keys (such as $K_{RRCint}$ and $K_{RRCenc}$ per TS 33.501). An example procedure of the key derivation, according to 3GPP TS 33.501, is described at least in part in Listing 11.

LISTING 11

Whenever an initial AS security context needs to be established between UE and gNB/ng-eNB, AMF and the UE shall derive a $K_{gNB}$ and a Next Hop parameter (NH). The $K_{gNB}$ and the NH are derived from the $K_{AMF}$. A NH Chaining Counter (NCC) is associated with each $K_{gNB}$ and NH parameter. Every $K_{gNB}$ is associated with the NCC corresponding to the NH value from which it was derived. At initial setup, the $K_{gNB}$ is derived directly from $K_{AMF}$, and is then considered to be associated with a virtual NH parameter with NCC value equal to zero. At initial setup, the derived NH value is associated with the NCC value one.

NOTE 1: At the UE, the NH derivation associated with NCC=1 could be delayed until the first handover performing vertical key derivation.

NOTE 1a: In N2 handover, when the $K_{gNB}$ is updated either due to $K_{AMF}$ change or synchronising the AS security context with the NAS security context, the $K_{gNB}$ is derived as specified in clauses 6.9.2.3.3 and 6.9.2.3.4 of the present document. In inter-RAT handover, the $K_{gNB}$ is derived as specified in clause 8.4 of the present document. In UE context modification, the $K_{gNB}$ is derived as specified in clause 6.9.2.2.

Whether the AMF sends the $K_{gNB}$ key or the {NH, NCC} pair to the serving gNB/ng-eNB is described in detail in sub-clauses 6.9.2.2 and 6.9.2.3. The AMF shall not send the NH value to gNB/ng-eNB at the initial connection setup. The gNB/ng-eNB shall initialize the NCC value to zero after receiving NGAP Initial Context Setup Request message.

NOTE 2: Since the AMF does not send the NH value to gNB/ng-eNB at the initial connection setup, the NH value associated with the NCC value one cannot be used in the next Xn handover or the next intra-gNB/intra-ng-eNB-CU handover, for the next Xn handover or the next intra-gNB-CU/intra-ng-eNB handover the horizontal key derivation (see Figure 6.9.2.1.1-1) will apply.

NOTE 3: One of the rules specified for the AMF in sub-clause 6.9.2.3.3 of the present document states that the AMF always computes a fresh {NH, NCC} pair that is given to the target gNB/ng-eNB. An implication of this is that the first {NH, NCC} pair will never be used to derive a $K_{gNB}$. It only serves as an initial value for the NH chain.

The UE and the gNB/ng-eNB use the $K_{gNB}$ to secure the communication between each other. On handovers, the basis for the $K_{gNB}$ that will be used between the UE and the -continued

| LISTING 11 |
| --- |
| target gNB/ng-eNB, called $K_{NG\text{-}RAN}$*, is derived from either the currently active $K_{gNB}$ or from the NH parameter. If $K_{NG\text{-}RAN}$* is derived from the currently active $K_{gNB}$ this is referred to as a horizontal key derivation (see Figure 6.9.2.1.1-1) and if the $K_{NG\text{-}RAN}$* is derived from the NH parameter the derivation is referred to as a vertical key derivation (see Figure 6.9.2.1.1-1). |
| As NH parameters are only computable by the UE and the AMF, it is arranged so that NH parameters are provided to gNB/ng-eNBs from the AMF in such a way that forward security can be achieved. |
| On handovers with vertical key derivation the NH is further bound to the target PCI and its frequency ARFCN-DL before it is taken into use as the $K_{gNB}$ in the target gNB/ng-eNB. On handovers with horizontal key derivation the currently active $K_{gNB}$ is further bound to the target PCI and its frequency ARFCN-DL before it is taken into use as the $K_{gNB}$ in the target gNB/ng-eNB. |

In addition, in some configurations, an intra-cell handover may be instructed to the UE just to update the AS security context. This act may be referred as "Key change on the fly", which may be categorized in one of the following two cases: Key re-keying and Key refresh.

The case of Key re-keying is initiated by the AMF. The AMF may create a new $K_{gNB}$ from the current $K_{AMF}$ using a fresh uplink NAS COUNT, a counter handled by the Non-Access Stratum (NAS) layer, which is shared by the UE and the AMF. The derived $K_{gNB}$ may be sent to the gNB. The gNB may then send an RRC message (e.g., RRCReconfiguration) with the first security configuration comprising (1) an indication indicating a need to generate a fresh $K_{AMF}$ and/or (2) indication indicating a need to generate a fresh $K_{gNB}$ based on the $K_{AMF}$ (e.g. KeySetChangeIndicator=TRUE).

The case of Key refresh is initiated by the currently serving gNB. The gNB may generate a new $K_{gNB}$ from the Next Hop parameter, NH), if an unused {NH, NCC} pair is available, given by the AMF, known as "vertical derivation". Otherwise the gNB may generate a new $K_{gNB}$ from the currently used $K_{gNB}$ (known as "horizontal derivation"). The vertical derivation is performed in the vertical direction in FIG. 20, whereas the horizontal derivation is performed in the horizontal direction in FIG. 20. The gNB may then send an RRC message (e.g. RRCReconfiguration) including the first security configuration (e.g., nextHopChainingCount used for the key derivation and KeySetChangeIndicator=FALSE). The UE receiving the RRC message may generate a new $K_{gNB}$ with either the vertical or horizontal derivation, based on the received NCC value and the saved NCC value. That is, the vertical derivation may be performed if the received NCC value is different from the saved NCC value, otherwise, the horizontal derivation may be performed.

If the handover command does not comprise the first security configuration, the UE is supposed to continue using the current AS security context, i.e., the current AS keys, after the handover. In some systems, such as the 5G system, the AS key update may not be required for an intra-gNB handover. In such a case, for example, the UE may determine if the AS key update is needed by the presence of MasterKeyUpdate, and possibly also security AlgorithmConfig, in RRCReconfiguration.

Figure 21:
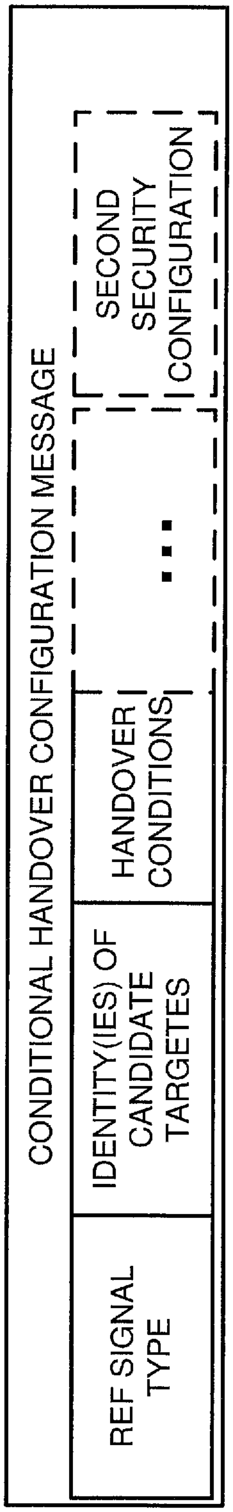
FIG. 21 is a diagrammatic view showing example generic contents of an example conditional handover configuration message including security configurations for the example embodiment of FIG. 19.
Figure 22:
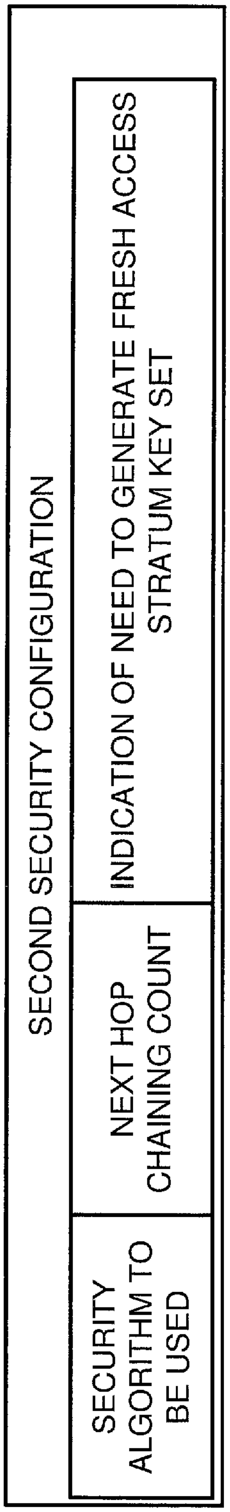
FIG. 22 is a diagrammatic view showing example generic contents of a second security configuration information element for the example embodiment of FIG. 19.

As mentioned before, "a first security configuration" was described as a set of parameters or information used for generating the security keys used for a non-conditional handover. On the other hand, and as used herein, a "second security configuration(s)" comprises a set of parameters or information which will be used for generating a security context to be established upon or after performing a conditional handover to one of the candidate target cells configured in the CHO configurations. In an example first implementation of the example embodiment and mode of FIG. 19, the CHO configurations disclosed in the previous embodiments, e.g., the example embodiments and modes described with reference to one or more of FIG. 6, FIG. 11, and/or FIG. 15, may further comprise second security configuration(s), which will be used for generating a security context to be established upon or after performing a conditional handover to one of the candidate target cells configured in the CHO configurations. In other example implementations of the example embodiment and mode of FIG. 19, the second security configuration may be a part of a message comprising the CHO configurations but not a part of the CHO configuration information element per se (e.g., in a different information element included in the message). For example, FIG. 21 shows an example format of at least portions of a representative conditional handover configuration message which includes second security configuration information. In either case, and as shown by way of example in FIG. 22, the second security configuration may comprise:

- Security algorithm to be used (e.g. securityAlgorithmConfig)
- Next hop chaining count (e.g. nextHopChainingCount)
- An indication indicating a need to generate a fresh AS key set (e.g., KeySetChangeIndicator)

Similar to the first security configuration, the second security configuration for a candidate target cell may be optionally included in the CHO configurations. If the second security configuration is absent, then the UE may continue using the master key and the subsequent keys being used in the currently serving cell after performing a CHO to the candidate target cell.

Figure 23A:
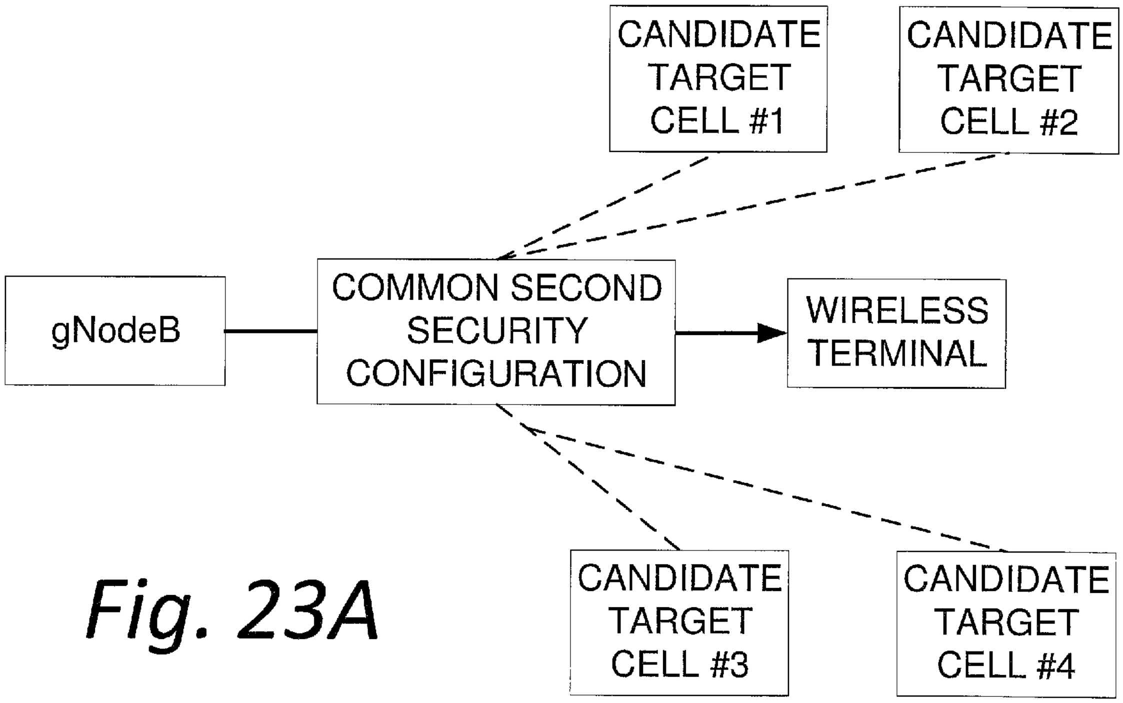
FIG. 23A is a diagrammatic view showing a common second security configuration information element which may be associated with plural candidate target cells for the example embodiment of FIG. 19.

In one example configuration, illustrated by way of example in FIG. 23A, a common second security configuration may be used for all of the candidate target cell(s) in the CHO configurations.

Figure 23B:
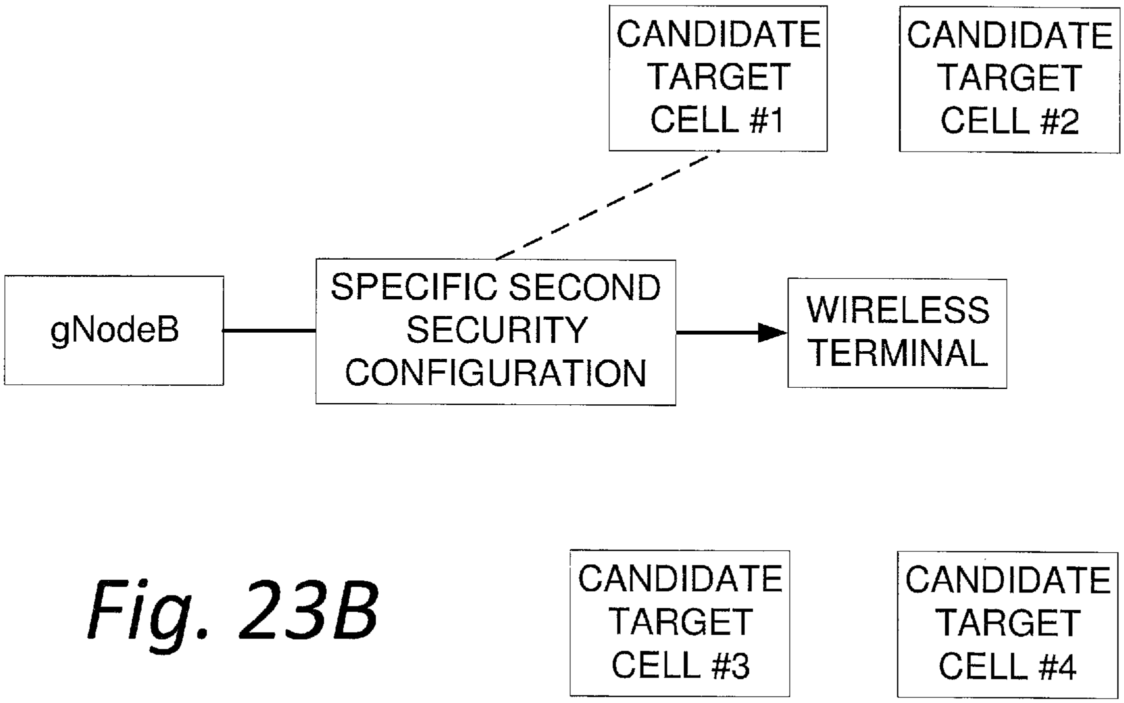
FIG. 23B is a diagrammatic view showing a specific second security configuration information element which may be associated with a unique candidate target cells for the example embodiment of FIG. 19.

In another example configuration, illustrated by way of example in FIG. 23B, a cell-specific second security configuration may be configured for each of the candidate target cell(s).

Figure 23C:
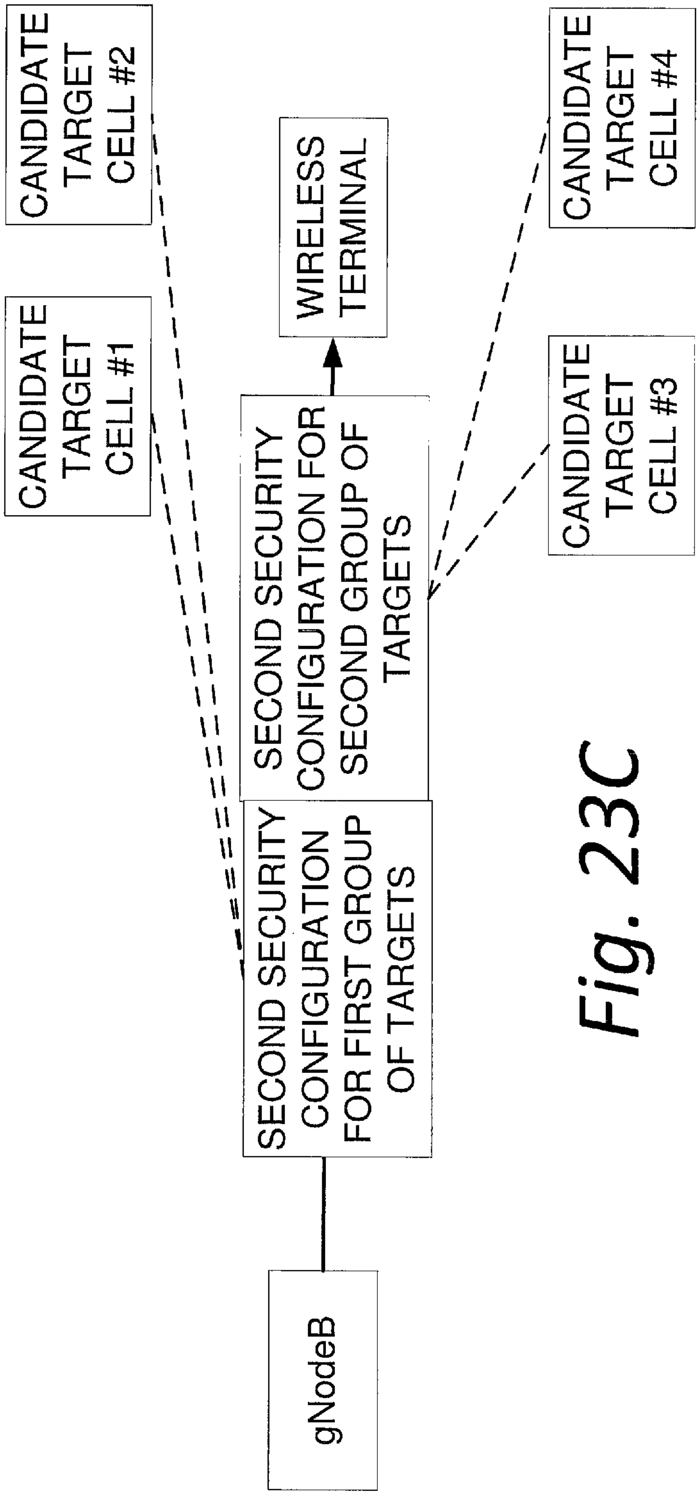
FIG. 23C is a diagrammatic view showing a message with plural second security configuration information elements, different second security configuration information elements of the message being associated with different groups of one or more candidate target cells for the example embodiment of FIG. 19.

In yet another example configuration, illustrated by way of example in FIG. 23C, a plurality of second security configurations is configured, wherein each of the second security configurations may be used for one or a group of candidate target cells.

Listing 12-1 shows an example format of the CHO configurations comprising a cell-specific second security configuration for each of the candidate target cells.

Listing 12-1

```
CHOConfig ::=   SEQUENCE {
   CHOConfigToRemoveList   CHOConfigToRemoveList
OPTIONAL,   -- Need N
   CHOConfigToAddModList   CHOConfigToAddModList
OPTIONAL,   -- Need N
   }
OPTIONAL,   -- Need M
CHOConfigToRemoveList ::= SEQUENCE (SIZE (1..maxNrofCHOConfigId)) OF
CHOConfigId
ReportConfigToAddModList ::=   SEQUENCE (SIZE (1..maxCHOConfigId)) OF
CHOConfigToAddMod
CHOConfigToAddMod ::=   SEQUENCE {
   choConfigId   CHOConfigId,
   reportConfig   CHOICE {
      choConfigNR   CHOConfigNR,
      ...,
      choConfigInterRAT   choConfigInterRAT
   }
}
CHOConfigNR ::=   SEQUENCE {
   radioBearerConfig   RadioBearerConfig
OPTIONAL, -- Need M
   secondaryCellGroup   OCTET STRING (CONTAINING
CellGroupConfig)   OPTIONAL, -- Need M
   masterCellGroup   OCTET STRING (CONTAINING
CellGroupConfig)   OPTIONAL, -- Need M
   fullConfig   ENUMERATED {true}
OPTIONAL, -- Cond FullConfig
   masterKeyUpdate   MasterKeyUpdate
OPTIONAL, -- Cond MasterKeyChange
   CHOConditionList SEQUENCE (SIZE (1..maxCHOConditionList)) OF
CHOCondition
}
CHOCondition   SEQUENCE {
   eventTriggered   EventTriggerConfigCHO,
      ...,
}
EventTriggerConfigCHO::=   SEQUENCE {
   eventId   CHOICE {
      eventA1   SEQUENCE {
         a1-Threshold   MeasTriggerQuantity,
         a1-LeavingOffset   MeasTriggerQuantityOffset
   OPTIONAL,
         reportOnLeave   BOOLEAN
   OPTIONAL,
      },
      eventA2   SEQUENCE {
         a2-Threshold   MeasTriggerQuantity,
         a2-LeavingOffset   MeasTriggerQuantityOffset
   OPTIONAL,
         reportOnLeave   BOOLEAN
   OPTIONAL,
   },
      eventA3   SEQUENCE {
         a3-Offset   MeasTriggerQuantityOffset,
         a3-LeavingOffset   MeasTriggerQuantityOffset
   OPTIONAL,
         reportOnLeave   BOOLEAN
   OPTIONAL,
    },
      eventA4   SEQUENCE {
         a4-Threshold   MeasTriggerQuantity,
         a4-LeavingOffset   MeasTriggerQuantityOffset
   OPTIONAL,
         reportOnLeave   BOOLEAN
   OPTIONAL,
      },
      eventA5   SEQUENCE {
         a5-Threshold1   MeasTriggerQuantity,
         a5-Threshold2   MeasTriggerQuantity,
         a5-LeavingOffset1   MeasTriggerQuantityOffset
   OPTIONAL,
         a5-LeavingOffset2   MeasTriggerQuantityOffset
   OPTIONAL,
         reportOnLeave   BOOLEAN
   OPTIONAL,
      },
      eventA6   SEQUENCE {
         a6-Offset   MeasTriggerQuantityOffset,
```

-continued

Listing 12-1

```
      a6-LeavingOffset   MeasTriggerQuantityOffset
  OPTIONAL,
      reportOnLeave   BOOLEAN
  OPTIONAL,
    },
    ...
  },
...
```

Listing 12-2 is an alternative format for the cell-specific second security configuration, wherein the CHO configurations, CHOConfig, may comprise one common second security configuration, masterKeyUpdate, each of the CHO configurations, e.g., CHOConfigNR, comprising a flag to indicate whether or not it is associated with the second common security configuration.

Listing 12-2

```
CHOConfig ::=   SEQUENCE {
  CHOConfigToRemoveList   CHOConfigToRemoveList
OPTIONAL,   -- Need N
  CHOConfigToAddModList   CHOConfigToAddModList
OPTIONAL,   -- Need N
  masterKeyUpdate   MasterKeyUpdate
OPTIONAL, -- Cond MasterKeyChange
  }
OPTIONAL,   -- Need M
CHOConfigNR ::=   SEQUENCE {
  radioBearerConfig   RadioBearerConfig
OPTIONAL, -- Need M
  secondaryCellGroup   OCTET STRING (CONTAINING
CellGroupConfig)   OPTIONAL, -- Need M
  masterCellGroup   OCTET STRING (CONTAINING
CellGroupConfig)   OPTIONAL, -- Need M
  fullConfig   ENUMERATED {true}
OPTIONAL, -- Cond FullConfig
  masterKeyUpdateAssociated   ENUMERATED {true}
OPTIONAL, -- Need M
  CHOConditionList   SEQUENCE (SIZE (1..maxCHOConditionList))
OF CHOCondition
}
```

In the example embodiment and mode of FIG. 19, the source gNodeB 22 comprises node processor 30 and node transmitter 34. The node processor 30, and particularly first security context generator 91, is configured to establish, using a first key set, a first security context with the wireless terminal 26. The node processor 30, e.g., conditional handover configuration information generator 66(19), is configured to generate a configuration message comprising (1) one or more conditional handover configurations and (2) an indication, by whether or not each of the one or more conditional handover configurations is configured with a security configuration, of a key set to be used by a wireless terminal to establish a second security context upon or after a handover configured by the each of the one or more conditional handover configurations. Each of the one or more conditional handover configurations comprises at least one identity of a candidate target cell, and at least one triggering condition. The key set to be used by a wireless terminal to establish a second security context upon or after a handover configured by the each of the one or more conditional handover configurations may be generated by key set generator 92 for target cell(s).

Figure 24:
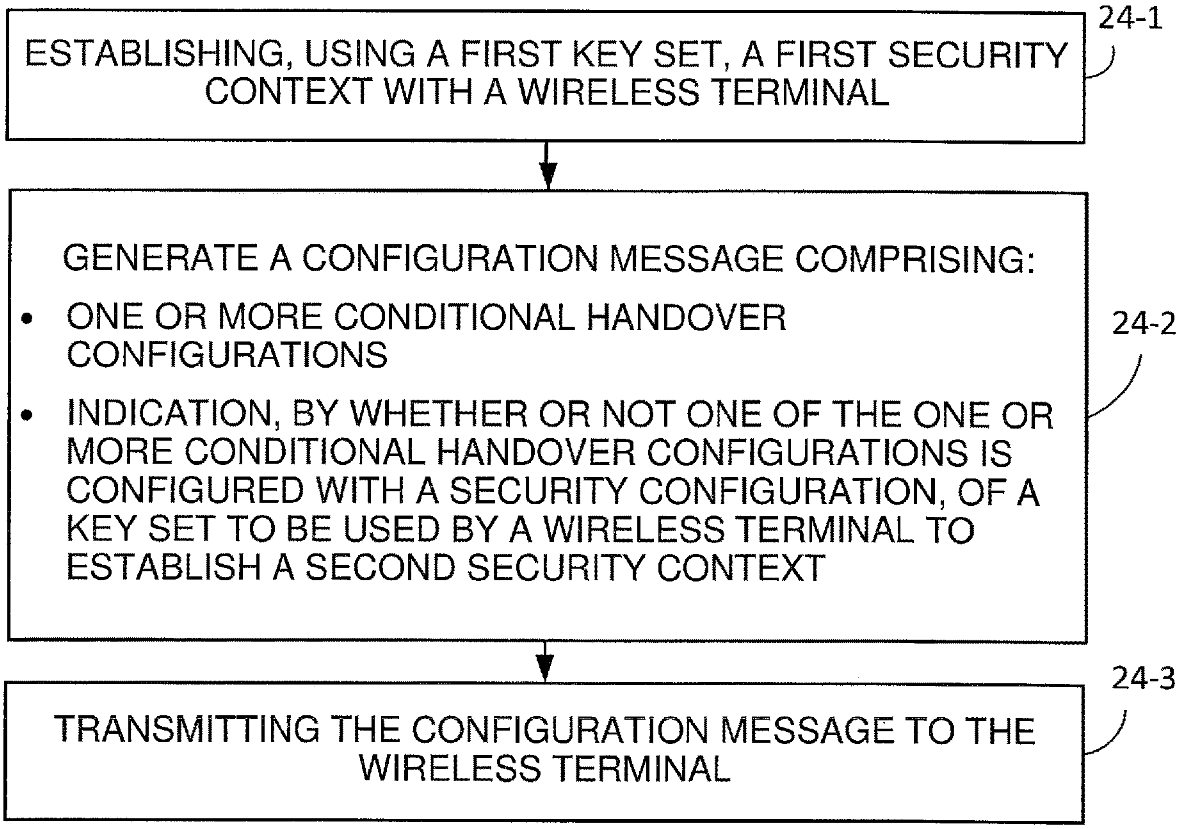
FIG. 24 is a flowchart showing example, basic, representative acts performed by a source gNodeB of the example embodiment and mode of FIG. 19.

Thus, the source gNodeB 22 of FIG. 19 performs example, basic, representative acts of steps as shown in FIG. 24. Act 24-1 comprises establishing, using a first key set, a first security context with a wireless terminal. Act 24-1 may be performed at least in part by first security context generator 91. Act 24-2 comprises configuration message. The configuration message of act 24-2, which may be generated by key set generator 92 for target cell(s), may comprise (1) the one or more conditional handover configurations and (2) the indication, by whether or not each of the one or more conditional handover configurations is configured with a security configuration, of a key set to be used by a wireless terminal to establish a second security context upon or after a handover configured by the each of the one or more conditional handover configurations.

In the example embodiment and mode of FIG. 19, the wireless terminal 26, sometimes referred to as the UE, comprises terminal processor 40 and terminal receiver 46. The terminal processor 40 of the wireless terminal 26, and particularly terminal security context manager 94, is configured to establish, using a first key set, a first security context with a first wireless access node. The terminal processor 40, particularly handover unit 72, is configured to perform a conditional handover to a candidate target cell configured by one of the one or more conditional handover configurations, in a case that the at least one triggering condition associated with the candidate target cell is met The terminal processor 40, and particularly terminal second context generator 96 for target cell(s), is further configured to establish a second security context with a second wireless access node that serves the candidate target cell, based on whether or not a security configuration associated with the candidate target cell is configured by the configuration message.

Figure 25:
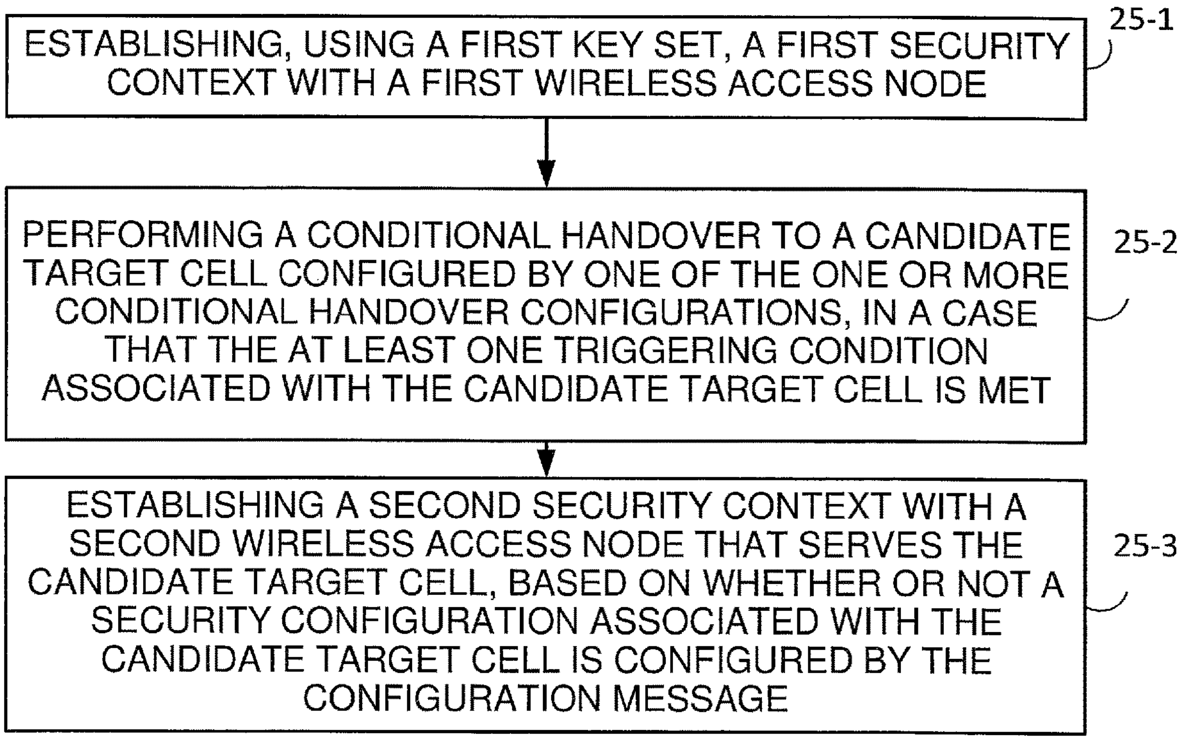
FIG. 25 is a flowchart showing example, basic, representative acts performed by a wireless terminal of the example embodiment and mode of FIG. 19.

Thus, the wireless terminal 26 of FIG. 19 performs example, basic, representative acts of steps as shown in FIG. 25. Act 25-1 comprises establishing, using a first key set, a first security context with a first wireless access node. Act 25-2 comprises performing a conditional handover to a candidate target cell configured by one of the one or more conditional handover configurations, in a case that the at least one triggering condition associated with the candidate target cell is met. Act 25-3 comprises establishing a second security context with a second wireless access node that serves the candidate target cell, based on whether or not a security configuration associated with the candidate target cell is configured by the configuration message.

Figure 26:
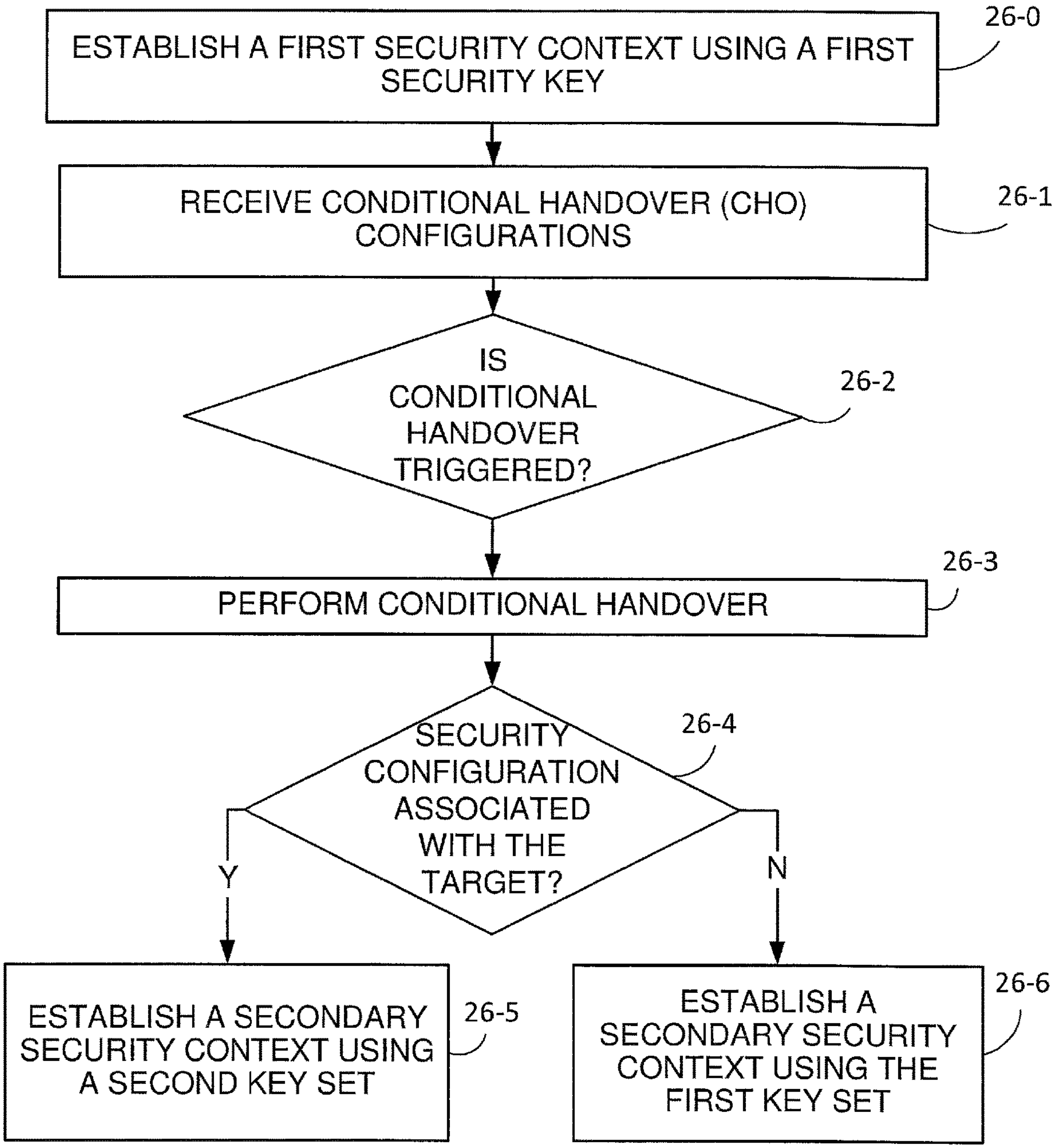
FIG. 26 is a flowchart showing example, basic, representative acts performed by a wireless terminal which receives a first security context and thereafter, if a conditional handover is triggered, determines whether a security configuration is established for a target.

FIG. 26 shows an example procedure for the UE for which security configurations are provided for handover. Accordingly, as act 26-0 the UE may establish a first security context with a first (source) gNB. The first security context may comprise a first key set used for encryptions and integrity protection. As act 26-1 the UE may receive a configuration message from the first gNB, the configuration message comprising one or more conditional handover configurations. Each of the conditional handover configurations may comprise at least one identity of a candidate target cell and at least one triggering condition. The configuration message of act 26-1 may further comprise optional security configuration(s). Each of the security configuration(s), if present, may be associated with at least one of the conditional handover configurations. Act 26-2 comprises making a determination if the at least one triggering condition associated with the candidate target cell is met. If it is determined at act 26-2 that the at least one triggering condition associated with the candidate cell is met, as act 26-3 the UE may perform a conditional handover to a candidate target cell. Upon or after executing the conditional handover of act 26-3, as act 26-4 the UE may check the presence of the security configuration associated with the candidate target cell. If the check of act 26-4 is positive, as act 26-5 the UE may establish a second security context with a node, e.g., a target gNB, that controls the candidate target cell using a second key set derived from the associated security configuration. If the check of act 26-4 is negative, as act 26-6 the UE may continue using the first key set to establish a second security context with the second gNB.

Figure 27:
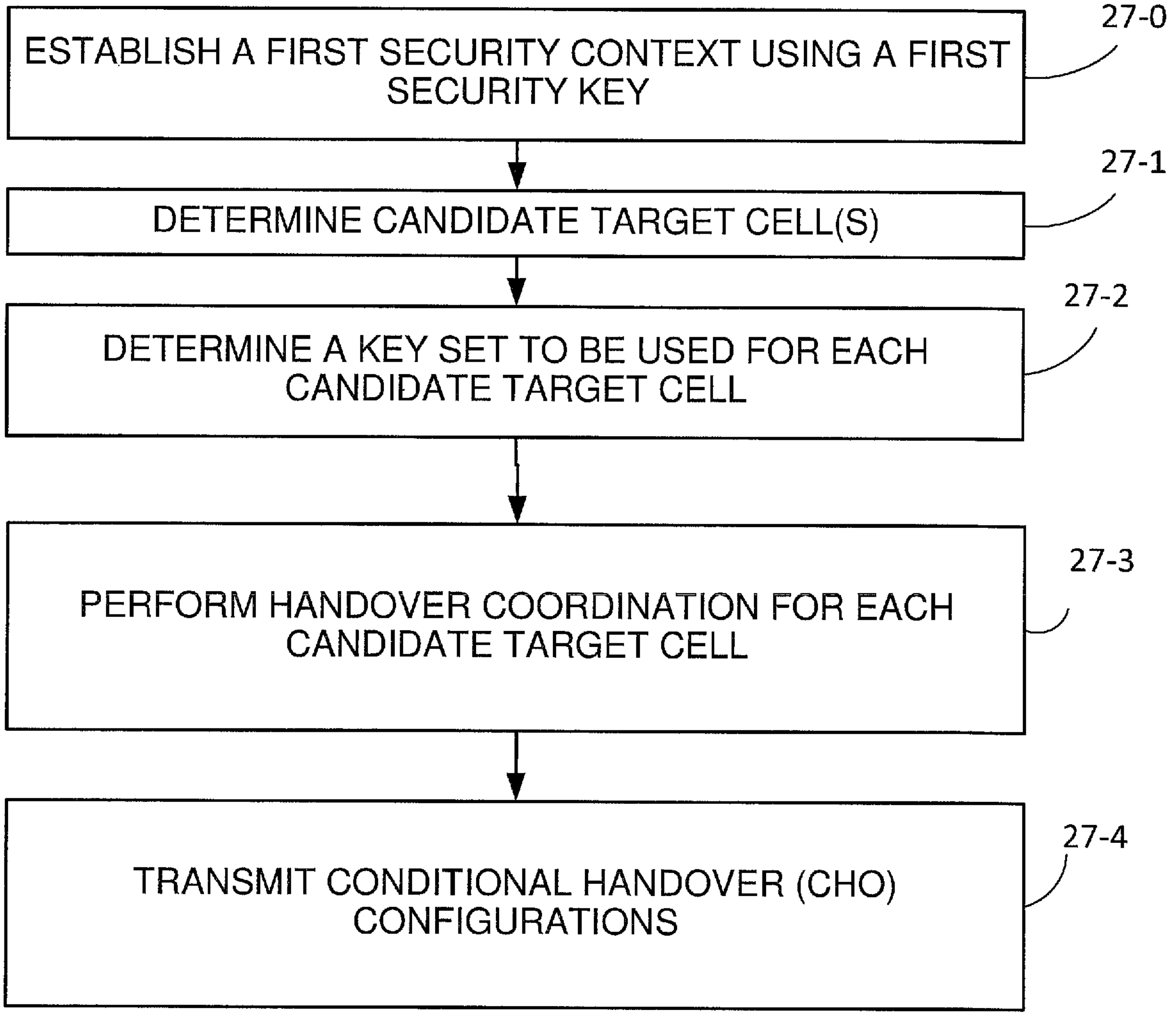
FIG. 27 is a flowchart showing example, basic, representative acts performed by an access node, e.g., gNB, which establishes a first security context, determines a key set to be used for candidate target cells, and after handover coordination transmits conditional handover configurations to a wireless terminal.

FIG. 27 shows an example procedure for the gNB of this embodiment. Act 27-1 shows that the gNB may establish a first security context with the UE. The first security context may comprise a first key set used for encryptions and integrity protection. As act 27-1 the gNB may determine candidate target cell(s) for CHO to be configured to the UE. As act 27-2 the gNB may further determine, for each of the candidate target cell(s), a key set to be used, either the first key set or an updated key set. As act 27-3, for each of the candidate target cell(s), the gNB may prospectively perform a handover coordination with a node that controls the each of the candidate target cell(s). During the handover coordination for each of the candidate target cell(s), if an updated key set is to be used, the gNB may generate a second key set and provide the second key set to the node. As act 27-4 the gNB may then generate and transmit a configuration message comprising CHO configurations and optional second security configuration(s). Each of the conditional handover configurations may comprise at least one identity of a candidate target cell and at least one triggering condition. Each of the second security configuration(s), if present, may be associated with at least one of the conditional handover configurations. For each of the CHO configurations, if associated with one of the optional security configuration(s), the gNB may instruct the UE to derive the second key set upon or after a conditional handover, otherwise the gNB may instruct the UE to continue using the first key set.

5: Releasing Cho Configurations Based on Security Configuration

As described in the previous section and embodiment of FIG. 19, a series of access stratum, AS, security contexts may be generated and established in a chained process as shown by way of example in FIG. 20. In addition, a second security configuration may be for a future use; e.g., not to be consumed immediately, but to be used only after a conditional handover is triggered.

There may be situations in which, after a second security configuration has been created, for one more reasons yet another new security configuration must be created. In such event where the yet another new security context has to be created, creation of the yet another security configuration breaks into the key chaining, as creation of a new key set for the yet another security configuration may invalidate the previously configured (unused) second security configuration. In such situation involving creation of the yet another security configuration, therefore, the previously created other CHO configurations may have to be released (de-configured), or suspended (inactivated).

Figure 28:
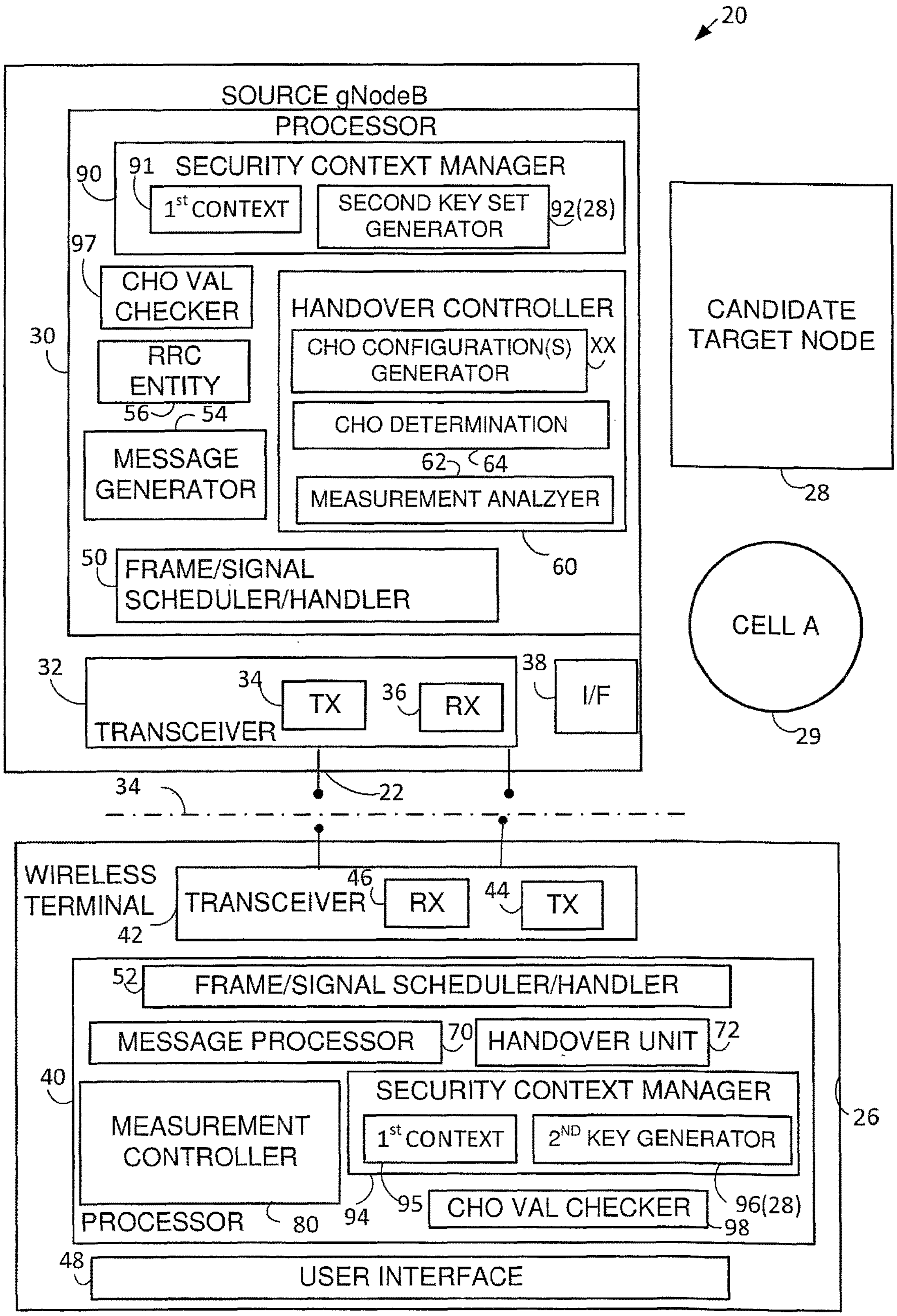
FIG. 28 is a schematic view of an example communications system comprising a source gNodeB which provides a wireless terminal with conditional handover configuration and which checks handover configurations.

FIG. 28 shows an example communications system 20 wherein security contexts may also be employed in conjunction with handovers, and wherein validity of handover configurations may be checked based on security configurations for reasons such as those basically described above. FIG. 28 shows system 20 as comprising source gNodeB 22, wireless terminal 26, and candidate target node 28. The source gNodeB 22, wireless terminal 26, and node processor 30 of the communications system 20 of FIG. 28 are similar to those of FIG. 6, FIG. 11, FIG. 15, and FIG. 19, with like units and functionalities having like reference numbers. As shown in FIG. 28, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, handover controller 60, security context manager 90. As in previous example embodiment and modes, the handover controller 60 may comprise measurement analyzer 62, conditional handover (CHO) determination unit 64, and conditional handover configuration information generator 66(28). A difference between the previous example embodiments and the example embodiment and mode of FIG. 28 is that node processor 30 further comprises node conditional handover validity checker 97. The node conditional handover validity checker 97 may comprises or be included in handover controller 60, and may communicate and/or interact with security context manager 90. The security context manager 90 comprises first security context generator 91 and second key set generator 92(28) which derives a second key set for establishing a second security context between the wireless terminal and a second wireless access node that serves the target cell.

As in the preceding example embodiments and modes, the wireless terminal 26 of the example embodiment and mode of FIG. 28 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 28, it should be understood that, in like manner with FIG. 15 and FIG. 19, measurement controller 80 may in turn comprises a measurement initiation unit, a measurement results unit, and a measurement report control unit. In addition, the terminal processor 40 of FIG. 28 is shown as comprising terminal conditional handover validity checker 98. The terminal security context manager 94 comprises terminal first context generator 95 and terminal second key generator 96(28). The terminal second key generator 96(28) uses a security configuration to derive a second key set for establishing a second security context with a second wireless access node that serves the target cell.

The example embodiment and mode of FIG. 28 takes into consideration various aspects of context generation and handling in conjunction with handovers, and particularly checks for validity of conditional handover configurations as described herein. For example, the example embodiment and mode of FIG. 19 takes into consideration various examples and scenarios, as the example scenarios 5-1 through 5-4 below and corresponding FIGS. 29 through 33 illustrate example situations in which CHO configurations need to be released or can be preserved. The acts of FIG. 34 and FIG. 35 may also be performed by the system of the example embodiment and mode of FIG. 28.

Example Scenario 5-1: Re-Establishment after RLF

Figure 29:
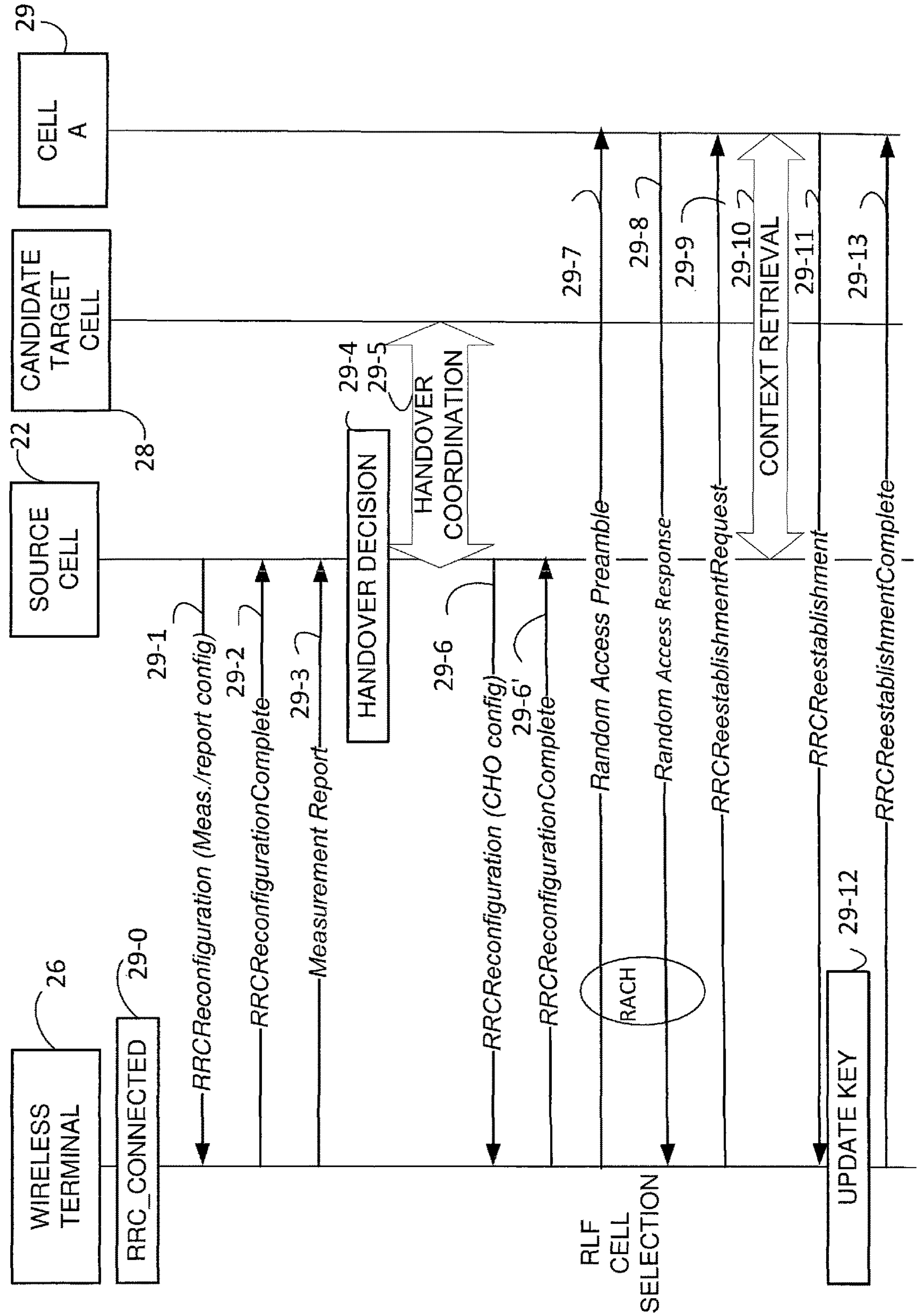
FIG. 29 shows differing scenario of in which conditional handover configurations need to be released or can be preserved.

FIG. 29 shows an example scenario where the UE experiences a radio link failure (RLF) with the currently serving cell (Source Cell) after a CHO is configured with a candidate target cell by the currently serving cell. How the CHO is configured for the UE with respect to the candidate target cell is reflected by acts 29-0 through 29-6', which are similar to acts 7-0 through 7-6' of FIG. 7, respectively, and hence not described further herein.

In the scenario of FIG. 29, after detecting an RLF the UE may perform a cell selection procedure, which results in finding Cell A, also referred to herein as cell 29. As shown by acts 29-7 and 29-8, the UE may perform a RACH procedure, e.g., Random Access Preamble/Response procedure, and thereafter as act 29-9 may send a RRCReestablishmentRequest message to Cell A. Cell A may then, as act 29-10, communicate with the Source Cell to retrieve the connection context for the UE, e.g., the UE context. Upon a successful retrieval of the UE context, as act 29-11 Cell A may respond to the UE with a RRCReestablishment message. The RRCReestablishment message of act 29-11 may comprise a nextHopChainingCount information element that the UE will use for Cell A. Using the nextHopChainingCount information element, as shown by act 29-12 the UE may then update $K_{gNB}$ by either the vertical or horizontal key derivation and the subsequent keys. Act 29-13 shows the UE then sending a RRCReestablishment-Complete message to cell A.

In some systems, such as LTE and 5G RAN, the key update such as shown by act 29-13 always has to occur after a connection re-establishment, e.g., after act 29-12. In such a case, the second security configuration for each of the candidate target cells configured by the CHO configurations may have to be invalidated. Thus, in the scenario of FIG. 29, the UE may release all of the CHO configurations, e.g., for all candidate target cells. In parallel, the gNB serving the Source Cell may also need to cancel the CHO coordination, e.g., the resource allocations, made to the candidate target cell(s). In one example configuration, upon receiving a context retrieval request from Cell A, as act 29-15 the gNB serving the Source Cell may send a CHO/HO cancellation command to each of the gNBs that control the candidate target cell(s).

Upon or after receiving the RRCReestablishment message, as act 29-13 the UE may perform the horizontal or vertical key derivation to create a fresh AS master key, i.e., $K_{gNB}$, and the subsequent keys based on comparing the received and saved (currently used) NCC values, as described in the previous embodiment.

Cell A may be a cell different from the Source Cell or may be the same cell as the Source Cell. In the latter case, the UE context retrieval may take place as internal signalling. In addition, if Cell A is one of the candidate target cells configured in the CHO configuration, the UE may perform a conditional handover (CHO), as shown by way of example in FIG. 7, instead of a connection re-establishment.

Example Scenario 5-2: Inter-gNB Handover

Figure 30:
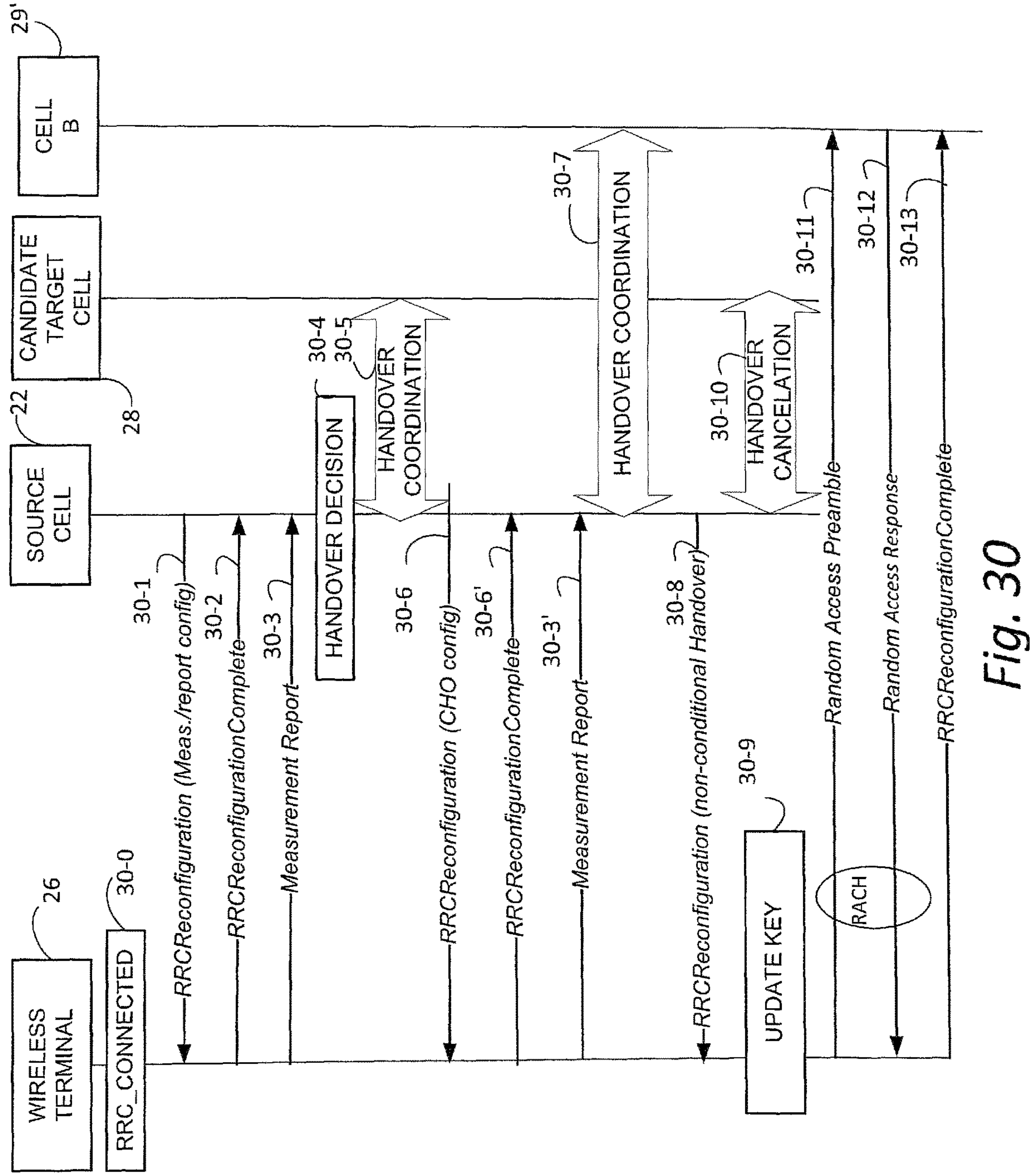
FIG. 30 shows differing scenario of in which conditional handover configurations need to be released or can be preserved.

The scenario FIG. 30 has similar initial acts 30-0 through 30-6' as the scenario of FIG. 29. But in the scenario of FIG. 30, after receiving in act 30-6 the CHO configurations from the currently serving cell (Source Cell), the UE is instructed by the currently serving cell to perform a non-conditional handover to a target cell, Cell B, also known as cell 29', that is not included in the CHO configurations. The case of FIG. 30 may happen when a measurement report sent by the UE, such as that depicted by act 30-3' in FIG. 30, indicates that the signal from a cell not listed as a candidate target cell becomes strong. The coordination of the non-conditional handover to the target cell (Cell B) that is not included in the CHO configurations is reflected by act 30-7. If Cell B is under control of another gNB, Cell B and the UE may have to use a fresh AS master key, and thus a RRCReconfiguration procedure as indicated by act 30-8 is performed to instruct that the non-conditional handover may include a first security configuration and thus to force the UE to update the key, e.g., to generate a new AS master key and the subsequent keys. Generation of the new AS master key, which is a form of key update, is reflected by act 30-9. As described in the previous example scenario of FIG. 29, the UE may generate the AS master key by either the horizontal key derivation or the vertical key derivation based on the value of NCC included in RRCReconfiguration, and the saved (currently used) NCC.

Similar to Example Scenario 5-1, in a case that as act 30-9 the UE derives a new master key due to the non-conditional inter-gNB handover, any second security configuration that the UE received in the CHO configurations may become invalid, which may result in invalidating the CHO configurations for all of the candidate target cell(s). The UE may release the saved CHO configurations. Likewise, as shown by act 30-10, the Source Cell may send the CHO/HO cancellation command to each of the each of the gNBs that control the candidate target cell(s). Thereafter the UE may engage in a random access procedure to cell B, as shown by the Random Access Preamble, the Random Access Response, and the RRCReconfigurationComplete message of respective acts 30-11 through 30-13, respectively.

Example Scenario 5-3: Key Change-On-the-Fly

In some cases, the network, e.g., the gNB or a core network entity, such as AMF, may initiate a key update. This procedure may be also known as an intra-cell handover without mobility, or key change/update-on-the-fly procedure. There are two types of network-initiated key update-on-the-fly procedures:

A Key re-keying procedure may be initiated by the currently serving AMF. The AMF may create a new $K_{gNB}$ from the current KAME using a fresh uplink NAS COUNT (a counter handled by the Non-Access Stratum (NAS) layer, shared by the UE and the AMF). The derived $K_{gNB}$ may be sent to the currently serving gNB, which may then send an RRC message (e.g. RRCReconfiguration) comprising (1) an indication indicating a need to generate a fresh $K_{AMF}$ (e.g. a field K_AMF_change_flag included in nas-Container) and/or (2) indication indicating a need to generate a fresh $K_{gNB}$ based on the $K_{AMF}$ (e.g. KeySetChangeIndicator=TRUE).

A Key refresh procedure may be initiated by the currently serving gNB. The gNB may generate a new $K_{gNB}$ from NH if an unused {NH, NCC} pair is available, given by the AMF, i.e. vertical derivation. Otherwise the currently serving gNB may generate a new $K_{gNB}$ from the currently used $K_{gNB}$, i.e., horizontal derivation. The gNB may then send an RRC message, e.g. RRCReconfiguration, including NCC and Key-SctChangeIndicator=FALSE. The UE receiving the RRC message may generate a new $K_{gNB}$ with either the vertical or horizontal derivation, based on the received NCC value and the saved NCC value.

Figure 31:
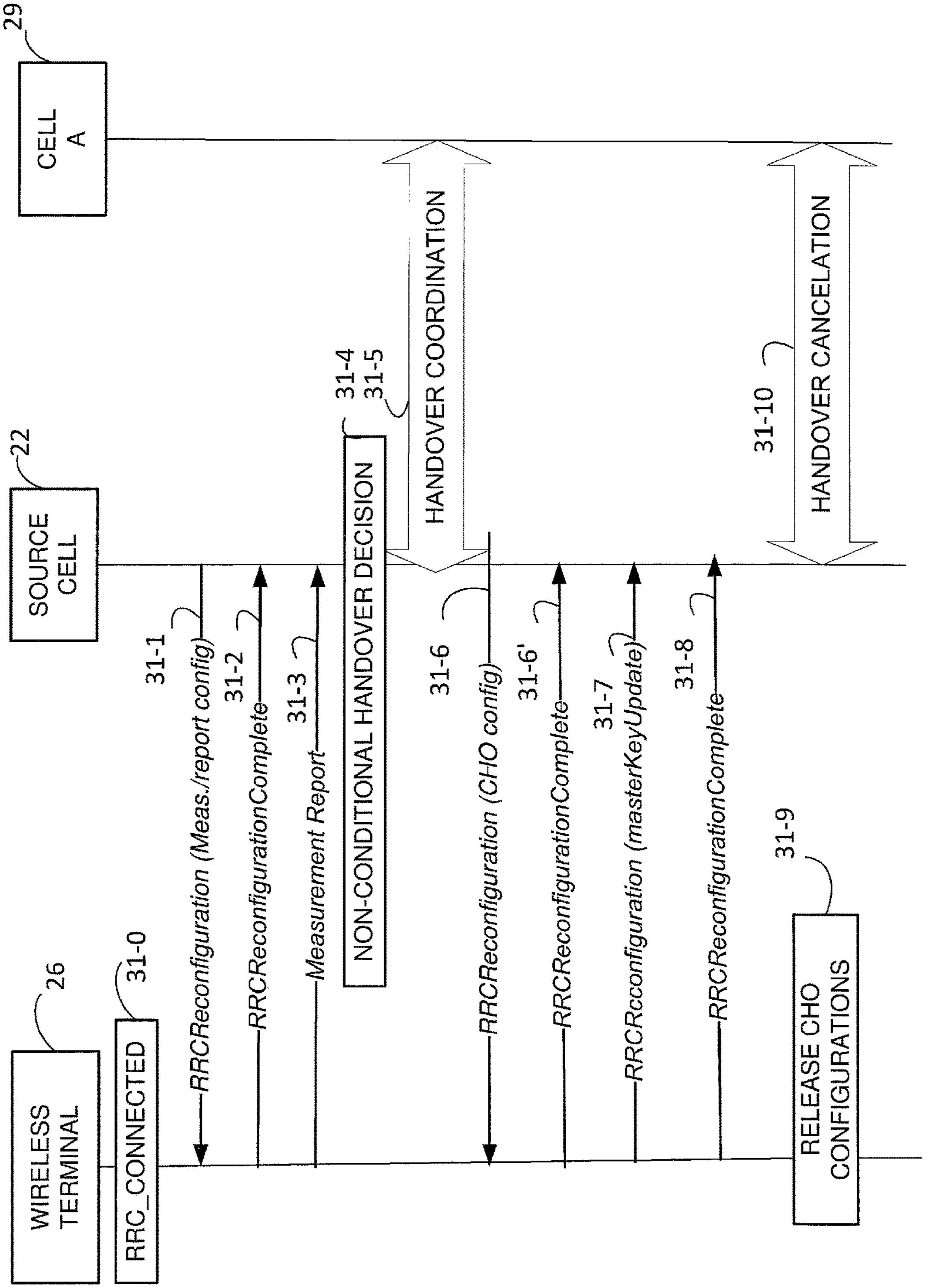
FIG. 31 shows differing scenario of in which conditional handover configurations need to be released or can be preserved.

FIG. 31 illustrates an example scenario, wherein after configuring the CHO to a candidate target cell (Cell A), as act 31-7 the currently serving cell (Source Cell) may send a RRCReconfiguration message including a masterKeyUpdate information element comprising at least a value for the NCC and KeySetChangeIndicator. The US then then may respond with a RRCReconfigurationComplete message as shown by act 31-8. As act 31-9 the UE may then release all of the CHO configurations, e.g., CHO configuration for Cell A and others, if any. In parallel, as act 31-10 the Source Cell may initiate a HO cancellation procedure to release the reserved CHO coordination in the candidate target cell(s), e.g., Cell A. In the example scenario of FIG. 31, act 31-0 through 31-6 are essentially the same as comparable acts of other scenarios, such as act 29-0 through 29-6'.

Example Scenario 5-4: Intra-gNB Handover

Figure 32:
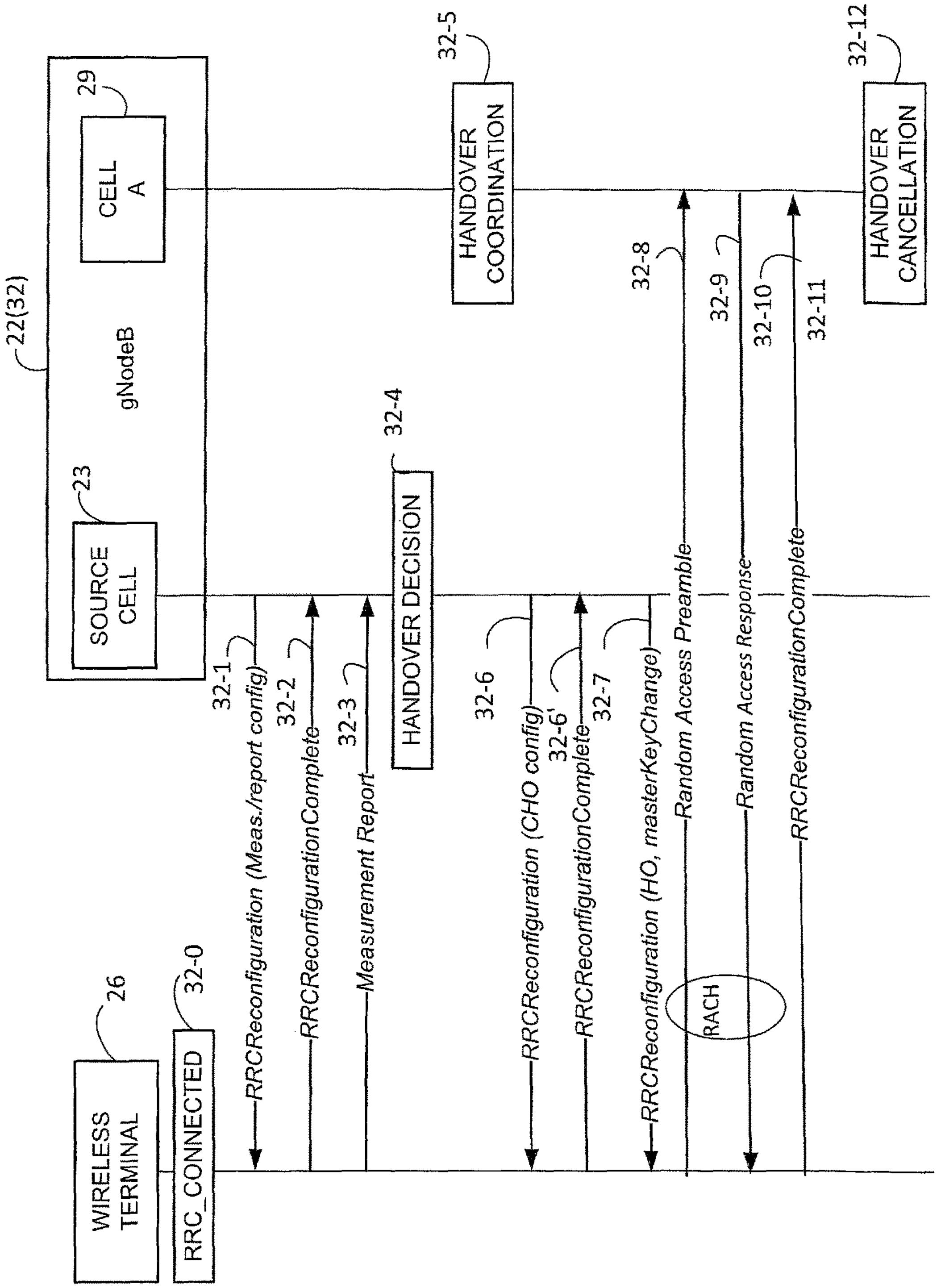
FIG. 32 shows differing scenario of in which conditional handover configurations need to be released or can be preserved.

An intra-gNB/eNB handover is a handover between two cells controlled by one gNB 22(32). As shown in FIG. 32, the handover may be between source cell 23 and cell A, also known as cell 29. In the example scenario of FIG. 32, it is assumed that the UE has already been configured with the CHO configurations with one or more candidate target cells. In other words, act 32-0 through 32-6, which are essentially the same as act 29-0 through 29-6', respectively, have already been executed. Act 32-4 shows that the gNB 22(32) had made a handover decision for a handover to cell A 29. As a result, cell A performs handover coordination as shown by act 32-5. In the example scenario of FIG. 32, however, a key update on $K_{gNB}$ may take place upon the intra-gNB handover. In other words, act 32-7 shows that in a message advising of handover that an information element such as masterKeyChange is included and provides the key update on $K_{gNB}$. After receipt of the message advising of handover, a RACH procedure is performed as reflected by the RandomAccess Preamble message of act 32-8 and the RandomAccessResponse message of act 32-9. Thereafter, after the UE sends the RRCReconfigurationComplete message of act 32-11, the cell A 29 may cancel the conditional handover coordination, if previously configured, by engaging in handover cancellation act 32-12.

In other deployment scenarios, the network operation policy may allow to keep using the same $K_{gNB}$ and the subsequent keys after the intra-gNodeB handover.

In the example intra-gNB scenarios described herein it is assumed that the UE has already been configured with the CHO configurations with one or more candidate target cells. In other words, act 32-0 through 32-7, which are essentially the same as act 29-0 through 29-7, respectively, have already been executed. Upon successfully performing a handover to a target cell, which may be one of the candidate target cells (for a conditional handover) or may be another cell (for a non-conditional handover), if the UE is allowed to use the current $K_{gNB}$ and the subsequent keys, the UE of this embodiment and mode may preserve (not release) the CHO configurations. In this case, the gNB may also keep the CHO configurations as valid configurations. Although the UE/gNB may just release the CHO configuration for the target cell to which the UE successfully performed a conditional handover, and may preserve the remaining CHO configurations. On the other hand, if a key update is required, the UE/gNB may release all the CHO configurations upon performing the handover in the same manner as previously disclosed for the inter-gNB handover.

For example, consider that the CHO configurations contain Cell A and Cell B as candidate target cells, both of Cell A and Cell B being under control of one gNB, and no key update is required for Cell A or Cell B. If the UE successfully performs a conditional handover to Cell A, the UE/gNB may keep the CHO configuration for Cell B while releasing the CHO configuration for Cell A. The CHO configuration for Cell A may be released because the prospectively allocated radio resource(s) for the UE at Cell A may be no longer reserved after the conditional handover. Furthermore, if the UE, before executing a conditional handover to Cell A or Cell B, successfully performs a non-conditional handover to Cell C, which is also under control of the gNB but not a candidate target cell, the UE/gNB may keep the CHO configurations for Cell A and Cell B after the non-conditional handover.

In one configuration, the UE may determine if the current $K_{gNB}$ is to be used after a handover (and therefore the CHO configurations can be preserved) by the presence of the first or second security configuration. Accordingly, if a candidate target cell configured in the CHO configurations is associated with a second security configuration, the UE may consider that a key update is needed for a handover to the candidate target cell. On the other hand, if a second security configuration is not associated with the candidate target cell, the UE may perform no key update after a handover to the cell. Furthermore, in a case that the UE receives a handover command (e.g. RRCReconfiguration) from the currently serving gNB (i.e. a regular handover, or a non-CHO handover), if the handover command comprises a first security configuration, the UE may perform a key update to generate a fresh $K_{gNB}$, otherwise, the UE will continue using the current key after the handover.

Figure 33:
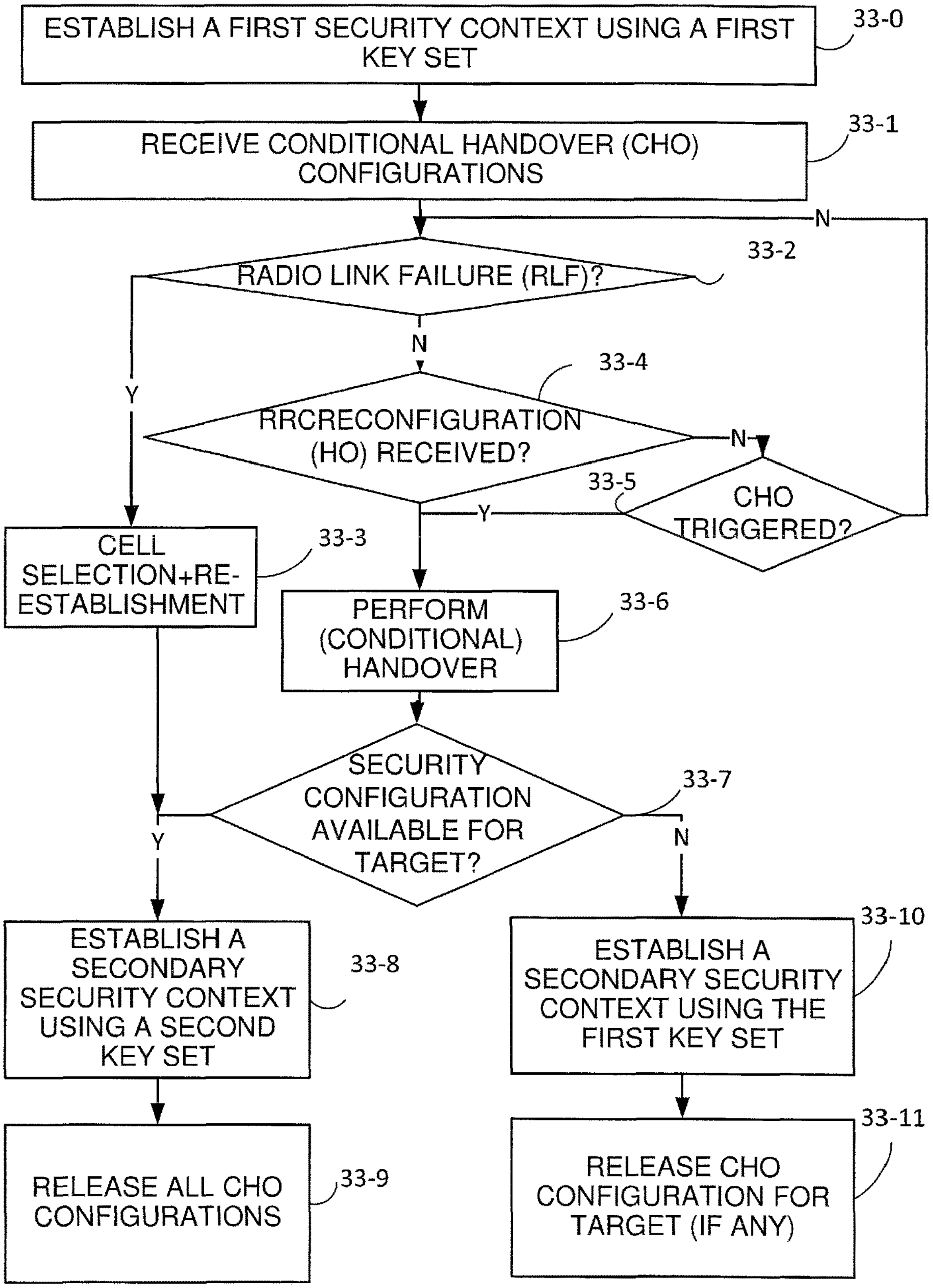
FIG. 33 shows differing scenario of in which conditional handover configurations need to be released or can be preserved.

FIG. 33 illustrates an example UE procedure, e.g., a procedure performed by terminal processor 40 of FIG. 28, Act 33-0 comprises the UE establishing a first security context with a first (source) gNB, using a first key set.

Act 33-1 comprises the UE receiving the CHO configurations from the first gNB.

Act 33-2 comprises the UE checking if it is experiencing a radio link failure (RLF).

Act 33-3 comprises the UE performing a cell selection procedure. After a successful selection, the UE performs the re-establish procedure, which will result in receiving from a target cell RRCReestablishment comprising security configuration for the target cell.

Act 33-4 comprises the UE checking if it received RRCReconfiguration from the currently serving gNB, which may trigger an intra-cell, intra-gNB or inter-gNB handover.

Act 33-5 comprises the UE checking if one of the triggering conditions configured in the CHO configurations is met.

Act 33-6 comprises the UE performing a non-conditional or conditional handover. For the non-conditional handover, the UE follows the configuration of the target cell given by the received RRCReconfiguration. For the conditional handover, the UE follows the configuration of the candidate target cell for which the triggering condition is met.

Act 33-7 comprises the UE checking if security configuration is available, which forces the UE to generate a fresh $K_{gNB}$ (or $K_{eNB}$) and the subsequent keys (a second key set). In the case of the regular handover, the security configuration may be optionally present in the received RRCReconfiguration. In the case of the conditional handover, the security configuration for the target cell may be optionally present in the CHO configurations.

Act 33-8 comprises the UE establishing a second security context using the second key set.

Act 33-9 comprises the UE releasing all the CHO configurations.

Act 33-10 comprises the UE establishing a second security context using the first key set.

Act 33-11 comprises the UE releasing CHO configuration only for the target cell and preserve the CHO configurations for other candidate target cells.

Figure 34:
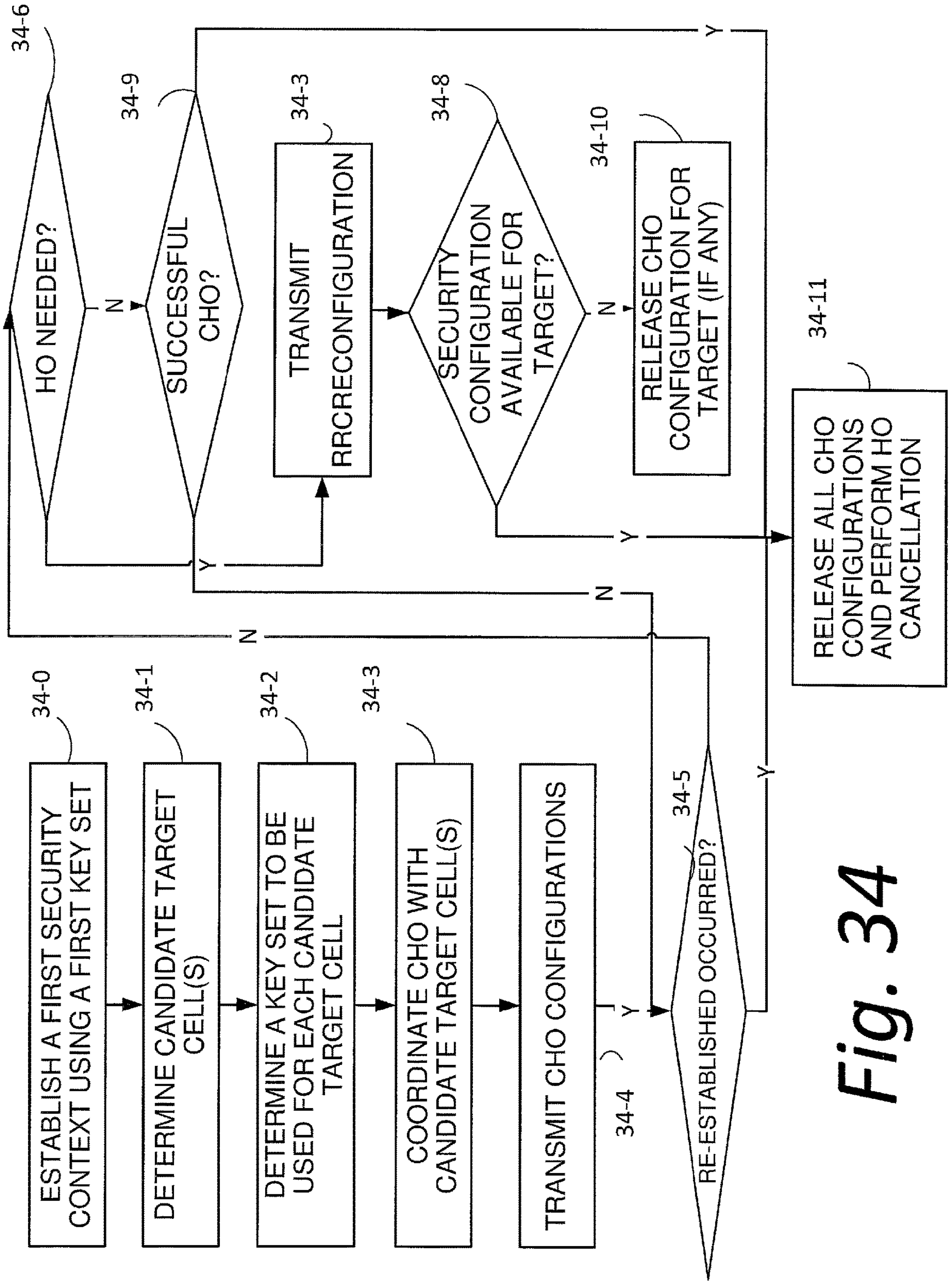
FIG. 34 shows differing scenario of in which conditional handover configurations need to be released or can be preserved.

FIG. 34 shows an example procedure performed by a source gNodeB 22, e.g., a currently serving gNB, for the example embodiment and mode of FIG. 28.

Act 34-0 comprises the gNB establishing a first security context with a UE, using a first key set.

Act 34-1 comprises the gNB determining candidate target cell(s) for CHO to be configured to the UE.

Act 34-2 comprises the gNB determining, for each of the candidate target cell(s), a key set to be used, either the first key set or a new key set.

Act 34-3 comprises, for each of the candidate target cell(s), the gNB prospectively performing a handover coordination with a node that controls the each of the candidate target cell(s).

Act 34-4 comprises the gNB transmitting CHO configurations to the UE. The CHO configurations comprise resource configuration, triggering condition(s) and optional security configuration for each of the candidate target cell(s).

Act 34-5 comprises the gNB checking if the UE has performed the re-establishment procedure (due to an RLF). The gNB can recognize the presence of the re-establishment procedure initiated by the UE when it receives a UE context retrieval request received from another node (inter-gNB re-establishment), or RRCReestablishmentRequest from the UE (intra-gNB re-establishment).

Act 34-6 comprises the gNB determining if a (non-conditional) handover is needed. This handover may be either an intra-cell, intra-gNB or inter-gNB handover.

Act 34-7 comprises the gNB transmitting RRCReconfiguration to trigger the (non-conditional) handover for the UE.

Act 34-8 comprises the gNB checking if the (non-conditional) handover is associated with a security configuration.

Act 33-9 comprises the gNB checking if the UE has successfully performed a conditional handover to one of the candidate target cell(s). The gNB can recognize a successful conditional handover if it receives a CHO success notification from one of the other gNBs (inter-gNB CHO) or it receives RRCReconfigurationComplete from one of the candidate target cell(s) under control of the (currently serving) gNB.

Act 34-10 comprises the gNB releasing all the CHO configurations configured to the UE, and performs handover cancellation for all the other gNBs.

Act 34-11 comprises the gNB releasing the CHO configuration for the target cell of the (non-conditional) handover, if the target cell is one of the candidate target cell(s).

In the example embodiment and mode of FIG. 28, the source gNodeB 22 comprises node processor 30 and node transmitter 34. The node processor 30, and particularly first security context generator 91, is configured to establish, using a first key set, a first security context with the wireless terminal 26. The node transmitter 34 is configured to transmit a configuration message comprising one or more conditional handover configurations. Each of the one or more conditional handover configurations may comprise at least one identity of a candidate target cell, and at least one triggering condition. The node processor 30, for example node conditional handover validity checker 97, is configured to determine, upon the wireless terminal performing a handover to a target cell, validity of the conditional handover configurations, based on whether or not the handover to the target cell is configured with a security configuration. The node processor 30, for example second key set generator 92(28), is further configured to use the security configuration to derive a second key set for establishing a second security context between the wireless terminal and a second wireless access node that serves the target cell.

Figure 35:
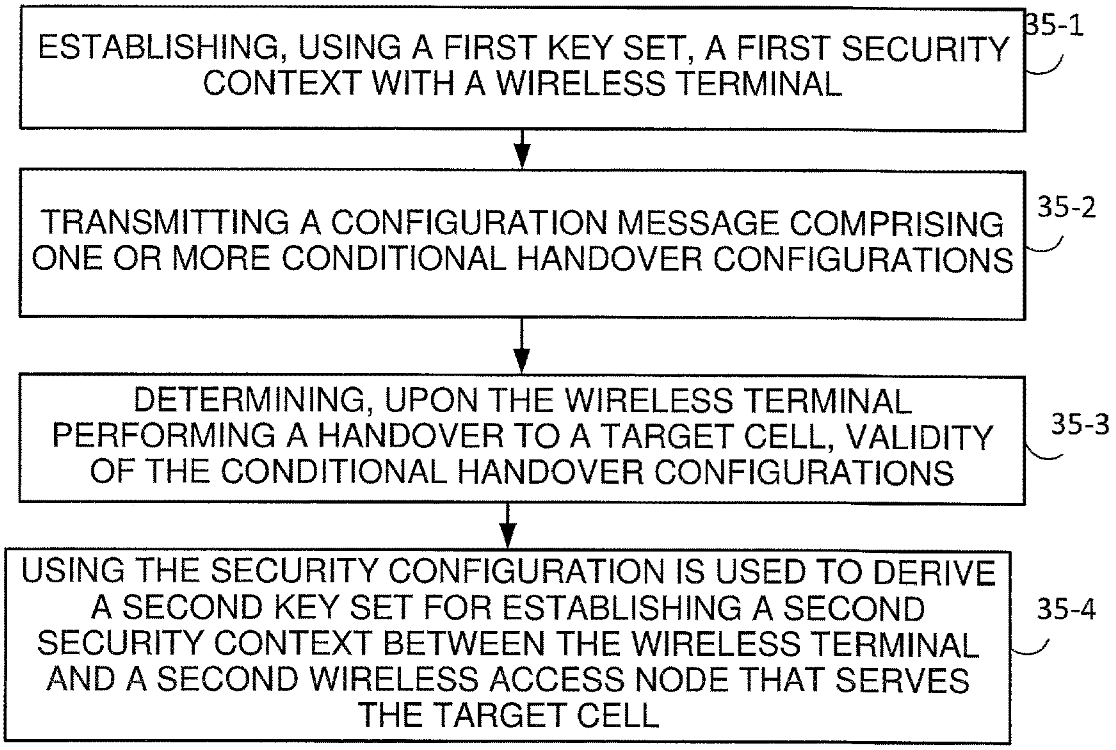
FIG. 35 is a flowchart showing example, basic, representative acts performed by a source gNodeB of the example embodiment and mode of FIG. 28.

Thus, the source gNodeB 22 of FIG. 28 performs example, basic, representative acts of steps as shown in FIG. 35. Act 35-1 comprises establishing a first security context with a wireless terminal using a first key set. Act 35-2 comprises transmitting a configuration message comprising one or more conditional handover configurations. Each of the one or more conditional handover configurations may comprise at least one identity of a candidate target cell, and at least one triggering condition. Act 35-3 comprises determining, upon the wireless terminal performing a handover to a target cell, validity of the conditional handover configurations, based on whether or not the handover to the target cell is configured with a security configuration. Act 35-4 comprises using the security configuration to derive a second key set for establishing a second security context between the wireless terminal and a second wireless access node that serves the target cell.

In the example embodiment and mode of FIG. 28, the wireless terminal 26, sometimes referred to as the UE, comprises terminal processor 40 and terminal receiver 46. The terminal processor 40 of terminal processor 40, and particularly terminal security context manager 94, is configured to establish, using a first key set, a first security context with a first wireless access node. The terminal receiver 46 is configured to receive the configuration message comprising one or more conditional handover configurations. The terminal processor 40, e.g., handover unit 72, is configured to perform a handover to a target cell. The terminal processor 40, for example, terminal conditional handover validity checker 98, is configured to determine validity of the conditional handover configurations, based on whether or not the handover to the target cell is configured with a security configuration. The terminal processor 40 is further configured, e.g., using terminal second key generator 96(28), to use the security configuration to derive a second key set for establishing a second security context with a second wireless access node that serves the target cell.

Figure 36:
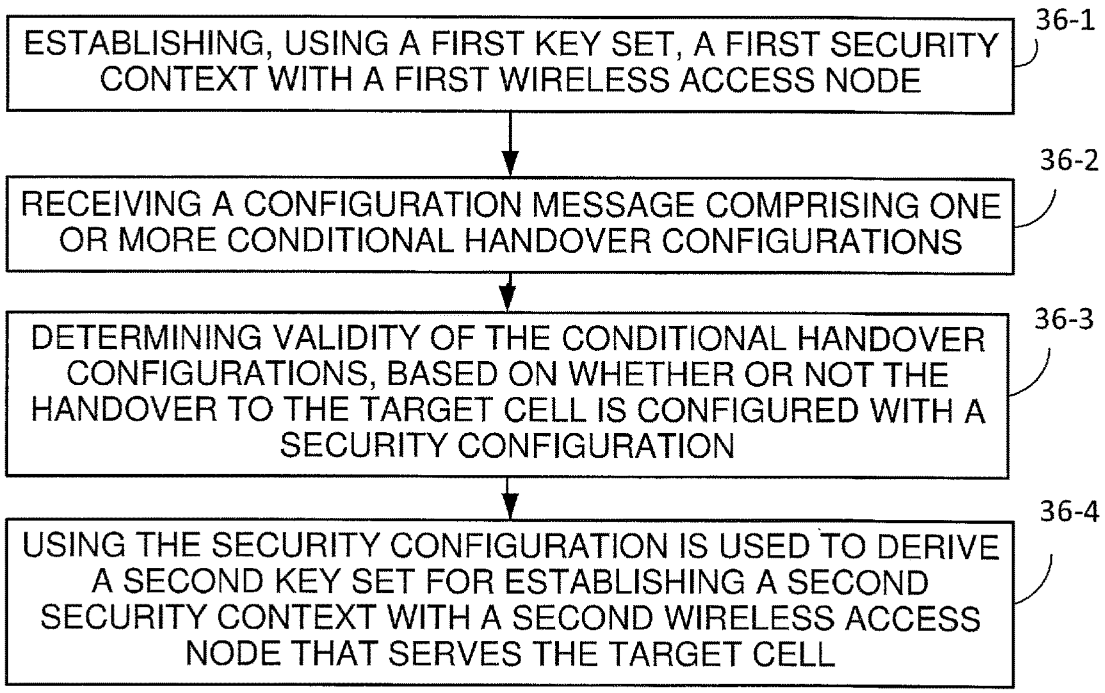
FIG. 36 is a flowchart showing example, basic, representative acts performed by a wireless terminal of the example embodiment and mode of FIG. 28.

Thus, the wireless terminal 26 of FIG. 28 performs example, basic, representative acts of steps as shown in FIG. 36. Act 36-1 comprises establishing, using a first key set, a first security context with a first wireless access node. Act 36-2 comprises receiving a configuration message comprising one or more conditional handover configurations. Each of the one or more conditional handover configurations may comprise at least one identity of a candidate target cell, and at least one triggering condition. Act 36-3 comprises determining validity of the conditional handover configurations, based on whether or not the handover to the target cell is configured with a security configuration. Act 36-4 comprises using the security configuration to derive a second key set for establishing a second security context with a second wireless access node that serves the target cell.

6: Providing Secondary Cell Group Configuration for Dual Connectivity

An example embodiment and mode described with reference to FIG. 37 discloses Dual Connectivity (DC) scenarios in which a Master gNodeB 22 provides a secondary cell group (SCG) configuration to a wireless terminal for immediate use by the wireless terminal upon reception. An example illustration of Dual Connectivity (DC) is depicted in FIG. 38. FIG. 38 shows that, when a UE is configured with a DC operation, the UE may be configured with a group of one or more cells served by a master node (MN), Master Cell Group (MCG) and a group of one or more cells served by a secondary node (SN), Secondary Cell Group (SCG). In FIG. 38, the cells belonging to the Master Cell Group (MCG) are shown by solid lines, whereas the cells belonging to the Secondary Cell Group (SCG) are shown in dotted lines. The depictions of FIG. 38 are merely for sake of an example illustration and are not intended to specify any particular placement or number of cells.

In a Dual Connectivity mode, a special cell may be defined among one or more cells in each of the cell groups (MCG or SCG). Such a special cell may be used for obtaining timing reference to be used for the corresponding cell group. The special cell for the MCG may be referred as PCell (Primary Cell), whereas the special cell for the SCG may be referred as PSCell (primary cell of SCG), or SpCell (Special Cell) of a SCG. The PCell may be a serving cell, operating a primary frequency, in which the UE may perform an initial connection establishment procedure and/or a connection re-establishment procedure. In addition, the PSCell may be a serving cell in which the UE may perform a random access procedure (e.g., in a case that the UE performs a reconfiguration with synchronization procedure). The cell(s) other than the special cell in each of the cell groups may be referred as SCell(s) (Secondary Cell(s)). Thus, with respect to dual connectivity, secondary cell group (SCG) is a term given to a group of serving cells which are associated with a secondary RAN node.

Figure 37:
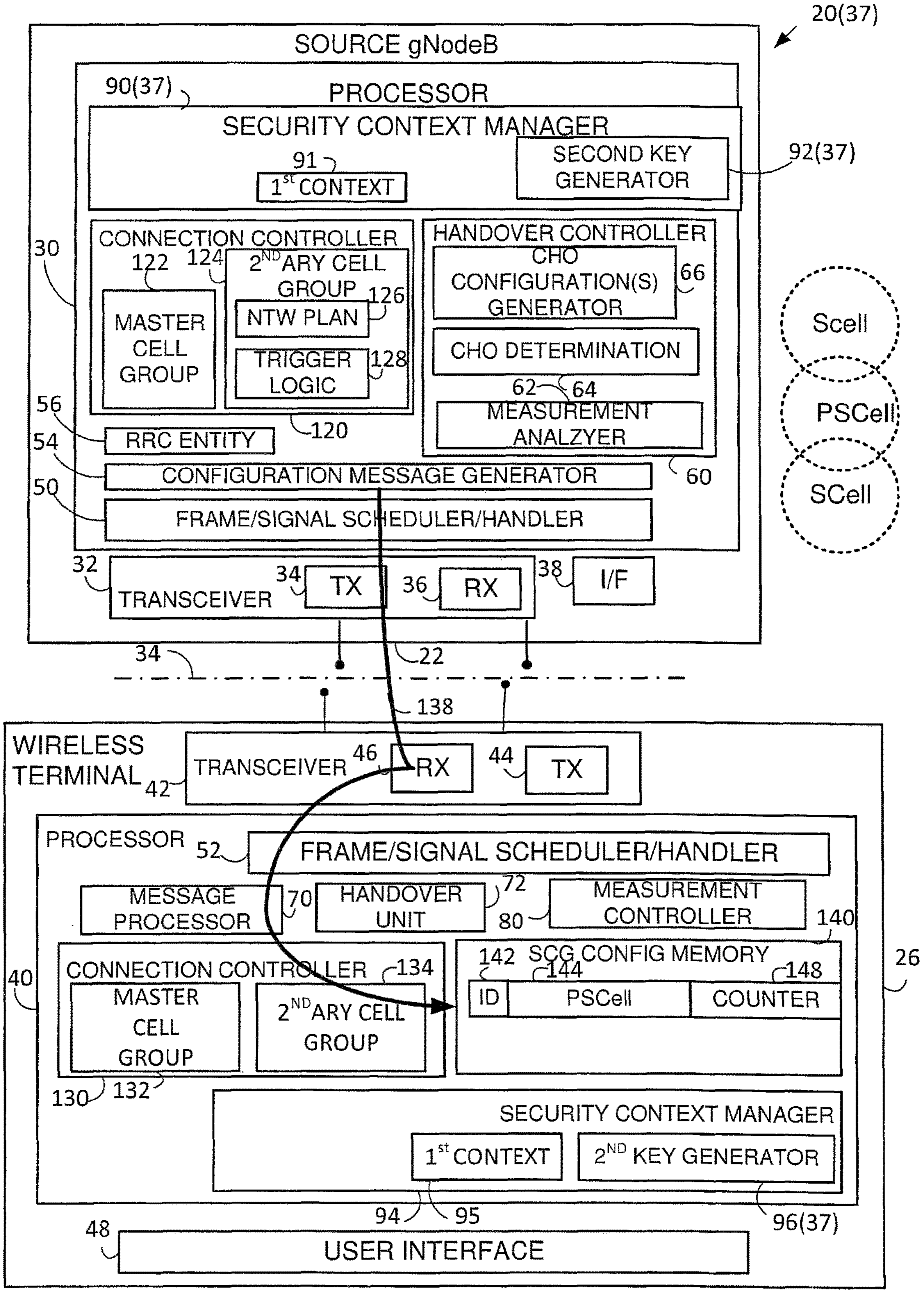
FIG. 37 is a schematic view of an example communications system comprising a source gNodeB which provides a wireless terminal with a secondary cell group (SCG) configuration.
Figure 38:
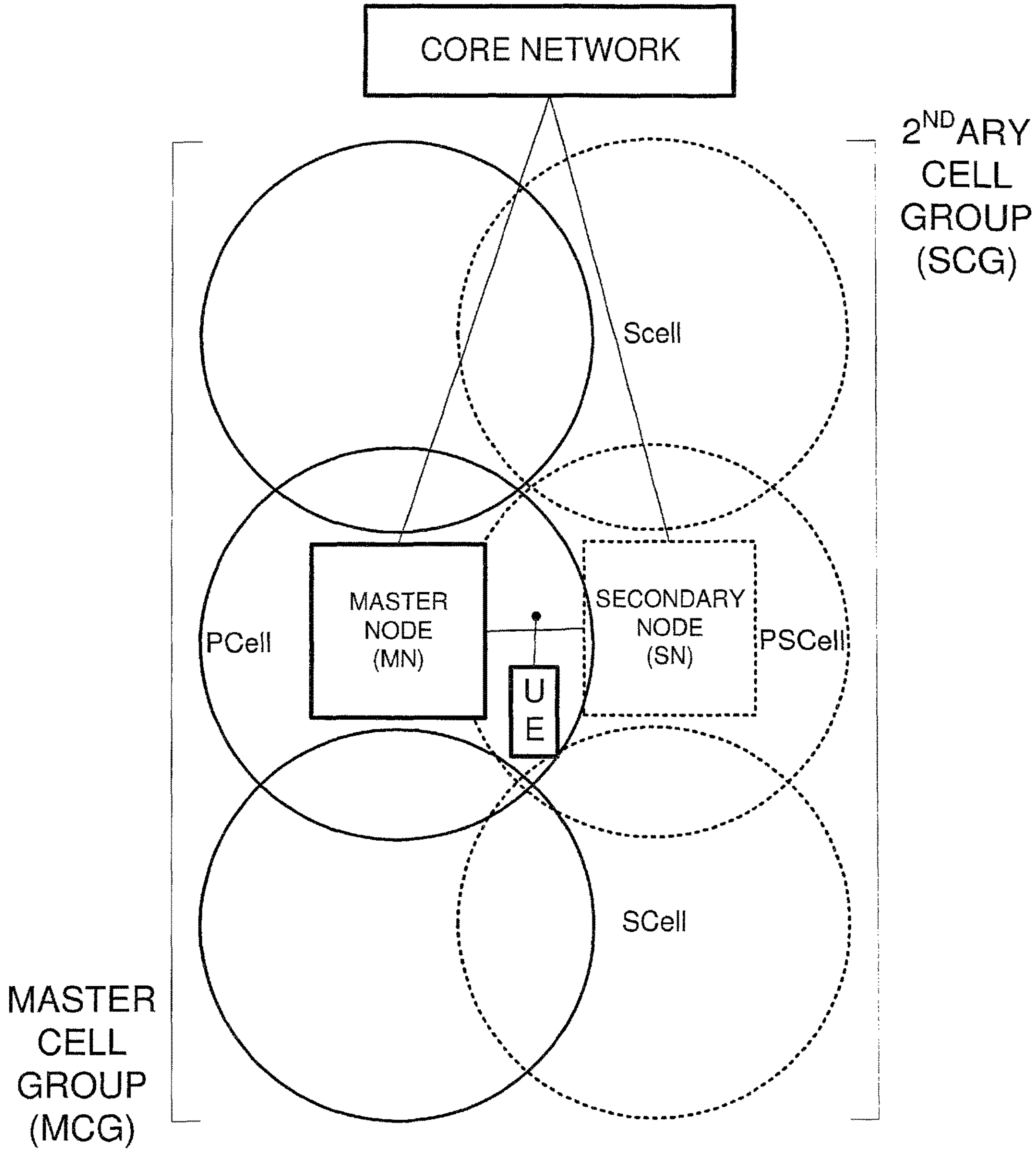
FIG. 38 is a diagrammatic view showing a network diagram for dual conductivity comprising a master cell group and a secondary cell group.

FIG. 37 shows an example communications system 20(37) which provides a secondary cell group (SCG) configuration to a wireless terminal for immediate use by the wireless terminal upon reception. FIG. 37 shows system 20(37) as comprising source gNodeB 22, wireless terminal 26, and a secondary cell group (SCG). In the example embodiment and mode of FIG. 37, the source gNodeB 22 serves as the Master node (MN), and thus may also be referred to as Master gNodeB 22. The Master gNodeB 22 with its node processor 30 and wireless terminal 26 with its terminal processor 40 of FIG. 37 are similar to those of FIG. 6, FIG. 11, FIG. 15, FIG. 19, and FIG. 28, with like units and functionalities having like reference numbers. As shown in FIG. 37, the Master gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50; message generator 54; RRC state machine 56; handover controller 60; security context manager 90(37). As in previous example embodiment and modes, the handover controller 60 may comprise measurement analyzer 62, conditional handover (CHO) determination unit 64, and handover configuration information generator 66. In the FIG. 37 embodiment and mode, the message generator 54 may also be known as configuration message generator 54 since it generates a configuration message that includes configuration information for immediate handover to one or more cells of the secondary cell group (SCG) to which wireless terminal 26 may belong or have access.

In serving as the master node, gNodeB 22 may control connectivity of wireless terminals served thereby, including wireless terminal 26. For this reason the node processor 30 of gNodeB 22 is shown as comprising master node connectivity controller 120. The master node connectivity controller 120 may execute an instance of a connectivity control logic, program or a connective control routine for each wireless terminal 26 served thereby. When providing dual connectivity (DC) such as that illustrated by way of example in FIG. 38, for example, for each wireless terminal 26 the instance of the connectivity control program may include master cell group connectivity logic 122 and secondary cell group connectivity control logic 124. Since certain aspects of the technology disclosed herein concern the secondary cell group (SCG), FIG. 37 further shows that the secondary cell group connectivity control logic 124 may comprise, or have access to, network plan or network topological information 126. The network plan or network topological information 126 may comprise a data base of nodes that may be eligible for inclusion, or actually be included in, the secondary cell group (SCG) to which wireless terminal 26 has access.

The security context manager 90(37) of the Master gNodeB 22 comprises first security context generator 91 and second key generator 92(37) which derives a second key for establishing a second security context and thus one or more security keys used for the radio connection with one or more secondary cells included in the secondary cell configuration.

As in the preceding example embodiments and modes, the wireless terminal 26 of the example embodiment and mode of FIG. 37 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 37, it should be understood that, in like manner with FIG. 15, FIG. 19, and FIG. 28, measurement controller 80 may in turn comprises a measurement initiation unit, a measurement results unit, and a measurement report control unit. In addition, the terminal processor 40 of FIG. 37 is shown as terminal security context manager 94.

The wireless terminal 26 comprises connection controller 130, which may be realized or comprised by terminal processor 40. Since the wireless terminal 26 of FIG. 37 may be capable of operating with dual connectivity, the connection controller 130 as shown as comprising master cell group connectivity logic 132 and secondary cell group connectivity control logic 134. As explained previously, the secondary cell group (SCG) may comprise a PSCell and other cells, e.g., SCells. As an example aspect of the technology disclosed herein, the Master gNodeB 22 prompts the wireless terminal 26 to perform an immediate handover to one or more of the cells of the secondary cell group (SCG). Information pertinent to the immediate handover of each cell in the secondary cell group (SCG) may be provided by the Master gNodeB 22 to the wireless terminal 26 in a configuration message 138 generated by message generator 54. The configuration message 138 may also be referred to as the re-configuration message 138. The Master gNodeB 22 provides the configuration message 138 so that the secondary cell group connectivity control logic 134 may direct the handover unit 72 to perform the handover upon receipt by the wireless terminal of the configuration message 138. Such information may herein also be known as configuration information. The configuration information for the secondary cell group (SCG) may be stored in secondary cell group configuration memory 140(37), to which the secondary cell group connectivity control logic 134 has access. For one or more cells of the secondary cell group (SCG) to which wireless terminal 26 belongs, the secondary cell group configuration memory 140(37) comprises fields or records which are shown in FIG. 37 as including configuration identification field 142; PSCell field 144, and, an optional security key-utilizing counter field 148.

The wireless terminal 26 further comprises terminal security context manager 94. The terminal security context manager 94 in turn comprises terminal first context generator 95 and terminal second key generator 96(37). The terminal second key generator 96(37) derives one or more security keys used for the radio connection with one or more secondary cells included in the conditional secondary cell configuration.

The Master gNodeB 22 thus comprises message generator 54 that may generate and transmit to the wireless terminal 26 the configuration message 138 that may include an SCG configuration with a PSCell configuration. The SCG configuration is preferably stored in secondary cell group configuration memory 140(37). The secondary cell group connectivity control logic 134 of the UE that receives the configuration message may start synchronization with the configured PSCell, and then establish radio connection/bearers with the SCells in the SCG.

Figure 39:
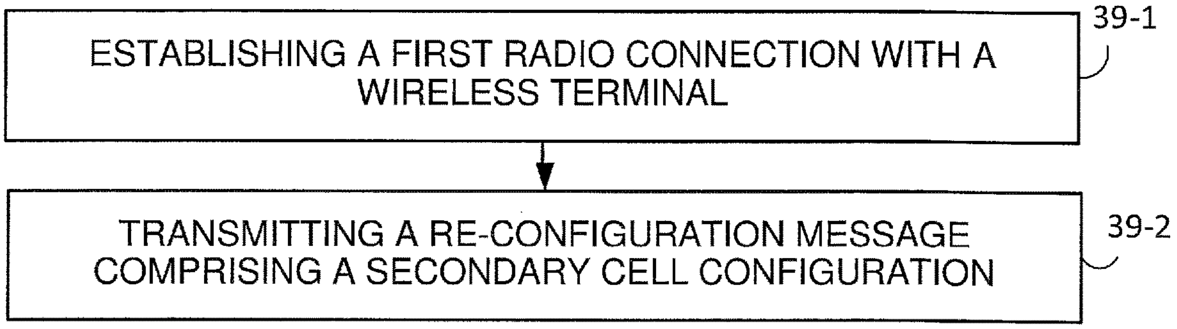
FIG. 39 is a flowchart which shows representative, generic, steps or acts performed by a Master gNodeB of FIG. 37.

FIG. 39 is a flowchart which shows representative, generic, steps or acts performed by Master gNodeB 22 of FIG. 37. Act 39-1 comprises establishing a first radio connection with a wireless terminal, e.g., with wireless terminal 26. Act 39-2 comprises transmitting a re-configuration message comprising a secondary cell group configuration. An example of the re-configuration message, also known as "configuration message", is configuration message 138 shown in FIG. 37. As previously explained, the configuration message 138 may be generated by message generator 54, and transmitted via transmitter circuitry 34 to wireless terminal 26. The configuration message 138 is received by receiver circuitry 46 of wireless terminal 26, processed by message processor 70, which stores contents of the configuration message 138 in conditional secondary cell configuration memory 140(37). The configuration message 138 may include a secondary cell group configuration which in turn comprises an identity of a primary secondary cell (stored in PSCell field 144) which may be used for Dual-Connectivity (DC). The secondary cell group configuration included in the configuration message 138 is configured to instruct the wireless terminal 26 to establish a second radio connection with a secondary access node serving the primary secondary cell included in the secondary cell configuration upon receipt of the configuration message 138.

Figure 40:
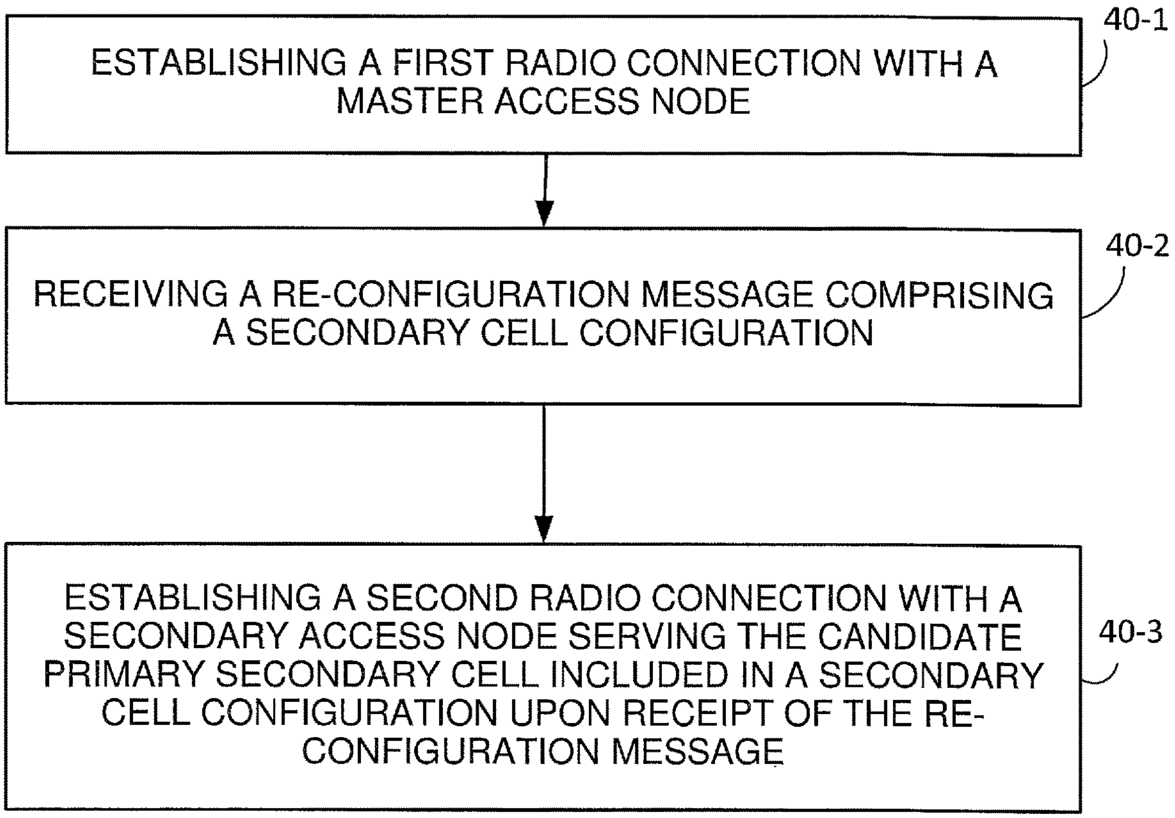
FIG. 40 is a flowchart which shows representative, generic, steps or acts performed by a wireless terminal of FIG. 37.

FIG. 40 is a flowchart which shows representative, generic, steps or acts performed by wireless terminal 26 of FIG. 37. Act 40-1 comprises establishing a first radio connection with a master access node, e.g., with Master gNodeB 22.

Act 40-2 comprises receiving a re-configuration message comprising a secondary cell group configuration. The secondary cell group configuration may comprise an identity of a primary secondary cell (stored in PSCell field 144) which may be used for Dual-Connectivity (DC). The secondary cell group configuration may be configured to instruct the wireless terminal to establish a second radio connection with a secondary access node serving the primary secondary cell upon reception of the configuration message 138, e.g., essentially immediately upon receiving and processing the configuration message 138.

Example circumstances of generation of the configuration message 138, also known as re-configuration message 138, are described below, as well as examples of how the configuration message 138 may be structured or encapsulated in other messages. For example, FIG. 41 and Table 1 provide an example circumstance/procedure for adding a secondary node, while FIG. 42 and Table 2 provide an example circumstance/procedure for modifying the current SCG configuration within the same SN.

Figure 41:
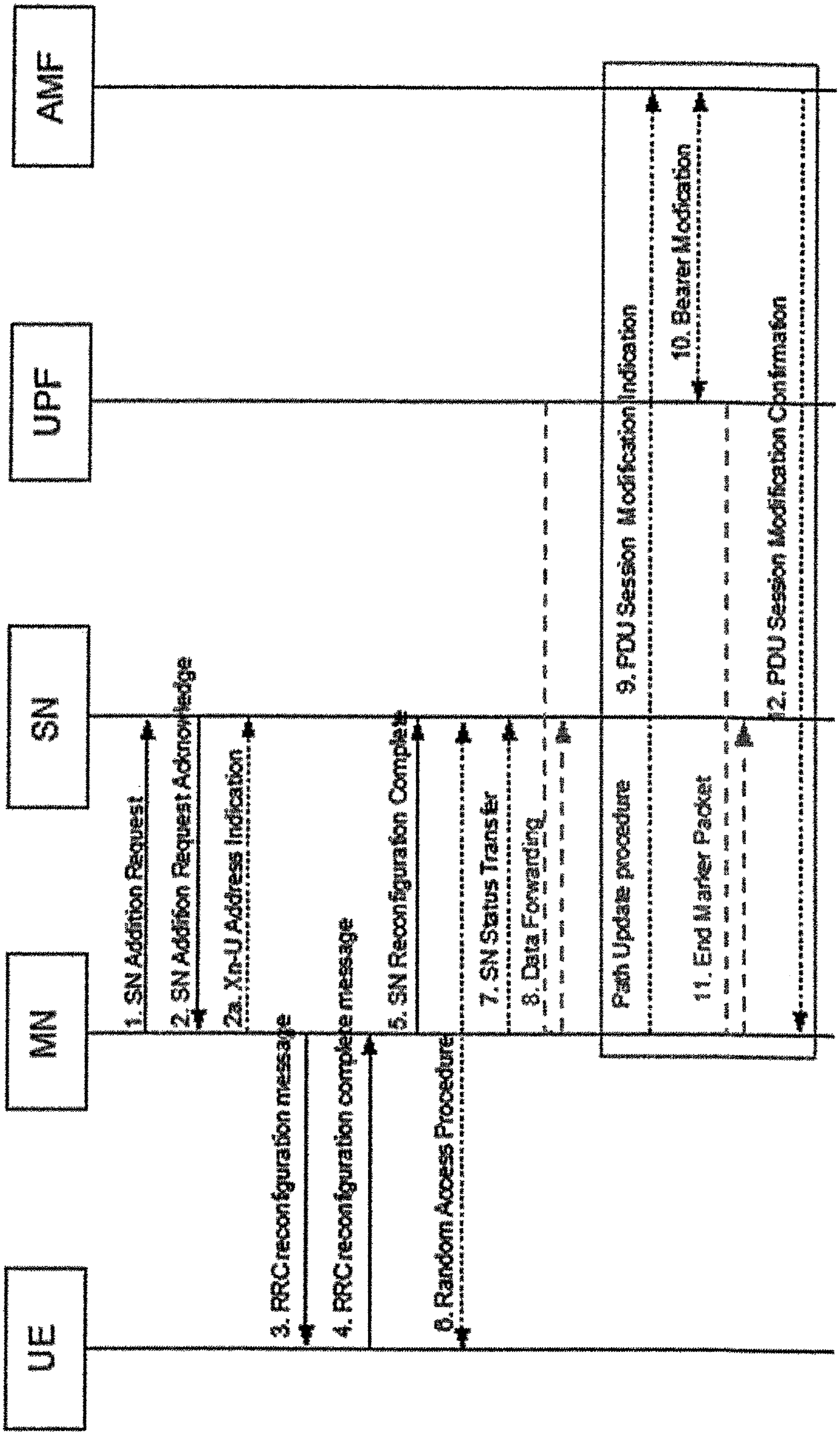
FIG. 41 is a diagram showing acts, steps, or messages comprising a procedure for adding or newly configuring a secondary node (i.e., adding a new SCG configuration).

3GPP TS 37.340 specifies a procedure for adding (newly configure) a secondary node (i.e. adding a new SCG configuration) as shown in FIG. 41. Messages, acts and signal of FIG. 40 are basically described in Table 1 below:

TABLE 1

1. The MN decides to request the target SN to allocate resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN terminated bearers are setup) to enable SRB3 to be setup based on SN decision.
   For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.
   For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

2. If the RRM entity in the SN is able to admit the resource request, it allocates respective radio resources and, dependent on the bearer type options, respective transport network resources. For bearers requiring SCG radio resources the SN TABLE 1-continued

| |
|---|
| triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided. |
| NOTE 3: In case of MN terminated bearers, transmission of user plane data may take place after step 2. |
| NOTE 4: In case of SN terminated bearers, data forwarding and the SN Status Transfer may take place after step 2. |
| NOTE 5: For MN terminated NR SCG bearers for which PDCP duplication with CA is configured the MN allocates 2 separate Xn-U bearers. For SN terminated NR MCG bearers for which PDCP duplication with CA is configured the SN allocates 2 separate Xn-U bearers. |
| 2a. For SN terminated bearers using MCG resources, the MN provides Xn-U DL TNL address information in the Xn-U Address Indication message. |
| 3. The MN sends the MN RRC reconfiguration message to the UE including the SN RRC configuration message, without modifying it. |
| 4. The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure. |
| 5. The MN informs the SN that the UE has completed the reconfiguration procedure successfully via SN Reconfiguration Complete message, including the SN RRC response message, if received from the UE. |
| 6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure. |
| 7. In case of SN terminated bearers using RLC AM, the MN sends SN Status Transfer. |
| 8. In case of SN terminated bearers using RLC AM, and dependent on the bearer characteristics of the respective QoS Flows, the MN may take actions to minimise service interruption due to activation of MR-DC (Data forwarding). |
| 9-12. For SN terminated bearers, the update of the UP path towards the 5GC is performed via PDU Session Path Update procedure. |

Figure 42:
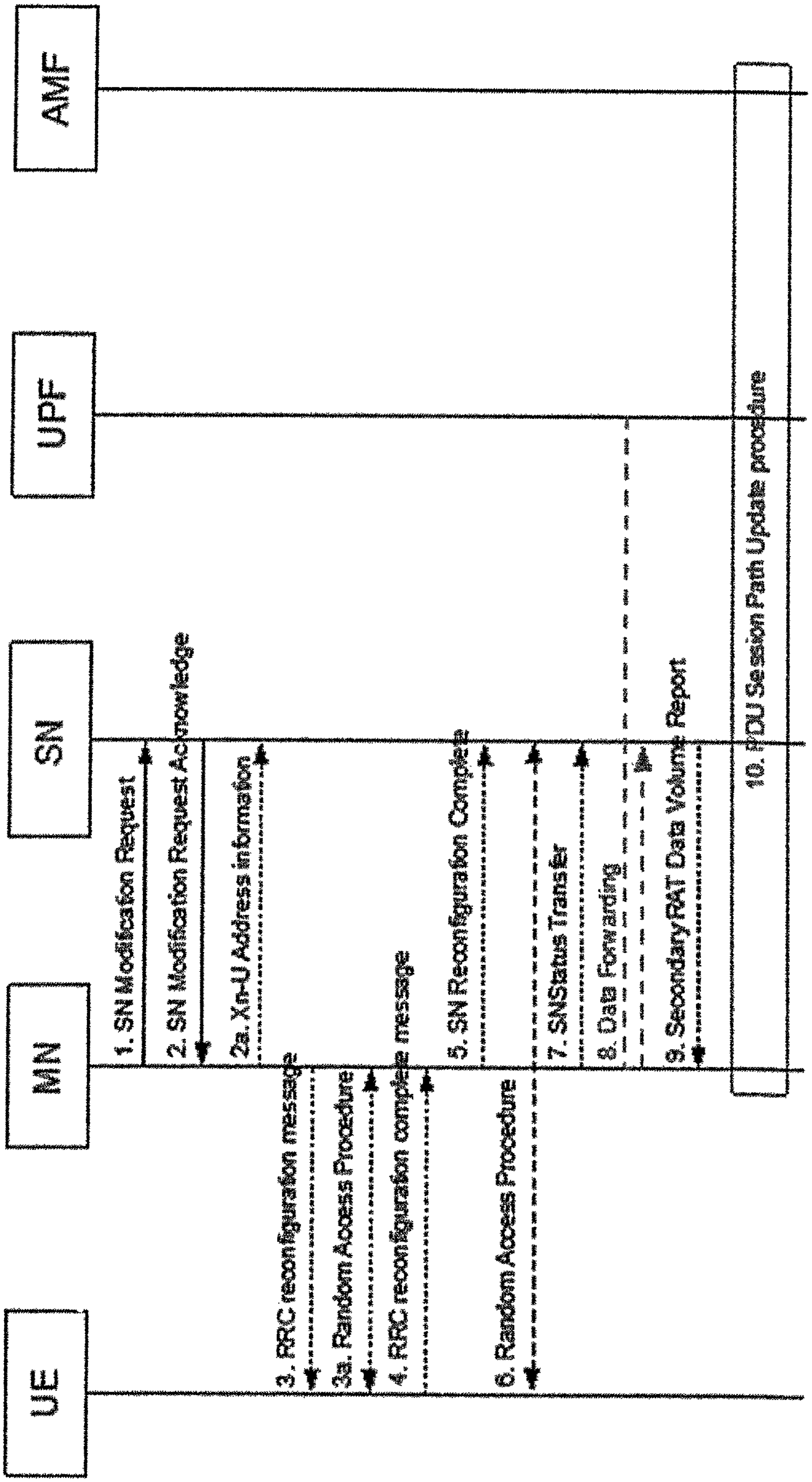
FIG. 42 is a diagram showing acts, steps, or messages comprising a procedure for modifying a current secondary cell group (SCG) configuration within the same secondary node.

TS37.340 also describes a procedure for modifying the current SCG configuration within the same SN as shown in FIG. 42 and the text of Table 2.

TABLE 2

| | |
|---|---|
| 1. | The MN sends the SN Modification Request message, which may contain user plane resource configuration related or other UE context related information, data forwarding address information (if applicable), PDU session level Network Slice info and the requested SCG configuration information, including the UE capabilities coordination result to be used as basis for the reconfiguration by the SN. In case a security key update in the SN is required, a new SN Security Key is included. |
| 2. | The SN responds with the SN Modification Request Acknowledge message, which may contain new SCG radio configuration information within an SN RRC reconfiguration message, and data forwarding address information (if applicable). |
| NOTE 1: | For MN terminated NR SCG bearers to be setup for which PDCP duplication with CA is configured the MN allocates 2 separate Xn-U bearers For SN terminated NR MCG bearers to be setup for which PDCP duplication with CA is configured the SN allocates 2 separate Xn-U bearers. |
| 2a. | For SN terminated MCG bearers, the MN provides Xn-U DL TNL address information in the Xn-U Address Indication message. |
| 3/4. | The MN initiates the RRC reconfiguration procedure, including an SN RRC reconfiguration message. The UE applies the new configuration, synchronizes to the MN (if instructed, in case of intra-MN handover) and replies with MN RRC reconfiguration complete message, including an SN RRC response message, if needed. In case the UE is unable to comply with (part of) the configuration included in the MN RRC reconfiguration message, it performs the reconfiguration failure procedure. |
| 5. | Upon successful completion of the reconfiguration, the success of the procedure is indicated in the SN Reconfiguration Complete message. |
| 6. | If instructed, the UE performs synchronisation towards the PSCell of the SN as described in SN addition procedure. Otherwise, the UE may perform UL transmission after having applied the new configuration. |

TABLE 2-continued

| | |
|---|---|
| 7. | If PDCP termination point is changed for bearers using RLC AM, and when RRC full configuration is not used, the MN sends the SN Status transfer. |
| 8. | If applicable, data forwarding between MN and the SN takes place (Figure 10.3.2-1 depicts the case where a user plane resource configuration related context is transferred from the MN to the SN). |
| 9. | The SN sends the Secondary RAT Data Usage Report message to the MN and includes the data volumes delivered to and received from the UE as described in clause 10.11.2. |
| NOTE 2: | The order the SN sends the Secondary RAT Data Usage Report message and performs data forwarding with MN is not defined. The SN may send the report when the transmission of the related QoS flow is stopped. |
| 10. | If applicable, a PDU Session path update procedure is performed. |

As shown in Step 3 of FIG. 41/FIG. 42, RRCReconfiguration message (i.e. MN RRCReconfiguration message) may be used for configuring the UE with a new/modified SCG. Furthermore, as described in Step 2 of FIG. 41/FIG. 42, the MN RRCReconfiguration message may encapsulate another RRCReconfiguration message provided by the SN (i.e. SN RRCReconfiguration Message) that comprises the SCG configuration. Listing 13 is an example format of the RRCReconfiguration message.

Listing 13 (begin)

```
-- ASN1START
-- TAG-RRCRECONFIGURATION-START
RRCReconfiguration ::=   SEQUENCE {
      rrc-TransactionIdentifier   RRC-TransactionIdentifier,
      criticalExtensions   CHOICE {
         rrcReconfiguration   RRCReconfiguration-IEs,
         criticalExtensionsFuture   SEQUENCE { }
      }
}
RRCReconfiguration-IEs ::=   SEQUENCE {
      radioBearerConfig   RadioBearerConfig
OPTIONAL, -- Need M
      secondaryCellGroup   OCTET STRING (CONTAINING
CellGroupConfig)   OPTIONAL, -- Need M
      measConfig   MeasConfig
OPTIONAL, -- Need M
      lateNonCriticalExtension   OCTET STRING
OPTIONAL,
      nonCriticalExtension   RRCReconfiguration-v1530-IEs
OPTIONAL
}
RRCReconfiguration-v1530-IEs ::=   SEQUENCE {
      masterCellGroup   OCTET STRING (CONTAINING
CellGroupConfig)   OPTIONAL, -- Need M
      fullConfig   ENUMERATED {true}
OPTIONAL, -- Cond FullConfig
      dedicatedNAS-MessageList   SEQUENCE (SIZE(1..maxDRB)) OF
DedicatedNAS-Message OPTIONAL, -- Cond nonHO
      masterKeyUpdate   MasterKeyUpdate
OPTIONAL, -- Cond MasterKeyChange
      dedicatedSIB1-Delivery   OCTET STRING (CONTAINING
SIB1)   OPTIONAL, -- Need N
      dedicatedSystemInformationDelivery OCTET STRING (CONTAINING
SystemInformation)   OPTIONAL, -- Need N
      otherConfig   OtherConfig
OPTIONAL, -- Need M
      nonCriticalExtension   RRCReconfiguration-v1540-IEs
OPTIONAL
}
RRCReconfiguration-v1540-IEs ::=   SEQUENCE {
      otherConfig-v1540   OtherConfig-v1540
OPTIONAL, -- Need M
      nonCriticalExtension   RRCReconfiguration-v1560-IEs
OPTIONAL
}
RRCReconfiguration-v1560-IEs ::=   SEQUENCE {
      mrdc-SecondaryCellGroupConfig   SetupRelease
{ MRDC-SecondaryCellGroupConfig }   OPTIONAL,   -- Need
M
      radioBearerConfig2   OCTET STRING
(CONTAINING RadioBearerConfig)   OPTIONAL,   -- Need M
      sk-Counter   SK-Counter
OPTIONAL,   -- Need N
      nonCriticalExtension   SEQUENCE { }
OPTIONAL
}
```

-continued

```
MRDC-SecondaryCellGroupConfig ::=   SEQUENCE {
      mrdc-ReleaseAndAdd   ENUMERATED {true}
OPTIONAL,   -- Need N
      mrdc-SecondaryCellGroup   CHOICE {
         nr-SCG   OCTET STRING
(CONTAINING RRCReconfiguration),
         eutra-SCG   OCTET STRING
      }
}
MasterKeyUpdate ::=   SEQUENCE {
      keySetChangeIndicator   BOOLEAN,
      nextHopChainingCount   NextHopChainingCount,
      nas-Container   OCTET STRING
   OPTIONAL,   -- Cond securityNASC
      ...
}
-- Configuration of one Cell-Group:
CellGroupConfig ::=   SEQUENCE {
      cellGroupId   CellGroupId,
      rlc-BearerToAddModList   SEQUENCE (SIZE(1..maxLC-ID)) OF
RLC-BearerConfig   OPTIONAL,   -- Need N
      rlc-BearerToReleaseList   SEQUENCE (SIZE(1..maxLC-ID)) OF
LogicalChannelIdentity   OPTIONAL,   -- Need N
      mac-CellGroupConfig   MAC-CellGroupConfig
OPTIONAL,   -- Need M
      physicalCellGroupConfig   PhysicalCellGroupConfig
OPTIONAL,   -- Need M
      spCellConfig   SpCellConfig
OPTIONAL,   -- Need M
      sCellToAddModList   SEQUENCE (SIZE
(1..maxNrofSCells)) OF SCellConfig   OPTIONAL,   -- Need N
      sCellToReleaseList   SEQUENCE (SIZE
(1..maxNrofSCells)) OF SCellIndex   OPTIONAL,   -- Need N
      ...,
      [[
      reportUplinkTxDirectCurrent-v1530   ENUMERATED {true}
OPTIONAL   -- Cond BWP-Reconfig
      ]]
}
-- Serving cell specific MAC and PHY parameters for a SpCell:
SpCellConfig ::=   SEQUENCE {
      servCellIndex   ServCellIndex
OPTIONAL,   -- Cond SCG
      reconfiguration WithSync   ReconfigurationWithSync
OPTIONAL,   -- Cond ReconfWithSync
      rlf-TimersAndConstants   SetupRelease { RLF-TimersAndConstants }
OPTIONAL,   -- Need M
      rlmInSyncOutOfSyncThreshold   ENUMERATED {n1}
OPTIONAL,   -- Need S
      spCellConfigDedicated   ServingCellConfig
OPTIONAL,   -- Need M
      ...
}
ReconfigurationWithSync ::=   SEQUENCE {
      spCellConfigCommon   ServingCellConfigCommon
OPTIONAL,   -- Need M
      newUE-Identity   RNTI-Value,
      t304   ENUMERATED {ms50, ms100, ms150,
ms200, ms500, ms1000, ms2000, ms10000},
      rach-ConfigDedicated   CHOICE {
         uplink   RACH-ConfigDedicated,
         supplementaryUplink   RACH-ConfigDedicated
      }
OPTIONAL,   -- Need N
      ...,
      [[
      smtc   SSB-MTC
OPTIONAL   -- Need S
      ]]
}
SCellConfig ::=   SEQUENCE {
      sCellIndex   SCellIndex,
      sCellConfigCommon   ServingCellConfigCommon
OPTIONAL,   -- Cond SCellAdd
      sCellConfigDedicated   ServingCellConfig
OPTIONAL,   -- Cond SCellAddMod
      ...,
      [[
      smtc   SSB-MTC
```

-continued

```
OPTIONAL   -- Need S
      ]]
}
-- TAG-RRCRECONFIGURATION-STOP
-- ASN1STOP
          Listing 13 (end)
```

In this example, it should be understood that for the MN RRCReconfiguration message the information element mrdc-SecondaryCellGroupConfig may be used to encapsulate the SN RRCReconfiguration message, whereas the encapsulated SN RRCReconfiguration message may include the information element secondaryCellGroup for the SCG configuration.

As mentioned in Section 4, SECURITY CONFIGURATIONS FOR Conditional handover configurationS, terminals and network entities may be required to protect user/signalling data from security attacks by applying encryptions and integrity protections. This may be the case for the radio bearers using the SCG as well. One example configuration of security mechanisms for the secondary cell group (SCG) may comprise, as specified in 3GPP TS 33.401 and/or TS 33.501, an access stratum, AS, key derivation scheme for a secondary node, SN, to derive a master AS key for the secondary node, e.g., key $K_{SN}$.

Figure 43:
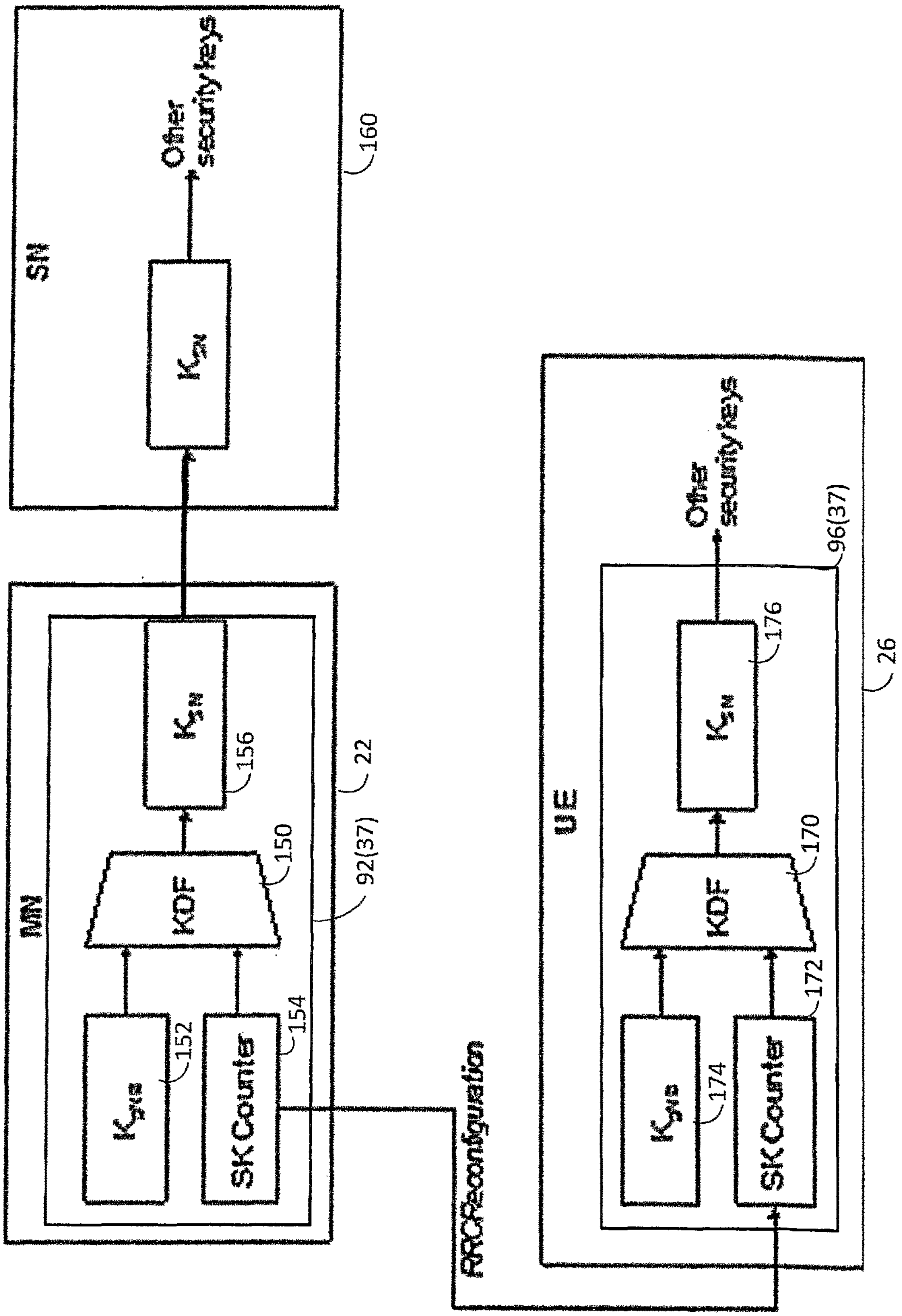
FIG. 43 is a diagrammatic view showing an example key derivation scheme for a secondary node for the example embodiment and mode of FIG. 37.

FIG. 43 shows an example key derivation scheme for $K_{SN}$. The example scheme of FIG. 43 may be used when the Master gNodeB 22 decides to newly add an secondary node, SN 160, or to newly add a secondary cell group, SCG, or when the Master gNodeB 22 updates the security keys used in the currently active SN/SCG. FIG. 43 shows Master gNodeB 22, for example secondary key generator 92(37) of Master gNodeB 22, which computes $K_{SN}$. As shown in FIG. 43, the secondary key generator 92(37) may comprise secondary key derivation function 150 which may receive inputs in the form of the currently active AS master key 152 for Master gNodeB 22, $K_{gNB}$, and a counter, such as SK Counter 154, as an input for a key derivation function (KDF). The secondary key derivation function 150 uses the inputs of the currently active AS master key 152 and the SK Counter 154 to derive secondary node key $K_{SN}$ 156. The SK Counter 154 may be also referred as an SN Counter or an SCG Counter. The SK Counter 154 may be selected by Master gNodeB 22 and be used as freshness input into $K_{SN}$ derivations to guarantee that other security keys further derived from $K_{SN}$ in the SN are not re-used with the same input parameters. The other security keys may be used for encryption and integrity protection of radio bearers for the SN. The secondary node key $K_{SN}$ 156 derived in the Master gNodeB 22 may be sent to the secondary node 160 using the SN Addition Request for SN addition, as shown in by way of example in FIG. 41, or the SN Modification Request for SN key updates as shown by way of example in FIG. 42.

The Master gNodeB 22 may send the SK Counter to the wireless terminal 26 using the RRCReconfiguration message (see Listing 13). FIG. 43 further shows wireless terminal 26, and secondary key generator 96(37) in particular, as comprising key derivation function 170. The key derivation function 170 receives inputs including the SK Counter 172, received from Master gNodeB 22, e.g., in the RRCReconfiguration message, and the currently active AS key $K_{gNB}$ 174. Upon reception of the RRCReconfiguration message the secondary key generator 96(37) may use the currently active AS key, $K_{gNB}$ 174, shared with Master gNodeB 22, and the received SK Counter 172 as inputs to the key derivation function 170 to derive secondary key $K_{SN}$, 176, which may be used for deriving other security key to be used for encryption and integrity protection of radio bearers for the secondary node SN 160.

FIG. 37 and FIG. 43 thus show that a secondary cell group configuration is associated with a designated a counter, such as the SK Counter, and that the counter may be used for computing one or more security keys used for the radio connection with the secondary cell included in the secondary cell group configuration. For example, FIG. 43 shows how in Master gNodeB 22 the input SK Counter 154 may be used by secondary key derivation function 150 to compute secondary node key $K_{SN}$ 156, and how in wireless terminal 26 the SK Counter 172 may be used by key derivation function 170 to compute secondary key $K_{SN}$, 176.

7: Configuration Of a Conditional PSCell Addition/Modification

Figure 44:
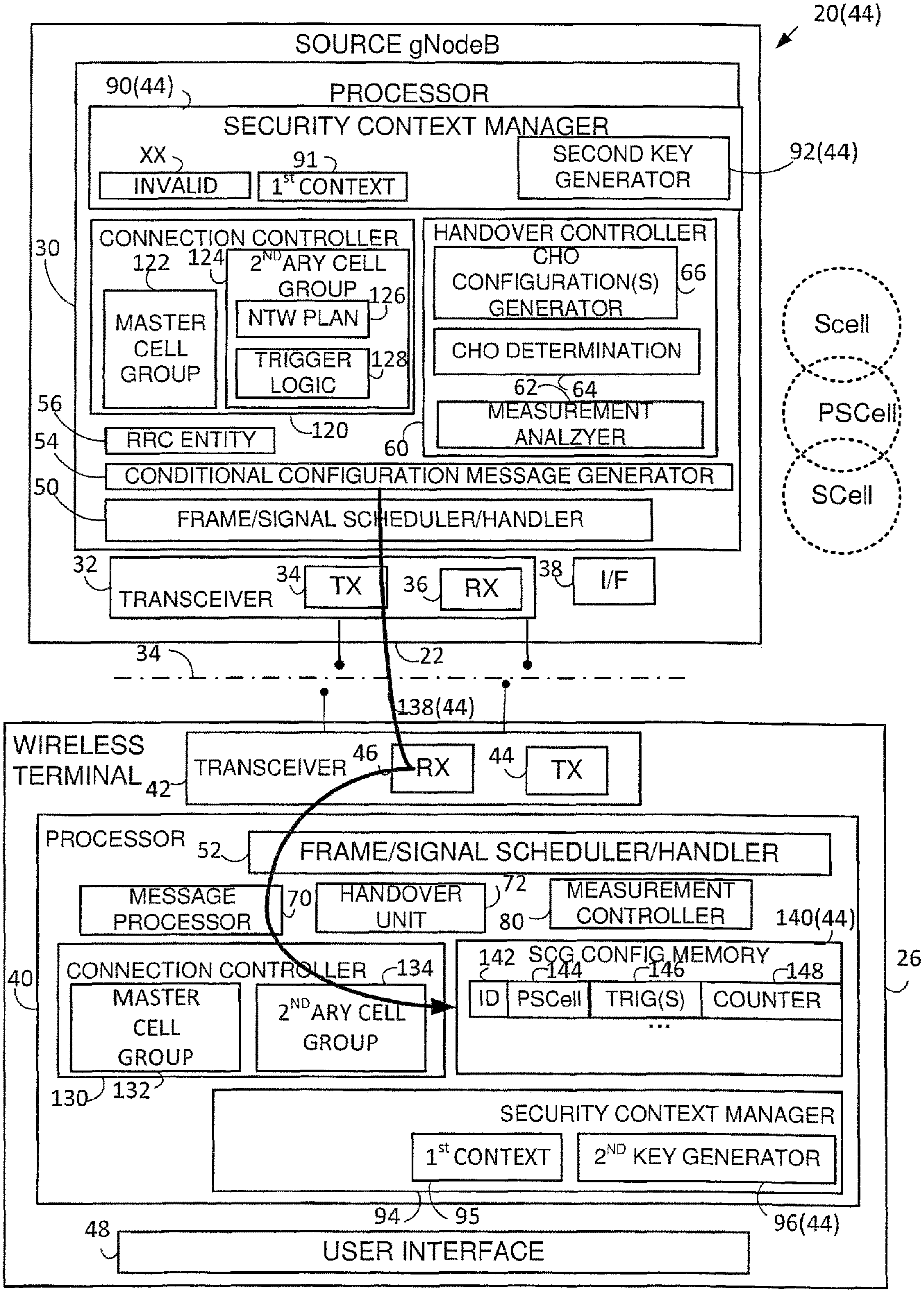
FIG. 44 is a schematic view of an example communications system comprising a source gNodeB which provides a wireless terminal with a conditional secondary cell group (SCG) configuration.

Some of the previous example embodiments and modes discuss conditional handovers, where one or more candidate target cells (candidate PCells) may be configured to the UE with associated one or more triggering conditions. The example embodiment and mode of FIG. 37 describes, e.g., providing secondary cell group (SCG) configuration for dual connectivity, wherein a handover involving the secondary cell group (SCG) occurs automatically upon receipt of a configuration message that carries the secondary cell group (SCG) configuration information. The example embodiment and mode of FIG. 44-FIG. 46, on the other hand, discloses configurations for conditional PSCell addition/modification. For the conditional PSCell addition, the Master gNodeB 22 may configure wireless terminal 26 with a candidate PSCell associated with at least one triggering condition. When the triggering condition is met, the UE may perform the aforementioned SN addition procedure. For the conditional PSCell modification (change) of the FIG. 44 example embodiment and mode, the wireless terminal 26 that is currently establishing SCG radio connection/bearers with a SN may be configured with a candidate PSCell associated with at least one triggering condition. In the case of FIG. 44, the wireless terminal 26 may perform the aforementioned SN modification procedure at a time when it is determined that the triggering condition is met. In one example implementation of the FIG. 44 embodiment and mode, the triggering condition may be one or a combination of the previously disclosed triggering conditions for conditional handover, CHO. Furthermore, for the conditional PSCell modification, the candidate PSCell may be served by the SN that the UE is currently communicating with (intra-SN PSCell) or served by a different SN (inter-SN PSCell).

Figure 45:
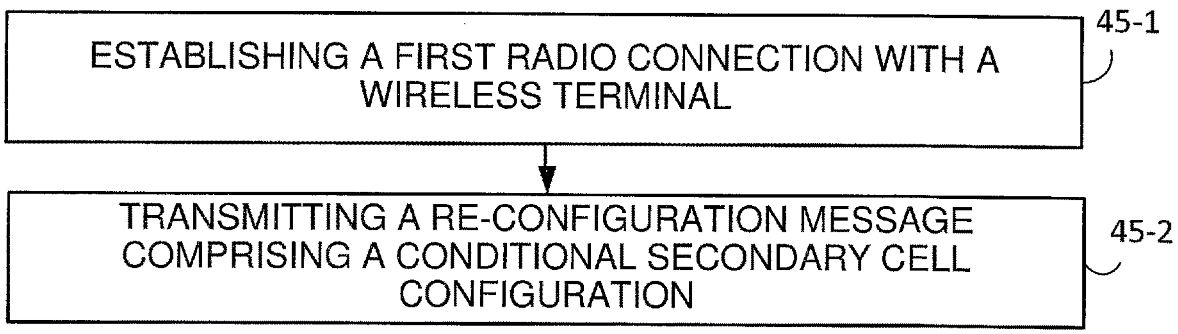
FIG. 45 is a flowchart which shows representative, generic, steps or acts performed by a Master gNodeB of FIG. 44.
Figure 46:
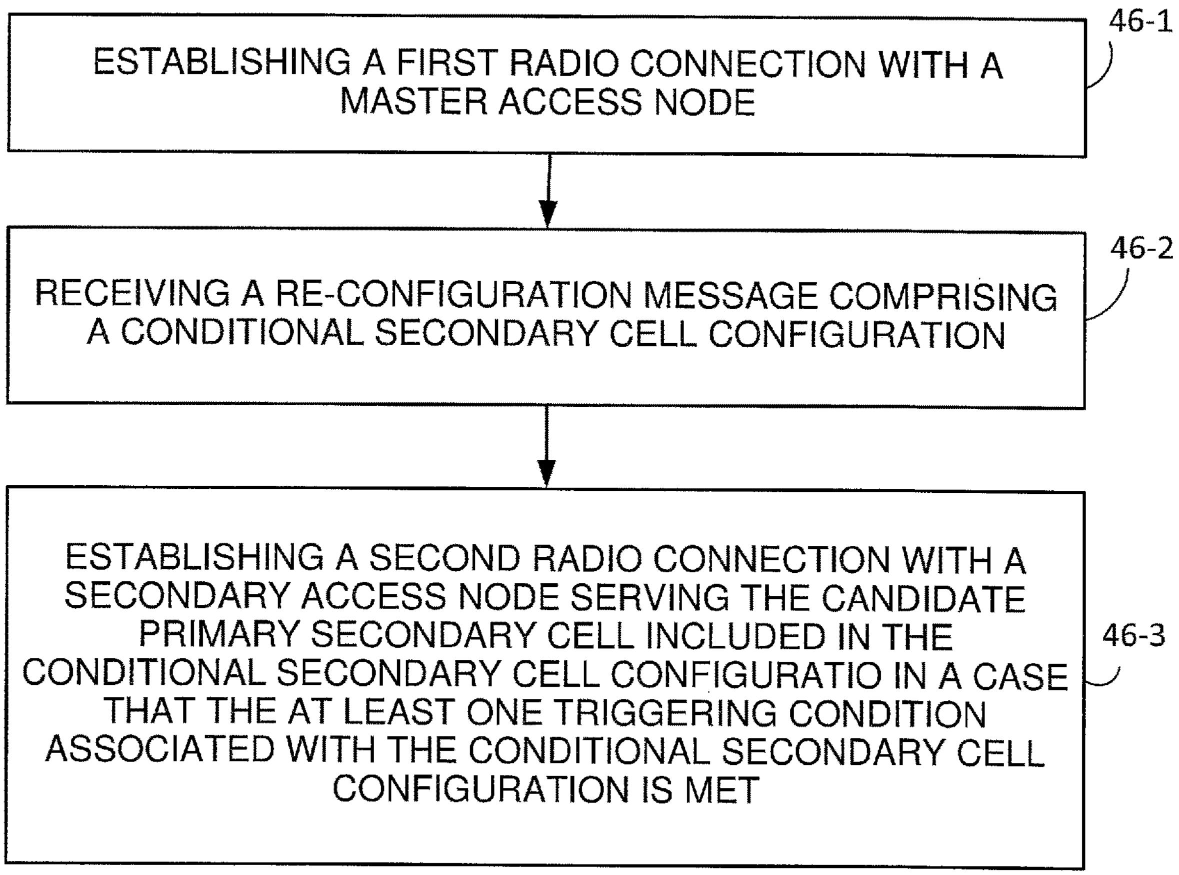
FIG. 46 is a flowchart which shows representative, generic, steps or acts performed by a wireless terminal of FIG. 44.

The configuration for conditional PSCell addition/modification as exemplified by the example embodiment and mode of FIG. 44-FIG. 46 for one secondary cell group (SCG) comprises one PSCell and zero or more SCells. In a sense the PSCell addition/modification may also be considered as a “handover” to a secondary cell group (SCG), so at some junctures the terminologies “PSCell addition/modification" and "handover to a SCG" may be used interchangeably herein, as well as the terminologies "configuration . . . for conditional PSCell addition/modification" and "configuration . . . for conditional handover to the SCG".

FIG. 44 shows an example communications system 20(42) which provides a configuration for conditional PSCell addition/modification. FIG. 44 shows system 20(44) as comprising source gNodeB 22, wireless terminal 26, and a secondary cell group (SCG). In the example embodiment and mode of FIG. 44, the source gNodeB 22 serves as the Master node (MN), and thus may also be referred to as Master gNodeB 22. The Master gNodeB 22 with its node processor 30 and wireless terminal 26 with its terminal processor 40 of FIG. 44 are similar to those of FIG. 6, FIG. 11, FIG. 15, FIG. 19, FIG. 28, and FIG. 37, with like units and functionalities having like reference numbers. As shown in FIG. 44, the Master gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50; message generator 54; RRC state machine 56; handover controller 60; security context manager 90(44). As in previous example embodiment and modes, the handover controller 60 may comprise measurement analyzer 62, conditional handover (CHO) determination unit 64, and conditional handover configuration information generator 66. In the FIG. 44 embodiment and mode, the message generator 54 may also be known as conditional configuration message generator 54 since it generates a configuration message that includes configuration information for conditional handover to the SCG, e.g. PSCell addition/modification, for the PSCell and optionally SCells, if configured, of the secondary cell group (SCG) to which wireless terminal 26 may belong or have access.

In serving as the master node, gNodeB 22 may control connectivity of wireless terminals served thereby, including wireless terminal 26. For this reason the node processor 30 of gNodeB 22 is shown as comprising master node connectivity controller 120. The master node connectivity controller 120 may execute an instance of a connectivity control logic, program or a connective control routine for each wireless terminal 26 served thereby. When providing dual connectivity (DC) such as that illustrated by way of example in FIG. 38, for example, for each wireless terminal 26 the instance of the connectivity control program may include master cell group connectivity logic 122 and secondary cell group connectivity control logic 124. Since certain aspects of the technology disclosed herein concern the secondary cell group (SCG), FIG. 44 further shows that the secondary cell group connectivity control logic 124 may comprise, or have access to, network plan or network topological information 126. The network plan or network topological information 126 may comprise a data base of nodes that may be eligible for inclusion, or actually be included in, the secondary cell group (SCG) to which wireless terminal 26 has access. The secondary cell group connectivity control logic 124 may also comprise conditional handover trigger logic 128. The conditional handover trigger logic 128 may comprise intelligence for generating the conditions for the handover to the SCG, e.g., the triggering criteria, for one or more secondary cells included in the secondary cell group (SCG) for the wireless terminal 26. Such triggering conditions may be the same or different for different cells included in the secondary cell group (SCG).

The security context manager 90(44) of the Master gNodeB 22 comprises first security context generator 91 and second key generator 92(44) which derives a second key for establishing a second security context and thus one or more security keys used for the radio connection with one or more secondary cells included in the conditional secondary cell configuration.

As in the preceding example embodiments and modes, the wireless terminal 26 of the example embodiment and mode of FIG. 44 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 44, it should be understood that, in like manner with FIG. 15, FIG. 19, FIG. 28, and FIG. 37, measurement controller 80 may in turn comprise a measurement initiation unit, a measurement results unit, and a measurement report control unit. In addition, the terminal processor 40 of FIG. 44 is shown as terminal security context manager 94(42).

The wireless terminal 26 comprises connection controller 130, which may be realized or comprised by terminal processor 40. Since the wireless terminal 26 of FIG. 44 may be capable of operating with dual connectivity, the connection controller 130 as shown as comprising master cell group connectivity logic 132 and secondary cell group connectivity control logic 134. As explained previously, the secondary cell group (SCG) may comprise a PSCell and other cells, e.g., SCells. As an example aspect of the technology disclosed herein, the Master gNodeB 22 may permit and/or authorize the wireless terminal 26 to perform a conditional handover to the SCG, and the conditional handover to the SCG may involve the PSCell and optionally SCells, if configured, of the secondary cell group (SCG). Information pertinent to the conditional handover to the SCG for each cell in the secondary cell group (SCG) may be provided by the Master gNodeB 22 to the wireless terminal 26 in a configuration message 138(44) generated by message generator 54. The configuration message 138(44) may also be referred to as the re-configuration message 138(44), or the conditional configuration message. The Master gNodeB 22 provides the configuration message 138(44) so that the secondary cell group connectivity control logic 134 may direct the handover unit 72 to perform the conditional handover to the SCG upon occurrence of condition(s) specified in the configuration message 138(44). Such information may herein also be known as conditional configuration information. The configuration information for each cell of the secondary cell group (SCG) may be stored in conditional secondary cell configuration memory 140(44) to which the secondary cell group connectivity control logic 134 has access. For one or more cells of the secondary cell group (SCG) to which wireless terminal 26 belongs, the conditional secondary cell configuration memory 140(44) comprises fields or records which are shown in FIG. 44 as including configuration identification field 142; PSCell field 144, triggering condition field 146, and, an optional security key-utilizing counter field 148.

The wireless terminal 26 further comprises terminal security context manager 94. The terminal security context manager 94 in turn comprises terminal first context generator 95 and terminal second key generator 96(44). The terminal second key generator 96(44) derives one or more security keys used for the radio connection for one or more secondary cells included in the conditional secondary cell configuration.

The Master gNodeB 22 thus comprises message generator 54 that may generate and transmit to the wireless terminal 26 the configuration message 138(44) that may include an SCG configuration with a PSCell configuration. The SCG configuration is preferably stored in conditional secondary cell configuration memory 140(44). The secondary cell group connectivity control logic 134 of the UE that receives the configuration message may start synchronization with the configured PSCell, and then establish radio connection/bearers with the SCells in the SCG after the wireless terminal 26 determines that the triggering condition associated with the SCG configuration is satisfied.

FIG. 45 is a flowchart which shows representative, generic, steps or acts performed by Master gNodeB 22 of FIG. 44. Act 45-1 comprises establishing a first radio connection with a wireless terminal, e.g., with wireless terminal 26. Act 45-2 comprises transmitting a re-configuration message comprising a conditional secondary cell configuration. An example of the re-configuration message, also known as "configuration message", is configuration message 138(44) shown in FIG. 44. As previously explained, the configuration message 138(44) may be generated by message generator 54, and transmitted via transmitter circuitry 34 to wireless terminal 26. The configuration message 138(44) is received by receiver circuitry 46 of wireless terminal 26, processed by message processor 70, which stores contents of the configuration message 138(44) in conditional secondary cell configuration memory 140 (44). The configuration message 138(44) may include a conditional secondary cell configuration which in turn may comprise an identity of a candidate primary secondary cell (stored in PSCell field 144) which may be used for Dual-Connectivity (DC). Moreover, the conditional secondary cell configuration may be associated with at least one triggering condition, stored in triggering condition field 146.

The conditional secondary cell configuration included in the configuration message 138(44) is configured to instruct the wireless terminal 26 to establish a second radio connection with a secondary access node serving the candidate primary secondary cell included in the conditional secondary cell configuration in a case that the at least one triggering condition associated with the conditional secondary cell configuration is met.

FIG. 46 is a flowchart which shows representative, generic, steps or acts performed by wireless terminal 26 of FIG. 44. Act 46-1 comprises establishing a first radio connection with a master access node, e.g., with Master gNodeB 22.

Act 46-2 comprises receiving a re-configuration message comprising a conditional secondary cell configuration. The conditional secondary cell configuration may comprise an identity of a candidate primary secondary cell (stored in PSCell field 144) which may be used for Dual-Connectivity (DC). The conditional secondary cell configuration may be associated with at least one triggering condition (stored in triggering condition field 146). The conditional secondary cell configuration may be configured to instruct the wireless terminal to establish a second radio connection with a secondary access node serving the candidate primary secondary cell included in the conditional secondary cell configuration in a case that the at least one triggering condition associated with the conditional secondary cell configuration is met. Act 46-3 thus comprises the wireless terminal 26 establishing a second radio connection with a secondary access node serving the candidate primary secondary cell included in the conditional secondary cell configuration in a case that the at least one triggering condition associated with the conditional secondary cell configuration is met.

As understood from the foregoing, the configuration message 138(44) of the embodiment and mode of FIG. 44 pertains to conditional configuration of a secondary cell group (SCG), whereas the configuration of the secondary cell group (SCG) for the FIG. 37 embodiment and mode occurred upon receipt of the configuration message 138. Nevertheless, example circumstances of generation of the configuration message 138(44), as well as examples of how the configuration message 138(44) may be structured or encapsulated in other messages, are also understood from the preceding example embodiment and mode of FIG. 37. For example, FIG. 41 and Table 1 provide an example circumstance/procedure for adding a secondary node, while FIG. 44 and Table 2 provide an example circumstance/procedure for modifying the current SCG configuration within the same SN.

Listing 14 shows an example format of the configuration for conditional PSCell addition/modification, where the MN RRCReconfiguration message that encapsulates the SN RRCReconfiguration message may comprise a list of triggering conditions. It should be understood that the MN RRCReconfiguration message may be essentially as disclosed for the FIG. 37 embodiment and mode, but additionally includes the list of triggering conditions.

In one example implementation of the FIG. 44 embodiment and mode, the wireless terminal 26, upon receiving the MN RRCReconfiguration message, may perform a regular, e.g., non-conditional, legacy or essentially immediate, PSCell addition/modification in a case that the message includes no triggering condition. Otherwise, the wireless terminal 26 may store in conditional secondary cell configuration memory 140(44) the configuration for PSCell addition/modification along with the triggering condition(s), without activating the configuration, and perform the designated PSCell addition/modification when at least one of the triggering condition(s) is met.

In another configuration, the (MN or SN) RRCReconfiguration message may comprise a separate information element, which is not shown in Listing 14, and which indicates whether or not the configuration for PSCell addition/modification is conditional. In this case the wireless terminal 26 may determine whether or not to perform the regular PSCell addition/modification or the conditional PSCell addition/modification based on the separately supplied information element.

Listing 14 (begin)

```
-- ASN1START
-- TAG-RRCRECONFIGURATION-START
RRCReconfiguration ::=                SEQUENCE {
  rrc-TransactionIdentifier             RRC-TransactionIdentifier,
  criticalExtensions                    CHOICE {
     rrcReconfiguration                        RRCReconfiguration-IEs,
     criticalExtensionsFuture               SEQUENCE { }
  }
```

-continued

```
}
RRCReconfiguration-IEs ::=                SEQUENCE {
   radioBearerConfig                                  RadioBearerConfig
OPTIONAL, -- Need M
   secondaryCellGroup                                 OCTET STRING (CONTAINING
CellGroupConfig)              OPTIONAL, -- Need M
   measConfig                                          MeasConfig
OPTIONAL, -- Need M
   lateNonCriticalExtension                         OCTET STRING
OPTIONAL,
   nonCriticalExtension                             RRCReconfiguration-v1530-IEs
OPTIONAL
}
RRCReconfiguration-v1530-IEs ::=                   SEQUENCE {
   masterCellGroup                                    OCTET STRING (CONTAINING
CellGroupconfig)              OPTIONAL, -- Need M
   fullConfig                                          ENUMERATED {true}
OPTIONAL -- cond FullConfig
   dedicatedNAS-MessageList      SEQUENCE (SIZE(1..maxDRB)) OF
DedicatedNAS-Message      OPTIONAL, -- cond nonHO
   masterKeyUpdate                                     MasterKeyUpdate
OPTIONAL, -- Cond MasterKeyChange
   dedicatedSIB1-Delivery                           OCTET STRING (CONTAINING
SIB1)                              OPTIONAL, -- Need N
   dedicatedSystemInformationDelivery            OCTET STRING (CONTAINING
SystemInformation)                               OPTIONAL, -- Need N
   otherConfig                                        OtherConfig
OPTIONAL, -- Need M
   nonCriticalExtension                            RRCReconfiguration-v1540-IEs
OPTIONAL
}
RRCReconfiguration-v1540-IEs ::=             SEQUENCE {
   otherConfig-v1540                                 OtherConfig-v1540
OPTIONAL, -- Need M
   nonCriticalExtension                            RRCReconfiguration-v1560-IEs
OPTIONAL
}
RRCReconfiguratio-v1560-IEs ::=                    SEQUENCE {
   mrdc-SecondaryCellGroupConfig                          SetupRelease
{ MRDC-SecondaryCellGroupConfig }                              OPTIONAL,    -- Need
M
   radioBearerConfig2                                     OCTET STRING
(CONTAINING RadioBearerConfig)                                OPTIONAL,    -- Need
M
   sk-Counter                                                SK-Counter
OPTIONAL,           -- Need N
   nonCriticalExtension                                  RRCReconfiguration-v1600-IEs
OPTIONAL
OPTIONAL
}
RRCReconfiguration-v1600-IEs ::=                   SEQUENCE {
   choConditionList                              CHOConditionList
OPTIONAL,           -- Need N
   nonCriticalExtension                                  SEQUENCE { }
OPTIONAL
}
MRDC-SecondaryCellGroupConfig ::=             SEQUENCE {
   mrdc-ReleaseAndAdd                               ENUMERATED {true}
OPTIONAL,           -- Need N
mrdc-SecondaryCellGroup                         CHOICE {
      nr-SCG                                             OCTET STRING
(CONTAINING RRCReconfiguration),
      eutra-SCG                                         OCTET STRING
   }
}
MasterKeyUpdate ::=                            SEQUENCE {
   keySetChangeIndicator                        BOOLEAN,
   nextHopChainingCount                           NextHopChainingCount,
   nas-Container                                  OCTET STRING
OPTIONAL,              -- Cond securityNASC
   ...
}
-- Configuration of one Cell-Group:
CellGroupConfig ::=                                    SEQUENCE {
   cellGroupId                                                  CellGroupId,
   rlc-BearerToAddModList                SEQUENCE (SIZE(1..maxLC-ID)) OF
RLC-BearerConfig
OPTIONAL,           -- Need N
   rlc-BearerToReleaseList           SEQUENCE (SIZE(1..maxLC-ID)) OF
```

-continued

```
LogicalChannelIdentity        OPTIONAL,   -- Need N
   mac-CellGroupConfig                              MAC-CellGroupConfig
OPTIONAL,          -- Need M
   physicalCellGroupConfig                          PhysicalCellGroupConfig
OPTIONAL,          -- Need M
   spCellConfig                                     SpCellConfig
OPTIONAL,          -- Need M
   sCellToAddModList                                SEQUENCE (SIZE
(1..maxNrofSCells)) OF SCellConfig         OPTIONAL,   -- Need N
   sCellToReleaseList                               SEQUENCE (SIZE
(1..maxNrofSCells)) OF SCellIndex          OPTIONAL,   -- Need N
   ...,
   [[
   reportUplinkTxDirectCurrent-v1530               ENUMERATED {true}
OPTIONAL           -- Cond BWP-Reconfig
   ]]
}
-- Serving cell specific MAC and PHY parameters for a SpCell:
SpCellConfig ::=                             SEQUENCE {
   servCellIndex                             ServCellIndex
OPTIONAL,          -- Cond SCG
   reconfigurationWithSync                   ReconfigurationWithSync
OPTIONAL,          -- Cond ReconfWithSync
   rlf-TimersAndConstants                    SetupRelease { RLF-TimersAndConstants }
OPTIONAL,          -- Need M
   rlmInSyncOutOfSyncThreshold               ENUMERATED {n1}
OPTIONAL,          -- Need S
   spCellConfigDedicated                     ServingCellConfig
OPTIONAL,          -- Need M
   ...
}
ReconfirationWithSync ::=             SEQUENCE {
   spCellConfigCommon                          ServingCellConfigCommon
OPTIONAL,          -- Need M
   newUE-Identity                            RNTI-Value
   t304                                        ENUMERATED {ms50, ms100, ms150,
ms200, ms500, ms1000, ms2000, ms10000},
   rach-ConfigDedicated                      CHOICE {
      uplink                                      RACH-ConfigDedicated,
      supplementaryUplink                         RACH-ConfigDedicated
   }
OPTIONAL           -- Need N
   ...,
   [[
   smtc                                        SSB-MTC
OPTIONAL           -- Need S
   ]]
}
SCellConfig ::=                              SEQUENCE {
   sCellIndex                                SCellIndex,
   sCellConfigCommon                           ServingCellConfigCommon
OPTIONAL,           -- Cond SCellAdd
   sCellConfigDedicated                      ServingCellConfig
OPTIONAL,          -- Cond SCellAddMod
   ...,
   [[
   smtc                                        SSB-MTC
OPTIONAL            -- Need S
   ]]
}
CHOConditionList SEQUENCE (SIZE (1..maxCHOConditionList)) OF CHOCondition
}
OPTIONAL,            --NEED N
CHOCondition                                            SEQUENCE {
     eventTriggered                                 EventTriggerConfigCHO,
        ...,
}
EventTriggerConfigCHO::=                          SEQUENCE {
   eventId                                          CHOICE {
      eventA1                                           SEQUENCE {
                  a1-Threshold                           MeasTriggerQuantity,
                  a1-LeavingOffset                  MeasTriggerQuantityOffset
     OPTIONAL,
     reportOnLeave                                      BOOLEAN
                    OPTIONAL,
      },
      eventA2                                           SEQUENCE {
                  a2-Threshold                           MeasTriggerQuantity,
                  a2-LeavingOffset              MeasTriggerQuantityOffset
```

-continued

```
        OPTIONAL,
        reportOnLeave                               BOOLEAN
        OPTIONAL,
         },
        eventA3                                         SEQUENCE {
                      a3-Offset
MeasTriggerQuantityOffset,
                      a3-LeavingOffset                MeasTriggerQuantityOffset
        OPTIONAL,
        reportOnLeave                                 BOOLEAN
        OPTIONAL,
      },
         eventA4                                        SEQUENCE {
                      a4-Threshold                        MeasTriggerQuantity,
                      a4-LeavingOffset                MeasTriggerQuantityOffset
                        OPTIONAL,
        reportOnLeave                                 BOOLEAN
        OPTIONAL,
         },
         eventA5                                        SEQUENCE {
                      a5-Threshold1                       MeasTriggerQuantity,
                      a5-Threshold2                       MeasTriggerQuantity,
                      a5-LeavingOffset1               MeasTriggerQuantityOffset
        OPTIONAL,
                      a5-LeavingOffset2               MeasTriggerQuanittyOffset
        OPTIONAL,
        reportOnLeave                                  BOOLEAN
                        OPTIONAL,
        },
         eventA6                                        SEQUENCE {
                      a6-Offset
MeasTriggerQuantityOffset,
                      a6-LeavingOffset                MeasTriggerQuantityOffset
                        OPTIONAL,
        reportOnLeave                                 BOOLEAN
        OPTIONAL,
        },
         ...
     },
}
-- TAG-RRCRECONFIGURATION-STOP
-- ASN1STOP
```

Listing 14 (end)

In one example implementation, the system 30(44) of the embodiment and mode of FIG. 44 also includes a mechanism of provisioning of the security configuration, such as, for example, the SK Counter, disclosed in the embodiment and mode of FIG. 37 and FIG. 43, may be used for a candidate PSCell. That is, the MN RRCReconfiguration message 138(44) may comprise an information element corresponding to sk-Counter to be applied to the conditional PSCell addition/modification configuration included in the encapsulated SN RRCReconfiguration message. The wireless terminal 26 that receives the MN RRCReconfiguration message may store the received SK Counter in security key-utilizing counter field 148 of conditional secondary cell configuration memory 140(44), and compute $K_{SN}$ for the candidate PSCell as disclosed, for example, in FIG. 43 and descriptions herein thereof, before or upon executing the configured PSCell addition/modification.

Figure 47:
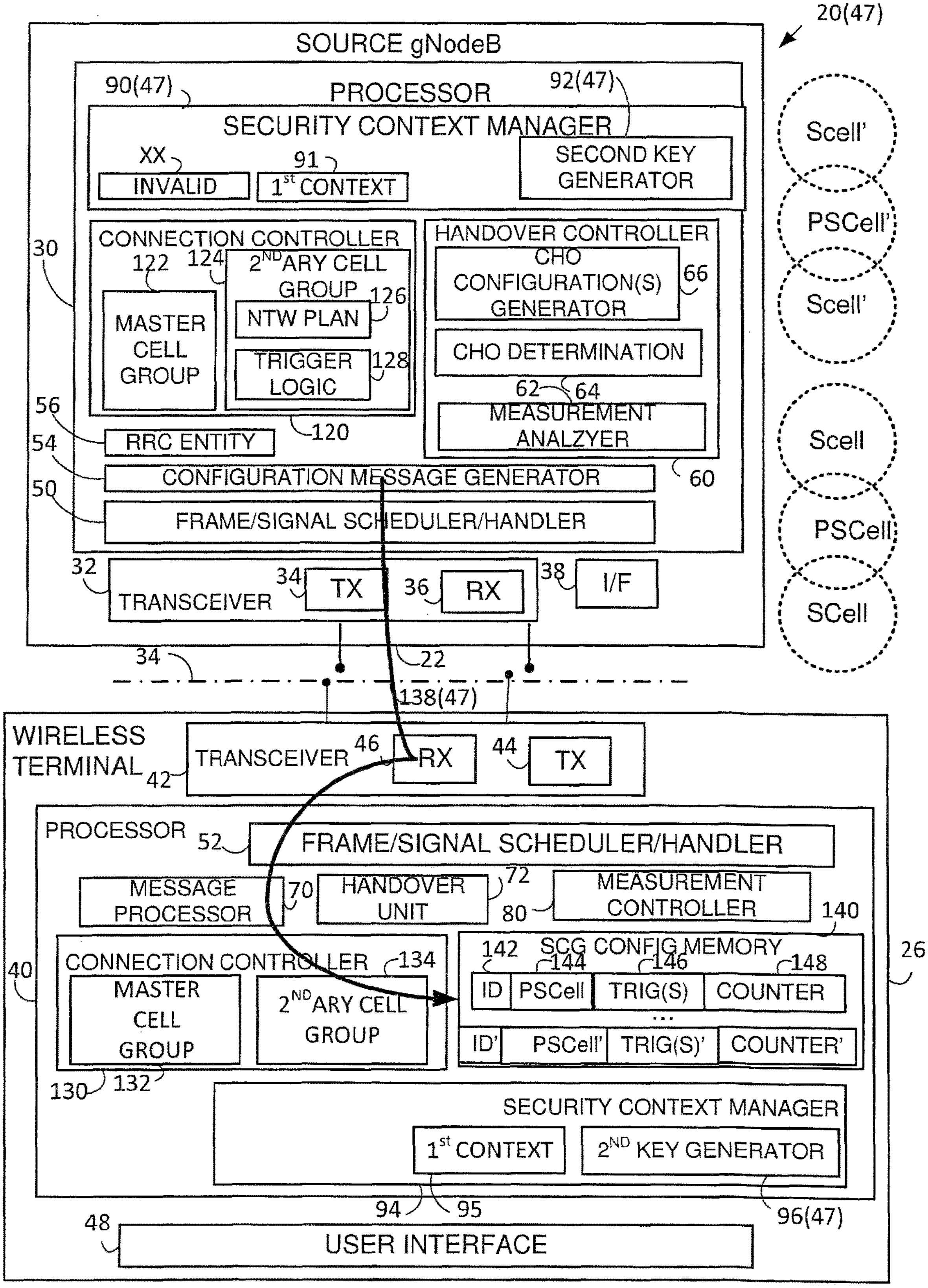
FIG. 47 is a schematic view of an example communications system comprising a source gNodeB which provides a wireless terminal with multiple conditional secondary cell group (SCG) configurations.

8: Configuration For Conditional PSCell Addition/Modification For Multiple Candidate PSCells FIG. 47 shows an example embodiment and mode wherein a wireless terminal 26 may be configured with multiple candidate PSCells for conditional PSCell addition/modification. For sake of simplified illustration, FIG. 47 shows two secondary cell groups (SCGs), a first secondary cell group (SCG) comprising unprimed PSCell and two unprimed Scells, and a second secondary cell group (SCG) comprising primed PSCell and two unprimed Scells. In one example implementation of the FIG. 47 embodiment and mode, each candidate PSCell configuration may be associated with one or more designated triggering conditions. In another example implementation of the FIG. 47 embodiment and mode, one triggering condition may be shared by all or some of the multiple candidate PSCells, e.g., by both the primed and unprimed PSCells. When configured, the wireless terminal 26 may evaluate the triggering condition(s) and perform a PSCell addition/modification, as disclosed in the FIG. 44 embodiment and mode, for the PSCell whose triggering condition(s) is met.

FIG. 47 shows system 20(47) as comprising source gNodeB 22, wireless terminal 26, and multiple secondary cell groups (SCG). In the example embodiment and mode of FIG. 47, the source gNodeB 22 serves as the Master node (MN), and thus may also be referred to as Master gNodeB 22. The Master gNodeB 22 with its node processor 30 and wireless terminal 26 with its terminal processor 40 of FIG. 47 are similar to those of FIG. 6, FIG. 11, FIG. 15, FIG. 19, FIG. 28, FIG. 37, and FIG. 44, with like units and functionalities having like reference numbers. As shown in FIG. 47, the Master gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50; message generator 54; RRC state machine 56; handover controller 60; security context manager 90(47). As in previous example embodiment and modes, the handover controller 60 may comprise measurement analyzer 62, conditional handover (CHO) determination unit 64, and conditional handover configuration information generator 66. In the FIG. 47 embodiment and mode, the message generator 54 may also be known as conditional configuration message generator 54 since it generates a configuration message that includes configuration information for conditional handover to the SCG for one or more cells of one of the multiple secondary cell groups (SCG) to which wireless terminal 26 may belong or have access.

In serving as the master node, gNodeB 22 may control connectivity of wireless terminals served thereby, including wireless terminal 26. For this reason the node processor 30 of gNodeB 22 is shown as comprising master node connectivity controller 120. The master node connectivity controller 120 may execute an instance of a connectivity control logic, program or a connective control routine for each wireless terminal 26 served thereby. When providing dual connectivity (DC) such as that illustrated by way of example in FIG. 38, for example, for each wireless terminal 26 the instance of the connectivity control program may include master cell group connectivity logic 122 and secondary cell group connectivity control logic 124. Since certain aspects of the technology disclosed herein concern the secondary cell group (SCG), FIG. 47 further shows that the secondary cell group connectivity control logic 124 may comprise, or have access to, network plan or network topological information 126. The network plan or network topological information 126 may comprise a data base of nodes that may be eligible for inclusion, or actually be included in, the secondary cell group(s) (SCG) to which wireless terminal 26 has access. The secondary cell group connectivity control logic 124 may also comprise conditional handover trigger logic 128. The conditional handover trigger logic 128 may comprise intelligence for generating the conditions for handover to the SCG, e.g., the triggering criteria, to one or more secondary cells included in the multiple secondary cell groups (SCG) for the wireless terminal 26. Such triggering conditions may be the same or different for different cells included in the multiple secondary cell groups (SCG).

The security context manager 90(47) of the Master gNodeB 22 comprises first security context generator 91 and second key generator 92(47) which derives a second key for establishing a second security context and thus one or more security keys used for the radio connection with one or more secondary cells included in the conditional secondary cell configuration.

As in the preceding example embodiments and modes, the wireless terminal 26 of the example embodiment and mode of FIG. 47 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 47, it should be understood that, in like manner with FIG. 15, FIG. 19, FIG. 28, FIG. 37, and FIG. 44, measurement controller 80 may in turn comprise a measurement initiation unit, a measurement results unit, and a measurement report control unit. In addition, the terminal processor 40 of FIG. 47 is shown as terminal security context manager 94(47).

The wireless terminal 26 comprises connection controller 130, which may be realized or comprised by terminal processor 40. Since the wireless terminal 26 of FIG. 47 may be capable of operating with dual connectivity, the connection controller 130 as shown as comprising master cell group connectivity logic 132 and secondary cell group connectivity control logic 134. As explained previously, each of the multiple secondary cell groups (SCGs) may comprise a PSCell and other cells, e.g., SCells. As an example aspect of the technology disclosed herein, the Master gNodeB 22 may permit and/or authorize the wireless terminal 26 to perform a conditional handover to the SCG, and the conditional handover to the SCG may involve any one of the cells of the involved secondary cell groups (SCGs). Information pertinent to the conditional handover to the SCG of each of the multiple secondary cell groups (SCGs) may be provided by the Master gNodeB 22 to the wireless terminal 26 in a configuration message 138(47) generated by message generator 54. The configuration message 138(47) may also be referred to as the re-configuration message 138(47), or the conditional configuration message. The Master gNodeB 22 provides the configuration message 138(47) so that the secondary cell group connectivity control logic 134 may direct the handover unit 72 to perform the conditional handover to the SCG upon occurrence of condition(s) specified in the configuration message 138(47). Such information may herein also be known as conditional configuration information. The configuration information for each of the multiple secondary cell groups (SCGs), and for each cell of each secondary cell group (SCG), may be stored in conditional secondary cell configuration memory 140(47), to which the secondary cell group connectivity control logic 134 has access. For one or more cells of the multiple secondary cell groups (SCG) to which wireless terminal 26 belongs, the conditional secondary cell configuration memory 140(47) comprises fields or records which are shown in FIG. 44 as including configuration identification field 142; PSCell field 144, triggering condition field 146, and, an optional security key-utilizing counter field 148. FIG. 47 particularly shows that conditional secondary cell configuration memory 140(47) comprises fields or records associated with the unprimed secondary cell group (SCG) and fields or records associated with the primed secondary cell group (SCG), and thus accommodates storage of multiple secondary cell group (SCG) configurations.

The wireless terminal 26 further comprises terminal security context manager 94. The terminal security context manager 94 in turn comprises terminal first context generator 95 and terminal second key generator 96(47). The terminal second key generator 96(47) derives one or more security keys used for the radio connection with one or more secondary cells included in the conditional secondary cell configuration.

The Master gNodeB 22 thus comprises message generator 54 that may generate and transmit to the wireless terminal 26 the configuration message 138(47) that may include one or multiples SCG configurations with a PSCell configuration. The SCG configuration is preferably stored in conditional secondary cell configuration memory 140(47). The secondary cell group connectivity control logic 134 of the UE that receives the configuration message may start synchronization with the configured PSCell, and then establish radio connection/bearers with the SCells in the SCG after the wireless terminal 26 determines that the triggering condition associated with the SCG configuration is satisfied.

Figure 48:
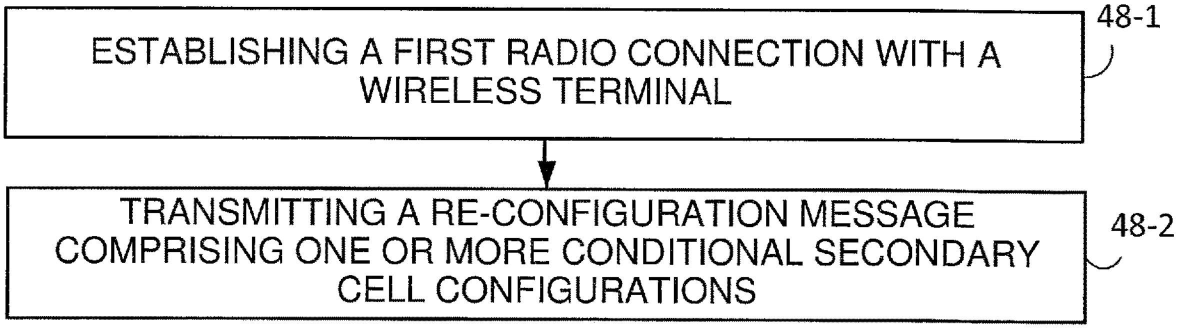
FIG. 48 is a flowchart which shows representative, generic, steps or acts performed by a Master gNodeB of FIG. 47.

FIG. 48 is a flowchart which shows representative, generic, steps or acts performed by Master gNodeB 22 of FIG. 47. Act 48-1 comprises establishing a first radio connection with a wireless terminal, e.g., with wireless terminal 26. Act 48-2 comprises transmitting a re-configuration message comprising one or more conditional secondary cell configurations. An example of the re-configuration message, also known as "configuration message", is configuration message 138(47) shown in FIG. 47. As previously explained, the configuration message 138(47) may be generated by message generator 54 and transmitted via transmitter circuitry 34 to wireless terminal 26. The configuration message 138(47) is received by receiver circuitry 46 of wireless terminal 26, processed by message processor 70, which stores contents of the configuration message 138(47) in conditional secondary cell configuration memory 140 (47). The configuration message 138(47) may include configurations for one or more of the multiple secondary cell groups (SCGs), each of which may comprise an identity of a candidate primary secondary cell (stored in PSCell field 144) which may be used for Dual-Connectivity (DC). Moreover, each of the one or more conditional secondary cell configurations may be associated with at least one triggering condition, stored in triggering condition field 146.

Each of the one or more conditional secondary cell configurations included in the configuration message 138 (47) is configured to instruct the wireless terminal 26 to establish a second radio connection with a secondary access node serving the candidate primary secondary cell included in the each of the one or more conditional secondary cell configurations in a case that the at least one triggering condition associated with the each of the one or more conditional secondary cell configurations is met.

Figure 49:
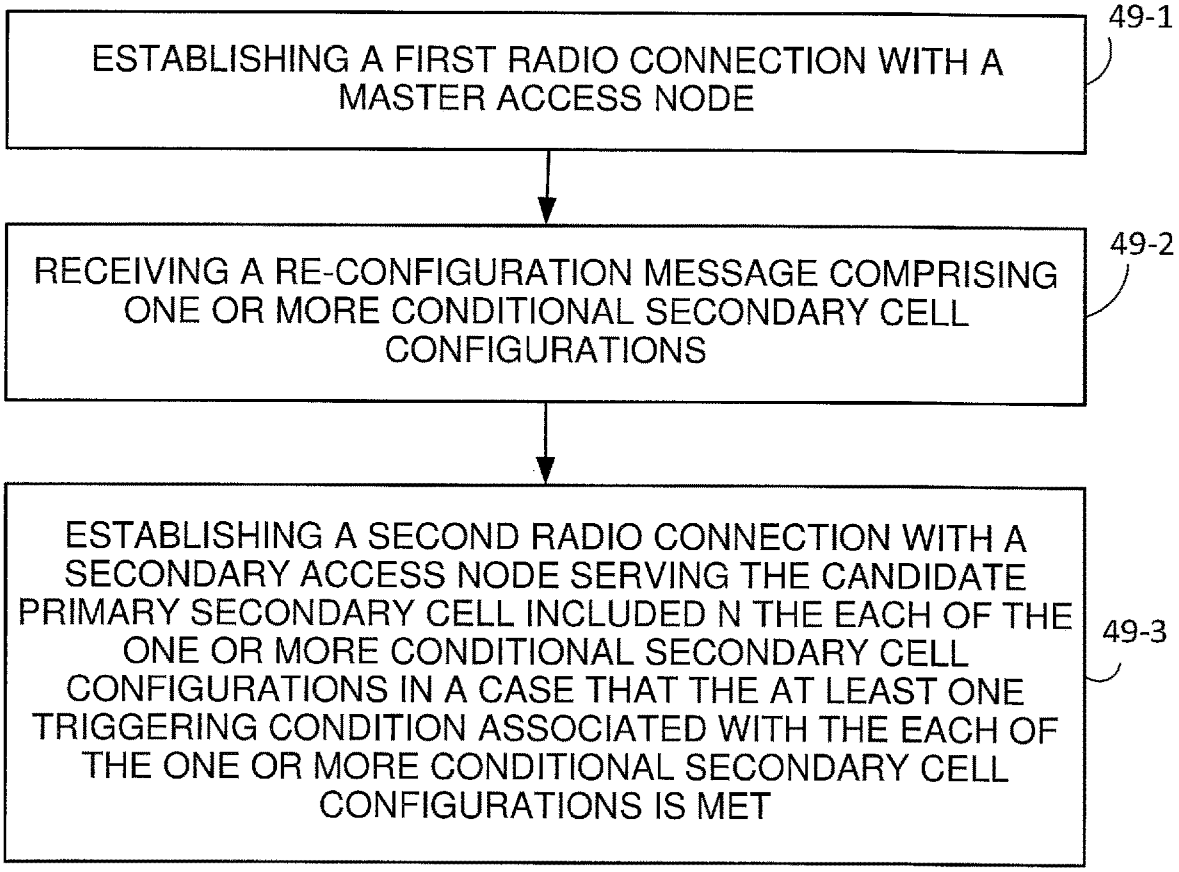
FIG. 49 is a flowchart which shows representative, generic, steps or acts performed by a wireless terminal of FIG. 47.

FIG. 49 is a flowchart which shows representative, generic, steps or acts performed by wireless terminal 26 of FIG. 47. Act 49-1 comprises establishing a first radio connection with a master access node, e.g., with Master gNodeB 22.

Act 49-2 comprises receiving a re-configuration message comprising one or more conditional secondary cell configurations. Each of the one or more conditional secondary cell configurations may comprise an identity of a candidate primary secondary cell (stored in PSCell field 144) which may be used for Dual-Connectivity (DC). Each of the one or more conditional secondary cell configurations may be associated with at least one triggering condition (stored in triggering condition field 146). Each of the one or more conditional secondary cell configurations may be configured to instruct the wireless terminal to establish a second radio connection with a secondary access node serving the candidate primary secondary cell included in the each of the one or more conditional secondary cell configurations in a case that the at least one triggering condition associated with the each of the one or more conditional secondary cell configurations is met. Act 49-3 thus comprises the wireless terminal 26 establishing a second radio connection with a secondary access node serving the candidate primary secondary cell included in one of the one or more conditional secondary cell configurations in a case that the at least one triggering condition associated with the each of the one or more conditional secondary cell configurations is met.

As understood from the foregoing, the configuration message 138(47) of the embodiment and mode of FIG. 47 pertains to conditional configuration of one or multiple secondary cell groups (SCGs). The example circumstances of generation of the configuration message 138(47), as well as examples of how the configuration message 138(47) may be structured or encapsulated in other messages, are also understood from the preceding example embodiment and mode of FIG. 37. For example, FIG. 41 and Table 1 provide an example circumstance/procedure for adding a secondary node, while FIG. 44 and Table 2 provide an example circumstance/procedure for modifying the current SCG configuration within the same SN.

Thus, one or more conditional secondary cell configurations may be included in an addition/modification list, e.g., an add/mod list, with the addition/modification list indicating whether the each of the one or more conditional secondary cell configurations in the addition/modification list is a new conditional secondary cell configuration or an updated configuration of a conditional secondary cell configuration stored in the wireless terminal. In addition, an identifier(s) of one or more conditional secondary cell configurations previously configured to the wireless terminal may be included in a release list, with the release list indicating that the conditional secondary cell configuration(s) identified by the identifier(s) in the release list needs to be released. Thus, the configuration message 138(47) may be formatted in a manner to express a "list" of conditional secondary cell configurations, with the nature of the list, e.g., addition/modification or release, being specified in the configuration message 138(47) as well, or by another message.

Listing 15 shows an example format of the configuration for conditional PSCell addition/modification with multiple candidate PSCells, wherein the information element condPSCellAddModList comprises a list of conditional PSCell configurations CondPSCellConfig, whereas condPSCellReleaseList may be used by the MN to instruct the UE to release some of the conditional PSCell configurations. The information element condPSCellConfigId may be used to identify a specific CondPSCellConfig. If the current UE configuration (i.e. the configuration for conditional PSCell addition/modification saved in the UE) includes CondPSCellConfig with the given condPSCellConfigId in condPSCellAddModList, the UE may modify the current UE configuration with the received CondPSCellConfig, otherwise the UE may add the received CondPSCellConfig to the current UE configuration. If the current UE configuration includes CondPSCellConfig with the given condPSCellConfigId in condPS-CellReleaseList, the UE may release the CondPSCellConfig from the current UE configuration.

Listing 15 (Start)

```
-- ASN1START
-- TAG-RRCRECONFIGURATION-START
RRCReconfiguration ::=                SEQUENCE {
   rrc-TransactionIndentifier           RRC-TransactionIdentifier
   criticalExtensions                     CHOICE {
      rrcReconfiguration                         RRCReconfiguration-IEs,
      criticalExtensionsFuture               SEQUENCE { }
   }
}
RRCreconfiguration-IEs ::=            SEQUENCE {
   radioBearerConfig                              RadioBearerConfig
OPTIONAL, -- Need M
   secondaryCellGroup                           OCTET STRING (CONTAINING
CellGroupConfig)                                    OPTIONAL, -- Need M
```

-continued

```
  measConfig                                    MeasConfig
OPTIONAL, -- Need M
  lateNonCriticalExtension                  OCTET STRING
OPTIONAL,
  nonCriticalExtension                        RRCReconfiguration-v1530-IEs
OPTIONAL
}
RRCReconfiguration-v1530-IEs ::=              SEQUENCE {
  masterCellGroup                               OCTET STRING (CONTAINING
CellGroupCong)                                     OPTIONAL, -- Need M
  fullConfig                                    ENUMERATED {true}
OPTIONAL, -- Cond FullConfig
  dedicatedNAS-MessageList                      SEQUENCE (SIZE(1..maxDRB)) OF
DedicatedNAS-Message                          OPTIONAL, -- Cond nonHO
  masterKeyUpdate                                 MasterKeyUpdate
OPTIONAL, -- Cond MasterKeyChange
  dedicatedSIB1-Delivery                        OCTET STRING (CONTAINING
SIB1)                                                OPTIONAL, -- Need N
  dedicatedSystemInformationDelivery          OCTET STRING (CONTAINING
Systeminformation)                                 OPTIONAL, -- Need N
  otherConfig                                   OtherConfig
OPTIONAL, -- Need M
  nonCriticalExtension                        RRCReconfiguration-v1540-IEs
OPTIONAL
}
RRCReconfiguration-v1540-IE ::=            SEQUENCE {
  otherConfig-1540                              OtherConfig-v1540
OPTIONAL, -- Need M
  nonCriticalExtension                        RRCReconfiguration-v1560-IEs
OPTIONAL
}
RRCReconfiguration-v1560-IEs ::=              SEQUENCE {
  mrdc-SecondaryCellGroupConfig                     SetupRelease
{ MRDC-SecondaryCellGroupConfig }                      OPTIONAL,   -- Need
M
  radioBearerConfig2                                OCTET STRING
(CONTAINING RadioBearerConfig)                            OPTIONAL,   -- Need
M
  sk-Counter                                         SK-Counter
OPTIONAL,   -- Need N
  nonCriticalExtension                             RRCReconfiguration-v1600-IEs
OPTIONAL
OPTIONAL
}
RRCReconfiguration-v1600-IEs ::=               SEQUENCE {
  condPSCellAddModList                        SEQUENCE {SIZE
(1..maxCondPSCellConfigs)} OF CondPSCellConfig
OPTIONAL,   -- Need N
  condPSCellReleaseList                       SEQUENCE {SIZE (1..
maxCondPSCellConfigs)} OF CondPSCellConfigId
OPTIONAL,   -- Need N
  nonCriticalExtension                             SEQUENCE { }
OPTIONAL
}
CondPSCellConfig ::=                          SEQUENCE {
  condPSCellConfigId                        CondPSCellConfigId,
  secondaryCellGroup                        OCTET STRING (CONTAINING
CellGroupConfig)   OPTIONAL,        -- Need M
  choConditionList                         CHOConditionList       OPTIONAL,
--Need M
  sk-Counter                                SK-Counter           OPTIONAL, -- Need N
}
CondPSCellConfigId ::=                     INTEGER (0..maxCondPSCellConfigs)
-- ASN1START
-- TAG-CELLGROUPCONFIG-START
```

Listing 15 (end)

It was mentioned above that, in one example implementation of the FIG. 47 embodiment and mode, each candidate PSCell configuration (e.g. each SCG configuration with a candidate PSCell) may be associated with one or more designated triggering conditions. Such is shown in the conditional secondary cell configuration memory 140(147) of FIG. 47, wherein the unprimed PSCell is associated with an unprimed trigger value in its associated triggering condition field 146, and the primed PSCell is associated with a primed trigger value in its associated triggering condition field 146. However, in another example implementation of the FIG. 47 embodiment and mode, one triggering condition may be shared by all or some of the multiple candidate PSCells, e.g., by both the primed and unprimed PSCells.

It should be noted that CondPSCellConfig may comprise a SK Counter, sk-Counter, understood with reference to FIG. 43, for example, which may be associated with one candidate PSCell. This SK counter may be used in a case that Master gNodeB 22 decides to differentiate the value of SK counters among multiple candidate PSCells. In such a case, the SK Counter in the information element RRCReconfiguration-v1560-IEs may be omitted or ignored.

9: Releasing Conditional PSCell Addition/Modification Configurations Based on Security Configuration The example embodiments and modes of FIG. 37, FIG. 44, and FIG. 47 disclose techniques wherein a security key for a secondary node, SN, may be generated and used for candidate PSCell(s). In those techniques a currently active access stratum (AS) key, $K_{gNB}$, is used as an input to a key derivation function (KDF) for deriving a secondary key, e.g., key $K_{SN}$, as illustrated by way of example in FIG. 43. In actual use, the secondary key $K_{SN}$ may need to be updated in a case that the currently active key K gNB gets updated. As a consequence, a conditional PSCell addition/modification configuration which is always tied a secondary key $K_{SN}$ which is derived from the current key $K_{gNB}$, may become invalid upon a $K_{gNB}$ update.

The fifth section hereof, "RELEASING CHO CONFIGURATIONS BASED ON SECURITY CONFIGURATION", discloses that the cases where $K_{gNB}$ gets updated, as follows:

Re-establishment after RLF

Inter-gNB handover

Key change on the fly

Intra-gNB handover

According to one example aspect of the technology disclosed herein, should the currently active access stratum (AS) key $K_{gNB}$ be updated during any of the cases listed above or any other case, the wireless terminal 26 may release the conditional PSCell addition/modification configuration(s).

According to one example implementation of this example aspect, the Master gNodeB 22 that has configured the conditional PSCell addition/modification may coordinate with the secondary node(s), SN(s), to cancel the PSCell addition/modification configuration(s).

According to another example implementation of this aspect, the wireless terminal 26 may suspend (e.g. inactivate) the conditional PSCell addition/modification configuration(s). In this "suspension" implementation, the Master gNodeB 22 may coordinate with the secondary node(s), SN(s), to update $K_{SN}$ while preserving other configuration parameters, and then send to the wireless terminal 26 the MN RRCReconfiguration message with a new SK Counter so that the wireless terminal 26 may derive the updated $K_{SN}$ and resume the conditional PSCell addition/modification configuration(s). The wireless terminal 26 may keep (e.g. not release) the suspended conditional PSCell addition/modification configuration(s), and may release the suspended conditional PSCell addition/modification configuration(s) when explicitly instructed by the Master gNodeB 22 using a signaling message such as, e.g. RRCReconfiguration comprising the aforementioned release list, or when a timer expires. The timer may be pre-configured or configured by the Master gNodeB 22. It should be noted that the mode and operation of suspension for PSCell addition/modification configurations may be also applied to the release of CHO configuration(s) disclosed in the fifth section. Accordingly, after the CHO configuration(s) is suspended (inactivated), the wireless terminal may keep the CHO configuration(s) until explicitly instructed by the source gNB to release the CHO configuration(s) or until a timer expires.

Figure 50:
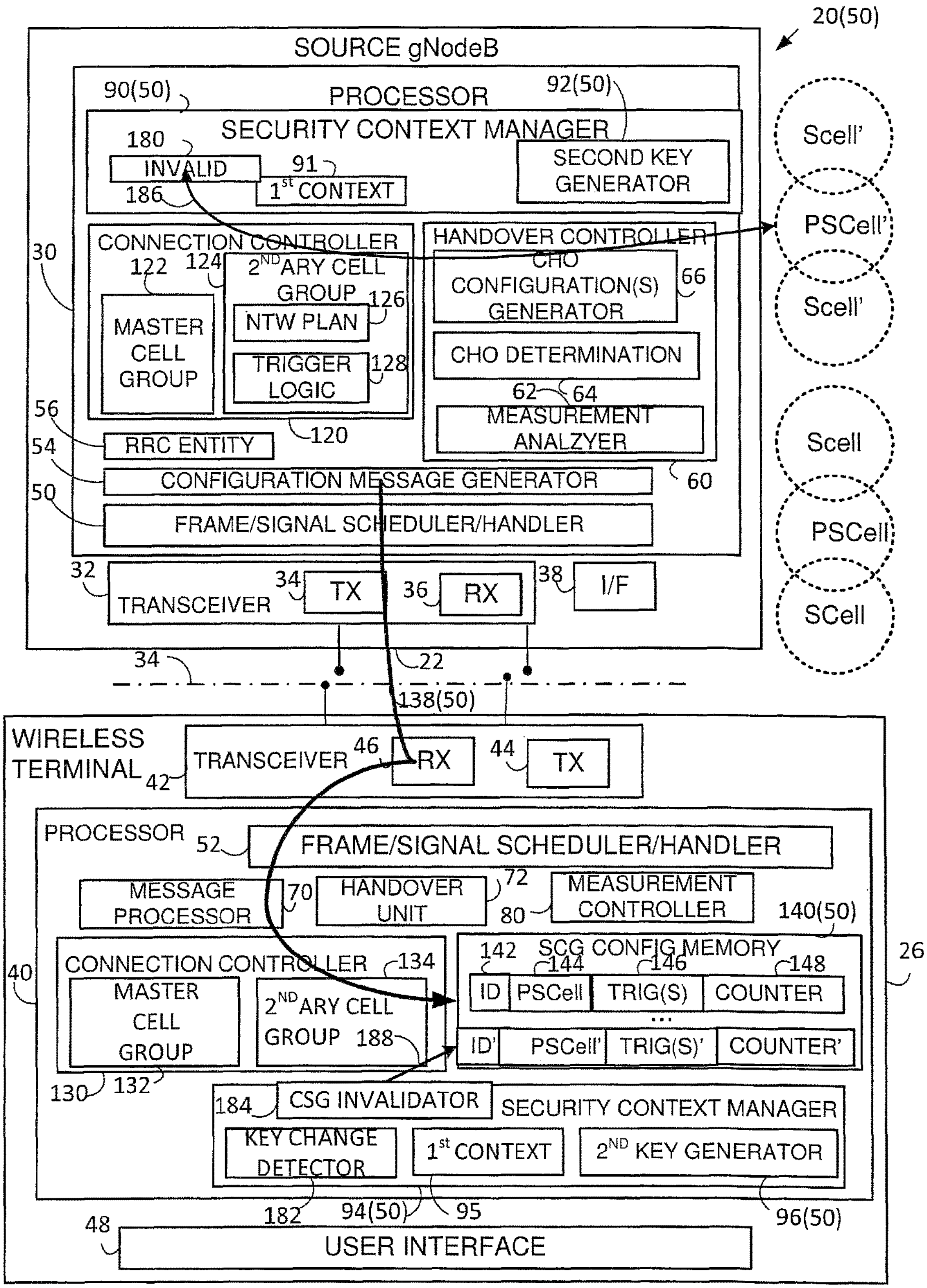
FIG. 50 is a schematic view of an example communications system wherein one or more conditional secondary cell configurations are invalidated upon a change of a first master key.

FIG. 50 shows system 20(50) wherein one or more conditional secondary cell configurations are invalidated upon a change of a first master key. FIG. 50 shows system 20(50) as comprising source gNodeB 22, wireless terminal 26, and multiple secondary cell groups (SCG). In the example embodiment and mode of FIG. 50, the source gNodeB 22 serves as the Master node (MN), and thus may also be referred to as Master gNodeB 22. The Master gNodeB 22 with its node processor 30 and wireless terminal 26 with its terminal processor 40 of FIG. 50 are similar to those of FIG. 6, FIG. 11, FIG. 15, FIG. 19, FIG. 28, FIG. 37, FIG. 44, and FIG. 47, with like units and functionalities having like reference numbers. As shown in FIG. 50, the Master gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50; message generator 54; RRC state machine 56; handover controller 60; security context manager 90(50). As in previous example embodiment and modes, the handover controller 60 may comprise measurement analyzer 62, conditional handover (CHO) determination unit 64, and conditional handover configuration information generator 66. In the FIG. 50 embodiment and mode, the message generator 54 may also be known as conditional configuration message generator 54 since it generates a configuration message that includes configuration information for conditional handover to the SCG for one or more cells of one of the multiple secondary cell groups (SCG) to which wireless terminal 26 may belong or have access.

In serving as the master node, gNodeB 22 may control connectivity of wireless terminals served thereby, including wireless terminal 26. For this reason the node processor 30 of gNodeB 22 is shown as comprising master node connectivity controller 120. The master node connectivity controller 120 may execute an instance of a connectivity control logic, program or a connective control routine for each wireless terminal 26 served thereby. When providing dual connectivity (DC) such as that illustrated by way of example in FIG. 38, for example, for each wireless terminal 26 the instance of the connectivity control program may include master cell group connectivity logic 122 and secondary cell group connectivity control logic 124. Since certain aspects of the technology disclosed herein concern the secondary cell group (SCG), FIG. 50 further shows that the secondary cell group connectivity control logic 124 may comprise, or have access to, network plan or network topological information 126. The network plan or network topological information 126 may comprise a data base of nodes that may be eligible for inclusion, or actually be included in, the secondary cell group(s) (SCG) to which wireless terminal 26 has access. The secondary cell group connectivity control logic 124 may also comprise conditional handover trigger logic 128. The conditional handover trigger logic 128 may comprise intelligence for generating the conditions for handover to the SCG, e.g., the triggering criteria, to one or more secondary cells included in the multiple secondary cell groups (SCG) for the wireless terminal 26. Such triggering conditions may be the same or different for different cells included in the multiple secondary cell groups (SCG).

The security context manager 90(50) of the Master gNodeB 22 comprises first security context generator 91 and second key generator 92(50) which derives a second key for establishing a second security context and thus one or more security keys used for the radio connection with one or more secondary cells included in the conditional secondary cell configuration. As shown in FIG. 50, security context manager 90(50) comprises the first security context generator 91 and second key generator 92(50). The second key generator 92(50) may derive the second key for a secondary node in the manner understood from FIG. 43. For the FIG. 50 example embodiment and mode security context manager 90(50) further comprises secondary cell group (SCG) configuration invalidator 180, e.g., SCG invalidator 180. As described used herein, "invalidation" encompasses both "cancellation" and "suspension" of a secondary cell group (SCG) configuration.

As in the preceding example embodiments and modes, the wireless terminal 26 of the example embodiment and mode of FIG. 50 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 50, it should be understood that, in like manner with FIG. 15, FIG. 19, FIG. 28, FIG. 37, FIG. 44, and FIG. 47, measurement controller 80 may in turn comprise a measurement initiation unit, a measurement results unit, and a measurement report control unit. In addition, the terminal processor 40 of FIG. 50 is shown as terminal security context manager 94(50).

The wireless terminal 26 comprises connection controller 130, which may be realized or comprised by terminal processor 40. Since the wireless terminal 26 of FIG. 50 may be capable of operating with dual connectivity, the connection controller 130 as shown as comprising master cell group connectivity logic 132 and secondary cell group connectivity control logic 134. As explained previously, each of the multiple secondary cell groups (SCGs) may comprise a PSCell and other cells, e.g., SCells. As an example aspect of the technology disclosed herein, the Master gNodeB 22 may permit and/or authorize the wireless terminal 26 to perform a conditional handover to the SCG, and the conditional handover to the SCG may involve any one of the cells of the involved secondary cell groups (SCGs). Information pertinent to the conditional handover to the SCG of each of the multiple secondary cell groups (SCGs) may be provided by the Master gNodeB 22 to the wireless terminal 26 in a configuration message 138(50) generated by message generator 54. The configuration message 138(50) may also be referred to as the re-configuration message 138(50), or the conditional configuration message. The Master gNodeB 22 provides the configuration message 138(50) so that the secondary cell group connectivity control logic 134 may direct the handover unit 72 to perform the conditional handover to the SCG upon occurrence of condition(s) specified in the configuration message 138(50). Such information may herein also be known as conditional configuration information. The configuration information for each of the multiple secondary cell groups (SCGs), and for each cell of each secondary cell group (SCG), may be stored in conditional secondary cell configuration memory 140(50), to which the secondary cell group connectivity control logic 134 has access. For one or more cells of the multiple secondary cell groups (SCG) to which wireless terminal 26 belongs, the conditional secondary cell configuration memory 140(50) comprises fields or records which are shown in FIG. 44 as including configuration identification field 142; PSCell field 144, triggering condition field 146, and, an optional security key-utilizing counter field 148. FIG. 50 particularly shows that conditional secondary cell configuration memory 140(50) comprises fields or records associated with the unprimed secondary cell group (SCG) and fields or records associated with the primed secondary cell group (SCG), and thus accommodates storage of multiple secondary cell group (SCG) configurations.

The wireless terminal 26 further comprises terminal security context manager 94(50). The terminal security context manager 94(50) in turn comprises terminal first context generator 95; terminal second key generator 96(50); key change detector 182; and secondary cell group (SCG) configuration invalidator 184. The terminal second key generator 96(50) derives one or more security keys used for the radio connection with one or more secondary cells included in the conditional secondary cell configuration. The manner of derivation of the second key for a secondary node SN, e.g., key $K_{SN}$, is understood with reference to FIG. 43. As described herein, the key change detector 182 detects a change in the current first master key, e.g., key $K_{gNB}$, and notifies secondary cell group (SCG) configuration invalidator 184. The secondary cell group (SCG) configuration invalidator 184 in turn "invalidates" one or more of the secondary cell group (SCG) configurations in conditional secondary cell configuration memory 140(50) having a secondary key $K_{SN}$ that is derived from the changed master key $K_{gNB}$.

The Master gNodeB 22 thus comprises message generator 54 that may generate and transmit to the wireless terminal 26 the configuration message 138(50) that may include one or multiples SCG configurations with a PSCell configuration. The SCG configuration is preferably stored in conditional secondary cell configuration memory 140(50). The secondary cell group connectivity control logic 134 of the UE that receives the configuration message may start synchronization with the configured PSCell, and then establish radio connection/bearers with the SCells in the SCG after the wireless terminal 26 determines that the triggering condition associated with the SCG configuration is satisfied.

Figure 51:
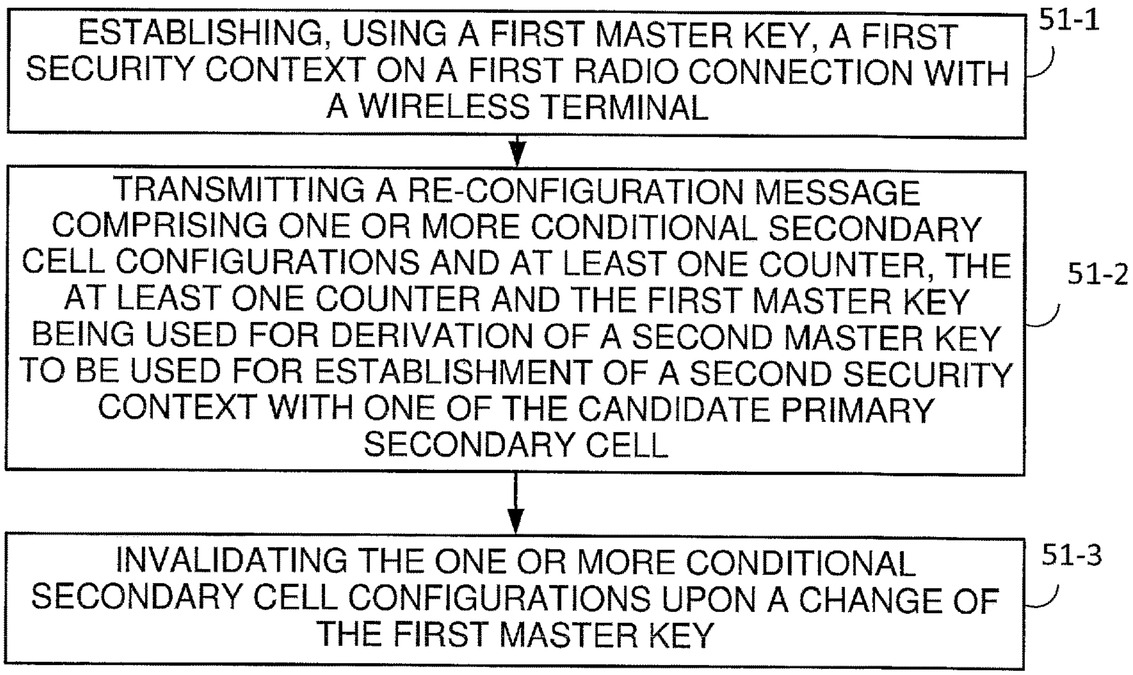
FIG. 51 is a flowchart which shows representative, generic, steps or acts performed by a Master gNodeB of FIG. 50.

FIG. 51 is a flowchart which shows representative, generic, steps or acts performed by Master gNodeB 22 of FIG. 50. Act 51-1 comprises establishing, using a first master key, a first security context on a first radio connection with a wireless terminal. Act 51-2 comprises transmitting a re-configuration message comprising one or more conditional secondary cell configurations and at least one counter to the wireless terminal 26. The re-configuration message may be configuration message 138(50), for example. Each conditional secondary cell configuration may comprise an identity of a candidate primary secondary cell and at least one triggering condition. The candidate secondary cell may be used for Dual-Connectivity (DC). The at least one counter and the first master key are used for derivation of a second master key to be used for establishment of a second security context with one of the candidate primary secondary cells. Act 51-3 comprises invalidating the one or more conditional secondary cell configurations upon a change of the first master key.

In the case of the invalidation of the configuration being a cancellation, act 51-3 may comprise the Master gNodeB 22 coordinating with the secondary node(s), SN(s), to cancel the PSCell addition/modification configuration(s). In the case of the invalidation being a "suspension" of the configuration, the Master gNodeB 22 may coordinate with the secondary node(s), SN(s), to update $K_{SN}$ while preserving other configuration parameters, and then send to the wireless terminal 26 the MN RRCReconfiguration message with a new SK Counter so that the wireless terminal 26 may derive the updated $K_{SN}$ and resume the conditional PSCell addition/modification configuration(s). The invalidation of either the cancellation case or the suspension case may be executed by node processor 30, e.g., processor circuitry of Master gNodeB 22, such as SCG invalidator 180, for example. FIG. 50 shows by arrow 186 an example of SCG invalidator 180 coordinating with a secondary node(s), SN. The coordination between Master gNodeB 22 and such secondary node may be through an appropriate interface not expressly shown in FIG. 50.

Figure 52:
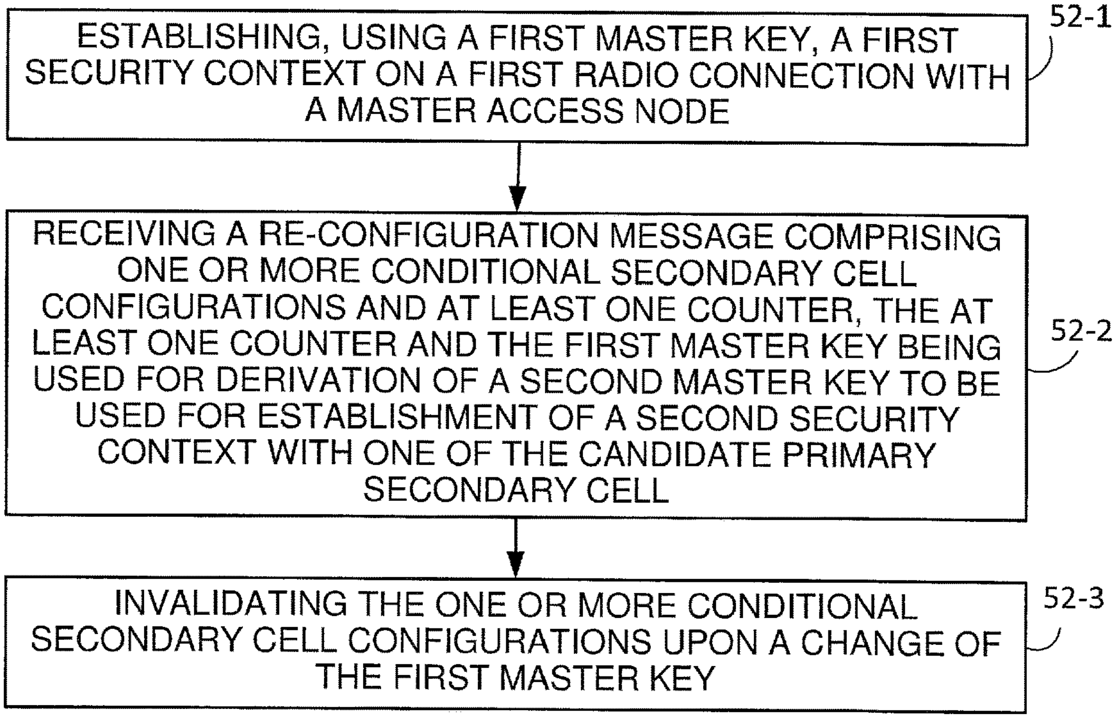
FIG. 52 is a flowchart which shows representative, generic, steps or acts performed by a wireless terminal of FIG. 50.

FIG. 52 is a flowchart which shows representative, generic, steps or acts performed by wireless terminal 26 of FIG. 50. Act 52-1 comprises establishing, using a first master key, a first security context on a first radio connection with a master access node. Act 52-2 comprises receiving a re-configuration message comprising one or more conditional secondary cell configurations and at least one counter. The re-configuration message may be configuration message 138(50), for example. As understood herein, each conditional secondary cell configuration may comprise an identity of a candidate primary secondary cell and at least one triggering condition, and the candidate primary secondary cell may be used for Dual-Connectivity (DC). The at least one counter and the first master key may be used for derivation of a second master key to be used for establishment of a second security context with one of the candidate primary secondary cell. Act 52-3 comprises invalidating the one or more conditional secondary cell configurations upon a change of the first master key. FIG. 50 shows by arrow 188 the secondary cell group (SCG) configuration invalidator 184 invalidating a secondary cell group (SCG) in conditional secondary cell configuration memory 140(50).

Act 52-3 thus subsumes detecting a change of the first master key. As mentioned above, a change of the first master key may occur during a connection re-establishment procedure to recover the first radio connection from a radio link failure (RLF); upon or after a handover of the first radio connection; or upon receiving a message instructing the first master key change.

In the case of the invalidation being a "suspension" of the configuration, as mentioned above the Master gNodeB 22 may coordinate with the secondary node(s), SN(s), to update $K_{SN}$ while preserving other configuration parameters, and then send to the wireless terminal 26 the MN RRCReconfiguration message with a new SK Counter so that the wireless terminal 26 may derive the updated $K_{SN}$ and resume the conditional PSCell addition/modification configuration(s). In the case of a suspension, the wireless terminal 26 may release the suspended conditional PSCell addition/modification configuration(s) when explicitly instructed by the Master gNodeB 22 using a signaling message such as, e.g. RRCReconfiguration, or when a timer expires. The timer may be pre-configured or configured by the Master gNodeB 22.

10: Validity of Conditional Handover Configurations Upon Executing a Handover

Certain embodiments and modes described herein, such as the example embodiment and mode of FIGS. 28-36, for example, may release conditional handover configuration(s), wherein upon/after executing a handover, the wireless terminal or UE may keep the remaining (unused) saved conditional handover configuration(s), and may do so particularly in a case that the executed handover does not change the AS security key(s). The executed handover may be an intra-gNB-CU handover, and may be a conditional or non-conditional handover. In the example embodiment and mode of FIG. 55-FIG. 60 as herein described, an additional condition is introduced to determine whether or not the wireless terminal keeps an unused conditional handover configuration upon executing a handover.

Figure 53:
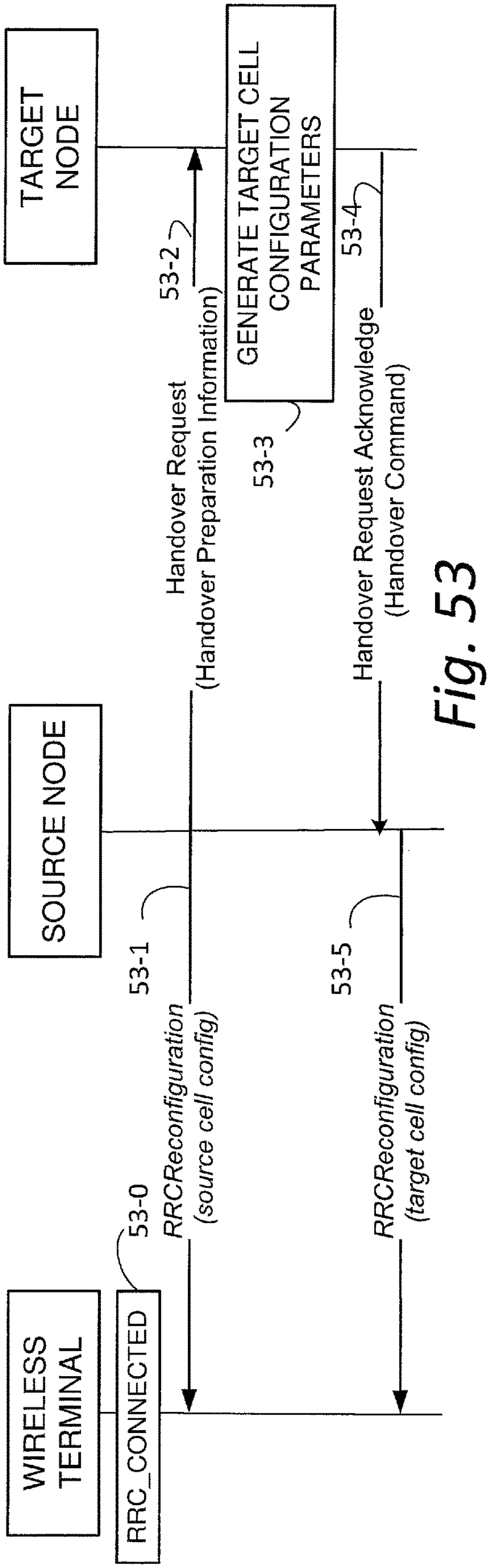
FIG. 53 is a diagrammatic view illustrating messages which may be involved in a handover coordination procedure.

As introduction to the example embodiment and mode of FIG. 55-FIG. 60, "delta signalling" is described for handover configuration purposes. In some instances, a handover command included in the RRCReconfiguration message may be provided with "delta signalling", meaning that only differences between the target cell configuration and the source cell configuration are signalled to the UE. FIG. 53 shows an example scenario of the delta signal used for a handover coordination procedure. In the scenario of FIG. 53, the wireless terminal is in RRC_Connected state, as shown by act 53-0. Before actually initiating the handover coordination procedure, as shown by act 53-1 the source node. e.g., the node for the current serving cell, or PCell, may already have transmitted an RRCReconfiguration message, the first RRCReconfiguration message, to provide the source cell configuration. As act 53-2 the source node may initiate the handover coordination procedure by sending a Handover Request message to the target node, e.g., the node for the target cell. The Handover Request message of act 53-2 may include Handover Preparation Information comprising the first RRC-Configuration message, or set of source cell configuration parameters, encapsulated in an information element. As act 53-3 the target node may generate a set of target cell configuration parameters to be used by the wireless terminal upon and after executing the handover to the target cell. In a case that the delta signaling is used, the target node may generate an RRCReconfiguration message, second RRCReconfiguration message, comprising the differences between the set of target cell configuration parameters and the set of source cell configuration parameters. Otherwise the second RRCReconfiguration message may reflect all of the target cell configuration parameters. The second RRCReconfiguration message may be encapsulated in an information element, such as Handover Command, and as act 53-4 may be sent to the source node via a Handover Request Acknowledge message, or a Handover Command. The source node, upon receiving the Handover Request Acknowledge message of act 53-4, may as act 54-5 transparently forward the second RRCReconfiguration message to the wireless terminal. When receiving the second RRCReconfiguration message, the wireless terminal, in a case that the second RRCReconfiguration message includes the delta signalling of the target node configuration, may generate the complete target cell configuration by applying the differences to the current source cell configuration. It should be noted that for a non-conditional handover the UE may have to generate the complete target cell configuration immediately after receiving the second RRCReconfiguration message. But for a conditional handover the UE may either immediately generate the complete target cell configuration, or wait to generate the complete target cell configuration until the wireless terminal executes the conditional handover, e.g., when a triggering condition is met.

In one configuration, to generate candidate target cell configuration(s), the UE may keep old source cell configuration(s) on which received delta signalling(s) is to be applied. Then upon executing a conditional handover, the wireless terminal may generate the target cell configuration by using corresponding old source cell configuration and associated delta signalling.

In another configuration, upon receiving the second RRCReconfiguration message with the delta signaling, the wireless terminal may immediately generate the complete candidate target cell configuration and store the complete candidate target cell configuration for future use.

Figure 54:
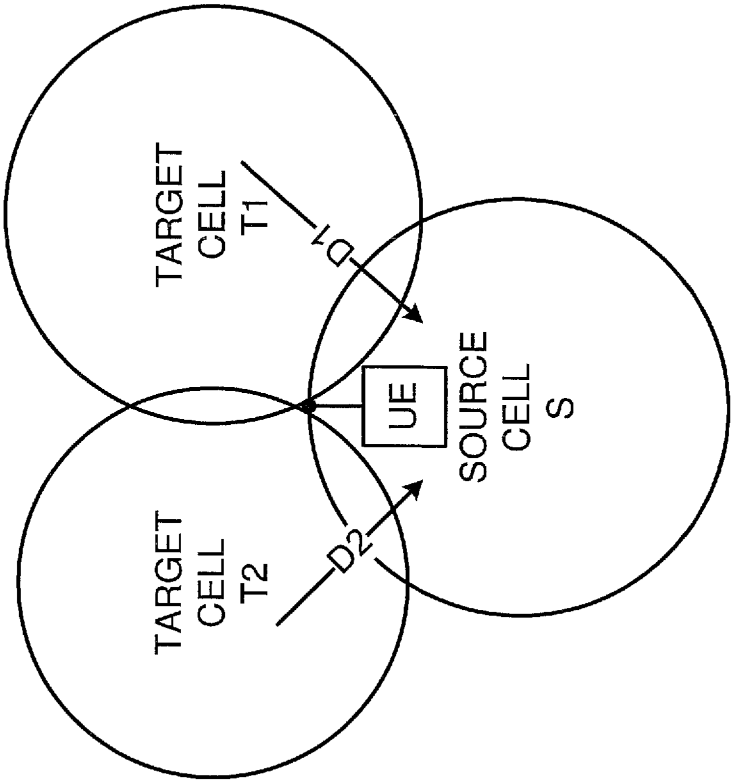
FIG. 54 is a diagrammatic view illustrating a scenario in which use of delta signalling for handover configuration may be problematic.

FIG. 54 illustrates a scenario in which use of delta signalling for handover configuration may be problematic. FIG. 54 shows wireless terminal UE as camping on a source cell, S, and being configured with two candidate target cells, cell T1 and cell T2, for conditional handover. The target cell configurations for candidate cell T1 and candidate cell T2 are provided by delta signalling. In FIG. 54 and herein, "D1" represents the differences between the candidate cell T1 configuration and the source cell S configuration; "D2" represents the differences between the candidate cell T2 configuration and the source cell S configuration.

When the wireless terminal of FIG. 54 executes a first conditional handover to target cell T1, the wireless terminal may apply delta signalling D1 to the source cell S configuration to generate the complete target cell T1 configuration. After the first conditional handover the wireless terminal may keep delta signalling D2 for a potential future conditional handover to target cell T2. When the wireless terminal actually performs a second conditional handover, e.g., a conditional handover from target cell T1 to target cell T2, the wireless terminal may not be able to generate the complete target T2 configuration by simply applying the delta signalling D2 to the current configuration, e.g., the target cell T1 configuration, since the delta signalling D2 was constructed with reference to and thus is applicable only to the old source cell configuration. Therefore, the storage of yet-used handover configuration information for a target cell may be problematic, particularly when the stored handover configuration information for the target cells is constructed with or based on delta signalling.

Turning now to the example embodiment and mode of FIG. 55-FIG. 60, as herein described, a wireless terminal is configured to make an informed determination whether or not the wireless terminal should keep an unused conditional handover configuration upon executing a handover, based on the nature of the unused conditional handover configuration.

Figure 55:
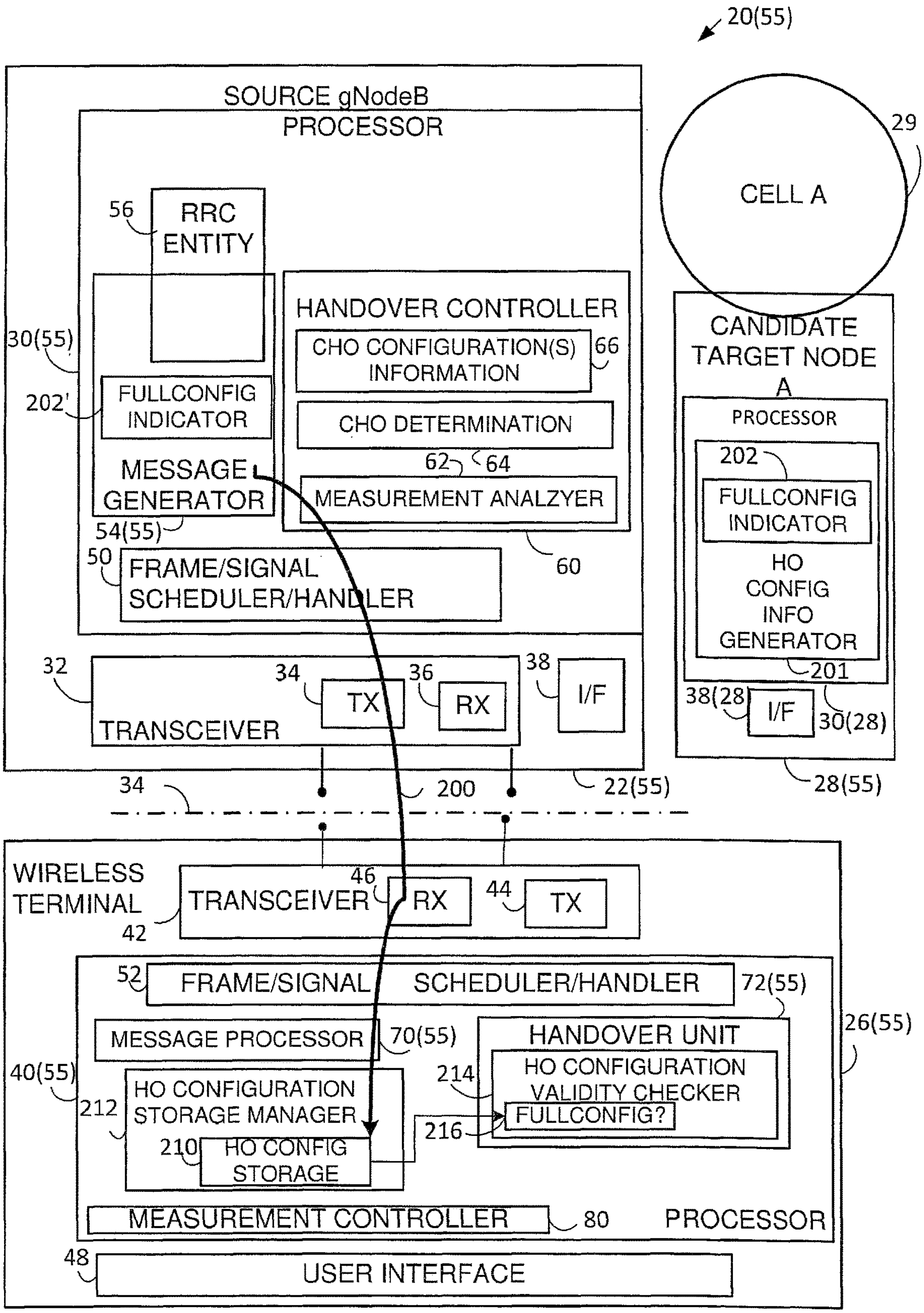
FIG. 55 is a schematic view of an example communications system comprising a source gNodeB which may provide a wireless terminal with a full format configuration indication for conditional handover configuration.

In particular, the wireless terminal 26(55) of FIG. 55 may be allowed to keep a conditional handover configuration in a case that the conditional handover configuration is not provided by the delta signalling. In other words, a stored conditional handover configuration may continue to be valid after a handover, e.g., either a conditional or non-conditional handover, in a case that the conditional handover configuration is provided as a complete format, e.g., as a full configuration for the target cell. In the case of a full format handover configuration, a signalling message to configure the conditional handover may comprise an indicator to indicate whether the conditional handover configuration provided in the message may be kept or needs to be released after executing a handover. Upon executing a handover, the wireless terminal 26(55) may determine the validity of the conditional handover configuration, if not used by the executed handover, based on the indication.

FIG. 55 shows an example communications system 20(55) as comprising source gNodeB 22(55), wireless terminal 26(55), and candidate target node 28(55) which serves cell 29. The source gNodeB 22(55) and wireless terminal 26(55) of the communications system 20(55) of FIG. 55 are similar to those of preceding example embodiments and modes, with like units and functionalities having like reference numbers. As shown in FIG. 55, the source gNodeB 22(55) comprises node processor circuitry ("node processor 30(55)") and node transceiver circuitry 32, with node transceiver circuitry 32 comprising node transmitter 34 and node receiver 36. The node processor 30(55) comprises node frame/signal scheduler/handler 50, message generator 54(55), RRC state machine 56, and handover controller 60. As in previous example embodiment and modes, the handover controller 60 may comprise measurement analyzer 62, conditional handover (CHO) determination unit 64, and conditional handover configuration information generator 66(58).

The message generator 54(55) generates several types of messages, with messages comprising information element(s) for configuring handovers being of particular interest to the FIG. 55 example embodiment and mode. Typically messages with information elements for configuring handovers are included in a RRCReconfiguration message, for which reason the message generator 54(55) may work in conjunction with the node RRC entity 56 with which it overlaps in appearance in FIG. 55. As used herein, both the information element(s) which include information for configuring handovers and the message(s) in which such information elements are included may be referred to as handover configuration message(s). FIG. 55 shows message generator 54(55) as generating an example handover configuration message 200 for the FIG. 55 embodiment and mode, which is processed by frame scheduler 50 for inclusion in a frame, the frame being transmitted via node transmitter 34 over air interface 34 to wireless terminal 26(55).

To generate the handover configuration message 200, message generator 54(55) may obtain the handover configuration information, e.g., the information needed by a wireless terminal to operate after handover to a target cell, in diverse manners. For example, gNodeB 22(55) may communicate through its interface 38 with candidate target node 28(55) in the manner of FIG. 53, and receive delta signaling of the handover configuration information from candidate target node 28(55). Alternatively, the candidate target node 28(55) may request and obtain, from candidate target node 28(55) or elsewhere, full configuration information, known herein as "fullConfig", required for a wireless terminal for operation after handover to candidate target node 28(55).

FIG. 55 further shows selected aspects of candidate target node 28(55) which may be pertinent to aspects of the technology disclosed herein. It should be understood that candidate target node 28(55) is a radio access network node and may have elements and functionalities similar to those of gNodeB 22(55), but for the purpose of serving another cell, e.g., target cell A. The selectively illustrated elements of candidate target node 28(55) include interface 39(28), through which candidate target node 28(55) may communicate with other access nodes such as gNodeB 22(55), for example. Although not illustrated, it will be appreciated that candidate target node 28(55) also has a transceiver for communication over the air interface with wireless terminal which are served by candidate target node 28(55) in cell A. Like gNodeB 22(55) the candidate target node 28(55) also has a node processor, illustrated as node processor 30(28) in FIG. 55. The node processor 30(28) may include all elements shown as comprising node processor 30(55), but for sake of simplicity in FIG. 55 is shown as primarily comprising target node handover configuration information generator 201. The target node handover configuration information generator 201 serves to generate, e.g., the handover configuration information that may be included in the handover request acknowledge message, e.g., handover command, message 53-4 of FIG. 53. Such message may also be referred to herein as the handover configuration message. Depending on its mode of operation and manner of dealing with other nodes such as gNodeB 22(55), the handover configuration information which the target node handover configuration information generator 201 generates for inclusion in the handover request acknowledge message may be either full configuration handover configuration information, e.g., full format configuration information which is also represented by fullConfig, or delta signaling handover configuration information. As an aspect of the technology disclosed herein, the target node handover configuration information generator 201 further comprises full configuration indicator generator 202. The full configuration indicator generator 202 serves to include, in the handover configuration information generated by target node handover configuration information generator 201, a flag or indication which may be set or configured to indicate that the handover configuration information generated by target node handover configuration information generator 201 is full configuration handover information and not merely delta signaling type handover configuration information.

Thus the candidate target node 28(55) may provide handover configuration information, optionally including the fullConfig indication where appropriate, to the gNodeB 22(55) in a message such as the handover request acknowledge message, e.g., handover command, message 53-4 of FIG. 53. Since such message may also be utilized by gNodeB 22(55), and by message generator 54(55) in particular, to generate the handover configuration message 200, the handover request acknowledge message, e.g., handover command, message 53-4 of FIG. 53 may also be referred to herein as a handover configuration message. The message generator 54(55) of gNodeB 22(55) may encapsulate the handover configuration message received from candidate target node 28(55) in yet another handover configuration message, i.e., the handover configuration message 200.

As understood from above, the message generator 54(55) of gNodeB 22(55) may generate the handover configuration message 200 which, in an example embodiment and mode, may be an RRCReconfiguration message. In so doing, if the handover configuration message as received from candidate target node 28(55) includes the full configuration indicator as generated by full configuration indicator generator 202 of candidate target node 28(55), the handover configuration message 200 will also include such full configuration indication. As an example variation and optional feature, the message generator 54(55) of gNodeB 22(55) may include its own full configuration indicator generator 202' to ensure that, if appropriate, the fullConfig indicator is included in the handover configuration message 200 generated by message generator 54(55). Moreover, should the gNodeB 22(55) realize that the handover configuration information to be carried in handover configuration message 200 is full configuration information, but for some reason the candidate target node 28(55) failed to include the fullConfig indication in its handover configuration message, the full configuration indicator generator 202' of gNodeB 22(55) may generate and then insert the fullConfig indication in the handover configuration message 200.

Figure 56:
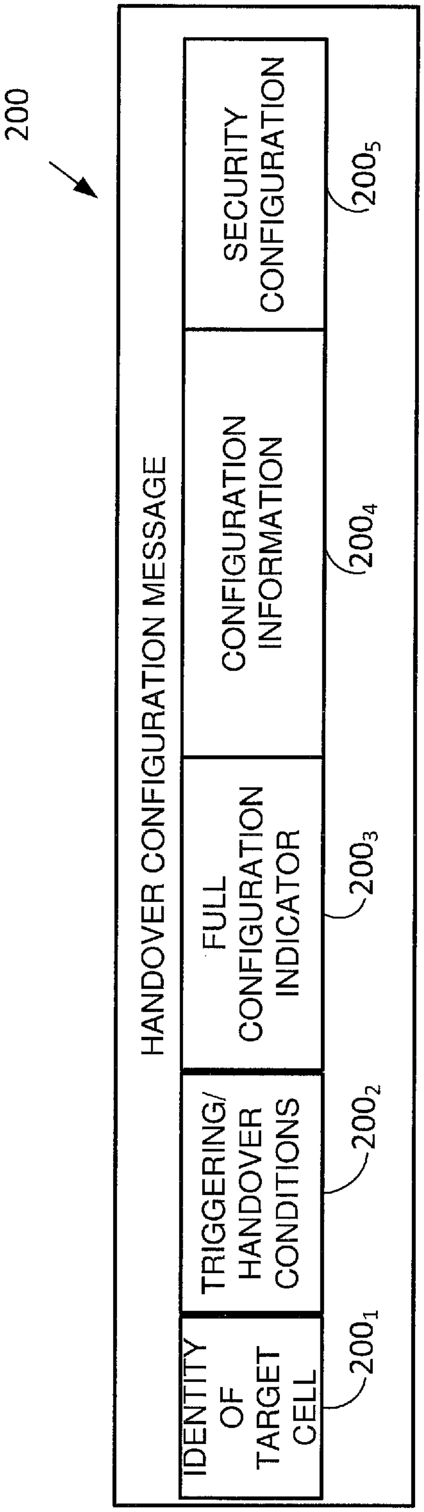
FIG. 56 is a diagrammatic view of an example format of a handover configuration message 200 that may be generated by a message generator of FIG. 55.

FIG. 56 shows an example format of a handover configuration message 200 that may be generated by the message generator 54(55) of FIG. 55. As indicated above, the handover configuration message(s) may itself be an information element which is carried in or encapsulated in another message, such as RRCReconfiguration message. The handover configuration message 200 may comprise various fields or internal information elements, including but not limited to those shown in FIG. 56. For example, handover configuration message 200 may include field 2001 which comprises the identify of a candidate target cell to which the handover configuration message 200 pertains; field 2002 which comprises or describes one or more triggering conditions upon which execution of the handover depends; a field 200; which comprises the full configuration indicator as generated or inserted by full configuration indicator generator 200; and field 2004 which comprises the handover configuration information carried by the handover configuration message 200. In addition, as an optional feature understood with reference to other example embodiments and modes described herein, the handover configuration message 200 may also comprise field 2005 for carrying security information or a security configuration(s). It should be understood that additional fields may also be included in the handover configuration message 200, and that the fields may be arranged in any desired or required order.

In a case that the field 2003 is present and/or carries a fullConfig flag or fullConfig indicator, the field 2004 comprises the full format configuration of the handover configuration information. Otherwise, if field 2003 is not present and/or does not carry a flag or indicator, the field 2004 may comprise less than full configuration information, e.g., may comprise delta signaling for the configuration information of the target node.

As in the preceding example embodiments and modes, wireless terminal 26(55) of the example embodiment and mode of FIG. 55 comprises terminal processor 40(55) and terminal transceiver circuitry 42, with terminal transceiver circuitry 42 in turn comprising terminal transmitter 44 and terminal receiver 46. The terminal processor 40 comprises terminal frame/signal handler 52, message processor 70(55), handover unit 72(55), and measurement controller 80. Although not specifically shown in FIG. 55, it should be understood that, in like manner with FIG. 15 and FIG. 19 and other example embodiments and modes, measurement controller 80 may in turn comprises a measurement initiation unit, a measurement results unit, and a measurement report control unit.

FIG. 55 further shows that receiver 46 of wireless terminal 26(55) receives, e.g., a frame comprising the handover configuration message 200 over the air interface 34 from gNodeB 22(55). The handover configuration message 200 is obtained from the acquired frame by frame handler 52, and is in turn processed or analysed by message processor 70(55). Upon being determined by message processor 70(55) to be a handover configuration message 200, the message contents are stored in handover configuration storage or memory 210, whose input/output operations are governed and/or controlled by handover configuration storage manager 212.

Figure 57:
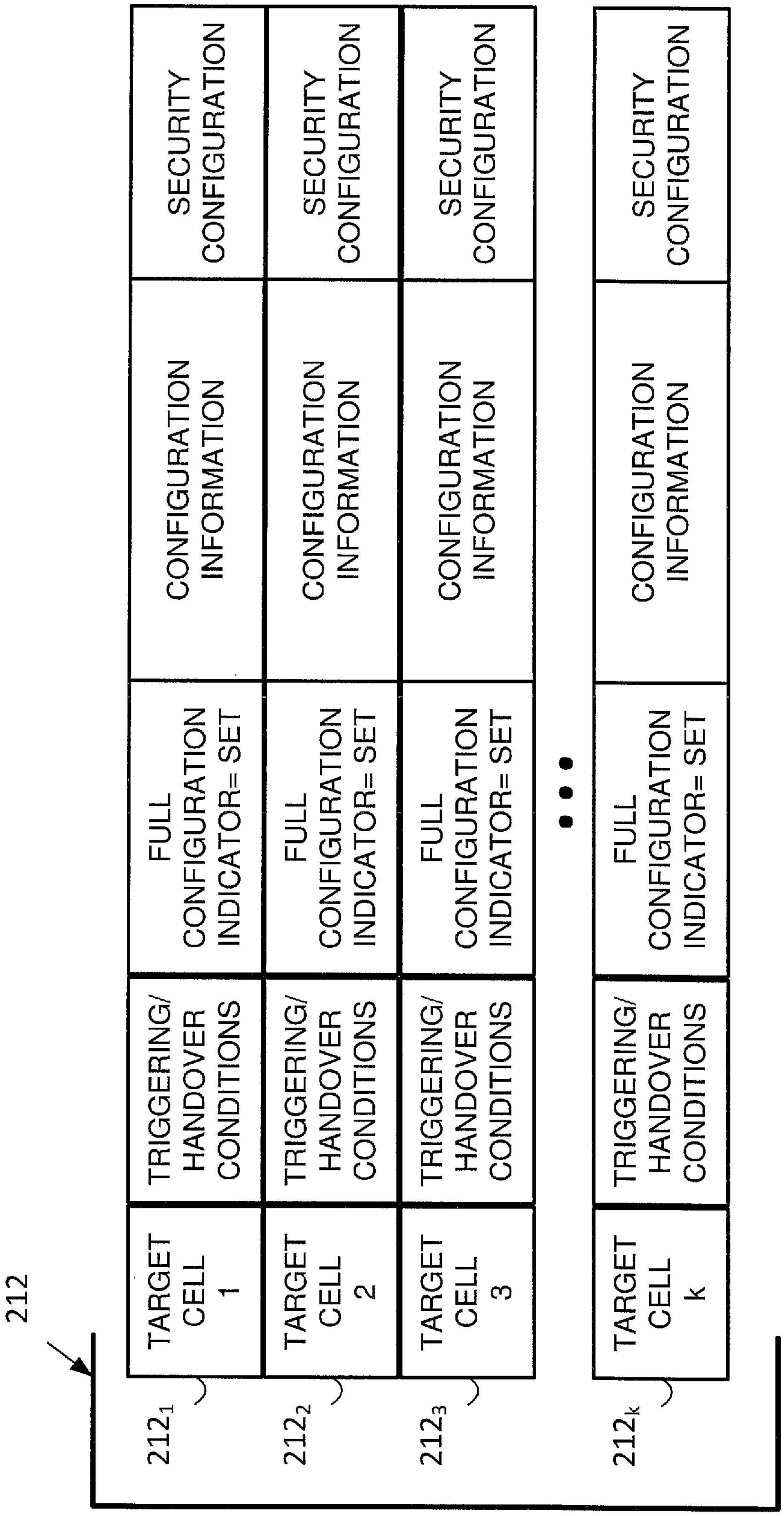
FIG. 57 is a diagrammatic view of example contents of a handover configuration storage for the wireless terminal of the example embodiment and mode of FIG. 55.

It should be understood that wireless terminal 26(55) may receive handover configuration information for plural target cells, and accordingly that handover configuration storage 210 may include respective records or entries comprising handover configuration information corresponding to the plural target nodes. FIG. 57 shows example representative depiction of contents 212 of handover configuration storage 210, including records or entries for k number of candidate target nodes. The record or entry for each candidate target node essentially comprises information corresponding to the fields of the handover configuration message 200 of FIG. 56, as well as any additional fields that may be desired or required. The arrangement of the fields in each record or entry may vary. In the example shown in FIG. 57, it so happens that the records for target cells 1 and 2 have the full configuration indicator set in the respective full configuration indicator field, thereby signifying that the configuration information of the record for the respective target cell is full configuration information. By contrast, the full configuration indicator is not set for target cell 3, which may mean that the configuration information stored in handover configuration storage 210 for target cell 3 is comprises delta signalling rather than fullConfig information.

It should further be understood that the handover configuration information for plural target cells as provided by candidate target node 28(55) may be in separate handover configuration messages 200, e.g., a separate handover configuration message 200 for each target cell. It is also possible in another example embodiment and mode for one overall or master message, such as an RRCReconfiguration message, to carry the handover configuration information for the plural target cells, e.g., for one overall or master message to carry plural handover configuration messages, e.g., handover configuration messages 200 for plural target cells. Use of the terminology handover configuration message 200 herein is thus intended to cover both the situation of a single message for one target cell and a single message which covers, e.g., carries handover configuration information, for plural target cells.

In order to capitalize upon information which it is provided, handover unit 72(55) comprises handover configuration validity checker 214. For the example embodiment and mode of FIG. 55, the handover configuration validity checker 214 comprises full configuration checker 216. In essence, when handover unit 72(55) determines that a handover has been requested or triggered for a particular target cell, handover unit 72(55) obtains from handover configuration storage 210 the record(s) of handover configuration information for conditional handovers. As understood with reference to FIG. 57, each of such obtained record(s) of handover configuration information for conditional handovers includes an identity of an associated candidate target cell and an indication of whether the handover configuration information is full configuration information or not. The indication may be the present or absence of the full configuration indicator field for the associated candidate target cell, or how the full configuration indicator field is set or not set. If the full configuration indicator field for the associated candidate target cell is provided and/or set, the handover unit 72(55) knows that the particular handover configuration information stored in handover configuration storage 210 may be still valid for future use. On the other hand, if the full configuration indicator field is not provided and/or not set, the handover unit 72(55) realizes that the the handover configuration information stored in handover configuration storage 210 is no longer valid, and accordingly the particular record of the handover configuration information may be removed. Thus, if valid, the wireless terminal may keep the conditional handover configuration after the handover execution, otherwise, the wireless terminal may release the conditional handover configuration. Thus, as one aspect of the technology disclosed herein, the validity check performed by handover configuration validity checker 214 based on fullConfig is for the stored CHO configurations to be possibly used in the future. If this particular handover just executed involved a stored conditional handover configuration, the stored conditional handover configuration may be considered to be "used" and thus may be removed from the storage.

Figure 58:
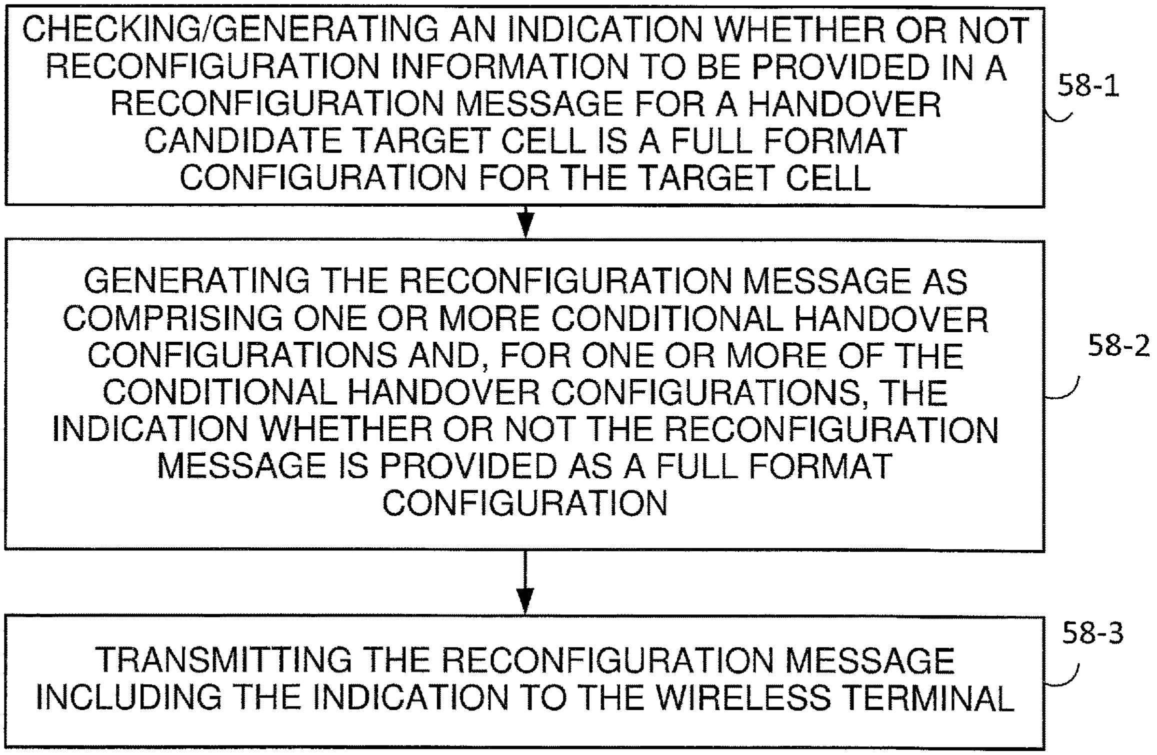
FIG. 58 shows example, representative acts or steps that may be performed by a gNodeB of the example embodiment and mode of FIG. 55.

FIG. 58 shows example, representative acts or steps that may be performed by the gNodeB 22(55) in conjunction with aspects of the technology disclosed herein with reference to the embodiment and mode of FIG. 55. Act 58-1 is not necessarily for the handover that the wireless terminal may be executing, but is an optional act that comprises the gNodeB 22(55) checking to ascertain whether or not reconfiguration information to be provided in a reconfiguration message for a handover candidate target node is a full format configuration for the target cell. If the gNodeB 22(55) has reason to believe that the handover configuration information as received from candidate target node 28(55), for example, is fullConfig information, but not so indicated, the full configuration indicator generator 202' may generate the fullConfig indication for inclusion in the handover configuration message. Act 58-2 comprises generating the reconfiguration message as comprising one or more conditional handover configurations and, for one or more of the conditional handover configurations, the indication whether or not the reconfiguration message is provided as a full format configuration. Act 58-3 comprises transmitting the reconfiguration message including the indication to the wireless terminal.

Figure 59:
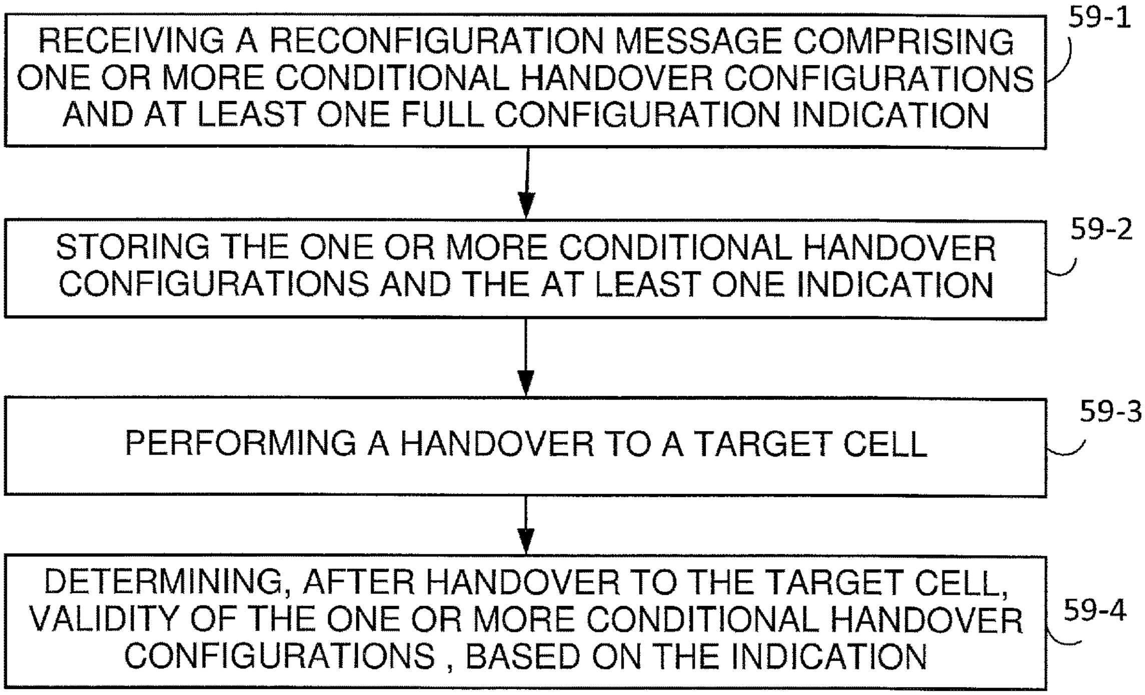
FIG. 59 shows example, representative acts or steps that may be performed by a wireless terminal of the example embodiment and mode of FIG. 55.

FIG. 59 shows example, representative acts or steps that may be performed by the wireless terminal 26(55) in conjunction with aspects of the technology disclosed herein with reference to the embodiment and mode of FIG. 55. Act 59-1 comprises receiving a reconfiguration message comprising one or more conditional handover configurations and at least one indication, e.g., at least one full configuration indication. As explained above with reference to FIG. 56 and FIG. 57, each of the one or more conditional handover configurations may comprise at least one identity of a candidate target cell, and at least one triggering condition, the at least one indication indicating whether or not the reconfiguration message is provided as full configuration. Act 59-2 comprises storing the one or more conditional handover configurations and the at least one indication. As understood with reference, e.g., to FIG. 55 and FIG. 57, the conditional handover configurations may be stored under supervision of handover configuration storage manager 212 in handover configuration storage 210. Act 59-3 comprises performing a handover to a target cell. Act 59-4 comprises determining, after handover to the target cell, validity of the one or more conditional handover configurations, the determination being based on the indication, e.g., the indication of whether the handover configuration is a full format configuration or not.

Figure 60:
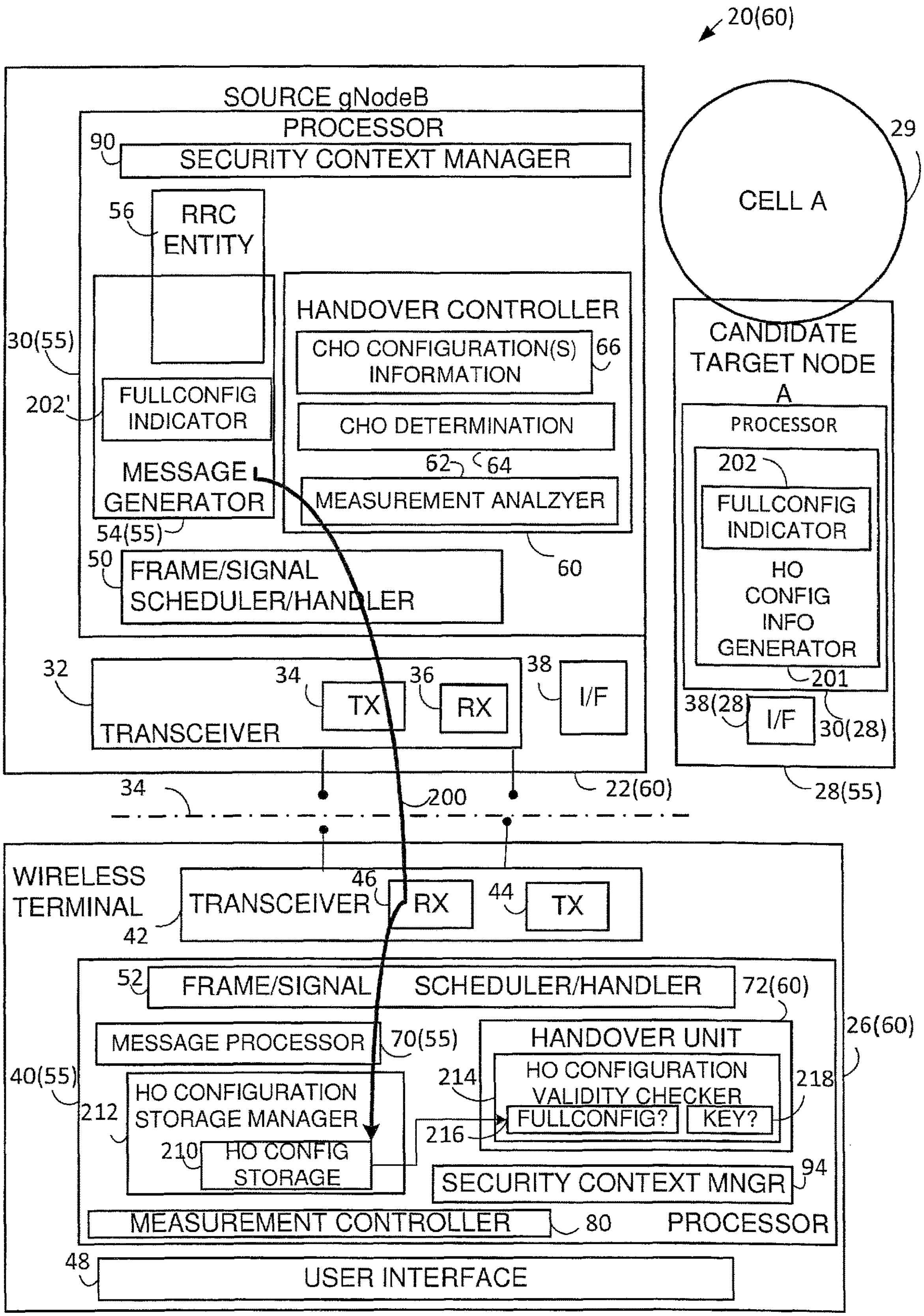
FIG. 60 is a schematic view showing a variation of the example embodiment and mode of FIG. 55 wherein the validity of the conditional handover configuration may be determined combined with other criteria.

FIG. 60 shows a variation of the example embodiment and mode of FIG. 55 wherein the validity of the conditional handover configuration may be determined combined with other criteria, such as security key update as disclosed in the previous embodiments. In the example embodiment and mode of FIG. 60, structure and functionalities shown with like reference numbers as in FIG. 55 have like or similar constituency and operation. The system 20(60) of FIG. 60 differs from system 20(55) of FIG. 55 primarily in that the processor circuitry of gNodeB 22(60) comprises node security context manger 90 and the processor circuitry of wireless terminal 26(60) comprises terminal security context manger 94. In addition, the handover configuration validity checker 214 of handover unit 72(60) comprises security (key) checker 218 in addition to full configuration checker 216.

Listing 16 shows an example format of a RRCReconfiguration message which may be used for configuring conditional handover(s), i.e., the second RRCReconfiguration message of FIG. 53. The information element fullConfig may be used to indicate that this RRCReconfiguration message is provided as full configuration. The information element fullConfig may be generated by full configuration indicator generator 202 of candidate target node 28(55) or the full configuration indicator generator 202' of gNodeB 22(55) as described above. In one example configuration, the target node may decide to have the wireless terminal keep the conditional handover configuration over a handover, e.g., after a handover. In such configuration, the target node may autonomously generate the RRCReconfiguration message in full configuration. In another example configuration, the source node may instruct the target node by signalling, e.g., a Handover Request, to generate the RRCReconfiguration message in full configuration. In either configuration, upon receiving the RRCReconfiguration message, the wireless terminal may check if the information element fullConfig is present, or set to a pre-determined value. If the information element fullConfig is present, or set to a pre-determined value, the wireless terminal may consider that the received conditional handover configuration(s) can be kept over/after a handover, and thus the wireless terminal may use the information element as a criterion to decide whether to keep or release the conditional handover configuration(s) upon/after a handover execution, in addition to the optional AS security key update criteria disclosed in FIG. 60 and previous embodiments.

Listing 16 (start)

```
RRCReconfiguration ::=                SEQUENCE {
  rrc-TransactionIdentifier             RRC-TransactionIdentifier,
  criticalExtensions                    CHOICE {
    rrcReconfiguration                    RRCReconfiguration-IEs,
    criticalExtensionsFuture              SEQUENCE { }
  }
}
RRCReconfiguration-IEs ::=            SEQUENCE {
  radioBearerConfig                   RadioBearerConfig
OPTIONAL, -- Need M
  secondaryCellGroup                OCTET STRING (CONTAINING
CellGroupConfig)
OPTIONAL, -- Need M
  measConfig                  MeasConfig
OPTIONAL, -- Need M
  lateNonCriticalExtension            OCTET STRING
OPTIONAL,
  nonCriticalExtension              RRCReconfiguration-v1530-IEs
OPTIONAL
}
RRCReconfiguration-v1530-IEs ::= SEQUENCE {
  masterCellGroup                     OCTET STRING (CONTAINING
CellGroupConfig)
OPTIONAL, -- Need M
  fullConfig                        ENUMERATED {true}
OPTIONAL, -- Cond FullConfig
  dedicatedNAS-MessageList              SEQUENCE (SIZE (1..maxDRB)) OF
DedicatedNAS-Message
OPTIONAL, -- Cond nonHO
  masterKeyUpdate                   MasterKeyUpdate
OPTIONAL, -- Cond MasterKeyChange
  dedicatedSIB1-Delivery              OCTET STRING (CONTAINING SIB1)
OPTIONAL, -- Need N
  dedicatedSystemInformationDelivery                  OCTET STRING
(CONTAINING SystemInformation)                          OPTIONAL,
-- Need N
  otherConfig                       OtherConfig
OPTIONAL, -- Need M
  nonCriticalExtension                RRCReconfiguration-v1540-IEs
OPTIONAL
}
RRCReconfiguration-v1540-IEs ::= SEQUENCE {
  otherConfig-v1540                     OtherConfig-v1540
OPTIONAL, -- Need M
  nonCriticalExtension                  RRCReconfiguration-v1560-IEs
OPTIONAL
}
RRCReconfiguration-v1560-IEs :: =                SEQUENCE {
  mrdc-SecondaryCellGroupConfig                  SetupRelease
{ MRDC-SecondaryCellGroupConfig }                          OPTIONAL,
-- Need M
  radioBearerConfig2                    OCTET STRING (CONTAINING
RadioBearerConfig)
OPTIONAL,   -- Need M
  sk-Counter                            SK-Counter
OPTIONAL,   -- Need N
  nonCriticalExtension              RRCReconfiguration-v16xy-IEs
OPTIONAL}
RRCReconfiguration-v16xy-IEs :: = SEQUENCE {
  cho-Config-r16                      CHO-Config-r16
OPTIONAL,   -- Need M
  nonCriticalExtension                  SEQUENCE { }
OPTIONAL
}
MRDC-SecondaryCellGroupConfig ::= SEQUENCE {
  mrdc-ReleaseAndAdd                    ENUMERATED {true}
OPTIONAL,   -- Need N
  mrdc-SecondaryCellGroup                CHOICE {
    nr-SCG                              OCTET STRING (CONTAINING
RRCReconfiguration),
```

-continued

```
    eutra-SCG                                    OCTET STRING
  }
}
MasterKeyUpdate ::=                          SEQUENCE {
  keySetChange Indicator                     BOOLEAN,
  nextHopChainingCount                       NextHopChainingCount,
  nas-Container                          OCTET STRING
OPTIONAL,    -- Cond securityNASC
  ...
}
CHO-Config-r16 ::=                           SEQUENCE {
  cho-ConfigToRemoveList-r16                     cho-ConfigToRemoveList-r16
OPTIONAL,    -- Need N
cho-ConfigToAddModList-r16                       cho-ConfigToAddModList-r16
OPTIONAL,    -- Need N
attemptCHO-r16                                ENUMERATED {true}
OPTIONAL,    -- Need N
  ...
}
```

Listing 16 (end)

The source node, or other network entity(ies), may need to coordinate target nodes based on the fullConfig information element configured to the wireless terminal. Specifically, if some of the conditional handover configurations configured to the wireless terminal are provided by delta signaling, e.g., fullConfig is not present, upon the wireless terminal executing a handover to another cell, the source cell may initiate a handover cancellation for each of the candidate target cell(s) of concern. Otherwise, the source cell may take no action, e.g., may keep the handover coordination(s), for such target node(s).

It should be noted that in the case of candidate target cell(s) being served by the source node, i.e., intra-gNB-CU conditional handover configuration(s), the source node may solely decide whether it uses delta signaling or full configuration for the candidate target cell(s), and generate the RRCReconfiguration message(s) for the target cell(s) by itself.

11: Applicability of System Information Provided by a Conditional Reconfiguration In some deployment scenarios, a conditional handover (CHO) configuration associated with a target candidate cell may provide system information of the target candidate cell. The example embodiment and mode of FIG. 61-FIG. 70 disclose applicability, e.g., whether applicable or not, of such system information configured by the CHO configuration, also referred as “a conditional reconfiguration”.

Figure 61:
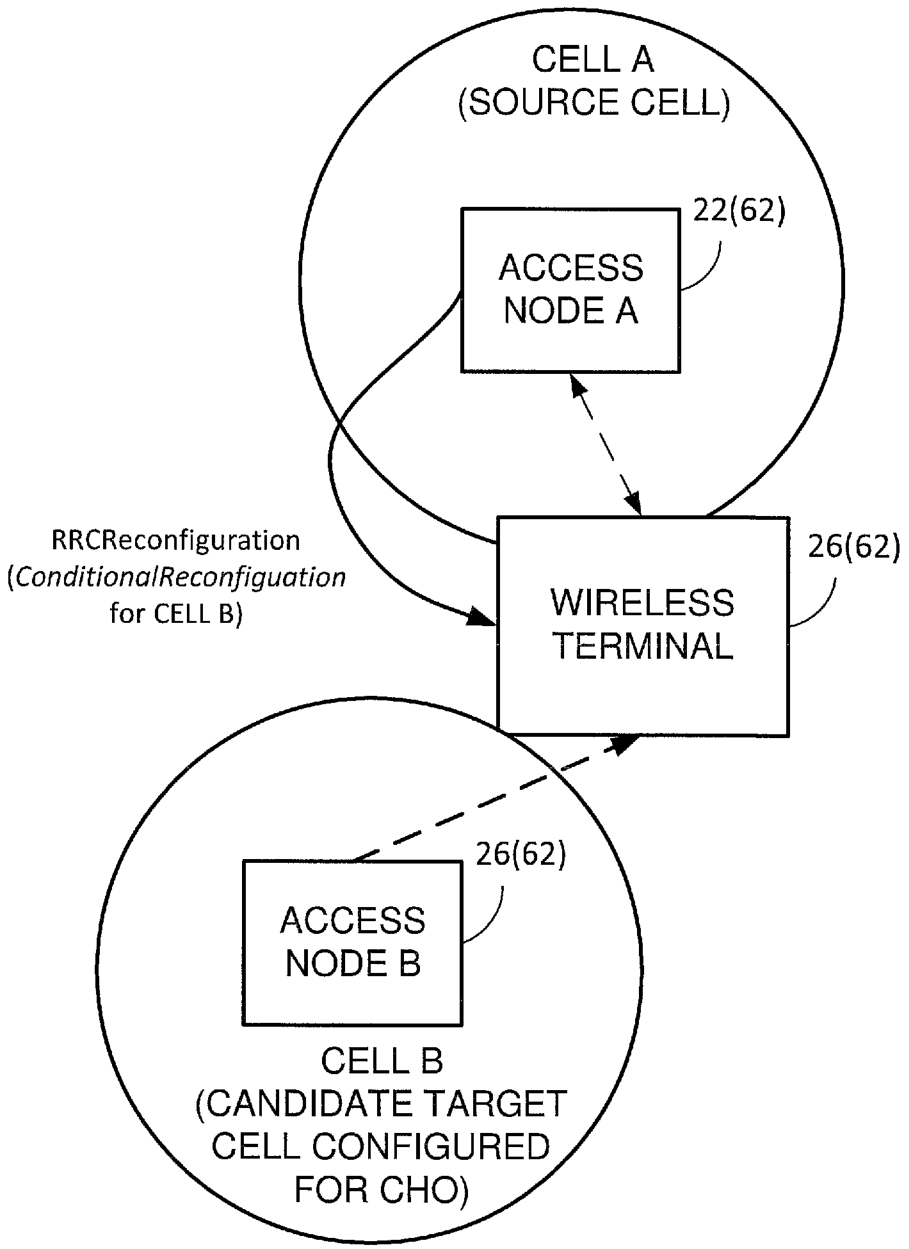
FIG. 61 is a diagrammatic view of a basic scenario of a conditional handover for the example embodiment and mode of FIG. 61-FIG. 70 wherein a wireless terminal determines applicability of possibly different versions of system information.

FIG. 61 is a basic scenario of the conditional handover for the example embodiment and mode of FIG. 61-FIG. 70. As shown in FIG. 61 a wireless terminal has established an RRC connection with a source cell (Cell A) served by Access Node A. During the RRC connection, the wireless terminal may be configured with a first RRCReconfiguration message including one or more conditional reconfigurations for target candidate cells. In the scenario depicted in FIG. 61, the first RRCReconfiguration may include at least a conditional reconfiguration of Cell B, which may further comprise a measurement object(s), a triggering condition(s) and a second RRCReconfiguration message. The wireless terminal may then perform measurements based on the measurement object(s) and evaluate the triggering condition(s). Upon one of the triggering condition(s) is fulfilled, the wireless terminal may execute a handover to Cell B, by applying configuration parameters configured in the second RRCReconfiguration message.

Figure 62:
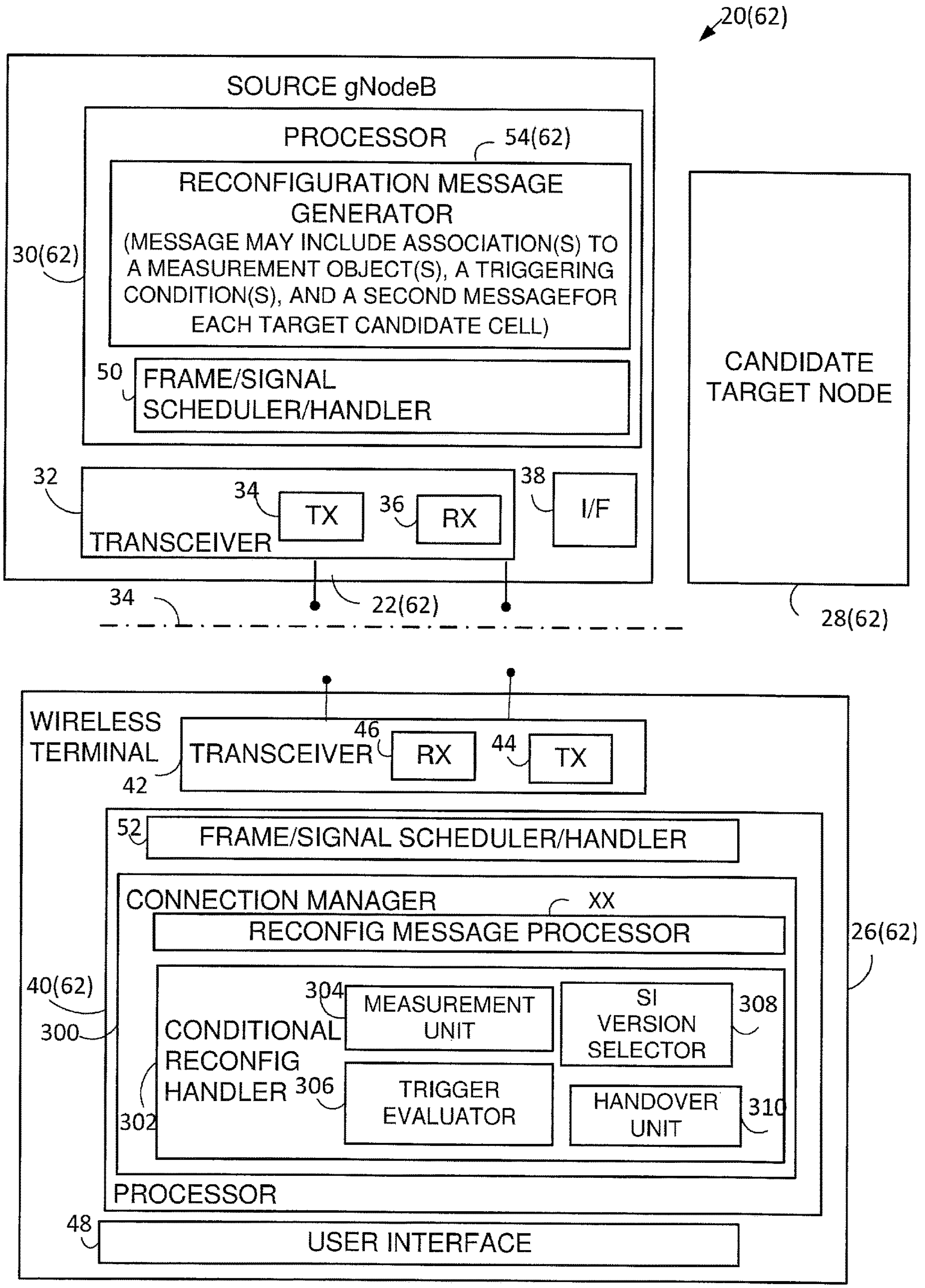
FIG. 62 is a schematic view of an example communications system in which a wireless terminal undergoing conditional reconfiguration determines applicability of system information.

FIG. 62 shows an example communications system 20(62) a wireless terminal such as wireless terminal 26(62) undergoing conditional reconfiguration determines applicability of system information, e.g., may make a selection between differing versions of system information for a target node. FIG. 62 shows system 20(62) as comprising an access node such as source gNodeB 22(62), wireless terminal 26(62), and candidate target node 28(62). The source gNodeB 22(62), wireless terminal 26(62), and candidate target node 28(62) of the communications system 20(62) of FIG. 62 may be similar in many respects to those of preceding example embodiments and modes, e.g., may comprise like units and functionalities having like reference numbers.

As shown in FIG. 62, the source gNodeB 22(62) comprises node processor circuitry, “node processor 30(62)”, and node transceiver circuitry 32. The node transceiver circuitry 32 comprises node transmitter 34 and node receiver 36. The node processor 30(62) comprises, among other units and functionalities, node frame/signal scheduler/handler 50 and reconfiguration message generator 54(62). Although not illustrated as such, the source gNodeB 22(62) may further includes other units such as an RRC state machine, a handover controller and a source node security context manager.

The communications system 20(26), and any other communications system described herein, may be realized in virtualized and/or distributed and/or logical form. For example, any access node that serves as a donor node in connecting to the core network may comprise at least one Central Unit (CU) and at least one Distributed Unit (DU). The CU is a logical entity managing the DU collocated in the IAB-donor as well as the remote DUs resident in the IAB-nodes. The CU may also be an interface to the core network, behaving as a RAN base station (e.g., eNB or gNB). In some embodiments, the DU is a logical entity hosting a radio interface (backhaul/access) for other child IAB-nodes and/or UEs. In one configuration, under the control of CU, the DU may offer a physical layer and Layer-2 (L2) protocols (e.g., Medium Access Control (MAC), Radio Link Control (RLC), etc.) while the CU may manage upper layer protocols (such as Packet Data Convergence Protocol (PDCP), Radio Resource Control (RRC), etc.). Access nodes that are not Donor nodes, e.g., IAB-nodes, may comprise DU and Mobile-Termination (MT) functions, where in some embodiments the DU may have the same functionality as the DU in the IAB-donor, whereas MT may be a UE-like function that terminates the radio interface layers. As an example, the MT may function to perform at least one of: radio transmission and reception, encoding and decoding, error detection and correction, signaling, and access to a SIM.

As in at least some of the preceding example embodiments and modes, the wireless terminal 26(62) of the example embodiment and mode of FIG. 62 comprises terminal processor 40(62) and terminal transceiver circuitry 42. The terminal transceiver circuitry 42 in turn comprises terminal transmitter 44 and terminal receiver 46. In the example embodiment and mode of FIG. 62 the terminal processor 40(62) is depicted for present purposes as comprising terminal frame/signal handler 52 and terminal connection manager 300. The terminal connection manager 300 in turn comprises, in an example embodiment and mode, conditional reconfiguration handler 302. The conditional reconfiguration handler 302 is further shown as comprising in an example embodiment and mode, measurement unit 304, trigger evaluator 306, handover unit 308, and system information version selector 310. It should be appreciated that the units comprising terminal connection manager 300 may, in other example embodiments and modes, have different names or be differently located, allocated, or architecturally arranged within wireless terminal 26(62). Moreover, it should be appreciated that yet other units and functionalities may comprise or be included in wireless terminal 26(62), and terminal processor 40(62), in particular, as is shown to the person skilled in the art.

As mentioned above, the reconfiguration message generator 54(62) generates a re-configuration message which, in an example embodiment and mode, may be an RRCReconfiguation message. As further understood herein, the reconfiguration message generated by reconfiguration message generator 54(62) may be referred to as a "first" reconfiguration message, and the first reconfiguration message may in turn include a second reconfiguration message.

Figure 63:
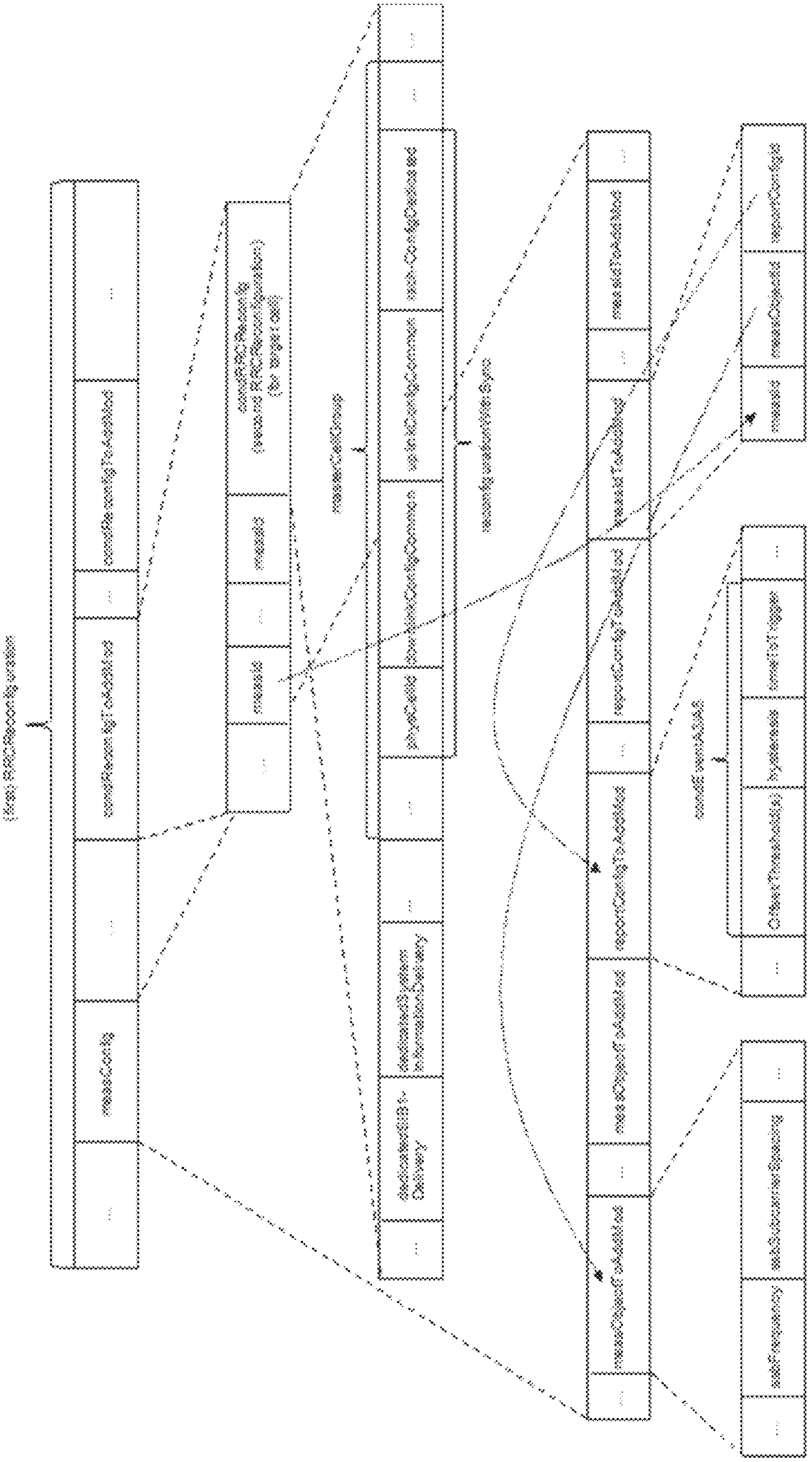
FIG. 63 is a diagrammatic view of an example reconfiguration message, e.g., of example relevant information elements in the RRCReconfiguration message, for the example embodiment and mode of FIG. 61-FIG. 70.

Listing 17 shows an example format of an RRCReconfiguration message, which may be for either or both of the first and the second RRCReconfiguration messages. FIG. 63 is a graphical representation of relevant information elements in the RRCReconfiguration message shown in Listing 17.

Listing 17 (start)

```
RRCReconfiguration ::=                SEQUENCE {
   rrc-TransactionIdentifier           RRC-TransactionIdentifier,
   criticalExtensions                     CHOICE {
      rrcReconfiguration                     RRCReconfiguration-IEs,
      criticalExtensionsFuture            SEQUENCE { }
   }
}
RRCReconfiguration-IEs ::=           SEQUENCE {
   radioBearerConfig                            RadioBearerConfig
OPTIONAL, -- Need M
   secondaryCellGroup                    OCTET STRING (CONTAINING
CellGroupConfig)                              OPTIONAL, -- Need M
   measConfig                                    MeasConfig
OPTIONAL, -- Need M
   lateNonCriticalExtension             OCTET STRING
OPTIONAL,
   nonCriticalExtension                      RRCReconfiguration-v1530-IEs
OPTIONAL
}
RRCReconfiguration-v1530-IEs ::=    SEQUENCE {
   masterCellGroup                        OCTET STRING
(CONTAINING CellGroupConfig)                        OPTIONAL, --
Need M
   fullConfig                                          ENUMERATED {true}
OPTIONAL, -- Cond FullConfig
   dedicatedNAS-MessageList          SEQUENCE (SIZE(1..maxDRB)) OF
DedicatedNAS-Message                  OPTIONAL, -- Cond nonHO
   masterKeyUpdate                           MasterKeyUpdate
OPTIONAL, -- Cond MasterKeyChange
   dedicatedSIB1-Delivery                OCTET STRING (CONTAINING
SIB1)                                        OPTIONAL, -- Need N
   dedicatedSystemInformationDelivery   OCTET STRING (CONTAINING
SystemInformation)
OPTIONAL, -- Need N
   otherConfig                                        OtherConfig
OPTIONAL, -- Need M
   nonCriticalExtension                     RRCReconfiguration-v1540-IEs
OPTIONAL
}
RRCReconfiguration-v1540-IEs :==      SEQUENCE {
   otherConfig-v-1540                          OtherConfig-v-1540
OPTIONAL, -- Need M
   nonCriticalExtension
RRCReconfiguration-v1560-IEs          OPTIONAL
}
RRCReconfiguration-v1560-IEs ::=      SEQUENCE {
   mrdc-SecondaryCellGroupConfig        SetupRelease
{ MRDC-SecondaryCellGroupConfig }                OPTIONAL,   -- Need
M
   radioBearerConfig2                          OCTET STRING
(CONTAINING RadioBearerConfig }                 OPTIONAL,   -- Need
M
```

```
   sk-Counter                                                   SK-Counter
OPTIONAL,   -- Need N
   nonCriticalExtension
RRCReconfiguration-v16xy-IEs-v16xy-IEs { }
OPTIONAL
}
RRCReconfiguration-v1610-IEs ::=              SEQUENCE {
   otherConfig-v1610                                      OtherConfig-v1610
OPTIONAL, -- Need M
   bap-Config-r16                                             SetupRelease
{ BAP-Config-r16 }                                              OPTIONAL, -- Need
M
   iab-IP-AddressConfigurationList-r16                IAB-IP-AddressConfigurationList-r16
OPTIONAL, -- Need M
   conditionalReconfiguration-r16                     ConditionalReconfiguration-r16
OPTIONAL, -- Need M
   daps-SourceRelease-r16                                 ENUMERATED{true}
OPTIONAL, -- Need N
   t316-r16                                                         SetupRelease
{T316-r16}                                                        OPTIONAL, -- Need
M
   needForGapsConfigNR-r16                             SetupRelease
{NeedForGapsConfigNR-r16}                                         OPTIONAL, -- Need
M
   onDemandSIB-Request-r16                              SetupRelease
{ OnDemandSIB-Request-r16 }                                     OPTIONAL, -- Need
M
   dedicatedPosSysInfoDelivery-r16                   OCTET STRING (CONTAINING
PosSystemInformation-r16-IEs)
OPTIONAL, -- Need N
   sl-ConfigDedicatedNR-r16                                SetupRelease
{SL-ConfigDedicatedNR-r16}                                      OPTIONAL, -- Need
M
   sl-ConfigDedicatedEUTRA-Info-r16               SetupRelease
{SL-ConfigDedicatedEUTRA-Info-r16}
OPTIONAL, -- Need M
   nonCriticalExtension                                        SEQUENCE { }
OPTIONAL
}
...
ConditionalReconfiguration-r16 ::=               SEQUENCE {
   attemptCondReconfig-r16                            ENUMERATED {true}   OPTIONAL,
-- Cond PCell
   condReconfigToRemovedList-r16                 CondReconfigToRemoveList-r16
OPTIONAL, -- Need N
   condReconfigToAddList-r16                          CondReconfigToAddList-r16
OPTIONAL,   -- Need N
   ...
}
CondReconfigToRemoveList-r16 ::=                SEQUENCE (SIZE (1.. maxNrofCondCells-r16))
   OF       CondReconfigId-r16
CondReconfigToAddList-r16 ::=                  SEQUENCE (SIZE (1.. maxNrofCondCells-r16))
   OF       CondReconfigToAddMod-r16
CondReconfigToAddMod-r16 ::=                   SEQUENCE {
   condReconfigId-r16                                   CondReconfigId-r16,
   condExecutionCond-r16                     SEQUENCE (SIZE (1..2)) OF MeasId
OPTIONAL,       -- Cond condReconfigAdd
   condRRCReconfig-r16                                  OCTET STRING (CONTAINING
RRCReconfiguration)                        OPTIOAL,
-- Cond condReconfigAdd
   ...
}
CellGroupConfig ::=                                      SEQUENCE {
   cellGroupId                                                  CellGroupId,
   rlc-BearerToAddModList                              SEQUENCE (SIZE(1..maxLC-ID)) OF
RLC-BearerConfig                           OPTIONAL,   -- Need N
   rlc-BearerToReleaseList                           SEQUENCE (SIZE(1..maxLC-ID)) OF
LogicalChannelIdentity
OPTIONAL,   -- Need N
   mac-CellGroupConfig                                      MAC-CellGroupConfig
OPTIONAL,   -- Need M
   physicalCellGroupConfig                                PhysicalCellGroupConfig
OPTIONAL,   -- Need M
   spCellConfig                                                 SpCellConfig
OPTIONAL, -- Need M
   sCellToAddModList                                     SEQUENCE (SIZE
(1..MaxNrofSCells)) OF SCellConfig                OPTIONAL,   -- Need N
   sCellToReleaseList                                      SEQUENCE (SIZE
(1..MaxNrofSCells)) OF SCellIndex                 OPTIONAL,   -- Need N
```

-continued

```
  ...,
  [[
  reportUplinkTxDirectCurrent                    ENUMERATED {true}
OPTIONAL    -- Cond BWP-Reconfig
  ]]
}
-- Serving sell specific MAC and PHY parameters for a SpCell:
SpCellConfig ::=                      SEQUENCE {
  servCellIndex                        ServCellIndex
OPTIONAL,   -- CondSCG
  reconfigurationWithSync             ReconfigurationWithSync
OPTIONAL,   -- Cond ReconfWithSync
  rlf-TimersAndConstants              SetupRelease { RLF-TimersAndConstants }
OPTIONAL,   -- Need M
  rlmInSyncOutOfSyncThreshold           ENUMERATED {n1}
OPTIONAL,   -- Need S
  spCellConfigDedicated                ServingCellConfig
OPTIONAL,   -- Need M
  ...
}
ReconfigurationWithSync ::=          SEQUENCE {
  spCellConfigCommon                       ServingCellConfigCommon
OPTIONAL,   -- Need M
  newUE-Identity                        RNTI-Value,
  t304                         ENUMERATED {ms50, ms100, ms150, ms200, ms500,
ms1000, ms2000, ms10000},
  rach-ConfigDedicated                 CHOICE {
    uplink                                   RACH-ConfigDedicated,
    supplementaryUplink                     RACH-ConfigDedicated
  }
OPTIONAL,   -- Need N
  ...,
  [[
  smtc                                     SSB-MTC
OPTIONAL    -- Need S
  ]]
}
ServingCellConfigCommon ::=          SEQUENCE {
  physCellId                            PhysCellId
OPTIONAL,   -- Cond HOAndServCellAdd,
  downlinkConfigCommon                      DownlinkConfigCommon
OPTIONAL,   -- Cond HOAndServCellAdd
  uplinkConfigCommon                       UplinkConfigCommon
OPTIONAL,   -- Need M
  supplementartyUplinkConfig           UplinkConfigCommon
OPTIONAL,   -- Need S
  n-TimingAdvanceOffset                 ENUMERATED { n0, n25600, n39936 }
OPTIONAL,   -- Need S
  ssb-PositionsInBurst                   CHOICE {
    shortBitmap                              BIT STRING (SIZE (4)),
    mediumBitmap                               BIT STRING (SIZE (8)),
    longBitmap                                BIT STRING (SIZE (64))
  }
OPTIONAL, -- Cond AbsFreqSSB
  ssb-periodicityServingCell            ENUMERATED { ms5, ms10, ms20, ms40,
ms80, ms160, spare2, spare1 }
OPTIONAL, -- Need S
  dmrs-TypeA-Position                  EMUMERATED {pos2, pos3},
  lte-CRS-ToMatchAround                  SetupRelease
{ RatematchPatternLTE-CRS }                          OPTIONAL, -- Need M
  rateMatchPatternToAddModList         SEQUENCE (SIZE
(1..maxNrofRateMatchPatterns)) OF RateMatchPattern       OPTIONAL, -- Need N
  rateMatchPatternToReleaseList          SEQUENCE (SIZE
(1..maxNrofRateMatchPatterns)) OF RateMatchPatternId     OPTIONAL, -- Need N
  ssbSubcarriesSpacing                SubcarriesSpacing
OPTIONAL, -- Cond HOAndServCellWithSSB
  ttd-UL-DL-ConfigurationCommon          TDD-UL-DL-ConfigCommon
OPTIONAL, -- Cond TDD
  ss-PBCH-BlockPower                       INTEGER (-60..50),
  ...
}
MeasConfig ::=                        SEQUENCE {
  measObjectToRemoveList                 MeasObjectToRemoveList
OPTIONAL,   -- Need N
  measObjectToAddModList                   MeasObjectToAddModList
OPTIONAL,   -- Need N
  reportConfigToRemoveList             ReportConfigToRemoveList
OPTIONAL,   -- Need N
  reportConfigToAddModList              ReportConfigToAddModList
```

-continued

```
OPTIONAL,   -- Need N
   measIdToRemoveList                          MeasIdToRemoveList
OPTIONAL,   -- Need N
   measIdToAddModList                          MeasIdToAddModList
OPTIONAL,   -- Need N
   s-MeasureConfig                             CHOICE {
      ssb-RSRP                                    RSRP-Range,
      csi-RSRP                                    RSRP-Range
   }
OPTIONAL,   -- Need M
   quantityConfig                              QuantityConfig
OPTIONAL,   -- Need M
   measGapConfig                               MeasGapConfig
OPTIONAL,   -- Need M
   measGapSharingConfig                        MeasGapSharingConfig
OPTIONAL,   -- Need M
   ...
}
MeasObjectToAddModList ::=                     SEQUENCE (SIZE
(1..maxNrofObjectId)) OF MeasObjectToAddMod
MeasObjectToAddMod ::=                         SEQUENCE {
   measObjectId                                 MeasObjectId,
   measObject                                   CHOICE {
      measObjectNR                                   MeasObjectNR,
      ...,
      measObjectEUTRA                                MeasObjectEUTRA
   }
}
MeasObjectNR ::=                               SEQUENCE {
   ssbFrequency                                ARFCN-ValueNR
OPTIONAL,   -- Cond SSBorAssociatedSSB
   ssbSubcarrierSpacing                        SubcarrierSpacing
OPTIONAL,   -- Cond SSBorAssociatedSSB
   smtc1                                       SSV-MTC
OPTIONAL,   -- Cond SSBorAssociatedSSB
   smtc2                                       SSV-MTC2
OPTIONAL,   -- Cond IntraFreqConnected
   refFreqCSI-RS                               ARFCN-ValueNR
OPTIONAL,   -- Cond CSI-RS
   referenceSignalConfig                       ReferenceSignalConfig,
   absThreshSS-BlocksConsolidation             ThresholdNR
OPTIONAL,   -- Need R
   absThreshCSI-RS-Consolidation               ThresholdNR
OPTIONAL,   -- Need R
   nrofSS-BlockToAverage                       INTEGER
(2..maxNrofSS-BlocksToAverage)                          OPTIONAL,   --
Need R
   nrofCSI-RS-ResourceToAverage                INTEGER
(2..maxNrofCSI-RS-ResourceToAverage)                    OPTIONAL,   -- Need
R
   quantityConfigIndex                         INTEGER (1..maxNrofQuantityConfig),
   offsetMO                                       Q-OffsetRangeList,
   cellsToRemoveList                           PCI-List
OPTIONAL,   -- Need N
   cellsToAddModList                           CellsToAddModList
OPTIONAL,   -- Need N
   blackCellsToRemoveList                      PCI-RangeIndexList
OPTIONAL,   -- Need N
   blackCellsToAddModList                      SEQUENCE (SIZE
(1..maxNrofPCI-Ranges)) OF PCI-RangeElement          OPTIONAL,   -- Need N
   whiteCellsToRemoveList                      PCI-RangeIndexList
OPTIONAL,   -- Need N
   whiteCellsToAddModList                      SEQUENCE (SIZE
(1..maxNrofPCI-Ranges)) OF PCI-RangeElement
OPTIONAL,   -- Need N
   ...,
   [[
   freqBandIndicatorNR                         FreqBandIndicatorNR
OPTIONAL,   -- Need R
   measCycleSCell                              ENUMERATED {sf160, sf256, sf320,
sf512, sf640, sf1024, sf1280}
OPTIONAL   --Need R
   ]],
   [[
   t312-r16                                    SetupRelease ( T312-r16 )
OPTIONAL   -- Need M
   ]]
}
ReportConfigToAddModList ::=                   SEQUENCE (SIZE (1..maxreportConfigId))
```

-continued

```
OF ReportConfigToAddMod
ReportConfigToAddMod ::=                SEQUENCE {
  reportConfigId                        ReportConfigId,
  reportConfig                          CHOICE {
    reportConfigNR                            ReportConfigNR,
    ...,
    reportConfigInterRAT                     ReportConfigInterRAT
  }
}
ReportConfigNR ::=                           SEQUENCE {
  reportType                                  CHOICE {
    periodical                                    PeriodicalReportConfig,
    eventTriggered                                EventTriggerConfig,
    ...,
    reportCGI                                      ReportCGI,
    reportSFTD                                       ReportSFTD-NR,
    condTriggerConfig-r16                        CondTriggerConfig-r16
  }
}
CondTriggerConfig-r16 ::=                   SEQUENCE {
  condEventId                                     CHOICE {
    condEventA3                                         SEQUENCE {
      a3-Offset
MeasTriggerQuantityOffset,
      hysteresis                                     Hysteresis,
      timeToTrigger                                    TimeToTrigger
    },
    condEventA5                                         SEQUENCE {
      a5-Threshold1                                    MeasTriggerQuantity,
      a5-Threshold2                                    MeasTriggerQuantity,
      hysteresis Hysteresis,                          TimeToTrigger
      timeToTrigger
    },
    ...
  },
  rsType-r16                                      NR-RS-Type,
  ...
}
MeasIdToAddModList ::=                  SEQUENCE (SIZE (1..maxNrofMeasId)) OF
MeasIdToAddMod
MeasIdToAddMod ::=                        SEQUENCE {
  measId                                   MeasId,
  measObjectId                           MeasObjectId,
  reportConfigId                        ReportConfigId
}
                                end of listing 17
```

FIG. 63 is a graphical representation of relevant information elements in the RRCRe-configuration message shown in Listing 17 for the example embodiment and mode of FIG. 61-FIG. 70. Herein, the RRCReconfiguration message, which is shown at the top of FIG. 63, is known as a "first" RRCReconfiguration message, may comprise a measurement configuration, measConfig, and a list of conditional reconfigurations, cond-ConfigToAddMod. Each conditional reconfiguration, which may correspond to one target candidate cell, may further comprise one or more measurement IDs, measId, and a cascaded RRCReconfiguration message, a "second" RRCReconfiguration message. The second RRCReconfiguration message may be generated by an access node, e.g., gNB, IAB-CU, etc., that serves the corresponding target candidate cell. If the access node of the corresponding target candidate cell is different from the access node of the currently serving cell, the second RRCReconfiguration message may be handed over to the currently serving access node, IAB-CU, via an inter-node protocol, such as Xn Application Protocol, XnAP, per 3GPP TS 38.423. Otherwise, the second RRCReconfiguration message may be generated by the currently serving access node, e.g., the CU part of Donor 1. The second RRCReconfiguration message may comprise a master cell group configuration, masterCellGroup, including reconfiguration-WithSync, which further comprises an identity of the target candidate cell, e.g., physCellId. and may further comprise an uplink configuration, a downlink configuration and a RACH configuration to be used during a conditional handover execution for the target candidate cell.

Each of the one or more measurement IDs, e.g., measId's, may point to a measurement object, measObjectToAddMod, and a report configuration, reportConfig-ToAddMod. As shown in FIG. 63, the first RRCReconfiguration message may include a list of measurement objects and a list of report configurations. It should be understood that the one or more measurement IDs, measId's, included in a conditional re-configuration may be linked, e.g., through one of measId-ToAddMod's in measConfig, to a pair of a measurement object ID, measObjectId, and a report configuration ID, re-portConfigID, where the measurement object ID and the report configuration ID may point to one of the measurement objects, measObjectToAddMod and one of the report configurations, reportConfigToAddMod, in the first RRCReconfiguration message, respectively.

The measurement object may comprise configuration parameters necessary to perform measurements of cell(s) including the target candidate cell. The report configuration may comprise one or more events, each of which may further comprise offset/threshold(s) and other parameters, e.g., hysteresis and timeToTrigger. The report configuration associated with the conditional reconfiguration may have to be designated for a conditional handover. In other words, in Listing 17, condTriggerConfig, not other choices like eventTriggerConfig, should be chosen for report-ConfigNR associated with condConfigAddMod.

In addition, the second RRCReconfiguration message may further comprise dedicatedSIB1 Delivery, an information element to carry system information block type 1, e.g., SIB1, and/or dedicatedSystemInformationDelivery, another information element to carry a system information message comprising one or more SIBs other than SIB1. The SIB1 and/or the system information message comprised in dedicatedSIB1 Delivery and dedicatedSystemInformationDelivery, respectively are to be used as configurations of the target candidate cell identified by the identity, physCellId, included in the second RRCReconfiguration message; to be effective after executing the CHO configured by the corresponding conditional reconfiguration.

The inclusion of dedicatedSIB1 Delivery and/or dedicatedSystemInformationDelivery in the second RRCReconfiguration message may be determined by the access node of the target candidate cell. Typically, the access node of the target candidate cell may include one of or both dedicatedSIB1 Delivery and dedicatedSystemInformation-Delivery information elements in a case that the wireless terminal is expected to be incapable of acquiring system information from the target candidate cell after executing the CHO. For example, in a case that the second RRCReconfiguration message for the target candidate cell configures an active bandwidth part, BWP, with no common search space for monitoring the system information, the system information for the target candidate cell may have to be provided by a dedicated signaling, and the inclusion of one of or both the information elements in the conditional reconfiguration may serve as a means to dedicatedly provide the system information in advance.

Figure 64:
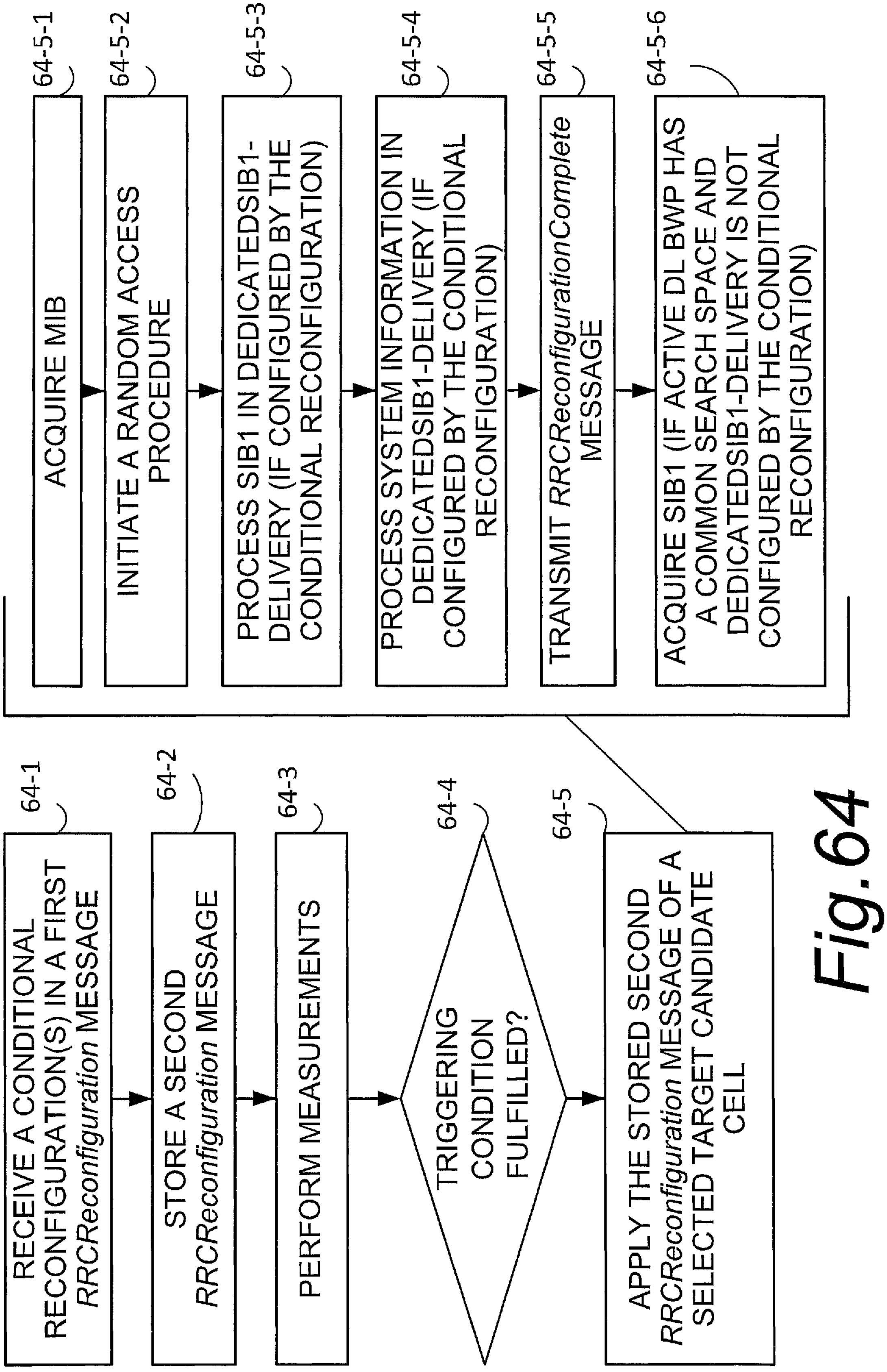
FIG. 64 shows example acts or steps for the wireless terminal of FIG. 62 to apply the system information provided by a conditional reconfiguration.

FIG. 64 shows acts or steps for wireless terminal 26(62) to apply the system information provided by a conditional reconfiguration. Act 64-1 shows the wireless terminal receiving, while in RRC_CONNECTED state, a first RRCReconfiguration message, such as the first RRCReconfiguration message of FIG. 61. As shown in FIG. 63, the first RRCReconfiguration message, which may be processed by conditional re-configuration handler 302, may comprise one or more instances of conditional reconfigurations, e.g., condReconfigToAddMod, each of which may further comprise an association(s) to a measurement object(s), a triggering condition(s) and a second RRCReconfiguration message, condRRCReconfig, for each target candidate cell. As act 64-2, the wireless terminal stores the received one or more second RRCReconfigration messages.

Based on the measurement object(s), the wireless terminal as act 64-3 may perform measurements for a target candidate cell(s), as act 64-4 may check if any of the triggering condition(s) is/are fulfilled. In the illustrated, non-limiting example structure of FIG. 62, the measurements of act 64-3 may be performed by measurement unit 304, and the triggering check of act 64-4 may be performed by trigger evaluator 306. If the check is negative, the wireless terminal may continue performing measurements. If positive, as act 64-5 the wireless terminal may apply the second RRCReconfiguration message configured for the target candidate cell whose triggering condition is fulfilled.

The act of applying the second RRCReconfiguration message as shown by act 64-5 of FIG. 64 may further comprise the following processes:

Perform the cell group configuration for the received masterCellGroup
- If the masterCellGroup contains the spCellConfig with reconfiguration WithSync:
  - acquire the MIB of the target SpCell (act 64-5-1).
  - initiate a random access procedure to the target SpCell (act 64-5-2).

If the second RRCReconfiguration message includes the dedicatedSIB1-Delivery:
- process SIB1 in the dedicatedSIB1-Delivery (act 64-5-3).

If the second RRCReconfiguration message includes the dedicatedSystemInformationDelivery:
- Process the System Information in the dedicatedSystemInformationDelivery (act 64-5-4).

Transmit an RRCReconfigurationComplete (act 64-5-5).

If the second RRCReconfiguration does not include dedicatedSIB1-Delivery and if the active downlink BWP for the target SpCell of the MCG has a common search space:
- acquire the SIB1 of the target SpCell of the MCG (act 64-5-6).

For sake of the foregoing, it will be understood from other discussions herein that: (1) a masterCellGroup, or MCG, may be utilized in a Dual Connectivity (DC) scenario in which a Master gNodeB such as shown in FIG. 38 in which a UE may be configured with a group of one or more cells served by a master node (MN), Master Cell Group (MCG) and a group of one or more cells served by a secondary node (SN), Secondary Cell Group (SCG); and (2) a SpCell is a special cell which may be used for obtaining timing reference to be used for the corresponding secondary cell group (SCG).

Figure 65:
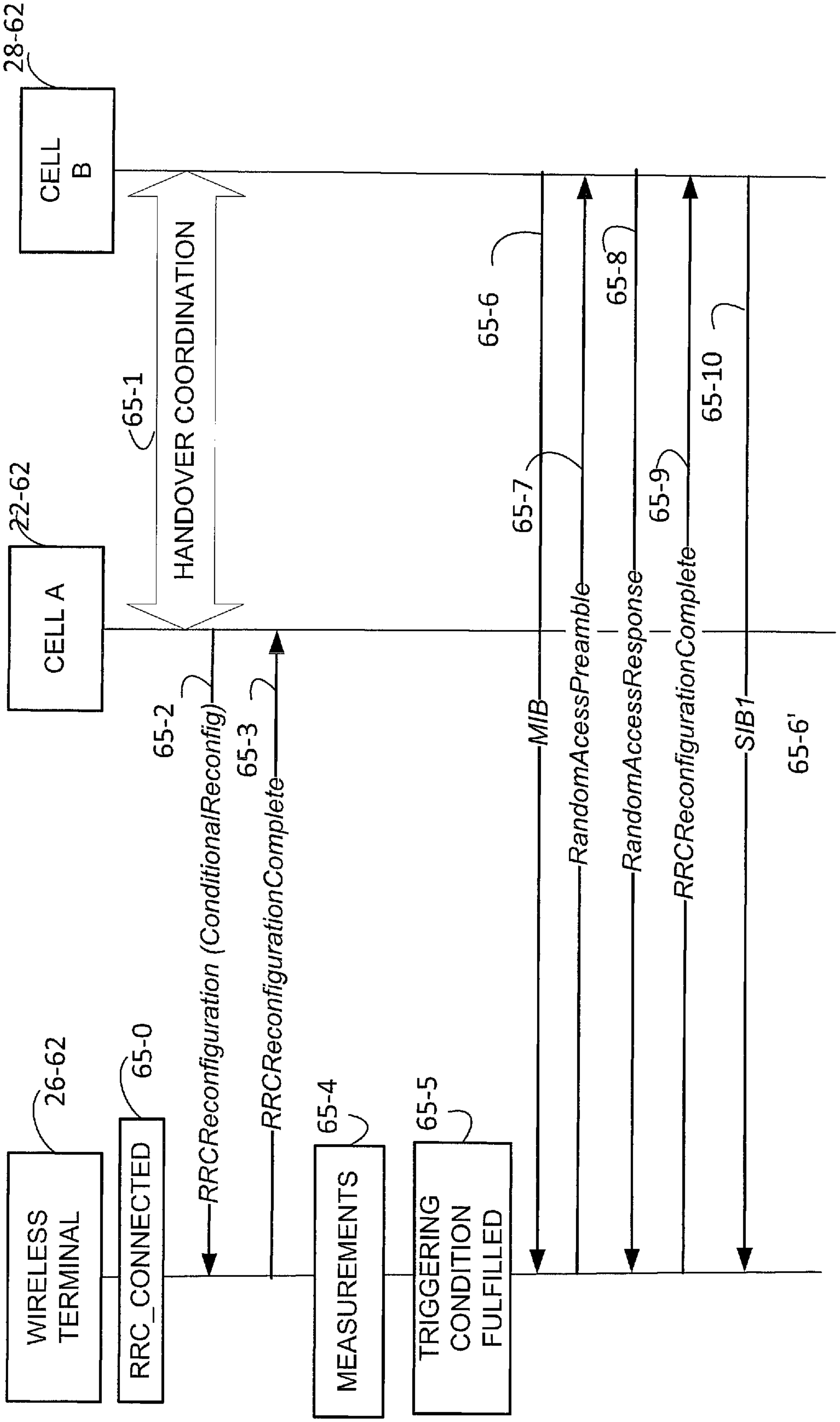
FIG. 65 shows an example message flow of the scenario depicted in FIG. 61.

FIG. 65 shows an example message flow of the scenario depicted in FIG. 61. First, as act 65-0, the wireless terminal is in RRC_CONNECTED state maintaining an RRC connection with Cell A. As act 65-1 Access Node A serving Cell A initiates a CHO coordination with Access Node B serving Cell B, a target candidate cell. During the CHO coordination, Access Node B may generate and provide Access Node A the second RRCReconfiguration message for Cell B, a target candidate cell for the wireless terminal. As act 65-2 Access Node A may then generate and send to the wireless terminal the first RRCReconfiguration message comprising a conditional reconfiguration including a measurement object(s), a triggering condition(s) and the second RRCReconfiguration message. In response to receiving the first RRCReconfiguration message, as act 65-3 the wireless terminal may transmit a RRCReconfigurationComplete message to Cell A.

Based on the measurement object(s), as act 65-4 the wireless terminal may perform measurements for neighboring cells including Cell B. If one of the triggering condition(s) is fulfilled based on the measurements performed as act 65-5): as act 65-6 the wireless terminal may acquire Master Information Block (MIB); as act 65-7 initiate a random access procedure comprising transmitting a Random Access Preamble; and, as act 65-8 receive a Random Access Response. The random access procedure may be performed based on a configuration provided in the second RRCReconfiguration message, e.g., rach-ConfigDedicated. After a successful completion of the random access procedure, as act 65-9 the wireless terminal may transmit an RRCReconfigurationComplete message to Cell B. Finally, as act 65-10, the wireless terminal may acquire SIB1 from Cell B, if SIB1 was not provided in the second RRCReconfiguration message and the active downlink BWP for Cell B has a common search space.

Figure 66:
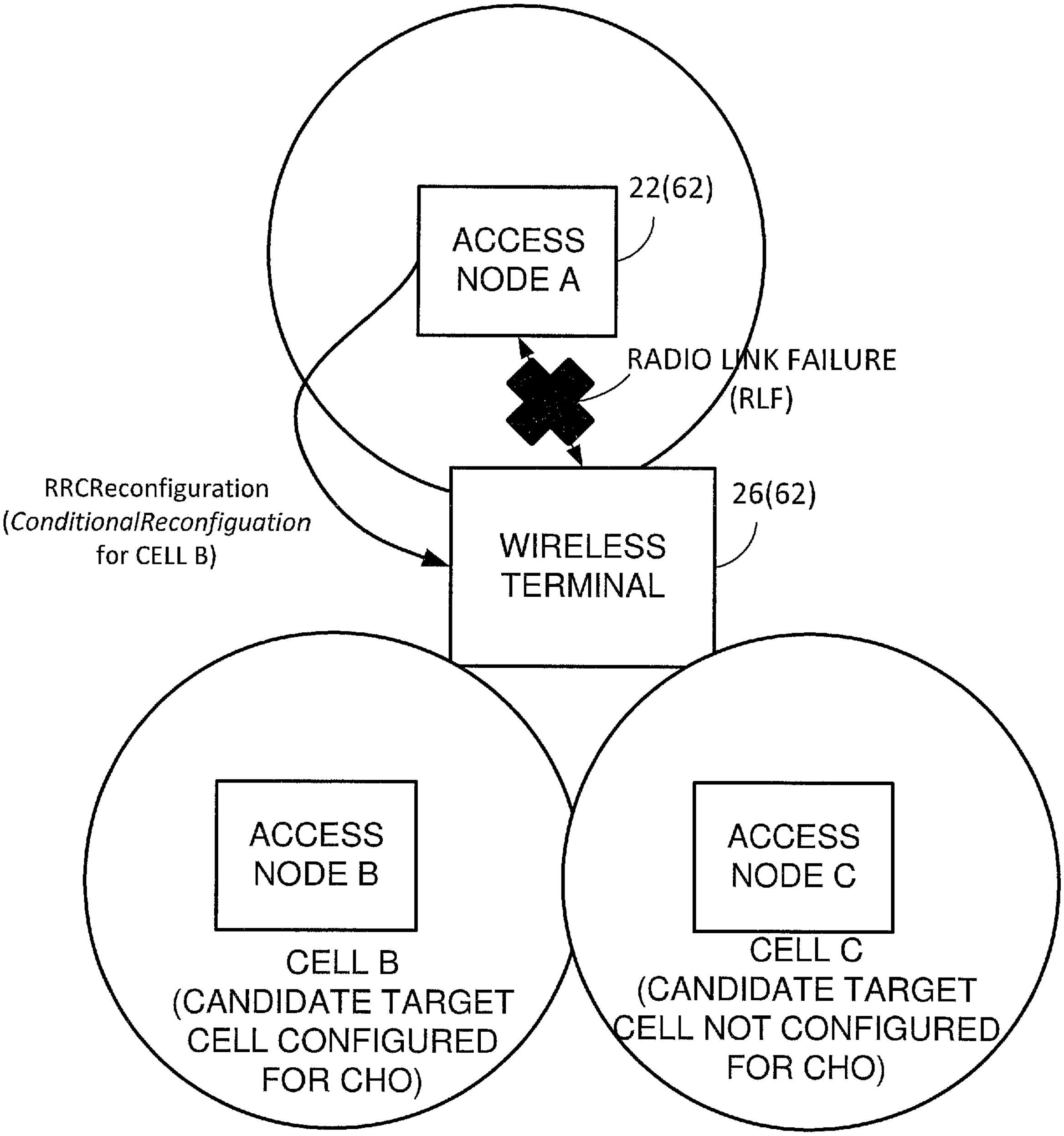
FIG. 66 is a diagrammatic view detecting two possible scenarios for recovery of the RRC connection when a radio link failure occurs in the example example embodiment and mode of FIG. 61-FIG. 70.

In the scenario depicted in FIG. 61, after the wireless terminal receives one or more conditional reconfigurations included in the first RRCReconfiguration message and before the wireless terminal executes a handover, e.g., a conventional handover or a CHO configured by one of the one or more conditional reconfigurations, it is possible that the radio link to the source cell/node, e.g., Cell A of FIG. 61, may become deteriorated and result in a radio link failure, RLF. When such an RLF occurs, there are two possible scenarios for a recovery of the RRC connection, as shown in FIG. 66. A first possible scenario is to recover the connection to a cell not configured as a target candidate cell. A second possible scenario is to recover the connection to one of the target candidate cells configured for CHO. For example, in FIG. 66, the wireless terminal has established an RRC connection to Cell A, has received a conditional re-configuration for Cell B, and now the connection experiences an RLF. The first scenario mentioned above is the case where the wireless terminal happens to recover the connection to Cell C. The second scenario mentioned above is the case where the wireless terminal happens to recover the connection to Cell B.

Figure 67:
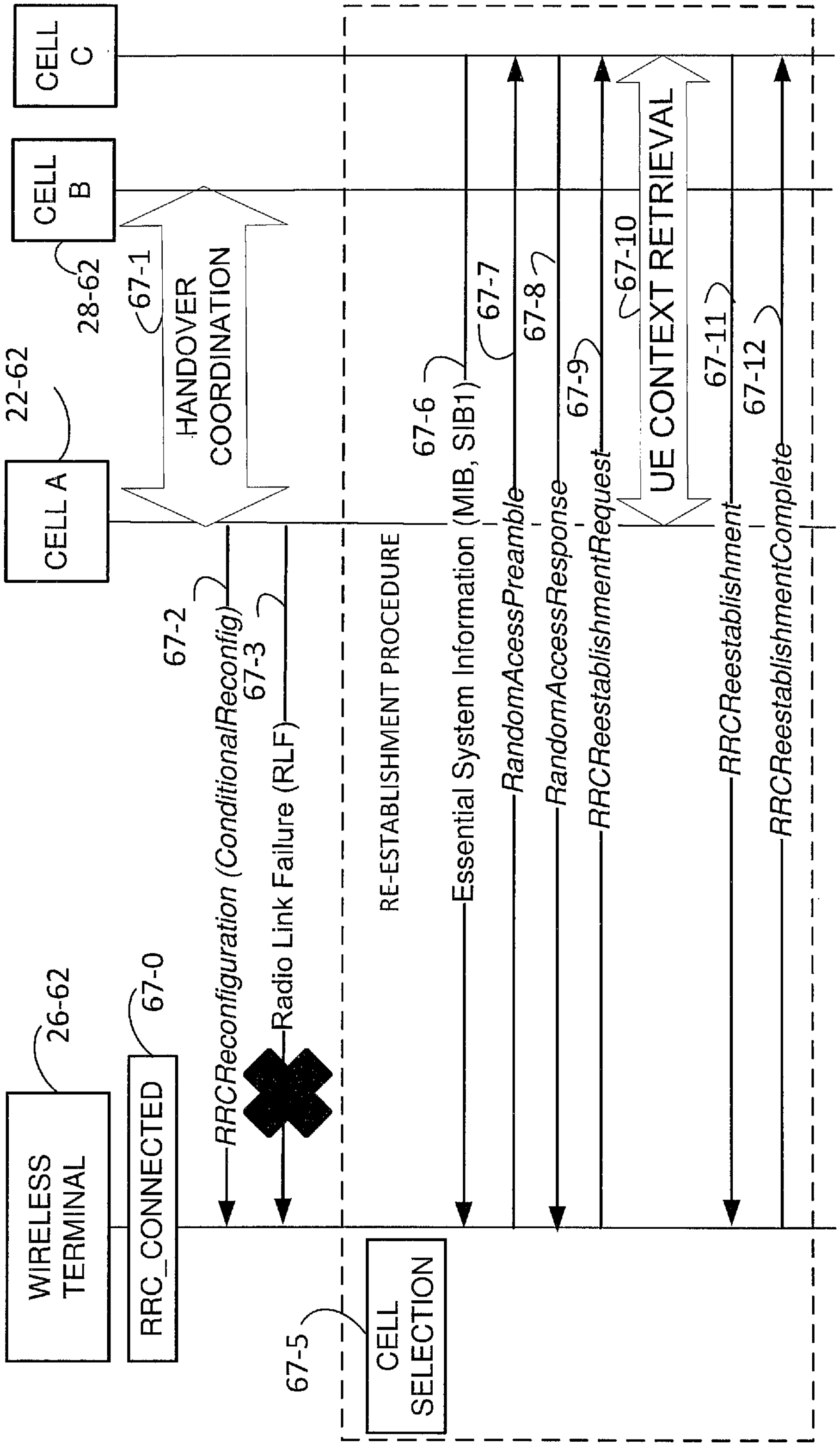
FIG. 67 is a diagrammatic view showing shows acts involved in an example message flow for a first scenario of FIG. 66.

FIG. 67 shows an example message flow for the first scenario mentioned above with reference to FIG. 66. Step 67-0 to Step 67-3 are identical to Step 65-0 to Step 65-3 of FIG. 65. At Step 67-4 the wireless terminal may detect a radio link failure, RLF. The RLF may trigger a connection re-establishment procedure which is framed by broken lines in FIG. 67. In the re-establishment procedure of FIG. 67, as act 67-5 the wireless terminal performs a cell selection procedure to search for a suitable cell. During the cell selection procedure of act 67-5, the wireless terminal may scan one or more radio frequencies/channels/bands to find a suitable cell, where a suitable cell may be a non-barred cell of a selected/registered PLMN with its signal strength/quality exceeding a (pre) configured threshold(s). To find a suitable cell, the wireless terminal may be required to acquire essential system information, such as MIB and SIB1, to determine suitability of a found cell. In the scenario of FIG. 67, as act 67-6 the wireless terminal happens to receive the essential system information from Cell C and determines that Cell C is suitable. The wireless terminal may then as act 67-7 and act 67-8 initiate a random access procedure to get synchronized to Cell C. Upon successful completion of the random access procedure, as act 67-9 the wireless terminal may send an RRCReestablishmentRequest message to Cell C. As shown by act 67-10, the RRCReestablishmentRequest message may be used by Access Node C to retrieve a UE context of the wireless terminal from Access Node A. Upon successful retrieval of the UE context, as act 23-11 Cell C may transmit an RRCReestablishment message to the wireless terminal. The connection re-establishment procedure may end by the wireless terminal responding with an RRCReestablishmentComplete message, as shown by act 67-12.

Figure 68:
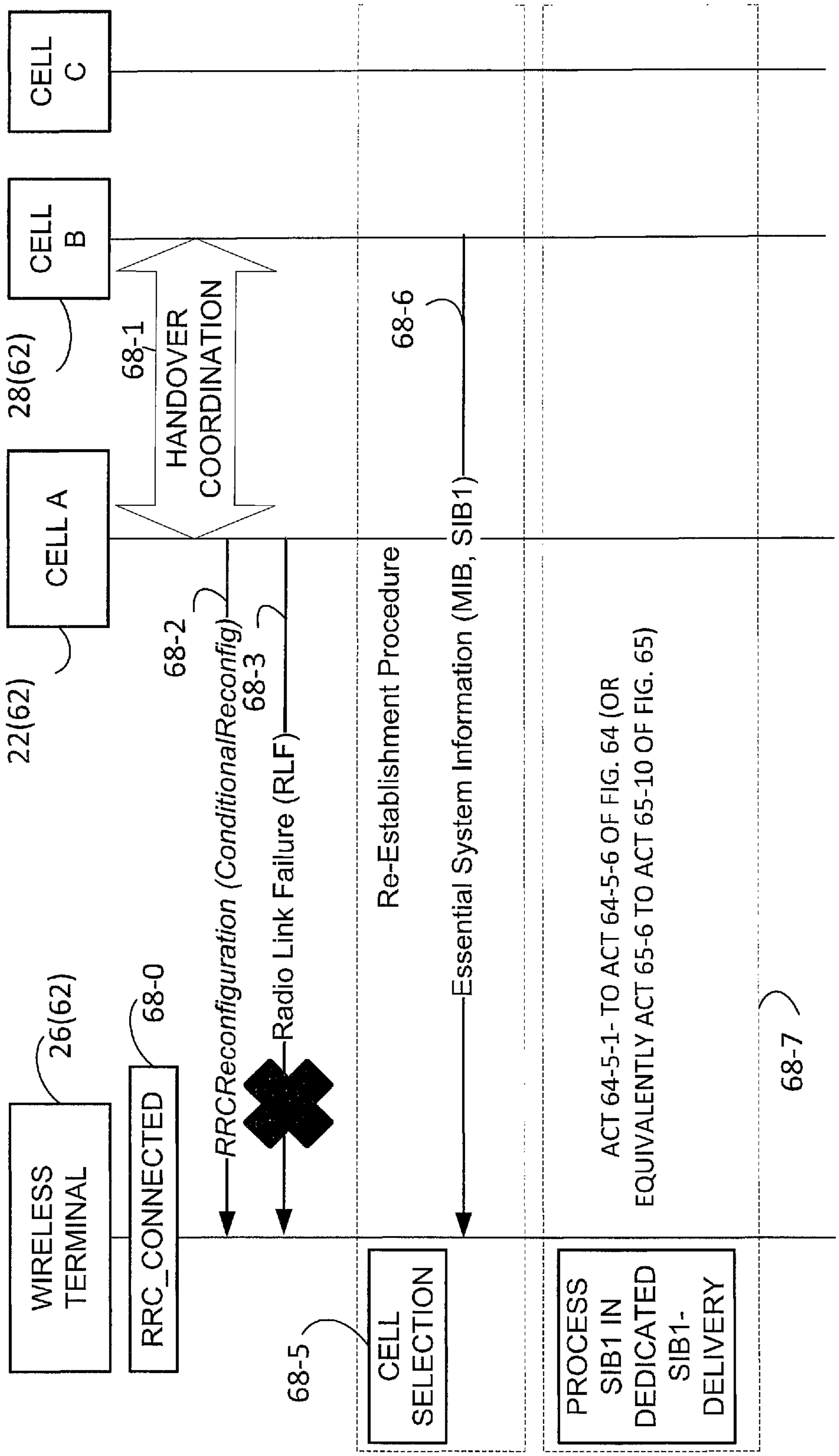
FIG. 68 is a diagrammatic view showing shows acts involved in an example message flow for a second scenario of FIG. 66.

FIG. 68 shows an example message flow for the second scenario mentioned above with reference to FIG. 66. Act 68-0 to act 68-5 are identical to act 67-0 to act 67-5 of FIG. 67. In the scenario of FIG. 68, however, as act 68-6 the wireless terminal happens to receive the essential system information from Cell B and determines that Cell B is not only suitable but also one of the cell(s) configured for CHO. The wireless terminal may terminate the connection re-establishment procedure and execute a CHO to Cell B. That is, as depicted by act 68-7, the wireless terminal may perform act of FIG. 64, which may further comprise act 64-5-1 to act 64-5-6, or equivalently perform act 65-6 to act 65-10 of FIG. 65.

Consider the case where a second RRCReconfiguration message comprises dedicatedSIB1-Delivery, a dedicated delivery of SIB1 for a target candidate cell. For example, the first RRCReconfiguration massage at act 68-2 comprises a conditional re-configuration for Cell B, which further comprises a second RRCReconfiguration message including dedicatedSIB1-Delivery. Based on act 64-2 of FIG. 64, this dedicatedSIB1-Delivery containing SIB1 of Cell B is stored, but not used e.g., not applied, yet. In act 68-6, the wireless terminal acquires SIB1 of Cell B during the connection re-establishment procedure. Then during act 68-7, or equivalently act 64-5 of FIG. 64, the wireless terminal could potentially now apply the stored SIB1, which is older than the SIB acquired in act 68-6. It is possible that Access Node B may update SIB1 after act 64-2 and before act 64-6. Thus, the stored SIB1, when applied during act 64-7, could become obsolete.

The example embodiment and mode of FIG. 61-FIG. 70 seeks to avoid the scenario, as described above, where a newer version of system information could become replaced by an older version. Herein "a version of system information" may mean a snapshot of the system information acquired at a certain time. A newer version may be identical to or different from an older version. Specifically, the wireless terminal may omit, or may not perform, the act of applying stored system information during a CHO execution to a target candidate cell, in a case that the CHO execution is triggered by the target candidate cell being found in a connection re-establishment procedure and a version of the stored system information is acquired in the connection re-establishment procedure. The system information version selector 310 may perform the act of omitting or not applying the stored system information during the CHO execution to a target candidate cell. The stored system information may be SIB1, other SIB(s), and/or system information message(s), and may be configured dedicatedly as a conditional re-configuration of the target candidate cell.

In a case that the stored system information is SIB1, the processes corresponding to act 64-5 of FIG. 64 may be modified in the following manner:

- Perform the cell group configuration for the received masterCellGroup
  - If the masterCellGroup contains the spCellConfig with reconfiguration WithSync:
    - acquire the MIB of the target SpCell, e.g., act 64-5-1.
    - initiate a random access procedure to the target SpCell, e.g., act 64-5-2).
- If the second RRCReconfiguration message includes the dedicatedSIB1-Delivery, and this procedure of applying the second RRCReconfiguration message is not triggered by the RRC connection re-establishment procedure selecting the target SpCell:
  - process SIB1 in the dedicatedSIB1-Delivery, act 64-5-3).
- If the second RRCReconfiguration message includes the dedicatedSystemInformationDelivery:
  - Process the System Information in the dedicatedSystemInformationDelivery, e.g., act 64-5-4).
- Transmit an RRCReconfigurationComplete, e.g., act 64-5-5).

If the second RRCReconfiguration does not include dedicatedSIB1-Delivery and if the active downlink BWP for the target SpCell of the MCG has a common search space:

acquire the SIB1 of the target SpCell of the MCG, e.g., act 64-5-6).

To generalize, a version of system information, e.g., SIB1, other SIB(s) and/or a system information message(s), provided dedicatedly by a conditional reconfiguration for a target candidate cell may not be applied to a wireless terminal during an execution of the conditional reconfiguration, if another version of the system information is acquired from the target candidate cell after receiving the conditional re-configuration and before the execution of the conditional reconfiguration. The system information version selector 310 may be the unit or functionality of wireless terminal 26(62) that essentially chooses or selects between a first version, e.g., a stored version of the system information as received in the conditional reconfiguration, and a second version, e.g., a version of the system information acquired from the target candidate cell.

If act 68-7, e.g., act 64-5, is triggered due to the connection re-establishment procedure finding a target candidate cell for CHO, the acquisition of SIB1 in act 64-5-6 may be redundant, since the SIB1 has been already acquired in act 67-6 during the connection re-establishment procedure. Thus, in such a case, the wireless terminal of this embodiment and mode may skip act 64-5-6. Re-acquiring SIB1, such as in act 64-5-6, may not be harmful since in this case replacement of system information by older version does not occur.

Figure 69:
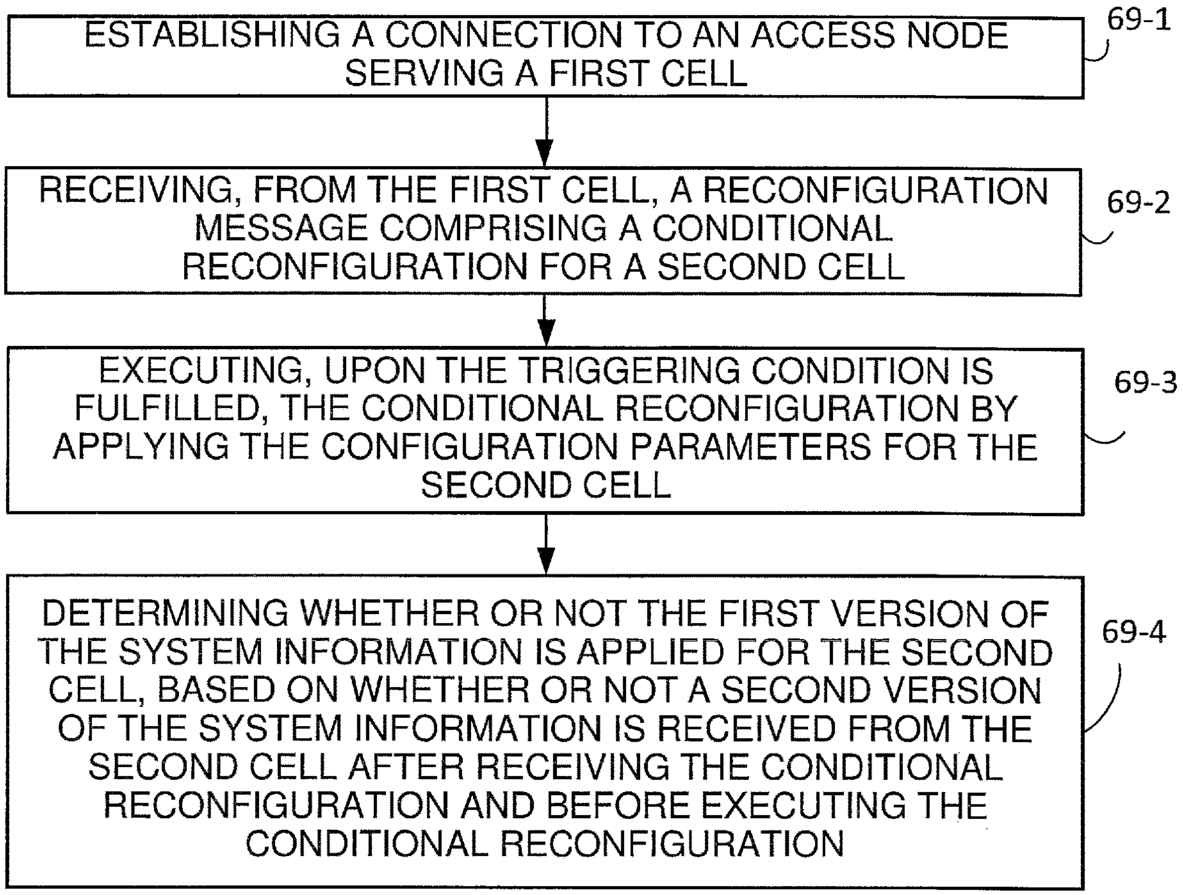
FIG. 69 is a flow chart showing example representative steps or acts performed by an example wireless terminal of the example embodiment and mode of FIG. 62.

FIG. 69 is a flow chart showing example representative steps or acts performed by a wireless terminal, UE, such as wireless terminal 26(62), of the example embodiment and mode of FIG. 61-FIG. 70. Act 69-1 comprises establishing a connection to an access node serving a first cell. The first cell may be a primary cell (PCell) or a special cell (SpCell) of a master cell group (MCG).

Act 69-2 comprises receiving, from the first cell, a reconfiguration message comprising a conditional reconfiguration for a second cell. The reconfiguration message may be the first reconfiguration message disclosed previously. The conditional reconfiguration may further comprise a triggering condition, configuration parameters, and a first version of system information. The system information may be a SIB1, or one or more other SIBs. In the case of SIB1, the first version of the SIB1 may be included in the dedicatedSIB1-Delivery information element in the second re-configuration message. In the case of one or more other SIBs, the first version of the SIB1 may be included in the dedicatedSystemInformation-Delivery information element in the second reconfiguration message. The second cell may be a target candidate cell for a conditional handover.

Act 69-3 comprises executing, upon the triggering condition is fulfilled, the conditional reconfiguration by applying the configuration parameters for the second cell. Applying the configuration parameters results in a handover to the second cell.

Act 69-4 comprises determining whether or not the first version of the system information is applied for the second cell, based on whether or not a second version of the system information is received from the second cell after receiving the conditional reconfiguration and before executing the conditional reconfiguration. The determination of act 69-4 may be performed by system information version selector 310. If the second version of the system information is not received, the first version of the system information is applied for the second cell. Otherwise, the first version of the system information is not applied and, instead, the second version is applied for the second cell. The second version of the system information may be received during a connection re-establishment procedure triggered by a radio link failure (RLF) detected on the connection to the first cell.

Figure 70:
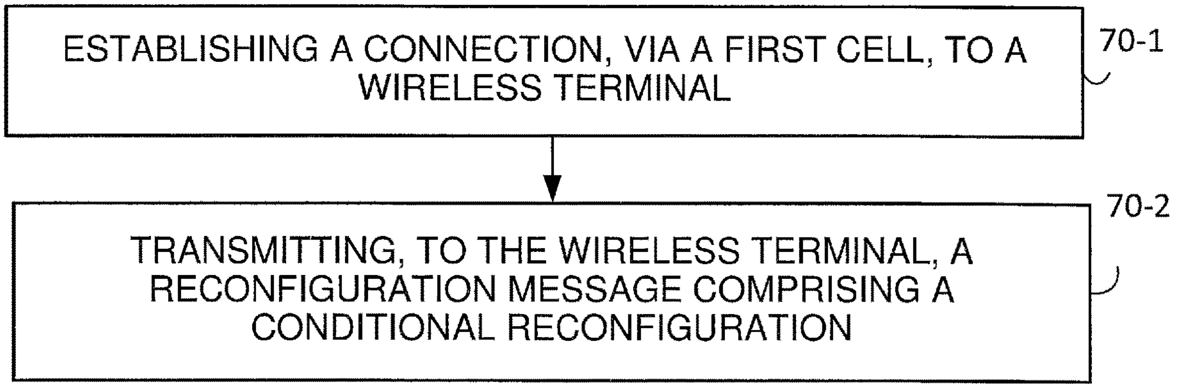
FIG. 70 is a flow chart showing example representative steps or acts performed by an example access node of the example embodiment and mode of FIG. 62.

FIG. 70 is a flow chart showing example representative steps or acts performed by an access node. e.g., gNB, of the example embodiment and mode of FIG. 61-FIG. 70. Act 70-1 comprises establishing a connection, via a first cell, to a wireless terminal. The first cell may be a primary cell, PCell, or a special cell, SpCell, of a master cell group, MCG. Act 70-2 comprises transmitting, to the wireless terminal, a reconfiguration message comprising a conditional reconfiguration. The reconfiguration message may be the first reconfiguration message disclosed previously. The conditional reconfiguration may further comprise a triggering condition, configuration parameters and a first version of system information. The system information may be a SIB1, or one or more other SIBs. In the case of SIB1, the first version of the SIB1 may be included in the dedicatedSIB1-Delivery information element in the second reconfiguration message. In the case of one or more other SIBs, the first version of the SIB1 may be included in the dedicatedSystemInformation-Delivery information element in the second reconfiguration message. The second cell may be a target candidate cell for a conditional handover. Upon the triggering condition is fulfilled, the conditional reconfiguration is executed by the wireless terminal applying the configuration parameters for the second cell. Furthermore, upon the triggering condition is fulfilled, whether or not the first version of the system information is applied for the second cell is determined by the wireless terminal, based on whether or not a second version of the system information is received from the second cell after the conditional reconfiguration is received and before the conditional reconfiguration is executed. If the second version of the system information is not received, the first version of the system information is applied for the second cell. Otherwise, the first version of the system information is not applied and, instead, the second version is applied for the second cell. The second version of the system information may be received during a connection re-establishment procedure triggered by a radio link failure (RLF) detected on the connection to the first cell.

The technology disclosed herein thus proposes, e.g., methods and apparatus for a UE to handle measurement reports associated with conditional handover configurations. Specifically:

The UE may suppress measurement reports for cells configured as candidate target cells for conditional handovers. The suppression may be configured by the gNB of the serving cell.

The UE may continue measurement reports in a periodic manner for cells configured as candidate target cells for conditional handovers. The periodicity may be configured by the gNB of the serving cell.

The gNB may configure the UE with leaving condition(s) associated with conditional handover configurations. The UE may discard the conditional handover configurations when some of the leaving condition(s) is/are met.

The conditional handover configurations may be associated with a second security configuration(s). The security configuration(s) may be used for establishing a security context after performing a conditional handover.

The conditional handover configurations may be released upon a mobility event, such as a handover and re-establishment, based on the second security configurations, and a first security configuration configured for the mobility event.

Configuration mechanism for conditional PSCell addition/modification is disclosed, including configuration for multiple candidate PSCells as well as security configuration for PSCell(s).

The PSCell addition/modification configurations may be invalidated in a case that the master security key for the master node (MN) has changed.

The validity of a stored conditional handover configuration after executing a (condition/non-conditional) handover is determined based on whether or not the conditional handover configuration was signaled in full configuration.

A version of system information, e.g., SIB1, other SIB(s) and/or a system information message(s), provided dedicatedly by a conditional reconfiguration for a target candidate cell may not be applied to a wireless terminal during an execution of the conditional reconfiguration, if another version of the system information is acquired from the target candidate cell after receiving the conditional reconfiguration and before the execution of the conditional reconfiguration.

Figure 71:
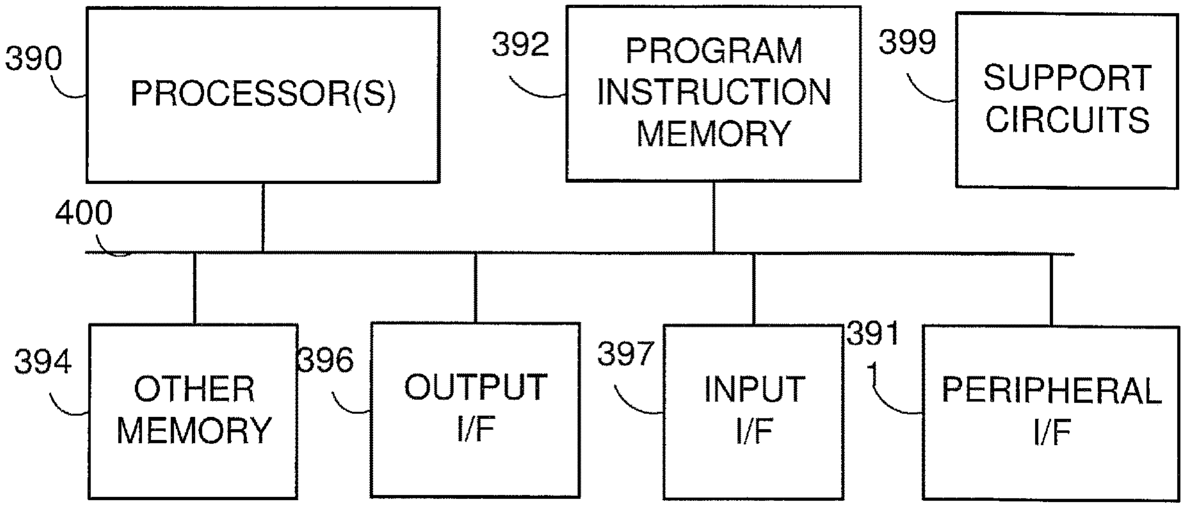
FIG. 71 is a diagrammatic view showing example elements comprising electronic machinery which may comprise a wireless terminal, a radio access node, and a core network node according to an example embodiment and mode.

Certain units and functionalities of the systems 20 may be implemented by electronic machinery. For example, electronic machinery may refer to the processor circuitry described herein, such as node processor(s) 30, and terminal processor(s) 40 and in particular node processor 30(62) and terminal processor 40(62). Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 71 shows an example of electronic machinery, e.g., processor circuitry, as comprising one or more processors 390, program instruction memory 392; other memory 394 (e.g., RAM, cache, etc.); input/output interfaces 396 and 397, peripheral interfaces 398; support circuits 399; and busses 400 for communication between the aforementioned units. The processor(s) 390 may comprise the processor circuitries described herein, for example, node processor(s) 30 and terminal processor(s) 40.

An memory or register described herein may be depicted by memory 394, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 399 are coupled to the processors 390 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the node processor(s) 30 and terminal processor(s) 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The technologies of the various example embodiments and modes described herein may be implemented either singly or in combination with one another. For example, one or more features of the example embodiment and mode of FIG. 6, one or more features of the example embodiment and mode of FIG. 11, one or more features of the example embodiment and mode of FIG. 15, one or more features of the example embodiment and mode of FIG. 19, one or more features of the example embodiment and mode of FIG. 28, one or more features of the example embodiment and mode of FIG. 37, one or more features of the example embodiment and mode of FIG. 44, one or more features of the example embodiment and mode of FIG. 47, one or more features of the example embodiment and mode of FIG. 50, one or more features of the example embodiment and mode of FIG. 55 may be combined for use with one or more of each other; and one or more features of the example embodiment and mode of FIG. 62 may be combined for use with one or more of each other.

It will be appreciated that the technology disclosed herein is directed to solving radio communications-centric issues and is necessarily rooted in computer technology and overcomes problems specifically arising in radio communications. Moreover, the technology disclosed herein improves basic function of a providing a wireless terminal with system information to enable the wireless terminal to communicate with the network 20.

The technology disclosed herein encompasses one or more of the following non-limiting, non-exclusive example embodiments and modes:

Example Embodiment 1: A wireless terminal comprising:

processor circuitry configured to establish a connection to an access node serving a first cell;

receiver circuitry configured to receive, from the first cell, a reconfiguration message comprising a conditional reconfiguration for a second cell, the conditional reconfiguration comprising:

a triggering condition, configuration parameters, and a first version of system information;

the processor circuitry further configured, upon the triggering condition being fulfilled, to:

execute the conditional reconfiguration by applying the configuration parameters for the second cell; and, determine whether or not the first version of the system information is applied for the second cell, based on whether or not a second version of the system information is received from the second cell after receiving the conditional reconfiguration and before executing the conditional reconfiguration.

Example Embodiment 2: The wireless terminal of Example Embodiment 1, wherein the first version of the system information is applied for the second cell in a case that the second version of the system information is not received from the second cell.

Example Embodiment 3: The wireless terminal of Example Embodiment 1, wherein the first version of the system information is not applied for the second cell in a case that the second version of the system information is received from the second cell.

Example Embodiment 4: The wireless terminal of Example Embodiment 3, wherein the second version of the system information is applied for the second cell.

Example Embodiment 5: The wireless terminal of Example Embodiment 1, wherein the second version of the system information is received during a connection re-establishment procedure, the connection re-establishment procedure being triggered by a radio link failure (RLF) detected on the connection to the first cell.

Example Embodiment 6: The wireless terminal of Example Embodiment 1, wherein the system information is a System Information Block Type 1 (SIB1).

Example Embodiment 7: The wireless terminal of Example Embodiment 1, wherein the system information is one or more SIBs other than SIB1.

Example Embodiment 8: The wireless terminal of Example Embodiment 1, wherein the second cell is a target candidate cell of a conditional handover.

Example Embodiment 9: An access node serving a first cell, the access node comprising:

processor circuitry configured to establish a connection, via a first cell, to a wireless terminal;

transmitter circuitry configured to transmit, to the wireless terminal, a reconfiguration message comprising a conditional reconfiguration for a second cell, the conditional re-configuration comprising:

a triggering condition, configuration parameters, and a first version of system information, wherein the reconfiguration message is configured whereby, upon the triggering condition being fulfilled:

the conditional reconfiguration is executed by the wireless terminal applying the configuration parameters for the second cell, and;

whether or not the first version of the system information is applied for the second cell is determined by the wireless terminal, based on whether or not a second version of the system information is received from the second cell after the conditional reconfiguration is received and before the conditional reconfiguration is executed.

Example Embodiment 10: The access node of Example Embodiment 9, wherein the first version of the system information is applied for the second cell in a case that the second version of the system information is not received by the wireless terminal from the second cell.

Example Embodiment 11: The access node of Example Embodiment 9, wherein the first version of the system information is not applied for the second cell in a case that the second version of the system information is received by the wireless terminal from the second cell.

Example Embodiment 12: The wireless terminal of Example Embodiment 11, wherein the second version of the system information is applied for the second cell.

Example Embodiment 13: The access node of Example Embodiment 9, wherein the second version of the system information is received during a connection re-establishment procedure, the connection re-establishment procedure being triggered by a radio link failure (RLF) detected on the connection to the first cell.

Example Embodiment 14: The access node of Example Embodiment 9, wherein the system information is a System Information Block Type 1 (SIB1).

Example Embodiment 15: The access node of Example Embodiment 9, wherein the system information is one or more SIBs other than SIB1.

Example Embodiment 16: The access node of Example Embodiment 9, wherein the second cell is a target candidate cell of a conditional handover.

Example Embodiment 17: A method for a wireless terminal comprising:

establishing a connection to an access node serving a first cell;

receiving, from the first cell, a reconfiguration message comprising a conditional re-configuration for a second cell, the conditional reconfiguration comprising:

a triggering condition,
configuration parameters, and
a first version of system information;
upon the triggering condition being fulfilled:
executing the conditional reconfiguration by applying the configuration parameters for the second cell, and;
determining whether or not the first version of the system information is applied for the second cell, based on whether or not a second version of the system information is received from the second cell after receiving the conditional reconfiguration and before executing the conditional reconfiguration.

Example Embodiment 18: The method of Example Embodiment 17, wherein the first version of the system information is applied for the second cell in a case that the second version of the system information is not received from the second cell.

Example Embodiment 19: The method of Example Embodiment 17, wherein the first version of the system information is not applied for the second cell in a case that the second version of the system information is received from the second cell.

Example Embodiment 20: The method of Example Embodiment 19, wherein the second version of the system information is applied for the second cell.

Example Embodiment 21: The method of Example Embodiment 17, wherein the second version of the system information is received during a connection re-establishment procedure, the connection re-establishment procedure being triggered by a radio link failure (RLF) detected on the connection to the first cell.

Example Embodiment 22: The method of Example Embodiment 17, wherein the system information is a System Information Block Type 1 (SIB1).

Example Embodiment 23: The method of Example Embodiment 17, wherein the system information is one or more SIBs other than SIB1.

Example Embodiment 24: The method of Example Embodiment 17, wherein the second cell is a target candidate cell of a conditional handover.

Example Embodiment 25: A method for an access node serving a first cell, the method comprising:
establishing a connection, via a first cell, to a wireless terminal;
transmitting, to the wireless terminal, a reconfiguration message comprising a conditional reconfiguration for a second cell, the conditional reconfiguration comprising:
a triggering condition,
configuration parameters, and
a first version of system information;
wherein, upon the triggering condition being fulfilled:
the conditional reconfiguration is executed by the wireless terminal applying the configuration parameters for the second cell; and,
whether or not the first version of the system information is applied for the second cell is determined by the wireless terminal, based on whether or not a second version of the system information is received from the second cell after the conditional reconfiguration is received and before the conditional reconfiguration is executed.

Example Embodiment 26: The method of Example Embodiment 25, wherein the first version of the system information is applied for the second cell in a case that the second version of the system information is not received by the wireless terminal from the second cell.

Example Embodiment 27: The method of Example Embodiment 25, wherein the first version of the system information is not applied for the second cell in a case that the second version of the system information is received by the wireless terminal from the second cell.

Example Embodiment 28: The method of Example Embodiment 27, wherein the second version of the system information is applied for the second cell.

Example Embodiment 29: The method of Example Embodiment 25, wherein the second version of the system information is received during a connection re-establishment procedure, the connection re-establishment procedure being triggered by a radio link failure (RLF) detected on the connection to the first cell.

Example Embodiment 30: The method of Example Embodiment 25, wherein the system information is a System Information Block Type 1 (SIB1).

Example Embodiment 31: The method of Example Embodiment 25, wherein the system information is one or more SIBs other than SIB1.

Example Embodiment 32: The method of Example Embodiment 25, wherein the second cell is a target candidate cell of a conditional handover.

One or more of the following documents may be pertinent to the technology disclosed herein (all of which are incorporated herein by reference in their entirety): 3GPP RAN2 #109 bis Contributions:

| | |
|---|---|
| R2-2002599 | Discussions on VarRLF-Report Setting Quectel |
| R2-2002748 | On measurement and evaluation during CHO execution Futurewei |
| R2-2002900 | T304 running issue when CHO Execution LG Electronics Inc. |
| R2-2002901 | Failure handling of both CHO and MR-DC LG Electronics Inc. |
| R2-2002902 | Consideration on CHO capability LG Electronics Inc. |
| R2-2002951 | Discussion of some remaining issues for CHO OPPO |
| R2-2002996 | Corrections to conditional reconfiguration evaluation PANASONIC R&D Center Germany |
| R2-2003028 | UE capabilities for CHO and NR T312 Nokia, Nokia Shanghai Bell |
| R2-2003035 | CHO and MR-DC operation Ericsson |
| R2-2003036 | Failure handling interaction Ericsson |
| R2-2003037 | UE capabilities for CHO Ericsson |
| R2-2003105 | E-mail discussion report [Post109e#12][MOB] Resolving open issues for CHO Nokia, Nokia Shanghai Bell |
| R2-2003106 | MCG recovery versus recovery via CHO - Rel-16 impact Nokia, Nokia Shanghai Bell |
| R2-2003260 | Further details of CHO configuration and execution China Telecom |
| R2-2003333 | Clarification on source reconfigiration during CHO Samsung |
| R2-2003422 | Further consideration on conventional HO overriding a CHO command ZTE Corporation, Sanechips |

-continued

| | |
|---|---|
| R2-2003577 | Discussion on leftovers for CHO Huawei, HiSilicon |
| R2-2003578 | Discussion on T312 support Huawei, HiSilicon |
| R2-2003579 | Discussion on UE capabilities for CHO and T312 Huawei, HiSilicon |
| R2-2003609 | UE configuration release in RRC reestablishment SHARP |
| R2-2003847 | Report from [AT109bis-e][207][MOB] Open CHO issues Nokia, Nokia Shanghai Bell |
| R2-2003848 | Offline discussion 208: Finalization of T312 for Fast handover failure recovery Samsung (Offline rapporteur) |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

CROSS REFERENCE

This Nonprovisional application claims priority under 35 U.S.C. § 119 on provisional Application No. 63/197,985 on Jun. 7, 2021, the entire contents of which are hereby incorporated by reference.

What is claimed is:

1. A wireless terminal comprising:

processor circuitry configured to establish a connection to an access node serving a first cell; and receiver circuitry configured to receive, from the first cell, a reconfiguration message comprising a conditional reconfiguration for a second cell, the conditional reconfiguration comprising:

a triggering condition, configuration parameters, and a first version of system information, wherein the processor circuitry is further configured to, upon a satisfaction of the triggering condition:

execute the conditional reconfiguration by applying the configuration parameters for the second cell, and determine whether the first version of the system information is applied for the second cell based on whether a second version of the system information is received from the second cell after receiving the conditional reconfiguration and before executing the conditional reconfiguration.

2. The wireless terminal of claim 1, wherein the first version of the system information is applied for the second cell in a case that the second version of the system information is not received from the second cell.

3. The wireless terminal of claim 1, wherein the first version of the system information is not applied for the second cell in a case that the second version of the system information is received from the second cell.

4. The wireless terminal of claim 1, wherein the second version of the system information is applied for the second cell in a case that the second version of the system information is received from the second cell.

5. The wireless terminal of claim 1, wherein the second version of the system information is received during a connection re-establishment procedure, the connection re-establishment procedure being triggered by a radio link failure (RLF) detected on the connection to the first cell.

6. The wireless terminal of claim 1, wherein the second cell is a target candidate cell of a conditional handover.

7. An access node serving a first cell, the access node comprising:

processor circuitry configured to establish a connection, via a first cell, to a wireless terminal; and transmitter circuitry configured to transmit, to the wireless terminal, a reconfiguration message comprising a conditional reconfiguration for a second cell, the conditional reconfiguration comprising:

a triggering condition, configuration parameters, and a first version of system information, wherein the reconfiguration message is configured whereby, upon a satisfaction of the triggering condition:

the conditional reconfiguration is executed by the wireless terminal applying the configuration parameters for the second cell, and whether the first version of the system information is applied for the second cell is determined by the wireless terminal, based on whether a second version of the system information is received from the second cell after the conditional reconfiguration is received and before the conditional reconfiguration is executed.

8. The access node of claim 7, wherein the first version of the system information is applied for the second cell in a case that the second version of the system information is not received by the wireless terminal from the second cell.

9. The access node of claim 7, wherein the first version of the system information is not applied for the second cell in a case that the second version of the system information is received by the wireless terminal from the second cell.

10. The access node of claim 7, wherein the second version of the system information is applied for the second cell in a case that the second version of the system information is received by the wireless terminal from the second cell.

11. The access node of claim 7, wherein the second version of the system information is received during a connection re-establishment procedure, the connection re-establishment procedure being triggered by a radio link failure (RLF) detected on the connection to the first cell.

12. The access node of claim 7, wherein the second cell is a target candidate cell of a conditional handover.

13. A method performed by a wireless terminal, the method comprising:

establishing a connection to an access node serving a first cell;

receiving, from the first cell, a reconfiguration message comprising a conditional reconfiguration for a second cell, the conditional reconfiguration comprising:

a triggering condition, configuration parameters, and a first version of system information; and satisfying the triggering condition, upon a satisfaction of the triggering condition:

executing the conditional reconfiguration by applying the configuration parameters for the second cell, and determining whether the first version of the system information is applied for the second cell, based on whether a second version of the system information is received from the second cell after receiving the conditional reconfiguration and before executing the conditional reconfiguration.

* * * * *